US011875559B2

(12) United States Patent
Cohn et al.

(10) Patent No.: US 11,875,559 B2
(45) Date of Patent: Jan. 16, 2024

(54) SYSTEMS AND METHODOLOGIES FOR AUTOMATED CLASSIFICATION OF IMAGES OF STOOL IN DIAPERS

(71) Applicant: OBVIO HEALTH USA, INC., New York, NY (US)

(72) Inventors: Brian Alexander Cohn, Manhattan Beach, CA (US); Austin Richard Napana Lamb, Manhattan Beach, CA (US); Jamie Chen, Los Altos, CA (US); Melissa Trieu, San Jose, CA (US); Nikki Jamshidbaigi, Salt Lake City, UT (US); Pavle Joshua Medvidovic, Manhattan Beach, CA (US); Craig Gravina, Farmington, CT (US)

(73) Assignee: OBVIO HEALTH USA, INC., New York, NY (US)

( * ) Notice: Subject to any disclaimer, the term of this patent is extended or adjusted under 35 U.S.C. 154(b) by 334 days.

(21) Appl. No.: 17/372,852

(22) Filed: Jul. 12, 2021

(65) Prior Publication Data

US 2023/0012236 A1 Jan. 12, 2023

(51) Int. Cl.

| | |
|---|---|
| ***G06N 3/084*** | (2023.01) |
| ***G06T 3/40*** | (2006.01) |
| ***G06N 3/045*** | (2023.01) |
| ***G06V 10/94*** | (2022.01) |
| ***G06V 10/25*** | (2022.01) |
| ***G06V 10/22*** | (2022.01) |

(52) U.S. Cl.
CPC ............. *G06V 10/95* (2022.01); *G06N 3/045* (2023.01); *G06N 3/084* (2013.01); *G06T 3/4046* (2013.01); *G06V 10/235* (2022.01); *G06V 10/25* (2022.01)

(58) Field of Classification Search
None
See application file for complete search history.

(56) References Cited

U.S. PATENT DOCUMENTS

| | | | | |
|---|---|---|---|---|
| 2018/0174275 | A1* | 6/2018 | Bourdev | G06V 30/19173 |
| 2018/0218497 | A1* | 8/2018 | Golden | G06T 7/136 |
| 2022/0179030 | A1* | 6/2022 | Tian | G06N 3/045 |

* cited by examiner

*Primary Examiner* — Idowu O Osifade
(74) *Attorney, Agent, or Firm* — Tillman Wright, PLLC; Chad D. Tillman; Jeremy C. Doerre

(57) ABSTRACT

A method involves use of multiple convolutional neural networks and multiple segmentation masks to programmatically generate a stool rating for a digital image of a diaper with stool. The method includes generating, by a first convolutional neural network, a first mask representing an identification of an area of the digital image that corresponds to stool, and a second mask representing an identification of an area of the digital image that corresponds to a diaper. The method further includes generating a third mask representing an intersection of the first and second masks, and generating a modified digital image utilizing the third mask. The method further includes determining, by a second convolutional neural network, a stool rating for the digital image of the diaper with stool by utilizing the modified digital image as input for the second convolutional neural network.

20 Claims, 167 Drawing Sheets

| | | |
|---|---|---|
| 243 | 150 | 251 |
| 201 | 11 | 204 |
| 7 | 2 | 6 |

data for 3x3 greyscale image

3x3 greyscale image $$\text{score} = W_{bicycle}^T x + b$$

| 0.1 | -0.4 | -0.3 | 0.5 | -0.6 | -0.1 | 0.1 | -0.7 | -0.3 | column vector $W_{bicycle}$ transposed into row vector $W_{bicycle}^T$

×

| 243 |
| 201 |
| 7 |
| 150 |
| 11 |
| 2 |
| 251 |
| 204 |
| 6 |

vector x containing image data

+ 3.2 bias parameter b

= -106.3 bicycle score

| | | | | | | | | | |
|---|---|---|---|---|---|---|---|---|---|
| 0.1 | -0.4 | -0.3 | 0.5 | -0.6 | -0.1 | 0.1 | -0.7 | -0.3 | bicycle classifier weights |
| -0.3 | 0.7 | -0.7 | -0.3 | 0.1 | -0.6 | -0.3 | 0.7 | -0.7 | car classifier weights |
| 0.2 | 0.1 | 0.1 | 0.2 | 0.7 | 0.3 | -0.6 | -0.9 | -0.1 | boat classifier weights |

matrix W
containing weight
parameters

FIG. 4

| 0.1 | -0.4 | -0.3 | 0.5 | -0.6 | -0.1 | 0.1 | -0.7 | -0.3 |
|---|---|---|---|---|---|---|---|---|
| -0.3 | 0.7 | -0.7 | -0.3 | 0.1 | -0.6 | -0.3 | 0.7 | -0.7 |
| 0.2 | 0.1 | 0.1 | 0.2 | 0.7 | 0.3 | -0.6 | -0.9 | -0.1 |

matrix W containing weight parameters

×

| 243 |
|---|
| 201 |
| 7 |
| 150 |
| 11 |
| 2 |
| 251 |
| 204 |
| 6 |

vector x containing image data

+

| 3.2 |
|---|
| -2.1 |
| 6.0 |

vector b containing bias parameters

=

| -106.3 | bicycle score |
|---|---|
| 79.0 | car score |
| -221.1 | boat score |

vector s containing class scores $$\text{Loss} = \sum_{j \neq y} \max(0, s_j - s_y + \Delta)$$

*FIG. 6* y = car vector s containing class scores

| | |
|---|---|
| -106.3 | bicycle score |
| 79.0 | car score |
| -221.1 | boat score |

$$\text{Loss} = \sum_{j \neq y} \max(0, s_j - s_y + \Delta)$$

$$\text{Loss} = \max(0, s_{bicycle} - s_{car} + 100) + \max(0, s_{boat} - s_{car} + 100)$$

$$\text{Loss} = \max(0, -106.3 - 79 + 100) + \max(0, -221.1 - 79 + 100)$$

$$\text{Loss} = \max(0, -85.3) + \max(0, -200.1)$$

$$\text{Loss} = 0$$

*FIG. 7*

3x3 greyscale image

| | | |
|---|---|---|
| 149 | 202 | 254 |
| 201 | 7 | 252 |
| 8 | 147 | 1 |

data for 3x3 greyscale image

| 0.1 | -0.4 | -0.3 | 0.5 | -0.6 | -0.1 | 0.1 | -0.7 | -0.3 |
|---|---|---|---|---|---|---|---|---|
| -0.3 | 0.7 | -0.7 | -0.3 | 0.1 | -0.6 | -0.3 | 0.7 | -0.7 |
| 0.2 | 0.1 | 0.1 | 0.2 | 0.7 | 0.3 | -0.6 | -0.9 | -0.1 |

matrix W containing weight parameters

×

| 1 |
|---|
| 252 |
| 254 |
| 2 |
| 7 |
| 149 |
| 8 |
| 4 |
| 202 |

vector $x_2$ containing image data

+

| 3.2 |
|---|
| -2.1 |
| 6.0 |

vector b containing bias parameters

=

| -254.4 | bicycle score |
|---|---|
| -234.1 | car score |
| 78.2 | boat score |

vector $s_2$ containing class scores $y_2$ = car

| -254.4 | bicycle score |
| --- | --- |
| -234.1 | car score |
| 78.2 | boat score |

vector $s_2$ containing class scores $$L_i = \sum_{j \neq y_i} \max(0, s_{i,j} - s_{i,y_i} + \Delta)$$

$L_2 = \max(0, s_{2,bicycle} - s_{2,car} + 100) + \max(0, s_{2,boat} - s_{2,car} + 100)$ $L_2 = \max(0, -254.4 - -234.1 + 100) + \max(0, 78.2 - -234.1 + 100)$ $L_2 = \max(0, 79.7) + \max(0, 412.3)$ $L_2 = 492$

*FIG. 10B*

| 0.1 | -0.4 | -0.3 | 0.5 | -0.6 | -0.1 | 0.1 | -0.7 | -0.3 |
|---|---|---|---|---|---|---|---|---|
| -0.3 | 0.7 | -0.7 | -0.3 | 0.1 | -0.6 | -0.3 | 0.7 | -0.7 |
| 0.2 | 0.1 | 0.1 | 0.2 | 0.7 | 0.3 | -0.6 | -0.9 | -0.1 |

matrix W containing weight parameters

×

| 149 | 201 | 8 | 202 | 7 | 147 | 254 | 252 | 1 | vector $x_3$ containing image data

+

| 3.2 |
|---|
| -2.1 |
| 6.0 |

vector b containing bias parameters

=

| -133.9 | bicycle score |
|---|---|
| 39.7 | car score |
| -233.2 | boat score |

vector $s_3$ containing class scores $y_3$ = bicycle vector $s_3$ containing class scores

| | |
|---|---|
| -133.9 | bicycle score |
| 39.7 | car score |
| -233.2 | boat score |

$$L_i = \sum_{j \neq y_i} \max(0, s_{i,j} - s_{i,y_i} + \Delta)$$

$$L_3 = \max(0, s_{3,car} - s_{3,bicycle} + 100) + \max(0, s_{3,boat} - s_{3,bicycle} + 100)$$

$$L_3 = \max(0, 39.7 - -133.9 + 100) + \max(0, -233.2 - -133.9 + 100)$$

$$L_3 = \max(0, 273.6) + \max(0, 0.7)$$

| 0.1 | -0.4 | 0.5 | -0.6 | -0.1 | 0.1 | -0.7 | -0.3 | 3.2 |
|---|---|---|---|---|---|---|---|---|
| -0.3 | 0.7 | -0.3 | 0.1 | -0.6 | 0.1 | -0.3 | -0.7 | -2.1 |
| 0.2 | 0.1 | 0.2 | 0.7 | 0.3 | -0.6 | -0.1 | -0.9 | 6.0 |

matrix W containing weight parameters and bias parameters

| 3.2 |
|---|
| -2.1 |
| 6.0 |

vector b containing bias parameters

×

| 243 |
| 201 |
| 7 |
| 150 |
| 11 |
| 2 |
| 251 |
| 204 |
| 6 |
| **1** |

vector $x_1$ containing image data new entry for bias incorporation

=

| -106.3 | bicycle score |
|---|---|
| 79.0 | car score |
| -221.1 | boat score |

vector $s_1$

| | | | | | | | | | |
|---|---|---|---|---|---|---|---|---|---|
| 0.1 | -0.4 | -0.3 | 0.5 | -0.6 | -0.1 | 0.1 | -0.7 | -0.3 | 3.2 |
| -0.3 | 0.7 | -0.7 | -0.3 | 0.1 | -0.6 | -0.3 | 0.7 | -0.7 | -2.1 |
| 0.2 | 0.1 | 0.1 | 0.2 | 0.7 | 0.3 | -0.6 | -0.9 | -0.1 | 6.0 |

matrix W containing weight parameters and bias parameters

↔

| $W_{bicycle}$ | $W_{car}$ | $W_{boat}$ |
|---|---|---|
| 0.1 | -0.3 | 0.2 |
| -0.4 | 0.7 | 0.1 |
| -0.3 | -0.7 | 0.1 |
| 0.5 | -0.3 | 0.2 |
| -0.6 | 0.1 | 0.7 |
| -0.1 | -0.6 | 0.3 |
| 0.1 | -0.3 | -0.6 |
| -0.7 | 0.7 | -0.9 |
| -0.3 | -0.7 | -0.1 |
| -2.1 | -2.1 | 6.0 |

*FIG. 13*

$$S_{i,class} = W_{class}^T X_i$$

| 0.1 | -0.4 | -0.3 | 0.5 | -0.6 | -0.1 | 0.1 | -0.7 | -0.3 | 3.2 | vector $w_{bicycle}^T$

×

| 243 | 201 | 7 | 150 | 11 | 2 | 251 | 204 | 6 | 1 | vector $x_1$ containing image data

=

| -106.3 | bicycle score $S_{1,bicycle}$ $$L_i = \sum_{j \neq y} \max(0, s_{i,j} - s_{i,y_i} + \Delta)$$

$$L_i = \sum_{j \neq y} \max(0, w_j^T x_i - w_{y_i}^T x_i + \Delta)$$

*FIG. 15*

$$L_i = \sum_{j \neq y} \max( 0, w_j^T x_i - w_{y_i}^T x_i + \Delta )$$

$$\nabla_{w_{y_i}} L_i = -\left(\sum_{j \neq y} 1_{true}(w_j^T x_i - w_{y_i}^T x_i + \Delta > 0)\right) x_i$$

*FIG. 16* class scores for image 2 (i = 2)

| -254.4 | bicycle score |
| -234.1 | car score |
| 78.2 | boat score |

$y_2$ = car $$L_i = \sum_{j \neq y} \max(0, w_j^T x_i - w_{y_i}^T x_i + \Delta)$$

$L_2 = \max(0, w_{bicycle}^T x_2 - w_{car}^T x_2 + 100) + \max(0, w_{boat}^T x_2 - w_{car}^T x_2 + 100)$ $L_2 = \max(0, -254.4 - -234.1 + 100) + \max(0, 78.2 - -234.1 + 100)$ $L_2 = \max(0, 79.7) + \max(0, 412.3)$ $L_2 = 492$

*FIG. 17*

$y_2 = car$ class scores for image 2 ( i = 2 )

| | |
|---|---|
| -254.4 | bicycle score |
| -234.1 | car score |
| 78.2 | boat score |

$$\nabla_{w_{y_i}} L_i = -\left(\sum_{j \neq y} 1_{true}\left(w_j^T x_i - w_{y_i}^T x_i + \Delta > 0\right)\right) x_i$$

$$\nabla_{w_{car}} L_2 = -(1_{true}(w_{bicycle}^T x_2 - w_{car}^T x_2 + 100 > 0) + 1_{true}(w_{boat}^T x_2 - w_{car}^T x_2 + 100 > 0))x_2$$

$$\nabla_{w_{car}} L_2 = -(1_{true}(-254.4 - -234.1 + 100 > 0) + 1_{true}(78.2 - -234.1 + 100 > 0))x_2$$

$$\nabla_{w_{car}} L_2 = -(1 + 1)x_2$$

$$\nabla_{w_{car}} L_2 = -2x_2$$

*FIG. 18*

$$\nabla_{W_{car}} L_2 = -2 * \begin{bmatrix} 1 \\ 252 \\ 254 \\ 2 \\ 7 \\ 149 \\ 8 \\ 4 \\ 202 \\ 1 \end{bmatrix} = \begin{bmatrix} -2 \\ -504 \\ -508 \\ -4 \\ -14 \\ -298 \\ -16 \\ -8 \\ -404 \\ -2 \end{bmatrix}$$

vector $x_2$ containing image data

FIG. 19

$$L_i = \sum_{j \neq y} \max(0, w_j^T x_i - w_{y_i}^T x_i + \Delta)$$

$$\nabla_{w_j} L_i = 1_{true}(w_j^T x_i - w_{y_i}^T x_i + \Delta > 0) x_i$$

*FIG. 20*

$y_2$ = car class scores for image 2 ( i = 2 )

| | |
|---|---|
| -254.4 | bicycle score |
| -234.1 | car score |
| 78.2 | boat score |

$$\nabla_{w_j} L_i = 1_{true}(w_j^T x_i - w_{y_i}^T x_i + \Delta > 0)x_i$$

$$\nabla_{w_{bicycle}} L_2 = 1_{true}(w_{bicycle}^T x_2 - w_{car}^T x_2 + 100 > 0)x_2$$

$$\nabla_{w_{bicycle}} L_2 = 1_{true}(-254.4 - -234.1 + 100 > 0)x_2$$

$$\nabla_{w_{bicycle}} L_2 = (1)x_2$$

$$\nabla_{w_{bicycle}} L_2 = x_2$$

*FIG. 21*

$$\nabla W_{bicycle} L_2 = 1 * \begin{array}{|c|c|c|c|c|c|c|c|c|c|} \hline 1 & 252 & 254 & 2 & 7 & 149 & 8 & 4 & 202 & 1 \\ \hline \end{array}$$

= vector $x_2$ containing image data $\begin{array}{|c|c|c|c|c|c|c|c|c|c|} \hline 1 & 252 & 254 & 2 & 7 & 149 & 8 & 4 & 202 & 1 \\ \hline \end{array}$ $y_2$ = car class scores for image 2 ( i = 2 )

| | |
|---|---|
| -254.4 | bicycle score |
| -234.1 | car score |
| 78.2 | boat score |

$$\nabla_{w_j} L_i = 1_{true}(w_j^T x_i - w_{y_i}^T x_i + \Delta > 0)x_i$$

$$\nabla_{w_{boat}} L_2 = 1_{true}(w_{boat}^T x_2 - w_{car}^T x_2 + 100 > 0)x_2$$

$$\nabla_{w_{boat}} L_2 = 1_{true}(78.2 - -234.1 + 100 > 0)x_2$$

$$\nabla_{w_{boat}} L_2 = (1)x_2$$

$$\nabla_{w_{boat}} L_2 = x_2$$

*FIG. 23*

| 1 | 252 | 254 | 2 | 7 | 149 | 8 | 4 | 202 | 1 |

=

$\nabla_{W_{boat}} L_2 = 1 *$

| 1 | 252 | 254 | 2 | 7 | 149 | 8 | 4 | 202 | 1 | vector $x_2$ containing image data $\nabla_W L_2 =$

| | | | | | | | | | | |
|---|---|---|---|---|---|---|---|---|---|---|
| 1 | 252 | 254 | 2 | 7 | 149 | 8 | 4 | 202 | 1 | $\nabla_{W_{bicycle}} L_2^T$ |
| -2 | -504 | -508 | -4 | -14 | -298 | -16 | -8 | -404 | -2 | $\nabla_{W_{car}} L_2^T$ |
| 1 | 252 | 254 | 2 | 7 | 149 | 8 | 4 | 202 | 1 | $\nabla_{W_{boat}} L_2^T$ |

*FIG. 25*

$$W_{updated} = W_{original} + -Z * \nabla_W L_2$$

step size

*FIG. 26*

$$-z * \nabla_W L_2$$

$$-Z * \nabla_W L_2 = -0.001 *$$

| | | | | | | | | | | |
|---|---|---|---|---|---|---|---|---|---|---|
| 1 | 252 | 254 | 2 | 7 | 149 | 8 | 4 | 202 | 1 | $\nabla_{W_{bicycle}} L_2^T$ |
| -2 | -504 | -508 | -4 | -14 | -298 | -16 | -8 | -404 | -2 | $\nabla_{W_{car}} L_2^T$ |
| 1 | 252 | 254 | 2 | 7 | 149 | 8 | 4 | 202 | 1 | $\nabla_{W_{boat}} L_2^T$ |

$\nabla_W L_2$ $$-Z * \nabla_W L_2 =$$

| | | | | | | | | | |
|---|---|---|---|---|---|---|---|---|---|
| -0.001 | -0.202 | -0.004 | -0.008 | -0.149 | -0.007 | -0.002 | -0.254 | -0.252 | -0.001 |
| 0.002 | 0.404 | 0.008 | 0.016 | 0.298 | 0.014 | 0.004 | 0.508 | 0.504 | 0.002 |
| -0.001 | -0.202 | -0.004 | -0.008 | -0.149 | -0.007 | -0.002 | -0.254 | -0.252 | -0.001 |

*FIG. 27*

$$W_{updated} = W_{original} + -z * \nabla_W L_2$$

$W_{original}$

| | | | | | | | | | |
|---|---|---|---|---|---|---|---|---|---|
| 0.1 | -0.4 | -0.3 | 0.5 | -0.6 | -0.1 | 0.1 | -0.7 | -0.3 | 3.2 |
| -0.3 | 0.7 | -0.7 | -0.3 | 0.1 | -0.6 | -0.3 | 0.7 | -0.7 | -2.1 |
| 0.2 | 0.1 | 0.1 | 0.2 | 0.7 | 0.3 | -0.6 | -0.9 | -0.1 | 6.0 |

+

$-Z * \nabla_W L_2$

| | | | | | | | | | |
|---|---|---|---|---|---|---|---|---|---|
| -0.001 | -0.202 | -0.004 | -0.008 | -0.149 | -0.007 | -0.002 | -0.254 | -0.252 | -0.001 |
| 0.002 | 0.404 | 0.008 | 0.016 | 0.298 | 0.014 | 0.004 | 0.508 | 0.504 | 0.002 |
| -0.001 | -0.202 | -0.004 | -0.008 | -0.149 | -0.007 | -0.002 | -0.254 | -0.252 | -0.001 |

=

$W_{updated}$

| | | | | | | | | | |
|---|---|---|---|---|---|---|---|---|---|
| 0.099 | -0.602 | -0.304 | 0.492 | -0.749 | -0.107 | 0.098 | -0.954 | -0.552 | 3.199 |
| -0.298 | 1.104 | -0.692 | -0.284 | 0.398 | -0.586 | -0.296 | 1.208 | -0.204 | -2.098 |
| 0.199 | -0.102 | 0.096 | 0.192 | 0.651 | 0.293 | -0.602 | -1.154 | -0.352 | 5.999 |

*FIG. 28*

| | | | | | | | | | |
|---|---|---|---|---|---|---|---|---|---|
| 0.099 | -0.602 | -0.304 | 0.492 | -0.749 | -0.107 | 0.098 | -0.954 | -0.552 | 3.199 |
| -0.298 | 1.104 | -0.692 | -0.284 | 0.398 | -0.586 | -0.296 | 1.208 | -0.204 | -2.098 |
| 0.199 | -0.102 | 0.096 | 0.192 | 0.651 | 0.293 | -0.602 | -1.154 | -0.352 | 5.999 |

matrix $W_{updated}$

×

| |
|---|
| 1 |
| 252 |
| 254 |
| 2 |
| 7 |
| 149 |
| 8 |
| 4 |
| 202 |
| 1 |

vector $x_2$ containing image data

=

| | |
|---|---|
| -360.36 | bicycle score |
| -23.796 | car score |
| -27.06 | boat score |

hypothetical updated class scores

*FIG. 29*

$y_2 = \text{car}$ hypothetical updated class scores for image 2

| | |
|---|---|
| -360.36 | bicycle score |
| -23.796 | car score |
| -27.06 | boat score |

$$\text{Loss} = \sum_{j \neq y} \max(0, s_j - s_y + \Delta)$$

$$\text{Loss} = \max(0, s_{bicycle} - s_{car} + 100) + \max(0, s_{boat} - s_{car} + 100)$$

$$\text{Loss} = \max(0, -360.36 - -23.796 + 100) + \max(0, -27.06 - -23.796 + 100)$$

$$\text{Loss} = \max(0, -236.564) + \max(0, 96.736)$$

$$\text{Loss} = 96.736$$

*FIG. 30*

$$\text{Data Loss} = \frac{1}{N} \sum_{i} \text{Loss}_i$$

*FIG. 32*

$$\text{Data Loss} = \frac{1}{3}(0 + 492 + 274.3)$$

$$\text{Data Loss} = 255.4333$$

*FIG. 33*

$$\text{Regularization Penalty} = \sum_{a} \sum_{b} W_{a,b}^{2}$$

*FIG. 34*

| | | | | | | | | | |
|---|---|---|---|---|---|---|---|---|---|
| 0.1 | -0.4 | -0.3 | 0.5 | -0.6 | -0.1 | 0.1 | -0.7 | -0.3 | bicycle classifier weights |
| -0.3 | 0.7 | -0.7 | -0.3 | 0.1 | -0.6 | -0.3 | 0.7 | -0.7 | car classifier weights |
| 0.2 | 0.1 | 0.1 | 0.2 | 0.7 | 0.3 | -0.6 | -0.9 | -0.1 | boat classifier weights |

matrix W
containing weight
parameters $$\text{Regularization Penalty} = \sum_{b=1}^{9} W_{bicycle,b}^{2} + \sum_{b=1}^{9} W_{car,b}^{2} + \sum_{b=1}^{9} W_{boat,b}^{2}$$

*FIG. 35*

| | | | | | | | | | |
|---|---|---|---|---|---|---|---|---|---|
| 0.1 | -0.4 | -0.3 | 0.5 | -0.6 | -0.1 | 0.1 | -0.7 | -0.3 | bicycle classifier weights |
| -0.3 | 0.7 | -0.7 | -0.3 | 0.1 | -0.6 | -0.3 | 0.7 | -0.7 | car classifier weights |
| 0.2 | 0.1 | 0.1 | 0.2 | 0.7 | 0.3 | -0.6 | -0.9 | -0.1 | boat classifier weights |

matrix W
containing weight
parameters $$\sum_{b=1}^{9} W_{bicycle,b}^{2} = 0.1^2 + -0.4^2 + -0.3^2 + 0.5^2 + -0.6^2 + -0.1^2 + 0.1^2 + -0.7^2 + -0.3^2$$

*FIG. 36*

$$\text{Regularization Loss} = \lambda \sum_{a} \sum_{b} W_{a,b}^{2}$$

FIG. 37

$$\text{Total Loss} = \frac{1}{N}\sum_{i} L_i + \lambda \sum_{a} \sum_{b} W_{a,b}^{2}$$

$$L_i = -\log\left(\frac{e^{s_{y_i}}}{\sum_j e^{s_j}}\right) \qquad L_i = -s_{y_i} + \log\sum_j e^{s_j}$$

$$p_{y_i} = \frac{e^{s_{y_i}}}{\sum_j e^{s_j}}$$

*FIG. 39*

$$f(z) = W_1 z + b_1 \qquad g(z) = W_2 z + b_2$$

$$f(z) = W_1 z + b_1 \qquad g(z) = W_2 f(z) + b_2$$

$$f(z) = \max(0, W_1 z + b_1) \quad g(z) = W_2 z + b_2$$

$$s = g(\,f(x)\,)$$

$$s = g(\,\max(\,0, W_1 x + b_1)$$

$$s = W_2(\,\max(0, W_1 x + b_1)) + b_2$$

$$f(z) = \max(0, z W_1 + b_1) \quad g(z) = z W_2 + b_2$$

$$S = (\ \max(0, X W_1 + b_1))\ W_2 + b_2$$

*FIG. 44A*

| | | | |
|---|---|---|---|
| image 1 | 243 | 17 | i=1 |
| image 2 | 19 | 45 | i=2 |
| image 3 | 75 | 154 | i=3 |

matrix
containing image data for 3
two-pixel images

*FIG. 45*

| | | | |
|---|---|---|---|
| 0.01 | 0.01 | 0.02 | 0.03 |

vector $b_1$ containing bias parameters

| | | | |
|---|---|---|---|
| 0.1 | -0.3 | 0.3 | -0.6 |
| -0.4 | 0.2 | -0.7 | 0.5 |

matrix $W_1$ containing weight parameters

*FIG. 47*

$$f(z) = \max(0, z W_1 + b_1)$$

$$F = \max(0, X W_1 + b_1)$$

$$\begin{bmatrix} 0.906 & -0.867 \\ -0.851 & -0.647 \\ -0.412 & 0.208 \end{bmatrix} \times \begin{bmatrix} 0.1 & -0.3 & 0.3 & -0.6 \\ -0.4 & 0.2 & -0.7 & 0.5 \end{bmatrix} + \begin{bmatrix} 0.01 & 0.01 & 0.02 & 0.03 \end{bmatrix} = \begin{bmatrix} 0.447 & -0.435 & 0.899 & -0.947 \\ 0.184 & 0.136 & 0.218 & 0.217 \\ -0.114 & 0.175 & -0.249 & 0.381 \end{bmatrix}$$

matrix X containing image data matrix $W_1$ containing weight parameters vector $b_1$ containing bias parameters $$\max\left(0, \begin{bmatrix} 0.447 & -0.435 & 0.899 & -0.947 \\ 0.184 & 0.136 & 0.218 & 0.217 \\ -0.114 & 0.175 & -0.249 & 0.381 \end{bmatrix}\right) = \begin{bmatrix} 0.447 & 0 & 0.899 & 0 \\ 0.184 & 0.136 & 0.218 & 0.217 \\ 0 & 0.175 & 0 & 0.381 \end{bmatrix}$$

matrix F

$$f(z) = \max(0, z W_1 + b_1) \quad g(z) = z W_2 + b_2$$

$$s_i = (\ \max(0, x_i W_1 + b_1))\ W_2 + b_2$$

*FIG. 52*

$$[0.906 \quad -0.867] \times \begin{bmatrix} 0.1 & -0.3 & 0.3 & -0.6 \\ -0.4 & 0.2 & -0.7 & 0.5 \end{bmatrix} + [0.01 \quad 0.01 \quad 0.02 \quad 0.03] = [0.447 \quad 0 \quad 0.899 \quad 0]$$

vector $x_1$ containing image data × matrix $W_1$ containing weight parameters + vector $b_1$ containing bias parameters = vector $f_1$ $$s_i = g(\, f(x_i)\,)$$

$$f(z) = \max(0, z W_1 + b_1) \quad g(z) = z W_2 + b_2$$

$$s_i = (\, \max(0, x_i W_1 + b_1))\, W_2 + b_2$$

$$L_i = -\log\left( \frac{e^{s_{i,y_i}}}{\sum_j e^{s_{i,j}}} \right)$$

$$p_{i,k} = \frac{e^{s_{i,k}}}{\sum_j e^{s_{i,j}}} \qquad p_{i,y_i} = \frac{e^{s_{i,y_i}}}{\sum_j e^{s_{i,j}}}$$

*FIG. 57*

$y_1 = \text{metal}$ $$p_{1,metal} = \frac{e^{s_{1,metal}}}{e^{s_{1,metal}} + e^{s_{1,plastic}} + e^{s_{1,wood}}}$$

$$p_{1,metal} = \frac{e^{0.773}}{e^{0.773} + e^{0.435} + e^{0.424}}$$

$$p_{1,metal} = \frac{2.166}{2.166 + 1.545 + 1.358} = 0.427$$

$$L_i = -\log\left(\frac{e^{s_{i,y_i}}}{\sum_j e^{s_{i,j}}}\right)$$

$$p_{i,k} = \frac{e^{s_{i,k}}}{\sum_j e^{s_{i,j}}} \qquad p_{i,y_i} = \frac{e^{s_{i,y_i}}}{\sum_j e^{s_{i,j}}}$$

$$L_i = -\log\left(p_{i,y_i}\right)$$

*FIG. 60*

$$L_i = -\log\left(p_{i,y_i}\right)$$

$$L_1 = -\log\left(p_{1,metal}\right)$$

$$L_1 = -\log\left(0.427\right) = 0.369$$

*FIG. 61*

|         |       |
|---------|-------|
| class 1 | metal |
| class 2 | plastic |
| class 3 | wood |

|         |   |
|---------|---|
| image 1 | 1 | i=1
| image 2 | 1 | i=2
| image 3 | 3 | i=3 vector y containing indicator of correct class $y_1 = 1$ $$p_{1,1} = \frac{e^{S_{1,1}}}{e^{S_{1,1}} + e^{S_{1,2}} + e^{S_{1,3}}}$$

$$p_{1,1} = \frac{e^{0.773}}{e^{0.773} + e^{0.435} + e^{0.424}}$$

$$p_{1,1} = \frac{2.166}{2.166 + 1.545 + 1.358} = 0.427$$

$$L_i = -\log\left( p_{i,y_i} \right)$$

$$L_1 = -\log\left( p_{1,1} \right)$$

$$L_1 = -\log\left( 0.427 \right) = 0.369$$

FIG. 64

$$p_{i,k} = \frac{e^{s_{i,k}}}{\sum_j e^{s_{i,j}}}$$

```
matrix F = max(0, dot(X,W1) + b1);
matrix S = dot(F,W2) + b2;

stepsize = 1;
reg = 1x10^-3;
int n = X.shape[0];

matrix eS = exp(S);
matrix rowsums_eS = sum(eS, axis=1, keepdims=true);
matrix P = eS / rowsums_eS;
matrix correct_P = P[range(n),y];

matrix L = -( log.P[ range(n), y ] );

int dataloss = sum(L) / n;
int regloss = reg * sum(W1 * W1) + reg * sum(W2*W2);
int loss = dataloss + regloss;
```

*FIG. 66*

$$\text{matrix } F = \max(0, \text{dot}(X,W1) + b1);$$
$$F = \max(0, X W_1 + b_1)$$

| | |
|---|---|
| 0.906 | -0.867 |
| -0.851 | -0.647 |
| -0.412 | 0.208 |

matrix X containing image data x

| | | | |
|---|---|---|---|
| 0.1 | -0.3 | 0.3 | -0.6 |
| -0.4 | 0.2 | -0.7 | 0.5 |

matrix W1 containing weight parameters

+

| | | | |
|---|---|---|---|
| 0.01 | 0.01 | 0.02 | 0.03 |

matrix b1 containing bias parameters

=

| | | | |
|---|---|---|---|
| 0.447 | -0.435 | 0.899 | -0.947 |
| 0.184 | 0.136 | 0.218 | 0.217 |
| -0.114 | 0.175 | -0.249 | 0.381 |

max( 0,

| | | | |
|---|---|---|---|
| 0.447 | -0.435 | 0.899 | -0.947 |
| 0.184 | 0.136 | 0.218 | 0.217 |
| -0.114 | 0.175 | -0.249 | 0.381 |

) =

| | | | |
|---|---|---|---|
| 0.447 | 0 | 0.899 | 0 |
| 0.184 | 0.136 | 0.218 | 0.217 |
| 0 | 0.175 | 0 | 0.381 |

matrix F

*FIG. 67A* matrix eS = exp(S);

$$e^{S_{i,k}}$$

|  |  |  |
|---|---|---|
| 2.166 | 1.545 | 1.358 |
| 1.103 | 1.192 | 0.975 |
| 0.840 | 1.151 | 0.768 |

matrix eS

|  | class 1 scores | class 2 scores | class 3 scores |
|---|---|---|---|
| image 1 | 0.773 | 0.435 | 0.424 |
| image 2 | 0.098 | 0.176 | -0.025 |
| image 3 | -0.174 | 0.141 | -0.264 |

matrix S matrix P = eS / rowsums_eS;

$$p_{i,k} = \frac{e^{S_{i,k}}}{\sum_j e^{S_{i,j}}}$$

matrix eS

|  | class 1 | class 2 | class 3 |
|---|---|---|---|
| image 1 | 2.166 | 1.545 | 1.358 |
| image 2 | 1.103 | 1.192 | 0.975 |
| image 3 | 0.840 | 1.151 | 0.768 |

/ matrix rowsums_eS

| 5.069 |
| 3.270 |
| 2.760 |

= matrix P

|  | k=1 | k=2 | k=3 |
|---|---|---|---|
| i=1 | 0.427 | 0.305 | 0.268 |
| i=2 | 0.337 | 0.365 | 0.298 |
| i=3 | 0.304 | 0.417 | 0.278 |

matrix L = -( log.correct_P );

$$L_i = -\log(\ p_{i,y_i}\ )$$

$$-\log\left(\begin{bmatrix}0.427\\0.337\\0.278\end{bmatrix}\right) = \begin{bmatrix}0.369\\0.472\\0.556\end{bmatrix}\begin{matrix}i=1\\i=2\\i=3\end{matrix}$$

matrix correct_P — matrix L

*FIG. 71*

$$\text{Total Loss} = \underbrace{\frac{1}{N}\sum_{i} L_i}_{\text{Data Loss}} + \underbrace{\lambda \sum_{v}\sum_{a}\sum_{b} W_{v,a,b}^{2}}_{\text{Regularization Loss}}$$

$$\text{Reg. Loss} = \lambda \sum_{a}\sum_{b} W_{1,a,b}^{2} + \lambda \sum_{a}\sum_{b} W_{2,a,b}^{2}$$

*FIG. 72* int dataloss = sum(L) / n;

$$\text{Data Loss} = \frac{1}{N}\sum_i L_i$$

$$\text{sum}(\boxed{\begin{array}{c} 0.369 \\ 0.472 \\ 0.556 \end{array}}) / 3 = 0.466$$

matrix L   int dataloss

```
int regloss = reg * sum(W1 * W1) + reg * sum(W2*W2);
```

$$\text{Reg. Loss} = \lambda \sum_{a} \sum_{b} W_{1,a,b}^{2} + \lambda \sum_{a} \sum_{b} W_{2,a,b}^{2}$$

$$W1 * W1 = \begin{bmatrix} 0.1 & -0.3 & 0.3 & -0.6 \\ -0.4 & 0.2 & -0.7 & 0.5 \end{bmatrix} * \begin{bmatrix} 0.1 & -0.3 & 0.3 & -0.6 \\ -0.4 & 0.2 & -0.7 & 0.5 \end{bmatrix} = \begin{bmatrix} 0.01 & 0.09 & 0.09 & 0.36 \\ 0.16 & 0.04 & 0.49 & 0.25 \end{bmatrix}$$

matrix W1 | matrix W1 | W1 * W1

$$\text{sum}(W1*W1) = 0.01 + 0.09 + 0.09 + 0.36 + 0.16 + 0.04 + 0.49 + 0.25 = 1.49$$

$$\text{reg} * \text{sum}(W1 * W1) = .001 * 1.49 = 0.00149$$

*FIG. 74*

```
int regloss = reg * sum(W1 * W1) + reg * sum(W2*W2);
```

$$\text{Reg. Loss} = \lambda \sum_a \sum_b W_{1,a,b}^2 + \lambda \sum_a \sum_b W_{2,a,b}^2$$

reg * sum(W1 * W1) = .001 * 1.49 = 0.00149 reg * sum(W2 * W2) = .001 * 2.04 = 0.00204 int regloss = 0.00149 + 0.00204 = 0.00353

*FIG. 75*

```
int loss = dataloss + regloss;
```

$$\text{Total Loss} = \underbrace{\frac{1}{N}\sum_i L_i}_{\text{Data Loss}} + \underbrace{\lambda \sum_v \sum_a \sum_b W_{v,a,b}^2}_{\text{Regularization Loss}}$$

$$\text{loss} = \underbrace{0.401}_{\text{dataloss}} + \underbrace{0.00353}_{\text{regloss}} = 0.40453$$

*FIG. 76*

$$p_{i,k} = \frac{e^{s_{i,k}}}{\sum_j e^{s_{i,j}}} \qquad p_{i,y_i} = \frac{e^{s_{i,y_i}}}{\sum_j e^{s_{i,j}}}$$

$$L_i = -\log(\, p_{i,y_i} \,)$$

$$\frac{\delta L_i}{\delta s_{i,k}} = p_{i,k} - 1_{true}(y_i = k)$$

*FIG. 77*

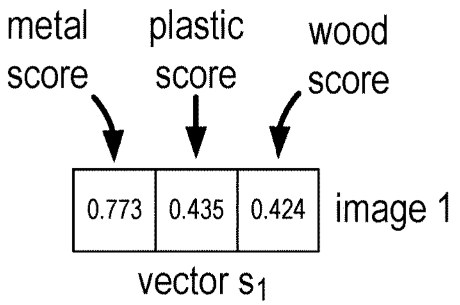
$$y_1 = \text{metal}$$
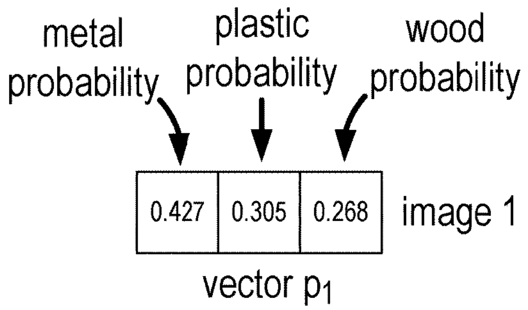
$$\frac{\delta L_i}{\delta s_{i,k}} = p_{i,k} - 1_{true}(y_i = k)$$
$$\frac{\delta L_1}{\delta s_{1,metal}} = p_{1,metal} - 1_{true}(y_1 = metal)$$
$$\frac{\delta L_1}{\delta s_{1,metal}} = 0.427 - 1_{true}(true) = -0.573$$
*FIG. 78*

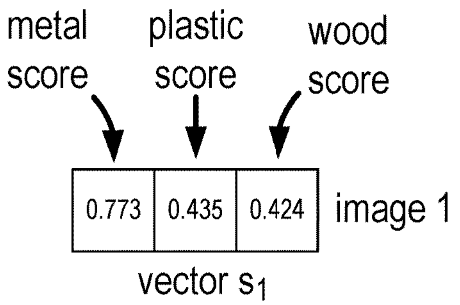
$y_1$ = metal
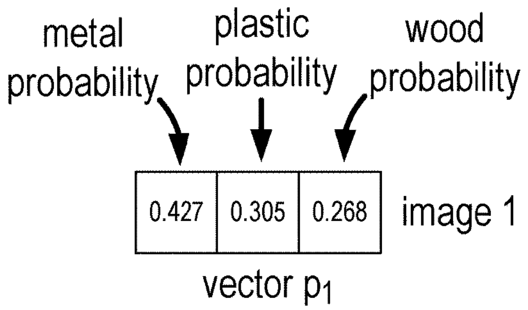
$$\frac{\delta L_i}{\delta s_{i,k}} = p_{i,k} - 1_{true}(y_i = k)$$
$$\frac{\delta L_1}{\delta s_{1,plastic}} = p_{1,plastic} - 1_{true}(y_1 = plastic)$$
$$\frac{\delta L_1}{\delta s_{1,plastic}} = 0.305 - 1_{true}(false) = 0.305$$
*FIG. 79*

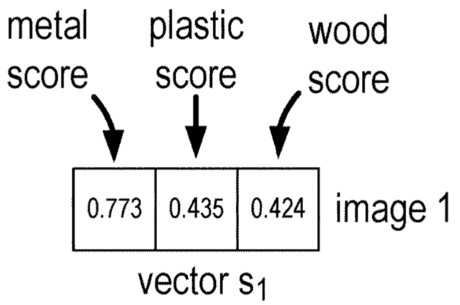
$y_1$ = metal
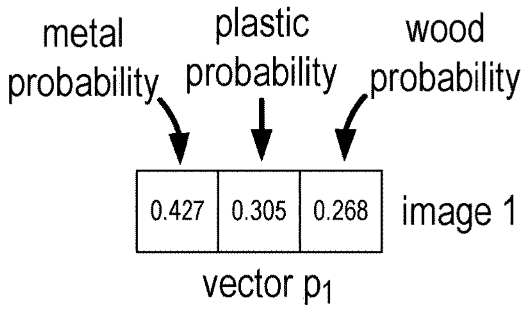
$$\frac{\delta L_i}{\delta s_{i,k}} = p_{i,k} - 1_{true}(y_i = k)$$
$$\frac{\delta L_1}{\delta s_{1,wood}} = p_{1,wood} - 1_{true}(y_1 = wood)$$
$$\frac{\delta L_1}{\delta s_{1,wood}} = 0.268 - 1_{true}(false) = 0.268$$
*FIG. 80*

```
matrix dS = P;
dS = dS[ range(n), y ] – 1;
dS = dS / n;

dW2 = dot(F.T, dS);
db2 = sum(dS, axis=0, keepdims=true);

dF = dot(dS, W2.T);
dF[F <= 0] = 0;

dW1 = dot(X.T, dF);
db1 = sum(dF, axis=0, keepdims=true);

dW2 = dW2 + 2 * reg * W2;
dW1 = dW1 + 2 * reg * W1;

W1 = W1 + -stepsize * dW1;
b1 = b1 + -stepsize * db1;
W2 = W2 + -stepsize * dW2;
b2 = b2 + -stepsize * db2;
```

matrix dS

| | class 1 | class 2 | class 3 |
|---|---|---|---|
| image 1 | -0.573 | 0.305 | 0.268 |
| image 2 | -0.663 | 0.365 | 0.298 |
| image 3 | 0.304 | 0.417 | -0.722 |

/ 3 (n) = matrix dS

| | | |
|---|---|---|
| -0.191 | 0.102 | 0.089 |
| -0.221 | 0.122 | 0.099 |
| 0.101 | 0.139 | -0.241 |

*FIG. 83* dW2 = dot(F.T, dS);

|  | class 2 | class 3 |
|---|---|---|
| class 1 → | -0.126 | -0.012 | -0.220 | -0.009 |
| class 2 → | 0.068 | 0.041 | 0.118 | 0.079 |
| class 3 → | 0.058 | -0.029 | 0.102 | -0.070 |

matrix dW2

=

| -0.191 | 0.102 | 0.089 |
| -0.221 | 0.122 | 0.099 |
| 0.101 | 0.139 | -0.241 |

matrix dS

×

| 0.447 | 0.184 | 0 |
| 0 | 0.136 | 0.175 |
| 0.899 | 0.218 | 0 |
| 0 | 0.217 | 0.381 |

matrix F$^T$ dF = dot(dS, W2.T);

| | | |
|---|---|---|
| -0.191 | 0.102 | 0.089 |
| -0.221 | 0.122 | 0.099 |
| 0.101 | 0.139 | -0.241 |

matrix dS x

| | | | |
|---|---|---|---|
| 0.3 | -0.4 | 0.7 | -0.3 |
| -0.3 | 0.2 | 0.6 | 0.2 |
| 0.3 | -0.1 | 0.3 | -0.7 |

matrix $W2^T$

=

| | | | |
|---|---|---|---|
| -0.061 | 0.088 | -0.046 | 0.015 |
| -0.073 | 0.103 | -0.052 | 0.021 |
| -0.084 | 0.012 | 0.082 | 0.166 |

matrix dF

*FIG. 86* dW1 = dot(X.T, dF);

| | | |
|---|---|---|
| 0.906 | -0.851 | -0.412 |
| -0.867 | -0.647 | 0.208 |

matrix $X^T$

×

| | | | |
|---|---|---|---|
| -0.061 | 0 | -0.046 | 0 |
| -0.073 | 0.103 | -0.052 | 0.021 |
| 0 | 0.012 | 0 | 0.166 |

matrix dF

=

| | | | |
|---|---|---|---|
| 0.007 | -0.093 | 0.003 | -0.086 |
| 0.100 | -0.064 | 0.074 | 0.021 |

matrix dW1

*FIG. 88* db1 = sum(dF, axis=0, keepdims=true);

| 0 | + | 0.021 | + | 0.166 | = | 0.187 |
| -0.046 | + | -0.052 | + | 0 | = | -0.098 |
| 0 | + | 0.103 | + | 0.012 | = | 0.115 |
| -0.061 | + | -0.073 | + | 0 | = | -0.134 |

matrix db1: | -0.134 | 0.115 | -0.098 | 0.187 | matrix dF:
| -0.061 | 0 | 0 |
| -0.073 | 0.103 | -0.052 | -0.046 |
| 0 | 0.012 | 0 |
| 0 | ... |

$$dW1 = dW1 + 2 * reg * W1;$$

2 * reg * W1 = 2 * .001 * reg

| 0.1 | -0.3 | 0.3 | -0.6 |
|---|---|---|---|
| -0.4 | 0.2 | -0.7 | 0.5 |

W1

=

| 0.000 | -0.001 | 0.001 | -0.001 |
|---|---|---|---|
| 0.000 | -0.001 | 0.000 | -0.001 |

dW2 =

| 0.007 | -0.093 | 0.003 | -0.086 |
|---|---|---|---|
| 0.100 | -0.064 | 0.074 | 0.021 |

matrix dW1

+

| 0.000 | -0.001 | 0.001 | -0.001 |
|---|---|---|---|
| 0.000 | -0.001 | 0.000 | -0.001 |

2 * reg * W1

=

| 0.007 | -0.094 | 0.004 | -0.087 |
|---|---|---|---|
| 0.099 | -0.064 | 0.073 | 0.022 |

dW1

W1 = W1 + -stepsize * dW1;

$$W1 = \underbrace{\begin{bmatrix} 0.1 & -0.3 & 0.3 & -0.6 \\ -0.4 & 0.2 & -0.7 & 0.5 \end{bmatrix}}_{\text{matrix W1}} + -1 * \underbrace{\begin{bmatrix} 0.007 & -0.094 & 0.004 & -0.087 \\ 0.099 & -0.064 & 0.073 & 0.022 \end{bmatrix}}_{\text{matrix dW1}} = \begin{bmatrix} 0.093 & -0.206 & 0.296 & -0.513 \\ -0.499 & 0.264 & -0.773 & 0.478 \end{bmatrix}$$

updated matrix W1 containing updated weight parameters

*FIG. 92* b1 = b1 + -stepsize * db1;

b1 = | 0.01 | 0.02 | 0.03 |  + -1 *  | -0.134 | 0.115 | -0.098 | 0.187 |  =  | 0.144 | -0.105 | 0.118 | -0.157 | matrix b1 matrix db1 updated matrix b1 containing updated bias parameters $$W2 = W2 + -stepsize * dW2;$$

$$W2 = \begin{bmatrix} 0.3 & -0.3 & 0.3 \\ -0.4 & 0.2 & -0.1 \\ 0.7 & 0.6 & 0.3 \\ -0.3 & 0.2 & -0.7 \end{bmatrix} + -1 * \begin{bmatrix} -0.125 & 0.067 & 0.059 \\ -0.013 & 0.041 & -0.029 \\ -0.219 & 0.119 & 0.103 \\ -0.010 & 0.079 & -0.071 \end{bmatrix} = \begin{bmatrix} 0.425 & -0.367 & 0.241 \\ -0.387 & 0.159 & -0.071 \\ 0.919 & 0.481 & 0.197 \\ -0.290 & 0.121 & -0.629 \end{bmatrix}$$

matrix W2 matrix dW2 updated matrix W2 containing updated weight parameters

*FIG. 94* b2 = b2 + -stepsize * db2;

$$b2 = \begin{array}{|c|c|c|} \hline 0.01 & 0.03 & 0.02 \\ \hline \end{array} + -1 * \begin{array}{|c|c|c|} \hline -0.311 & 0.363 & -0.053 \\ \hline \end{array} = \begin{array}{|c|c|c|} \hline 0.321 & -0.333 & 0.033 \\ \hline \end{array}$$

matrix b2     matrix db2     updated matrix b2 containing updated bias parameters

| | | |
|---|---|---|
| 243 | 150 | 251 |
| 201 | 11 | 204 |
| 7 | 2 | 6 |

data for 3x3 greyscale image

| | |
|---|---|
| 1 | -1 |
| 0 | 1 |

filter / kernel

FIG. 97A

| | | |
|---|---|---|
| 243 | 150 | 251 |
| 201 | 11 | 204 |
| 7 | 2 | 6 |

data for red color channel of 3x3 image

| | | |
|---|---|---|
| 7 | 3 | 2 |
| 47 | 54 | 43 |
| 123 | 111 | 5 |

data for green color channel of 3x3 image

| | | |
|---|---|---|
| 245 | 226 | 7 |
| 111 | 8 | 102 |
| 45 | 9 | 103 |

data for blue color channel of 3x3 image

| | |
|---|---|
| 1 | -1 |
| 1 | -1 |

filter / kernel for red color channel

| | |
|---|---|
| 0 | 0 |
| 1 | -1 |

filter / kernel for green color channel

| | |
|---|---|
| 0 | -1 |
| 1 | 0 |

filter / kernel for blue color channel

*FIG. 98A*

| | | | |
|---|---|---|---|
| 0 | 0 | 0 | 0 |
| 0 | 104 | 103 | 0 |
| 0 | 193 | -187 | 0 |
| 0 | 0 | 0 | 0 |

matrix F1 with zero-padding of 1

| | | | |
|---|---|---|---|
| 0 | 0 | 0 | 0 |
| 0 | 11 | 204 | 0 |
| 0 | 2 | 6 | 0 |
| 0 | 0 | 0 | 0 |

matrix F2 with zero-padding of 1

| | | | |
|---|---|---|---|
| 0 | 0 | 0 | 0 |
| 0 | -243 | -150 | 0 |
| 0 | -201 | -11 | 0 |
| 0 | 0 | 0 | 0 |

matrix F3 with zero-padding of 1

*FIG. 99G*

| | | | |
|---|---|---|---|
| 7 | -23 | 8 | 7 |
| 97 | 4 | 103 | 109 |
| 117 | 193 | -56 | 7 |
| 234 | 0 | 127 | 111 |

matrix F1

| | | | |
|---|---|---|---|
| -34 | 0 | 0 | 0 |
| 0 | 37 | 204 | -13 |
| 123 | 2 | 6 | 118 |
| 94 | 0 | 124 | 0 |

matrix F2

*FIG. 100A*

| | | | | | | | |
|---|---|---|---|---|---|---|---|
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |

FIG. 104

| | | | | | | | |
|---|---|---|---|---|---|---|---|
| 0 | 0 | 0 | 1 | 1 | 0 | 0 | 0 |
| 0 | 0 | 1 | 1 | 1 | 1 | 0 | 0 |
| 0 | 1 | 1 | 1 | 1 | 1 | 1 | 0 |
| 1 | 1 | 1 | 1 | 1 | 1 | 1 | 1 |
| 1 | 1 | 1 | 1 | 1 | 1 | 1 | 1 |
| 0 | 1 | 1 | 1 | 1 | 1 | 1 | 0 |
| 0 | 1 | 1 | 1 | 1 | 1 | 1 | 0 |
| 0 | 0 | 1 | 1 | 1 | 1 | 0 | 0 |

*FIG. 107*

| | | | | | | | |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 1 | 1 | 0 | 0 | 0 |
| 0 | 0 | 0 | 0 | 0 | 0 | 0 | 0 |
| 0 | 0 | 0 | 0 | 0 | 0 | 0 | 0 |

*FIG. 109*

SYSTEMS AND METHODOLOGIES FOR AUTOMATED CLASSIFICATION OF IMAGES OF STOOL IN DIAPERS

COPYRIGHT STATEMENT

Any new and original work of authorship in this document—including any source code—is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The invention generally relates to automated image segmentation and classification.

Computer analysis of images is increasingly ubiquitous. Classifying images, or objects within images, is a common task for computer image analysis. A computer image analysis system which classifies images into one of n discrete categories or labels can be characterized as a classifier. For example, a classifier could be configured to assign to a test image a label of "bicycle", "car", or "boat".

A classifier could also, in some instances, be configured to allow for classification of an image or object as belonging to more than one category or label. For example, a classifier could be configured to assign to a test image or object one or more labels from the group of: "bicycle", "automobile", "car", "truck", "boat", and "yacht".

A computer image analysis system can also be configured to segment an image into different segments. For example, an image containing a boat, water, and sky might be segmented into three areas. These areas may then be classified as a "boat" area or segment, a "water" area or segment, and a "sky" area or segment.

At a very high level, computer image analysis generally involves utilization of a score function that is configured to take data for an image as input and produce as output one or more scores, e.g. a calculated score value for each possible class which a classifier may assign an image to, or a score or identification for each pixel of an image assigning each pixel to a particular class or segment. Generally, the highest calculated score indicates a predicted class or segment for an image, portion of an image, or pixel. The goal for such a system is for it to correctly predict the "true" class for each image, portion of an image, or pixel, or correctly segment the image into different objects.

In the classifier context, this score function can be characterized as including one or more parameters that are used in combination with data for an image to calculate class scores for that image. Some of these parameters can be characterized as weight parameters, or weights, in that they weight the effect of some data for the image on the final output score values.

As an example, consider the extremely simple score function: score=Wx+b. In this score function, W represents a matrix containing weight parameters, x represents a vector containing data for an image, and b represents a vector containing bias parameters. A classifier using this type of simplified linear score function can be characterized as a linear classifier.

A vector containing scores for an image can be calculated by performing matrix multiplication, namely multiplying the matrix W containing weight parameters by the vector x containing image data, and then adding the vector b to the resultant matrix to arrive at the vector containing calculated scores. It will be appreciated that the characterization of the parameters in the matrix W as weight parameters is appropriate given that, owing to such multiplication, they weight the value of image data. In contrast, the bias parameters contained in the matrix b influence, or bias, output scores, but are not multiplied by the image data.

As an overly simplified example, consider a simple linear classifier configured to take as input a 3×3 greyscale image and use the simplified score function Wx+b to compute a vector containing score values, where each value corresponds to one of three classes: bicycle, car, and boat. Such a 3×3 greyscale image comprises nine pixels, each having a greyscale value, as illustrated in FIG. 1A. To process this greyscale image with the linear classifier, this 3×3 image is flattened to a single 9×1 column vector, as illustrated in FIG. 1B.

A vector w containing weight parameters for a class can then be multiplied by this 9×1 column vector x containing image data in order to produce a score value for that class for the image. For example, FIG. 2 illustrates a column vector $w_{bicycle}$ containing bicycle classifier weights. The transpose of this column vector $w_{bicycle}$ can be multiplied by the vector x, and a bias value added, to produce a bicycle score, as illustrated in FIG. 3.

More generally, a matrix W can be utilized containing classifier weights for a plurality of classes. FIG. 4 illustrates a matrix W containing classifier weight parameters for a bicycle class, car class, and boat class. Each row represents a classifier weight set that is configured to generate a score value for a corresponding class. The first row contains bicycle classifier weights configured to generate a score value for a bicycle class, the second row contains car classifier weights configured to generate a score value for a car class, and the third row contains boat classifier weights configured to generate a score value for a boat class.

This matrix W containing weight parameters can be multiplied by a 9×1 column vector x containing image data, as illustrated in FIG. 5. A vector b containing a bias parameter for each class (each in its own row) is then added to the resultant vector to produce a vector containing scores for the classes, as also illustrated in FIG. 5.

The classifier classifies an image as belonging to a particular class based on which calculated score is the highest. Thus, the classifier classifies the image depicted in FIG. 1 in the car class based on the score value corresponding to the car class (calculated using the car classifier weights in the second row of the matrix W) being the highest of any calculated score value for the image, as illustrated in FIG. 5.

Sometimes, image data may be preprocessed prior to classification by normalizing pixel values. This might involve, for example, centering data by subtracting the mean pixel value from every pixel value. This might further involve scaling each pixel value to lie on a range from −1 and 1.

Currently, most approaches to computer image analysis involve use of machine learning to train a computer using training images.

For example, a process for training a system to classify images as either including a bicycle or not including a bicycle might involve use of ten thousand training images, each of which has been labeled as including a bicycle or not including a bicycle. Returning to the previous example, a process for training a system to classify images as either a bicycle, a car, or a boat might involve use of ten thousand training images, each of which has been labeled as either "bicycle", "car", or "boat". These labels might be provided to the system in the form of a vector containing an entry for each image to be provided as input, with each entry indicating a true class for the corresponding image, e.g. entries comprising a string label for a class or an integer value corresponding to a class.

At a very high level, training a system to classify images generally involves utilizing a loss function that is configured to compare calculated scores for one or more images to a "true" class for each of the one or more images and calculate a loss value. Such a loss value can then be used to facilitate updating of one or more parameters, such as weight parameters, in a way that is designed to hopefully cause future classifications to be more accurate.

One commonly used type of loss function is multiclass support vector machine (SVM) loss. Consider a scenario where data for an image is provided together with a label y indicating a correct class for the image. The data for the image can be formatted into a vector x and used to calculate a score vector providing scores for a plurality of classes, as just described. This score vector can be characterized as a score vector s containing class scores calculated using a score function. SVM loss for this image can be calculated using the formula illustrated in FIG. 6. Each score in the score vector x corresponds to one of the possible classes. The variable $s_j$ represents the score for the jth class. The formula sums over all instances that do not correspond to the correct class, i.e. where j does not equal y (the label indicating the correct class). A is a parameter, and more specifically a hyperparameter, that can be understood as impacting how "far apart" the loss function "wants" the scores to be to indicate a correct prediction.

Returning to the example of FIG. 5, FIG. 7 illustrates calculation of a loss value for the image for which data was provided in vector x. A value of 100 is used for the hyperparameter Δ. Here, the calculated score values, which provide a much higher score for the correct car class than the other two classes, result in a loss value of 0.

FIGS. 8A and 8B each illustrate another 3×3 greyscale image comprising nine pixels each having a greyscale value. Just like the image of FIG. 1A, these images can be flattened to a single 9×1 column vector. Further, such column vectors can be combined together into a matrix containing image data for a plurality of images. For example, FIG. 9 illustrates three 9×1 column vectors: vector $x_1$ containing image data for the 3×3 greyscale image of FIG. 1A, vector $x_2$ containing image data for the 3×3 greyscale image of FIG. 8A, and vector $x_3$ containing image data for the 3×3 greyscale image of FIG. 8B. FIG. 9 illustrates combination of these column vectors into a matrix x containing image data for these three images, with each column containing image data for a particular one of the images.

FIG. 10*a* illustrates use of the matrix W and vector b that were previously used to calculate a score vector for the image of FIG. 1*a* to similarly calculate a score vector $s_2$ for the image of FIG. 8A. As illustrated, the calculated score for the boat class is the highest, thereby predicting that the image of FIG. 8*a* depicts a boat. However, in reality, a label $y_2$ for this image indicates that the correct class for this image is the car class. FIG. 10B illustrates calculation of a loss value for this image. Consistent with the calculation for the first image, a value of 100 is used for the hyperparameter Δ. Here, the calculated score values result in a loss value of 492.

FIG. 11A illustrates use of the matrix W and vector b that were previously used to calculate a score vector for the image of FIG. 1A to similarly calculate a score vector $s_3$ for the image of FIG. 8B. As illustrated, the calculated score for the car class is the highest, thereby predicting that the image of FIG. 8A depicts a car. However, in reality, a label $y_2$ for this image indicates that the correct class for this image is the bicycle class. FIG. 11B illustrates calculation of a loss value for this image. Consistent with the calculation for the first image, a value of 100 is used for the hyperparameter Δ. Here, the calculated score values result in a loss value of 274.3.

As described hereinabove, the score function Wx+b can be utilized to generate a vector containing class scores for a plurality of class, where W represents a matrix containing weight parameters, x represents a vector containing data for an image, and b represents a vector containing bias parameters. In implementing this function, the bias parameters can actually be incorporated into a vector or matrix containing weight parameters, as illustrated in FIG. 12. In particular, bias parameters are incorporated into a last column (or last row, if the matrix W was transposed) of a matrix containing weight parameters, and a last entry having a value of one is added to a vector containing image data (an entire last row or column containing values of one could similarly be added to a matrix containing image data for multiple images). This operates to allow for simplification of the score function to Wx, as illustrated in FIG. 12. That is, for an input vector $x_i$ containing image data, a score vector $s_i$ is calculated by multiplying a matrix W containing weight parameters and bias parameters by the vector $x_i$ containing image data. FIG. 12 illustrates calculation of a score vector $s_1$ containing scores for the image of FIG. 1A.

Such a matrix W containing weight parameters and bias parameters can be decomposed into vectors each containing weight parameters and a bias parameter for a single class. For example, FIG. 13 illustrates decomposition of the matrix W into: a column vector $w_{bicycle}$ containing weight parameters and a bias parameter for the bicycle class, a column vector $w_{car}$ containing weight parameters and a bias parameter for the car class, and a column vector $w_{boat}$ containing weight parameters and a bias parameter for the boat class. Although the matrix W as illustrated is specified to decompose into column vectors, the matrix could equally be specified to decompose into row vectors.

Given the specified decomposition into column vectors, the score for a given class for a given image i can be specified to be $s_{i,class}=w_{class}^T x_i$. Thus, for example, FIG. 14 illustrates calculation of a score value $s_{i,bicycle}$ for the bicycle class for the first image of FIG. 1A.

The previously specified SVM loss function illustrated in FIG. 6 can be updated to specify a loss $L_i$ for a particular image. Thus, $L_i$ would be the loss for the first image of FIG. 1A. FIG. 15 illustrates such an updated SVM loss function specifying a loss $L_i$ based on a calculated score $s_{i,j}$ for the jth class for the ith image, and a calculated score $s_{i,yi}$ for the correct class for the ith image.

This specified loss $L_i$ for a particular image can be expanded utilizing the specification of $s_{i,class}$ as $w_{class}^T x_i$. FIG. 15 illustrates such an expansion of the specified loss $L_i$ to specify loss $L_i$ based on a calculated score $w_j^T x_i$ for the jth class for the ith image, and a calculated score $w_{yi}^T x_i$ for the correct class for the ith image.

It will be appreciated that the accuracy of calculated scores for a particular image depends generally on the weight parameters and bias parameters utilized for such calculation. As noted above, a loss value can be used to facilitate updating of one or more parameters, such as weight parameters, in a way that is designed to hopefully cause future classifications to be more accurate. In particular, a goal can be set as determining a set of weight parameters and bias parameters (as well as potentially one or more other parameters or hyperparameters) that minimize loss.

Generally, determining weight parameters and bias parameters that minimize loss involves determining one or more partial derivatives or gradients of a loss function, score function, or some component thereof, and using that gradient or partial derivative to update one or more weight parameters or bias parameters. Generally, this involves determining one or more partial derivatives of a loss function, which collectively form a gradient of the loss function, and using that gradient or one or more of the partial derivatives to update one or more weight parameters and bias parameters. While in mathematics there is a clear distinction between a partial derivative and a gradient, in computing the term gradient will often be used to refer to a partial derivative, and that convention will sometimes be followed herein.

Intuitively, a gradient of a loss function can be seen as suggesting a general direction that would seem based on the calculated gradient to reduce loss the most.

It will be appreciated that a gradient can be computed numerically, or analytically using calculus. Generally, it is preferable to compute a gradient analytically and utilize a numerical calculation during design to test and confirm the accuracy of the analytical computation.

As an example, returning to the loss function $L_i$ provided in FIG. 15, this function can be differentiated with respect to the weights. Taking the gradient with respect to $W_{yi}$ results in the gradient $\nabla w_{yi} L_i$, as illustrated in FIG. 16. This gradient sums over all of the classes, and uses an indicator function to determine classes which did not meet the required margin set by Δ, i.e. the result of the indicator function is 1 for classes where it is true that $w_j^T x_i - w_{yi}^T x_i + \Delta$ is greater than zero. Thus, this gradient determines the number of classes other than the correct class with a loss greater than one. This number is then multiplied by −1, and then multiplied by the score vector $x_i$ to produce the gradient $\nabla w_{yi} L_i$.

As a specific example, FIG. 17 illustrates calculation of a loss value $L_2$ for the second image of FIG. 8*a* using the articulated loss function $L_i$, and FIG. 18 illustrates calculation of a gradient $\nabla w_{car} L_2$ for that image. Because there are two classes other than the correct class with a loss greater than one, the gradient ends up being −2 times the score vector $x_2$. FIG. 19 illustrates such multiplication of −2 times the score vector $x_2$ to arrive at the gradient $\nabla w_{car} L_2$.

Returning again to the loss function $L_i$ set out in FIG. 15, this function also needs to be differentiated with respect to the weights for the non-correct classes. Taking the gradient with respect to $W_j$ results in the gradient $\nabla w_j L_i$, as illustrated in FIG. 20. This gradient uses an indicator function to determine whether the class meets the required margin set by Δ, i.e. the result of the indicator function is 1 if it is true that $w_j^T x_i - w_{yi}^T x_i + \Delta$ is greater than zero. The result of this indicator function, which will be either zero or one, is then multiplied by the score vector $x_1$ to produce the gradient $\nabla w_j L_i$.

As a specific example, FIG. 21 illustrates calculation of a gradient $\nabla w_{bicycle} L_2$ for the second image of FIG. 8A. Because the indicator function ends up being true, the gradient $\nabla w_{bicycle} L_2$ ends up being the score vector $x_2$, as illustrated in FIGS. 21 and 22. FIG. 23 illustrates calculation of a gradient $\nabla w_{boat} L_2$ for the second image of FIG. 8A. Because the indicator function ends up being true, the gradient $\nabla w_{boat} L_2$ ends up being the score vector $x_2$, as illustrated in FIGS. 23 and 24.

The column vectors calculated to be these gradients $\nabla w_{car} L_2$, $\nabla w_{boat} L_2$, $\nabla w_{boat} L_2$ can be combined to form the gradient $\nabla w L_2$. FIG. 25 illustrates the combination of the transposes of these column vectors to form the gradient $\nabla w L_2$. The transposed vectors are utilized to provide for conformance with the dimensions of W, in accord with the specification of the matrix W as decomposing into column vectors.

This calculated gradient $\nabla w L_2$ can be utilized to update weight parameters contained in W. For example, FIG. 26 illustrates an exemplary update function for calculating an updated matrix $W_{updated}$. This matrix $W_{updated}$ is calculated by multiplying the calculated gradient $\nabla w L_2$ by −1 times a step size variable, which is represented in FIG. 26 as z. The result of this multiplication is then added to the original matrix $W_{original}$. This operates to update the weight parameters in the matrix W in a way designed to minimize loss based on the calculated gradient $\nabla w L_2$.

For example, FIG. 27 illustrates multiplication of the calculated gradient $\nabla w L_2$ by −1 times a step size variable, and FIG. 28 illustrates addition of the resultant matrix to the previously existing matrix $W_{original}$ resulting in the matrix $W_{updated}$. (The original matrix $W_{original}$ also contained bias parameters incorporated therein, and these have been updated as well as part of this process, but such updating may be separate or utilize a different approach in accordance with one or more preferred implementations.)

As noted above, this updating of the weight parameters and bias parameters is designed to hopefully cause future classifications to be more accurate. As an overly simplistic illustration of this, FIG. 29 illustrates subsequent calculation of new hypothetical updated class scores for the vector $x_2$ containing image data for the second image of FIG. 8A, and FIG. 30 illustrates subsequent calculation of a new hypothetical loss value for these scores. FIG. 31 illustrates comparison of the originally calculated class scores and loss value for the second image of FIG. 8A with these hypothetical updated class scores and loss value. As illustrated, the calculated loss has decreased from 492 to 96.736.

This is obviously a rather large decrease in loss. In general, a step size value determines how much any particular parameter update impacts parameters, e.g. weight parameters. A small step size generally results in small but consistent improvements, but can take a long time (and a lot of data) for training. On the other hand, a larger step size can result in quicker learning, but can also lead to overshooting. Generally, step size is a hyperparameter that must be carefully selected, and often tuned, for an ideal result. Sometimes, cross-validation is used to select or tune step size, Δ, or other hyperparameters.

It will be appreciated that performing a parameter update after every individual piece of training data, e.g. after every image, is computationally intensive. Frequently, batches of training data, e.g. batches of images, are utilized for training.

When batches are utilized, the data loss for a batch can be set, for example, to be the average loss for all of the training examples contained in a training batch. FIG. 32 illustrates an exemplary such formula specifying the total data loss for a batch of N examples, where each example is a matrix $x_i$. Returning to the previously described example of the three images of FIG. 1A, FIG. 8A, and FIG. 8B, for a batch composed of the image data for these images, FIG. 33 illustrates calculation of a data loss value for this batch.

Calculation of loss for machine learning, whether utilizing one data example at a time or a batch, frequently also utilizes a regularization penalty to favor smaller values within W. In this regard, it will be appreciated that if the function s=Wx is utilized as a score function, and loss is specified utilizing the difference between the score $s_j$ for an incorrect class and the score $s_y$ for a correct class, then W matrices containing multiples of one another may produce the same loss value. For example, a first matrix W and a second matrix 2W, where each value in matrix 2W is twice its value in W, would calculate the same loss under this approach.

To address this, a regularization penalty is frequently utilized to favor smaller values within W. For example. FIG. 34 illustrates specification of a regularization penalty that is set to be the sum of the square of all values in a matrix W containing weight parameters. For example, FIG. 35 illustrates calculation of such a regularization penalty for the previously utilized matrix W containing bicycle classifier weights, car classifier weights, and boat classifier weights. FIG. 36 illustrates calculation of part of this penalty for the bicycle class.

The regularization loss can be specified to be the regularization penalty multiplied by a hyperparameter λ which weights the regularization penalty. The total loss for a batch can then be specified to be the sum of the data loss for the batch and the regularization loss, as illustrated in FIG. 38. Such an approach involving regularization loss (and thus minimization of regularization loss) is sometimes characterized as incorporating weight decay.

Various alternative loss functions can be utilized in specifying loss as well. Another common methodology for specifying loss is the use of cross-entropy loss for a softmax classifier. For example, FIG. 39 illustrates several equivalent articulations of such a cross-entropy loss for a softmax classifier. Such an approach has the advantage of being able to output easily interpretable probability values that a particular class is the correct class. For example, FIG. 39 illustrates the probability $p_{yi}$ ascribed by the system to the correct class yi.

It will be appreciated that the simple linear score function Wx+b utilized for a linear classifier is limited in its ability to differentiate between data examples within datasets. More complex score functions can be specified as a combination of multiple functions. For example, FIG. 40A illustrates specification of a score function s based on two other functions, f(z) and g(z). The function f(z) utilizes a first weight matrix $W_1$ containing a first set of weight parameters and a first bias vector $b_1$ containing a first set of bias parameters. The function g(z) utilizes a second weight matrix $W_2$ containing a second set of weight parameters and a second bias vector $b_2$ containing a second set of bias parameters. The score function s is specified as g(f(X)) where x is an input vector x or matrix X containing image data. FIG. 40B illustrates an alternative scheme for specifying a more complex score function.

A system for calculating one or more score values can be characterized as including layers. A layer can be characterized or described as implementing a function. For example, returning to the example of FIG. 5, FIG. 41A illustrates characterization of this example as including a single layer implementing the function f(z)=Wz+b, which takes as input a vector $x_i$ containing image data and provides as output a vector $s_i$ containing calculated score values for the three classes for which classifier weights are included in the matrix W containing weight parameters.

FIG. 41*b* illustrates a layer configured to take as input a matrix X containing image data for three images (i=1,2,3), and provide as output a matrix S containing class scores for each image.

A system implementing a score function with one or more layers can be characterized as a neural network. A neural network can be modeled as a collection of units that are connected in an acylic graph, where the output of some units becomes input for other units (e.g. one or more units in a next layer).

Two adjacent layers can be characterized as fully connected if all the inputs from a first layer are fully connected to every unit of the second layer. A layer whose units are fully connected to the inputs from a previous layer can be characterized as a fully connected layer.

Layers of a neural network frequently utilize an activation function to introduce non-linearity. Perhaps the most commonly utilized activation function is the Rectified Linear Unit activation function f(z)=max(0,z). Other common activation functions include the sigmoid function $\sigma(Z)=1/(1+e^{-z})$ and the tan h function $f(z)=2\sigma(2z)-1$, or $f(z)=2*(1/(1+e^{-2z}))-1$.

FIG. 42 illustrates a score function s configured to utilize a first function f(z) and a second function g(z) to calculate scores based on an input column vector x containing image data for a single image or a matrix X containing image data for a plurality of images. The function f(z) utilizes a first weight matrix $W_1$ containing a first set of weight parameters and a first bias vector $b_1$ containing a first set of bias parameters. The function f(z) further includes an ReLU activation function. The function g(z) utilizes a second weight matrix $W_2$ containing a second set of weight parameters and a second bias vector $b_2$ containing a second set of bias parameters.

These functions can be characterized as specifying a multilayer neural network, with the function f(z) representing a first hidden layer of the neural network that utilizes an activation function, and the function g(z) representing a second and final layer of the neural network that calculates class scores based on output from the hidden layer. FIG. 43 fancifully illustrates use of such multilayer neural network to take as input a vector $x_i$ containing image data for a single image and produce as output a vector $s_1$ containing class scores.

FIG. 44A illustrates another score function S configured to utilize a first function f(z) and a second function g(z) to calculate scores based on an input column vector x containing image data for a single image or a matrix X containing image data for a plurality of images. The function f(z) utilizes a first weight matrix $W_1$ containing a first set of weight parameters and a first bias vector $b_1$ containing a first set of bias parameters. The function f(z) further includes an ReLU activation function. The function g(z) utilizes a second weight matrix $W_2$ containing a second set of weight parameters and a second bias vector $b_2$ containing a second set of bias parameters.

As with the last set of functions, these functions can be characterized as specifying a multilayer neural network, with the function f(z) representing a first hidden layer of the neural network that utilizes an activation function, and the function g(z) representing a second and final layer of the neural network that calculates class scores based on output from the hidden layer. FIG. 44B fancifully illustrates use of such multilayer neural network to take as input a matrix X containing image data for a plurality of images and produce as output a matrix S containing class scores for each of these images.

For purposes of illustration, FIG. 45 illustrates an exemplary matrix containing image data for three very simple two-pixel images. FIG. 46 illustrates transformation of this matrix into a normalized centered matrix X containing normalized centered image data for these three two-pixel images. The first row contains data for the first image, the second row contains data for the second image, and the third row contains data for the third image.

As noted above, the exemplary function f(z) utilizes a first weight matrix $W_1$ containing a first set of weight parameters and a first bias vector $b_1$ containing a first set of bias parameters. FIG. 47 illustrates an exemplary first weight matrix $W_1$ containing a first set of weight parameters and an exemplary first bias vector $b_1$ containing a first set of bias parameters.

FIG. 48 illustrates calculation of a matrix F based on the function $f(z)=\max(0,z\ W_1+b_1)$, the matrix X containing image data, the matrix $W_1$ containing weight parameters, and the vector $b_1$ containing bias parameters. As illustrated, the activation function replaces any values less than zero with zero in the calculated matrix X.

FIG. 49 illustrates an exemplary second weight matrix $W_2$ containing a second set of weight parameters and an exemplary second bias vector $b_2$ containing a second set of bias parameters. The weight matrix $W_2$ includes metal classifier weight parameters in a first column, plastic classifier weight parameters in a second column, and wood classifier weight parameters in a third column. The bias vector $b_2$ similarly includes a metal classifier bias parameter in a first column, a plastic classifier bias parameter in a second column, and a wood classifier bias parameter in a third column.

FIG. 50 illustrates calculation of a matrix S containing class scores based on the function $g(z)=z\ W_2+b_2$, the matrix F, the matrix $W_2$ containing weight parameters, and the vector $b_2$ containing bias parameters. In the matrix S, the first row contains scores for the first image for which data was contained in the matrix X, the second row contains scores for the second image for which data was contained in the matrix X, and the third row contains scores for the third image for which data was contained in the matrix X.

FIG. 51 fancifully illustrates operation of the specified neural network. The neural network takes as input the matrix X containing image data, and processes it at the first hidden layer in accordance with the function $f(z)=\max(0, z\ W_1+b_1)$ in order to produce matrix F. This matrix F is then passed on as input to the second layer which in turn processes it in accordance with the function $g(z)=z\ W_2+b_2$ to produce matrix S containing class scores for the images for which data was provided in matrix X.

With reference to this same score function of FIG. 44A, FIG. 52 illustrates specification of a score vector $s_i$ which can be calculated based on an input row vector $x_i$ containing image data for a single image. For example, FIG. 53 illustrates decomposition of the matrix X just detailed hereinabove into three row vectors: row vector $x_1$ containing image data for the first image, row vector $x_2$ containing image data for the second image, and row vector $x_3$ containing image data for the third image.

Utilizing the same exemplary first weight matrix $W_1$, exemplary first bias vector $b_1$, exemplary second weight matrix $W_2$, and exemplary second bias vector $b_2$, FIG. 54 illustrates calculation of a row vector $f_1$ based on the function $f(z)=\max(0,z\ W_1+b_1)$, the row vector $x_i$ containing image data, the matrix $W_1$ containing weight parameters, and the vector $b_1$ containing bias parameters. As illustrated, the activation function replaces any values less than zero with zero in the calculated vector $x_1$. FIG. 55 illustrates calculation of a row vector $s_i$ containing class scores based on the function $g(z)=z\ W_2+b_2$, the row vector $f_1$, the matrix $W_2$ containing weight parameters, and the vector $b_2$ containing bias parameters.

To continue this example, FIG. 56 fancifully illustrates a column vector y containing labels for the correct class for each image for which data is presented in the matrix of FIG. 45 (although it will be appreciated that this could equally be a row vector). Here, $y_i$ is metal, thereby indicating that the correct class for the first image is metal; $y_2$ is metal, thereby indicating that the correct class for the second image is metal, and $y_3$ is wood, thereby indicating that the correct class for the third image is wood.

FIG. 57 illustrates a loss function to be utilized for this example. This loss function determines a cross-entropy loss for a softmax classifier. The loss function specifies a loss $L_i$ for a particular image (corresponding to a particular value of i) based on the calculated score $s_{i,yi}$ for the correct class for the particular image, and calculated scores $s_{i,j}$ for each class j for the particular image.

FIG. 57 further illustrates a formula for calculating a probability $p_{i,k}$ that a class k is the correct class for a particular image corresponding to a particular value of i. Such a calculated probability $p_{i,k}$ can be characterized as an easily interpretable probability value that a particular class is the correct class. A calculated probability $p_{i,yi}$ represents the probability ascribed by the system to the correct class $y_i$.

FIG. 58 illustrates calculation of a probability $p_{i,metal}$ that the metal class is the correct class for the first image (corresponding to an i value of one) for which score values are contained in vector $s_1$. As illustrated, the system can be characterized as ascribing a 42.7% chance that the metal class is the correct class for the first image. FIG. 59 illustrates similar calculation of a probability $p_{i,plastic}$ that the plastic class is the correct class for the first image (corresponding to an i value of one) for which score values are contained in vector $s_1$, and a probability $p_{i,wood}$ that the wood class is the correct class for the first image (corresponding to an i value of one) for which score values are contained in vector $s_1$.

Given the specified loss function $L_i$ and probability $p_{i,yi}$, the loss function $L_i$ can be reformulated as $L_i=-\log(p_{i,yi})$, as illustrated in FIG. 60. FIG. 61 illustrates calculation of the loss $L_1$ for the first image (corresponding to an i value of one) for which data was presented in the matrix of FIG. 45.

It will be appreciated that although FIG. 56 fancifully illustrated a column vector y containing labels for the correct class for each image for which data is presented in the matrix of FIG. 45, more generally this data may simply be represented with a class number. For example, FIG. 62 illustrates a column vector y containing an indicator of the correct class for each image for which data is presented in the matrix of FIG. 45 (although it will be appreciated that this could equally be a row vector). Here, $y_i$ is 1, thereby indicating that the correct class for the first image is class 1, corresponding to metal; $y_2$ is 1, thereby indicating that the correct class for the second image is class 1, corresponding to metal, and $y_3$ is 3, thereby indicating that the correct class for the third image is class 3, corresponding to wood.

FIG. 63 again illustrates calculation of a probability that the metal class is the correct class for the first image (corresponding to an i value of one) for which score values are contained in vector $s_1$, this time using the notation of $p_{1,1}$. FIG. 64 again illustrates calculation of the loss $L_1$ for the first image (corresponding to an i value of one) for which data was presented in the matrix of FIG. 45.

FIG. 65 illustrates, side by side, the matrix S containing class scores for the three images for which data was presented in the matrix of FIG. 45, and the specified formula for calculating a probability $p_{i,k}$ that a class k is the correct class for a particular image corresponding to a particular value of i based on the calculated score $s_{i,k}$ for the class k for the particular image and calculated scores $s_{i,j}$ for each class j for the particular image.

FIG. 66 illustrates exemplary pseudocode for an exemplary neural network implementation of this example.

FIG. 67A illustrates calculation of a matrix F based on the function f(z)=max(0,z $W_1+b_1$), the matrix X containing image data, the matrix $W_1$ containing weight parameters, and the matrix b1 containing bias parameters. As illustrated, the activation function replaces any values less than zero with zero in the calculated matrix X.

FIG. 67B illustrates calculation of a matrix S containing class scores based on the function g(z)=z $W_2+b_2$, the matrix F, the matrix $W_2$ containing weight parameters, and the matrix b2 containing bias parameters. In the matrix S, the first row contains scores for the first image for which data was contained in the matrix X, the second row contains scores for the second image for which data was contained in the matrix X, and the third row contains scores for the third image for which data was contained in the matrix X.

This matrix S containing class scores can be used to calculate a matrix P containing, for each image, the probability $p_{i,k}$ that a class k is the correct class for that image based on the calculated score $s_{i,k}$ for the class k for that image and calculated scores $s_{i,j}$ for each class j for that image. FIGS. 68-69B illustrate such a process. This involves first generating a matrix eS where each value is determined by raising Euler's number to the value of the corresponding entry in matrix S, as illustrated in FIG. 68. The rowsums for this matrix are then calculated and stored in a matrix rowsums_eS, as illustrated in FIG. 69A. A matrix P is then generated where each entry in the matrix P is determined by dividing the corresponding entry in the matrix eS by the rowsume for that row stored in the matrix rowsums_eS, as illustrated in FIG. 69B.

Next, as illustrated in FIG. 70, the identifications of the correct class stored in matrix y are utilized together with the matrix P to generate a matrix correct_P where each row corresponds to an image, and the lone value in each row indicates the probability $p_{i,yi}$ ascribed by the system to the correct class $y_i$.

This matrix correct_P is then utilized to generate a matrix L containing, in each row, a lone value representing the loss value for the corresponding image, as illustrated in FIG. 71.

A total loss value for this batch of images for which data was presented in matrix X can then be calculated by adding the total data loss for the batch to a calculated regularization loss for the matrices W1 and W2. FIG. 72 specifies a formula for the calculation of this regularization loss which involves adding together the square of every value in W1, and multiplying it by the hyperparameter λ, and adding together the square of every value in W2, and multiplying this by the hyperparameter λ, and adding the two calculated values together.

Returning to the specific pseudocode implementation of FIG. 66, FIG. 73 illustrates calculation of a data loss value by summing together the values in the matrix L and dividing the sum by the total number of images for which a loss value is included in the matrix L.

FIGS. 74-75 illustrate calculation of a regularization loss. In particular, this involves, for the first weight matrix W1, multiplying the weight matrix W1 by itself, summing all of the entries in the resultant matrix, and then multiplying the resultant value by the specified hyperparameter λ, as illustrated in FIG. 74. The same process is repeated for the matrix W2. This results in the calculation of the regularization loss illustrated in FIG. 75.

The total loss can then be calculated by adding together the calculated data loss and the calculated regularization loss, as illustrated in FIG. 76.

As described above, in order to attempt to determine a set of weight parameters and bias parameters (as well as potentially one or more other parameters or hyperparameters) that minimize loss, one or more one or more partial derivatives or gradients of a loss function can be determined, and used to facilitate updating of one or more weight parameters or bias parameters.

With respect to the specified loss function $L_i$ and specified score $s_{i,k}$ for the kth class for the ith image, differentiation can be utilized to produce a gradient $\delta L_i/\delta s_{i,k}=p_{i,k}-1_{true}(y_i=k)$, as illustrated in FIG. 77. That is, for the class indicated in y to be the correct class the gradient is $\delta L_i/\delta s_{i,k}=p_{i,k}-1$, while for the other classes the gradient is simply $\delta L_i/\delta s_{i,k}=p_{i,k}$.

Returning to the notation of FIG. 61, FIG. 78 illustrates calculation of the gradients $\delta L_1/\delta s_{1,metal}$, $\delta sL_1/\delta s_{1,plastic}$, and $\delta L_1/\delta s_{1,wood}$.

Returning to the specific pseudocode implementation of FIG. 66, FIG. 81 illustrates additional exemplary pseudocode for an exemplary neural network implementation which implements backpropagation through the defined layers of the neural network to update parameters. Backpropagation leverages the chain rule to use a calculated gradient on scores to calculate gradients on other elements.

The analytically calculated gradient formulas $\delta L_i/\delta s_{i,k}=p_{i,k}-1$ (for the correct class) $\delta L_i/\delta s_{i,k}=p_{i,k}$ (for the other classes) are utilized to calculate a gradient on the scores by generating a matrix dS based on the matrix P, as illustrated in FIG. 82. In particular, the matrix dS is first created as a copy of the matrix P, and then, for each image, one is subtracted from the probability value for the class indicated in the matrix y to be the correct class for that image, as illustrated in FIG. 82.

Each value in the matrix dS is then divided by the number of images in the batch, as illustrated in FIG. 83.

The calculated gradient for the scores, in the form of matrix dS can then be utilized to determine a gradient for other components using backpropagation.

For example, this calculated gradient for the scores is utilized for backpropagation to determine a gradient on weight matrix W2. Specifically, this calculated matrix dS is backpropagated into a matrix dW2, which can then be used to update the matrix W2. The matrix dW2 can be calculated as the dot product of the matrix $F^T$ and the matrix dS, as illustrated in FIG. 84.

The calculated gradient for the scores is also utilized for backpropagation to determine a gradient on bias matrix b2. Specifically, columns of the calculated matrix dS are summed to produce a matrix db2, as illustrated in FIG. 85, which can then be used to update the matrix b2.

The calculated gradient for the scores can also be backpropagated to determine a gradient on weight matrix W1. First, the calculated matrix dS is backpropagated into a matrix dF which is calculated as the dot product of the matrix dS and the matrix $W2^T$, as illustrated in FIG. 86. Next, the nonlinearity of the activation function is backpropagated by replacing, for any entry in matrix F that is less than or equal to zero, the corresponding entry in dF with a zero, as illustrated in FIG. 87. A matrix dW1 can then be calculated as the dot product of the matrix $X^T$ and the matrix dF, as illustrated in FIG. 88, which can subsequently be used to update the matrix W2.

The calculated gradient for the scores is also utilized for backpropagation to determine a gradient on bias matrix b1.

Specifically, columns of the calculated matrix dF are summed to produce a matrix db1, as illustrated in FIG. 89, which can then be used to update the matrix b1.

Notably, when calculating gradients on the weight and bias parameters, the contribution from regularization also needs to be incorporated. Given the regularization contribution $\lambda w^2$, the gradient can be calculated as $d/dw=2\lambda w$. FIG. 90 illustrates addition of the contribution from regularization to the matrix dW2, and FIG. 91 illustrates addition of the contribution from regularization to the matrix dW1.

Once these gradients on the weight and bias parameters have been determined, these gradients can be utilized to update such weight and bias parameters.

FIG. 92 illustrates use of the matrix dW1 to update the matrix W1. Owing to use of a step size value of one, this updating takes the very simple form of multiplying dW1 times negative one and then adding the result to W1.

FIG. 93 illustrates use of the matrix db1 to update the matrix b1. Owing to use of a step size value of one, this updating takes the very simple form of multiplying db1 times negative one and then adding the result to b1.

FIG. 94 illustrates use of the matrix dW2 to update the matrix W2. Owing to use of a step size value of one, this updating takes the very simple form of multiplying dW2 times negative one and then adding the result to W2.

FIG. 95 illustrates use of the matrix db2 to update the matrix b2. Owing to use of a step size value of one, this updating takes the very simple form of multiplying db2 times negative one and then adding the result to b2.

It will be appreciated that this example has described a single update to parameters of the neural network based on a batch of three training examples. This can be characterized as an iteration. After completing an iteration, an implementation may run another iteration for the same batch, or may move on to run an iteration of a next batch. Multiple iterations for the same batch, as well as iterations for multiple batches can, for example, be implemented with a loop function, with parameters being updated every iteration. This approach can be characterized as gradient descent, in that each iteration takes steps in the opposite direction of the calculated gradient. Some approaches may only use a single training example at a time to perform an update. These approaches can be characterized as utilizing stochastic gradient descent.

A single pass forward and backward through the entire data set can be characterized as an epoch. Thus, as an extremely oversimplified and unrealistic example, if the batch of three training examples just described was half of a training data set of six examples, then an iteration would be needed to provide a forward and backward pass and parameter update through the next batch of three examples, at which point one entire epoch would have been completed. This could be repeated for multiple epochs, e.g. 100 epochs.

As described, this exemplary implementation of a neural network implements a score function S specified to utilize a first function f(z) and a second function g(z) to calculate scores based on an input matrix X containing image data for a plurality of images. The function f(z) utilizes a first weight matrix W1 containing a first set of weight parameters and a first bias vector b1 containing a first set of bias parameters. The function f(z) further includes an ReLU activation function. The function g(z) utilizes a second weight matrix W2 containing a second set of weight parameters and a second bias vector b2 containing a second set of bias parameters.

The function f(z) represents a first hidden layer of the neural network that utilizes an activation function, and the function g(z) represents a second and final layer of the neural network that calculates class scores based on output from the hidden layer.

Notably, however, neural networks can include many more layers than two, and can comprise a plurality of layers with each layer utilizing or implementing a function such as f(z), g(z), etc., as illustrated in FIG. 96. The number of layers of a neural network can be characterized as its depth, and a neural network with a large number of layers can be characterized as a deep neural network.

A convolutional neural network is type of neural network that utilizes convolution operations at one or more layers. Convolutional neural networks are frequently used for image processing.

A convolutional layer of a neural network utilizes one or more filters, or kernels, that are each applied to an input. Specifically, these filters are convolved across the width and height of the input, and a dot product is computed between the filter and the entries at that position. These filters represent weights that are applied to input by this convolution.

To illustrate convolution, FIG. 97A illustrates a 3×3 matrix representing data for a greyscale image, and a 2×2 filter, or kernel. FIGS. 97B-97E illustrate an exemplary convolution operation for this exemplary matrix using the exemplary filter.

How much the filter is slid at once (in other words, how many pixels/data points over it is translated at once) can be characterized as the stride. FIG. 97B-97E illustrate a stride of one, while FIG. 97F-971 illustrate a stride of two.

A convolutional layer of a neural network can also utilize padding to fill out a matrix in order to make its dimensions ideal for an operation, e.g. a matrix can be padded with zeroes to increase its size to allow a certain sized filter to be used with a certain stride. The most common approach is zero-padding, where zeroes are added around the outside of a matrix. FIG. 97J illustrates the use of zero-padding of one to convert a 3×3 matrix to a 5×5 matrix. Although less common, additional zero-padding could be used, e.g. zero-padding of two would convert that same 3×3 matrix into a 7×7 matrix.

A convolution operation may also utilize a bias parameter, which is added to the dot product at each application of the filter, as illustrated in FIG. 97K-L.

A convolutional layer frequently additionally implements an activation function to introduce non-linearity, as illustrated in FIG. 97M. Alternatively, a neural network may utilize an activation function layer (e.g. a RELU layer) as illustrated in FIG. 97N.

The input for a convolutional layer can be three dimensional, including a width, a height, and a depth dimension, and in such an instance the filters for that convolutional layer would be three dimensional as well. For example, an image will frequently include three color channels, such that data for the image will be in the form of a three-dimensional matrix (or three two-dimensional matrices) specifying, for each pixel in the image, a channel value for each of three channels at that pixel. As discussed above, this data can be preprocessed (e.g. centered and normalized).

FIGS. 98A-C illustrate use of a three-dimensional filter for input data for an image that includes three channel values for each pixel. As illustrated in FIG. 98C, a respective slice of the three-dimensional filter is applied to data for a corresponding respective one of the color channels, and the resulting dot products are summed together (optionally with a bias parameter). The respective slices are then slid based on a stride length, and this is repeated.

A convolutional layer may implement more than one filter. In such a case, the output of a convolutional layer will be three-dimensional, with the depth of the output corresponding to the number of filters that have been utilized at the layer. Each depthwise slice of the output corresponds to one of the filters.

For example, FIG. 99A illustrates three filters, FIG. 99B illustrates a matrix X containing image data, and FIGS. 99C-99F illustrate the three-dimensional output resulting from application of the filters of FIG. 99A to the matrix of FIG. 99B.

As described above with reference to FIG. 98A-C, a convolutional layer can involve application of a three-dimensional filter to a three-dimensional matrix. For example, the output from a first convolutional layer is frequently a three-dimensional matrix, with each depthwise slice of the three-dimensional matrix corresponding to a respective filter of the first convolutional layer.

FIGS. 99G-99I illustrate just such a situation, where zero-padding of one is added to the depthwise slices of the three-dimensional matrix produced in FIG. 99F, and a three-dimensional 2×2×3 filter is utilized to produce a 3×3 matrix, as illustrated in FIG. 99I.

Notably, however, a convolutional layer can involve application of multiple, different three-dimensional filters to a three-dimensional matrix. Returning to the example of FIGS. 99G-I, FIG. 99J illustrates two additional three-dimensional filters to be applied at a convolutional layer. The result is a 3×3×3 matrix, as illustrated in FIG. 99K, with each depthwise slice corresponding to a respective one of the three-dimensional filters that was applied. FIG. 99L illustrates the use of two convolutional layers to take matrix X containing data for a 3×3 greyscale image as input and produce a three-dimensional 3×3×3 matrix. The first layer takes as input the matrix X, applies three 2×2 two-dimensional filters, and produces as output a three-dimensional 2×2×3 matrix, with each depthwise layer corresponding to a respective one of the filters applied at the first layer. The second layer takes as input the 2×2×3 matrix output by the first layer, applies zero padding of one to each depthwise slice, applies three 2×2×3 three-dimensional filters, and produces as output a three-dimensional 3×3×3 matrix, with each depthwise slice corresponding to a respective one of the three-dimensional filters applied at the second layer.

Generally, a convolutional neural network includes one or more fully connected layers at proximate the end configured to calculate one or more scores based on a score function, as illustrated in FIG. 99M.

Updating a convolutional neural network involves calculating a gradient for each depth slice, i.e. for each filter, and updating weights of the filters based thereon. In practice, every unit in a convolutional layer may compute the gradient for its weights, but these gradients are added up across each depth slice and, for each depth slice, only a single set of weights will be updated. Backpropagation for a convolution operation involves convolution with spatially flipped filters.

Generally, for a convolutional layer, the same filters, and same weights therein, are convolved across the entire input. Sometimes, however, there may be a reason to utilize different weights for different portions of an image.

A convolutional neural network may utilize one or more pooling layers which function to reduce the spatial size of data. For example, FIGS. 100A-100F fancifully illustrates operation of a pooling layer to reduce the spatial size of data. Perhaps the most commonly used approach for pooling is max pooling. FIGS. 100A-100F illustrates max pooling. With max pooling, during backpropagation, the gradient is only routed to the input that had the highest value in the forward pass. Another commonly used pooling approach is average pooling, where the mean or average of all values in a pooling area is utilized, rather than the maximum value.

FIG. 100G illustrates a max pooling operation for a three-dimensional matrix.

Frequently, a pooling layer is provided after one or more convolutional layers, as illustrated in the exemplary architecture of FIG. 100H. Sometimes, two successive convolutional layers will be provided for each single pooling layer. Sometimes, a convolutional neural network will omit pooling layers entirely.

FIG. 100I fancifully illustrates an exemplary architecture for a convolutional neural network. Frequently, an architecture will utilize one or more convolutional layers before a pooling layer (possibly including one or more activation layers, or activation layers integrated with convolutional layers), with this pattern repeating several times before one or two fully connected layers are utilized to generate final output, e.g. class scores. Generally, a convolutional neural network includes one or more fully connected layers proximate the end of its architecture configured to calculate one or more scores based on a score function, as illustrated in FIG. 100I.

Convolutional neural networks are well known in the art, and commonly used for image segmentation and classification.

For example, ResNet is a convolutional neural network that utilizes an approach characterized as residual learning which involves utilizing shortcut connections that skip one or more layers. ResNet architecture is described in Kaiming He et al., *Deep Residual Learning for Image Recognition,* 2016 IEEE Conference on Computer Vision and Pattern Recognition (2016).

As another example, SegNet is a convolutional neural network designed for image segmentation. SegNet architecture is described in Vijay Badrinarayanan et al., *SegNet: A Deep Convolutional Encoder-Decoder Architecture for Image Segmentation*, IEEE Transactions on Pattern Analysis and Machine Intelligence 39, 12: 2481-2495 (2017).

Computer image analysis and machine learning have been applied to many problems, including the problem of human stool recognition and characterization.

For example, Hachuel et al., *Augmenting Gastrointestinal Health: A Deep Learning Approach to Human Stool Recognition and Characterization in Macroscopic Images*, (2018) discloses the use of convolutional neural networks to classify human stool using the Bristol scale. The approach taken by Hachuel involved use of a SegNet convolutional neural network to segment stool from an image, and a ResNet convolutional neural network to classify post-segmentation images using the Bristol scale.

Computer image analysis and machine learning have even been applied to the problem of scoring of stool consistency in diapers.

For example, Ludwig et al., *Machine Learning Supports Automated Digital Image Scoring of Stool Consistency in Diapers*, Journal of Pediatric Gastroenterology and Nutrition, February 2021, Volume 72, Issue 2: 255-261 (2021) evaluated the feasibility of automated classification of stool consistencies from diaper photos using machine learning.

Needs exists for improvement in automated image classification, particularly with respect to classification of stool in diapers. For example, there remains the technological problem of how to increase accuracy of automated machine scoring of images of stool in diapers. One or more needs are addressed by one or more aspects of the invention.

SUMMARY OF THE INVENTION

The invention includes many aspects and features. Moreover, while many aspects and features relate to, and are described in, a particular context, the invention is not limited to use only in this context, as will become apparent from the following summaries and detailed descriptions of aspects, features, and one or more embodiments of the invention.

Accordingly, one aspect of the invention relates to a method involving use of multiple convolutional neural networks and multiple segmentation masks to programmatically generate a rating for one or more test images, the method comprising: training, using a first plurality of digital images of stool, a first convolutional neural network to identify one or more areas of a digital image that correspond to stool, such training comprising, for each respective batch of digital images of the first plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to stool, and determining the respective loss value for the respective batch based on summing up loss values determined based on the comparisons of the calculated class probability values for the pixels of the respective digital images with the encoded truth masks, updating one or more parameters of the first convolutional neural network, such updating comprising calculating a gradient of a matrix of the calculated class probability values, starting from this calculated gradient of the matrix of the calculated class probability values, backpropagating through layers of the first convolutional neural network and calculating gradients for parameters associated with these layers, including weight parameters and bias parameters associated with these layers, performing, for each respective parameter of a set of one or more parameters of the first convolutional neural network, a parameter update based on a corresponding calculated gradient for that respective parameter and a step size value; training, using a second plurality of digital images of diapers, a second convolutional neural network to identify an area of a digital image that corresponds to a diaper, such training comprising, for each respective batch of digital images of the second plurality of digital images, for each of a plurality of iterations, calculating, by the second convolutional neural network for each respective digital image of the respective batch of digital images, a class probability value for each pixel of the respective digital image, each class probability value being calculated based on one or more parameters associated with one or more layers of the second convolutional neural network, the one or more parameters including one or more weight parameters and one or more bias parameters, calculating, by the second convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and determining the respective loss value for the respective batch based on summing up loss values determined based on the comparisons of the calculated class probability values for the pixels of the respective digital images with the encoded truth masks, updating one or more parameters of the second convolutional neural network, such updating comprising calculating a gradient of a matrix of the calculated class probability values, starting from this calculated gradient of the matrix of the calculated class probability values, backpropagating through layers of the second convolutional neural network and calculating gradients for parameters associated with these layers, including weight parameters and bias parameters associated with these layers, performing, for each respective parameter of a set of one or more parameters of the second convolutional neural network, a parameter update based on a corresponding calculated gradient for that respective parameter and a step size value; training, using a third plurality of digital images of diapers with stool, a third convolutional neural network to classify stool depicted in an image, such training comprising generating, for each respective digital image of the third plurality of digital images, a respective first mask by providing the respective digital image to the first convolutional neural network as input and receiving as output the generated respective first mask representing an identification of one or more areas of the respective digital image that correspond to stool, generating, for each respective digital image of the third plurality of digital images, a respective second mask by providing the respective digital image to the second convolutional neural network as input and receiving as output the generated respective second mask representing an identification of an area of the respective digital image that corresponds to a diaper, generating, for each respective digital image of the third plurality of digital images, a respective third mask representing an intersection of the respective first mask for the respective digital image and the respective second mask for the respective digital image, generating a fourth plurality of digital images from the third plurality of digital images by, for each respective digital image of the third plurality of digital images, applying the generated respective third mask to the respective digital image, for each respective batch of digital images of the fourth plurality of digital images, for each of a plurality of iterations, calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, calculating, by the third convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, updating one or more parameters of the third convolutional neural network based on use of gradient descent, such updating comprising calculating a gradient of a matrix of the calculated class probability values, starting from this calculated gradient of the matrix of the calculated class probability values, back-propagating through layers of the third convolutional neural network and calculating gradients for parameters associated with these layers, including weight parameters and bias parameters associated with these layers, this backpropagation involving at least some use of skip connections, performing, for each respective parameter of a set of one or more parameters of the third convolutional neural network, a parameter update based on a corresponding calculated gradient for that respective parameter and a step size value; providing, to a user via a web browser of the user, an interface configured to allow for upload of one or more digital images; receiving, at a server based on user input corresponding to interaction with the interface to upload digital images, a first set of digital images; utilizing the trained third convolutional neural network to evaluate the first set of digital images and generate a rating classification for each digital image of the first set of digital images, comprising generating, for each respective digital image of the first set of digital images, a respective first mask by providing the respective digital image to the first convolutional neural network as input and receiving as output the generated respective first mask representing an identification of one or more areas of the respective digital image that corresponds to stool, generating, for each respective digital image of the first set of digital images, a respective second mask by providing the respective digital image to the second convolutional neural network as input and receiving as output the generated respective second mask representing an identification of an area of the respective digital image that corresponds to a diaper, generating, for each respective digital image of the first set of digital images, a respective third mask representing an intersection of the respective first mask for the respective digital image and the respective second mask for the respective digital image, generating a second set of digital images from the first set of digital images by, for each respective digital image of the first set of digital images, applying the generated respective third mask to the respective digital image, calculating, by the third convolutional neural network for each respective digital image of the second set of digital images, a respective set of class probability values for the respective digital image, each class probability value being calculated based on one or more parameters associated with one or more layers of the third convolutional neural network, the one or more parameters including one or more weight parameters and one or more bias parameters, determining, for each respective digital image of the second set of digital images, based on the calculated respective set of class probability values for that respective digital image, a class to assign the respective digital image to, and associating the corresponding digital image of the first set of digital images with a rating corresponding to that class.

In a feature of this aspect, the method further comprises further training the third convolutional neural network to classify stool depicted in an image, such further training comprising generating a fifth plurality of digital images from the fourth plurality of digital images by, for each respective digital image of the third plurality of digital images, applying one or more random transformations to generate one or more augmented images forming part of the fifth plurality of digital images, and for each respective batch of digital images of the fifth plurality of digital images, for each of a plurality of iterations, calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, calculating, by the third convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, and updating one or more parameters of the third convolutional neural network, such updating comprising calculating a gradient of a matrix of the calculated class probability values, starting from this calculated gradient of the matrix of the calculated class probability values, back-propagating through layers of the third convolutional neural network and calculating gradients for parameters associated with these layers, including weight parameters and bias parameters associated with these layers, this backpropagation involving at least some use of skip connections, and performing, for each respective parameter of a set of one or more parameters of the third convolutional neural network, a parameter update based on a corresponding calculated gradient for that respective parameter and a step size value.

In a feature of this aspect, the random transformations include one or more skew transformations.

In a feature of this aspect, the random transformations include one or more rotation transformations.

In a feature of this aspect, the random transformations include one or more flip transformations.

In a feature of this aspect, the random transformations include one or more occlusion transformations.

In a feature of this aspect, the random transformations include one or more erasures.

In a feature of this aspect, the random transformations include one or more brightness or contrast transformations.

In a feature of this aspect, the random transformations include one or more crop transformations.

In a feature of this aspect, the random transformations include one or more zoom transformations.

In a feature of this aspect, each classification of stool in a digital image on a rating scale by a human rater was performed using the Bristol scale or the Brussels Infant and Toddler Stool Scale (BITSS).

In a feature of this aspect, each rating corresponding to a class is a rating on the Bristol scale.

In a feature of this aspect, the third convolutional neural network is configured to classify into one of seven classes, each corresponding to a rating on the Bristol scale.

In a feature of this aspect, each batch comprises a single image.

In a feature of this aspect, each batch is a mini-batch.

In a feature of this aspect, each batch comprises a plurality of images.

In a feature of this aspect, calculating, by the first convolutional neural network based on a loss function, a loss value for a batch comprises calculating a cross-entropy loss value.

In a feature of this aspect, calculating, by the first convolutional neural network based on a loss function, a loss value for a batch comprises calculating a hinge loss.

In a feature of this aspect, calculating, by the first convolutional neural network based on a loss function, a loss value for a batch comprises calculating a multiclass support vector machine loss.

In a feature of this aspect, the first convolutional neural network utilizes a softmax classifier.

In a feature of this aspect, the third convolutional neural network comprises one or more skip connections.

Another aspect relates to a method involving use of multiple convolutional neural networks and multiple segmentation masks to programmatically generate a rating for a plurality of test images, the method comprising: training, using a first plurality of digital images of stool, a first convolutional neural network to identify one or more areas of a digital image that correspond to stool, such training comprising, for each respective batch of digital images of the first plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and determining the respective loss value for the respective batch based on summing up loss values determined based on the comparisons of the calculated class probability values for the pixels of the respective digital images with the encoded truth masks, updating one or more parameters of the first convolutional neural network, such updating comprising calculating a gradient of a matrix of the calculated class probability values, starting from this calculated gradient of the matrix of the calculated class probability values, backpropagating through layers of the first convolutional neural network and calculating gradients for parameters associated with these layers, including weight parameters and bias parameters associated with these layers, performing, for each respective parameter of a set of one or more parameters of the first convolutional neural network, a parameter update based on a corresponding calculated gradient for that respective parameter and a step size value; training, using a second plurality of digital images of diapers, a second convolutional neural network to identify an area of a digital image that corresponds to a diaper, such training comprising, for each respective batch of digital images of the second plurality of digital images, for each of a plurality of iterations, calculating, by the second convolutional neural network for each respective digital image of the respective batch of digital images, a class probability value for each pixel of the respective digital image, each class probability value being calculated based on one or more parameters associated with one or more layers of the second convolutional neural network, the one or more parameters including one or more weight parameters and one or more bias parameters, calculating, by the second convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and determining the respective loss value for the respective batch based on summing up loss values determined based on the comparisons of the calculated class probability values for the pixels of the respective digital images with the encoded truth masks, updating one or more parameters of the second convolutional neural network, such updating comprising calculating a gradient of a matrix of the calculated class probability values, starting from this calculated gradient of the matrix of the calculated class probability values, backpropagating through layers of the second convolutional neural network and calculating gradients for parameters associated with these layers, including weight parameters and bias parameters associated with these layers, performing, for each respective parameter of a set of one or more parameters of the second convolutional neural network, a parameter update based on a corresponding calculated gradient for that respective parameter and a step size value; training, using a third plurality of digital images of diapers with stool, a third convolutional neural network to classify stool depicted in an image, such training comprising generating, for each respective digital image of the third plurality of digital images, a respective first mask by providing the respective digital image to the first convolutional neural network as input and receiving as output the generated respective first mask representing an identification of one or more areas of the respective digital image that correspond to stool, generating, for each respective digital image of the third plurality of digital images, a respective second mask by providing the respective digital image to the second convolutional neural network as input and receiving as output the generated respective second mask representing an identification of an area of the respective digital image that corresponds to a diaper, generating, for each respective digital image of the third plurality of digital images, a respective third mask representing an intersection of the respective first mask for the respective digital image and the respective second mask for the respective digital image, generating a fourth plurality of digital images from the third plurality of digital images by, for each respective digital image of the third plurality of digital images, applying the generated respective third mask to the respective digital image, for each respective batch of digital images of the fourth plurality of digital images, for each of a plurality of iterations, calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, calculating, by the third convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, updating one or more parameters of the third convolutional neural network, such updating comprising calculating a gradient of a matrix of the calculated class probability values, starting from this calculated gradient of the matrix of the calculated class probability values, backpropagating through layers of the third convolutional neural network and calculating gradients for parameters associated with these layers, including weight parameters and bias parameters associated with these layers, this backpropagation involving at least some use of skip connections, performing, for each respective parameter of a set of one or more parameters of the third convolutional neural network, a parameter update based on a corresponding calculated gradient for that respective parameter and a step size value; utilizing the trained third convolutional neural network to evaluate a fifth plurality of digital images of diapers with stool and generate a rating classification for each digital image of the fifth plurality of digital images, comprising generating, for each respective digital image of the fifth plurality of digital images, a respective first mask by providing the respective digital image to the first convolutional neural network as input and receiving as output the generated respective first mask representing an identification of one or more areas of the respective digital image that correspond to stool, generating, for each respective digital image of the fifth plurality of digital images, a respective second mask by providing the respective digital image to the second convolutional neural network as input and receiving as output the generated respective second mask representing an identification of an area of the respective digital image that corresponds to a diaper, generating, for each respective digital image of the fifth plurality of digital images, a respective third mask representing an intersection of the respective first mask for the respective digital image and the respective second mask for the respective digital image, generating a sixth plurality of digital images from the fifth plurality of digital images by, for each respective digital image of the fifth plurality of digital images, applying the generated respective third mask to the respective digital image, calculating, by the third convolutional neural network for each respective digital image of the sixth plurality of digital images, a respective set of class probability values for the respective digital image, each class probability value being calculated based on one or more parameters associated with one or more layers of the third convolutional neural network, the one or more parameters including one or more weight parameters and one or more bias parameters, determining, for each respective digital image of the sixth plurality of digital images, based on the calculated respective set of class probability values for that respective digital image, a class to assign the respective digital image to, and associating the corresponding digital image of the fifth set of digital images with a rating corresponding to that class.

Another aspect relates to a method involving use of multiple convolutional neural networks and multiple segmentation masks to programmatically generate a stool rating for each digital image of a first set of one or more digital images of a diaper with stool, the method comprising: generating, for each respective digital image of the first set of one or more digital images, a respective first mask by providing the respective digital image to a first convolutional neural network as input and receiving as output the generated respective first mask representing an identification of an area of the respective digital image that corresponds to stool; generating, for each respective digital image of the first set of one or more digital images, a respective second mask by providing the respective digital image to the second convolutional neural network as input and receiving as output the generated respective second mask representing an identification of an area of the respective digital image that corresponds to a diaper; generating, for each respective digital image of the first set of one or more digital images, a respective third mask representing an intersection of the respective first mask for the respective digital image and the respective second mask for the respective digital image, generating a second set of one or more digital images from the first set of one or more digital images by, for each respective digital image of the first set of one or more digital images, applying the generated respective third mask to the respective digital image; calculating, by the third convolutional neural network for each respective digital image of the second set of one or more digital images, a respective set of class probability values for the respective digital image, each class probability value being calculated based on one or more parameters associated with one or more layers of the third convolutional neural network, the one or more parameters including one or more weight parameters and one or more bias parameters; and determining, for each respective digital image of the second set of one or more digital images, based on the calculated respective set of class probability values for that respective digital image, a class to assign the respective digital image to, and associating the corresponding digital image of the first set of one or more digital images with a rating corresponding to that class.

Another aspect relates to a method involving use of multiple convolutional neural networks and multiple segmentation masks to programmatically generate a rating for one or more test images, the method comprising: training, using a first plurality of digital images of stool, a first downstream layer of a first convolutional neural network to identify one or more areas of a digital image that correspond to stool, such training comprising, for each respective batch of digital images of the first plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to stool, and determining the respective loss value for the respective batch based on summing up loss values determined based on the comparisons of the calculated class probability values for the pixels of the respective digital images with the encoded truth masks, updating one or more parameters of the first downstream layer of the first convolutional neural network, such updating comprising calculating a gradient of a matrix of the calculated class probability values, starting from this calculated gradient of the matrix of the calculated class probability values, backpropagating into the first downstream layer of the first convolutional neural network and calculating gradients for parameters associated with this layer, including weight parameters and bias parameters associated with this layer, performing, for each respective parameter of a set of one or more parameters of the first downstream layer of the neural network, a parameter update based on a corresponding calculated gradient for that respective parameter and a step size value; training, using a second plurality of digital images of diapers, a second downstream layer of the first convolutional neural network to identify an area of a digital image that corresponds to a diaper, such training comprising, for each respective batch of digital images of the second plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and determining the respective loss value for the respective batch based on summing up loss values determined based on the comparisons of the calculated class probability values for the pixels of the respective digital images with the encoded truth masks, updating one or more parameters of the second downstream layer of the first convolutional neural network, such updating comprising calculating a gradient of a matrix of the calculated class probability values, starting from this calculated gradient of the matrix of the calculated class probability values, backpropagating into the second downstream layer of the first convolutional neural network and calculating gradients for parameters associated with this layer, including weight parameters and bias parameters associated with this layer, performing, for each respective parameter of a set of one or more parameters of the second downstream layer of the first convolutional neural network, a parameter update based on a corresponding calculated gradient for that respective parameter and a step size value; training, using a third plurality of digital images of diapers with stool, a second convolutional neural network to classify stool depicted in an image, such training comprising generating, for each respective digital image of the third plurality of digital images, a respective first mask by providing the respective digital image to the first convolutional neural network as input and receiving as output the generated respective first mask representing an identification of one or more areas of the respective digital image that correspond to stool, generating, for each respective digital image of the third plurality of digital images, a respective second mask by providing the respective digital image to the first convolutional neural network as input and receiving as output the generated respective second mask representing an identification of an area of the respective digital image that corresponds to a diaper, generating, for each respective digital image of the third plurality of digital images, a respective third mask representing an intersection of the respective first mask for the respective digital image and the respective second mask for the respective digital image, generating a fourth plurality of digital images from the third plurality of digital images by, for each respective digital image of the third plurality of digital images, applying the generated respective third mask to the respective digital image, for each respective batch of digital images of the fourth plurality of digital images, for each of a plurality of iterations, calculating, by the second convolutional neural network for each respective digital image of the respective batch of digital images, a respective set of class probability values for the respective digital image, each class probability value being calculated based on one or more parameters associated with one or more layers of the second convolutional neural network, the one or more parameters including one or more weight parameters and one or more bias parameters, calculating, by the second convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, updating one or more parameters of the second convolutional neural network based on use of gradient descent, such updating comprising calculating a gradient of a matrix of the calculated class probability values, starting from this calculated gradient of the matrix of the calculated class probability values, backpropagating through layers of the second convolutional neural network and calculating gradients for parameters associated with these layers, including weight parameters and bias parameters associated with these layers, this backpropagation involving at least some use of skip connections, performing, for each respective parameter of a set of one or more parameters of the second convolutional neural network, a parameter update based on a corresponding calculated gradient for that respective parameter and a step size value; providing, to a user via a web browser of the user, an interface configured to allow for upload of one or more digital images; receiving, at a server based on user input corresponding to interaction with the interface to upload digital images, a first set of digital images; utilizing the trained second convolutional neural network to evaluate the first set of digital images and generate a rating classification for each digital image of the first set of digital images, comprising generating, for each respective digital image of the first set of digital images, a respective first mask by providing the respective digital image to the first convolutional neural network as input and receiving as output the generated respective first mask representing an identification of one or more areas of the respective digital image that corresponds to stool, generating, for each respective digital image of the first set of digital images, a respective second mask by providing the respective digital image to the first convolutional neural network as input and receiving as output the generated respective second mask representing an identification of an area of the respective digital image that corresponds to a diaper, generating, for each respective digital image of the first set of digital images, a respective third mask representing an intersection of the respective first mask for the respective digital image and the respective second mask for the respective digital image, generating a second set of digital images from the first set of digital images by, for each respective digital image of the first set of digital images, applying the generated respective third mask to the respective digital image, calculating, by the second convolutional neural network for each respective digital image of the second set of digital images, a respective set of class probability values for the respective digital image, each class probability value being calculated based on one or more parameters associated with one or more layers of the second convolutional neural network, the one or more parameters including one or more weight parameters and one or more bias parameters, determining, for each respective digital image of the second set of digital images, based on the calculated respective set of class probability values for that respective digital image, a class to assign the respective digital image to, and associating the corresponding digital image of the first set of digital images with a rating corresponding to that class.

In a feature of this aspect, the method further comprises further training the second convolutional neural network to classify stool depicted in an image, such further training comprising generating a seventh plurality of digital images from the fourth plurality of digital images by, for each respective digital image of the third plurality of digital images, applying one or more random transformations to generate one or more augmented images forming part of the seventh plurality of digital images, and for each respective batch of digital images of the seventh plurality of digital images, for each of a plurality of iterations, calculating, by the second convolutional neural network for each respective digital image of the respective batch of digital images, a respective set of class probability values for the respective digital image, each class probability value being calculated based on one or more parameters associated with one or more layers of the second convolutional neural network, the one or more parameters including one or more weight parameters and one or more bias parameters, calculating, by the second convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, and updating one or more parameters of the second convolutional neural network, such updating comprising calculating a gradient of a matrix of the calculated class probability values, starting from this calculated gradient of the matrix of the calculated class probability values, backpropagating through layers of the second convolutional neural network and calculating gradients for parameters associated with these layers, including weight parameters and bias parameters associated with these layers, this backpropagation involving at least some use of skip connections, and performing, for each respective parameter of a set of one or more parameters of the second convolutional neural network, a parameter update based on a corresponding calculated gradient for that respective parameter and a step size value.

In a feature of this aspect, the random transformations include one or more skew transformations, rotation transformations, or flip transformations.

In a feature of this aspect, the random transformations include one or more occlusion transformations.

In a feature of this aspect, the random transformations include one or more erasures.

In a feature of this aspect, the random transformations include one or more crop transformations.

In a feature of this aspect, the random transformations include one or more zoom transformations.

In a feature of this aspect, each classification of stool in a digital image on a rating scale by a human rater was performed using the Bristol scale or the Brussels Infant and Toddler Stool Scale (BITSS).

In a feature of this aspect, each rating corresponding to a class is a rating on the Bristol scale or the Brussels Infant and Toddler Stool Scale (BITSS).

In a feature of this aspect, the second convolutional neural network is configured to classify into one of seven classes, each corresponding to a rating on the Bristol scale.

In a feature of this aspect, each batch comprises a single image.

In a feature of this aspect, each batch is a mini-batch.

In a feature of this aspect, each batch comprises a plurality of images.

In a feature of this aspect, calculating, by the first convolutional neural network based on a loss function, a loss value for a batch comprises calculating a cross-entropy loss value.

In a feature of this aspect, calculating, by the first convolutional neural network based on a loss function, a loss value for a batch comprises calculating a hinge loss.

In a feature of this aspect, calculating, by the first convolutional neural network based on a loss function, a loss value for a batch comprises calculating a multiclass support vector machine loss.

In a feature of this aspect, the first convolutional neural network utilizes a softmax classifier.

In a feature of this aspect, the second convolutional neural network comprises one or more skip connections.

Another aspect relates to a method involving use of multiple convolutional neural networks and multiple segmentation masks to programmatically generate a rating for one or more test images, the method comprising: training, using a first plurality of digital images of stool, a first downstream layer of a first convolutional neural network to identify one or more areas of a digital image that correspond to stool, such training comprising, for each respective batch of digital images of the first plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to stool, and determining the respective loss value for the respective batch based on summing up loss values determined based on the comparisons of the calculated class probability values for the pixels of the respective digital images with the encoded truth masks, updating one or more parameters of the first downstream layer of the first convolutional neural network, such updating comprising calculating a gradient of a matrix of the calculated class probability values, starting from this calculated gradient of the matrix of the calculated class probability values, backpropagating into the first downstream layer of the first convolutional neural network and calculating gradients for parameters associated with this layer, including weight parameters and bias parameters associated with this layer, performing, for each respective parameter of a set of one or more parameters of the first downstream layer of the neural network, a parameter update based on a corresponding calculated gradient for that respective parameter and a step size value; training, using a second plurality of digital images of diapers, a second downstream layer of the first convolutional neural network to identify an area of a digital image that corresponds to a diaper, such training comprising, for each respective batch of digital images of the second plurality of digital images, for each of a plurality of iterations, calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, calculating, by the first convolutional neural network based on a loss function, a respective loss value for the respective batch, such calculating comprising comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and determining the respective loss value for the respective batch based on summing up loss values determined based on the comparisons of the calculated class probability values for the pixels of the respective digital images with the encoded truth masks, updating one or more parameters of the second downstream layer of the first convolutional neural network, such updating comprising calculating a gradient of a matrix of the calculated class probability values, starting from this calculated gradient of the matrix of the calculated class probability values, backpropagating into the second downstream layer of the first convolutional neural network and calculating gradients for parameters associated with this layer, including weight parameters and bias parameters associated with this layer, performing, for each respective parameter of a set of one or more parameters of the second downstream layer of the first convolutional neural network, a parameter update based on a corresponding calculated gradient for that respective parameter and a step size value; training, using a third plurality of digital images of diapers with stool, a second convolutional neural network to classify stool depicted in an image, such training comprising generating, for each respective digital image of the third plurality of digital images, a respective first mask by providing the respective digital image to the first convolutional neural network as input and receiving as output the generated respective first mask representing an identification of one or more areas of the respective digital image that correspond to stool, generating, for each respective digital image of the third plurality of digital images, a respective second mask by providing the respective digital image to the first convolutional neural network as input and receiving as output the generated respective second mask representing an identification of an area of the respective digital image that corresponds to a diaper, generating, for each respective digital image of the third plurality of digital images, a respective third mask representing an intersection of the respective first mask for the respective digital image and the respective second mask for the respective digital image, generating a fourth plurality of digital images from the third plurality of digital images by, for each respective digital image of the third plurality of digital images, applying the generated respective third mask to the respective digital image, for each respective batch of digital images of the fourth plurality of digital images, for each of a plurality of iterations, calculating, by the second convolutional neural network for each respective digital image of the respective batch of digital images, a respective set of class probability values for the respective digital image, each class probability value being calculated based on one or more parameters associated with one or more layers of the second convolutional neural network, the one or more parameters including one or more weight parameters and one or more bias parameters, calculating, by the second convolutional neural network based on a loss function, a respective loss value for the respective batch, such calculating comprising calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch based on the calculated loss values for the digital images of the respective batch, updating one or more parameters of the second convolutional neural network based on use of gradient descent, such updating comprising calculating a gradient of a matrix of the calculated class probability values, starting from this calculated gradient of the matrix of the calculated class probability values, backpropagating through layers of the second convolutional neural network and calculating gradients for parameters associated with these layers, including weight parameters and bias parameters associated with these layers, this backpropagation involving at least some use of skip connections, performing, for each respective parameter of a set of one or more parameters of the second convolutional neural network, a parameter update based on a corresponding calculated gradient for that respective parameter and a step size value; utilizing the trained second convolutional neural network to evaluate a first set of digital images and generate a rating classification for each digital image of the first set of digital images, comprising generating, for each respective digital image of the first set of digital images, a respective first mask by providing the respective digital image to the first convolutional neural network as input and receiving as output the generated respective first mask representing an identification of one or more areas of the respective digital image that corresponds to stool, generating, for each respective digital image of the first set of digital images, a respective second mask by providing the respective digital image to the first convolutional neural network as input and receiving as output the generated respective second mask representing an identification of an area of the respective digital image that corresponds to a diaper, generating, for each respective digital image of the first set of digital images, a respective third mask representing an intersection of the respective first mask for the respective digital image and the respective second mask for the respective digital image, generating a second set of digital images from the first set of digital images by, for each respective digital image of the first set of digital images, applying the generated respective third mask to the respective digital image, calculating, by the second convolutional neural network for each respective digital image of the second set of digital images, a respective set of class probability values for the respective digital image, each class probability value being calculated based on one or more parameters associated with one or more layers of the second convolutional neural network, the one or more parameters including one or more weight parameters and one or more bias parameters, determining, for each respective digital image of the second set of digital images, based on the calculated respective set of class probability values for that respective digital image, a class to assign the respective digital image to, and associating the corresponding digital image of the first set of digital images with a rating corresponding to that class.

Another aspect relates to a method involving use of multiple convolutional neural networks and multiple segmentation masks to programmatically generate a stool rating for each digital image of a first set of one or more digital images of a diaper with stool, the method comprising: generating, for each respective digital image of the first set of one or more digital images, a respective first mask by providing the respective digital image to a first convolutional neural network as input and receiving as output the generated respective first mask representing an identification of an area of the respective digital image that corresponds to stool; generating, for each respective digital image of the first set of one or more digital images, a respective second mask by providing the respective digital image to the first convolutional neural network as input and receiving as output the generated respective second mask representing an identification of an area of the respective digital image that corresponds to a diaper; generating, for each respective digital image of the first set of one or more digital images, a respective third mask representing an intersection of the respective first mask for the respective digital image and the respective second mask for the respective digital image, generating a second set of one or more digital images from the first set of one or more digital images by, for each respective digital image of the first set of one or more digital images, applying the generated respective third mask to the respective digital image; calculating, by the second convolutional neural network for each respective digital image of the second set of one or more digital images, a respective set of class probability values for the respective digital image, each class probability value being calculated based on one or more parameters associated with one or more layers of the second convolutional neural network, the one or more parameters including one or more weight parameters and one or more bias parameters; and determining, for each respective digital image of the second set of one or more digital images, based on the calculated respective set of class probability values for that respective digital image, a class to assign the respective digital image to, and associating the corresponding digital image of the first set of one or more digital images with a rating corresponding to that class.

Another aspect relates to a computer readable medium containing computer executable instructions for performing a disclosed method.

Another aspect relates to a system for performing a disclosed method.

Another aspect relates to a system comprising a classification server providing a classification service configured to perform a disclosed method.

In addition to the aforementioned aspects and features of the invention, it should be noted that the invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the invention now will be described in detail with reference to the accompanying drawings, wherein the same elements are referred to with the same reference numerals.

FIG. 4 illustrates a matrix W containing classifier weight parameters for a bicycle class, car class, and boat class.

FIG. 6 illustrates a formula for calculating the multiclass support vector machine loss.

FIG. 7 illustrates calculation of a loss value for the image for which data was provided in vector x of FIG. 5.

FIG. 10B illustrates calculation of a loss value for the image in FIG. 8A.

FIG. 11B illustrates calculation of a loss value for the image of FIG. 8B.

FIG. 13 illustrates decomposition of the matrix W in FIG. 12.

FIG. 15 illustrates such an expansion of the specified loss $L_i$ to specify loss $L_i$ based on a calculated score for the jth class for the ith image, and a calculated score $w_{yi}^T x_i$ for the correct class for the ith image.

FIG. 16 illustrates taking the gradient with respect to $W_{yi}$ resulting in the gradient $\nabla w_{yi} L_i$.

FIG. 17 illustrates calculation of a loss value $L_2$ for the second image of FIG. 8A using the articulated loss function $L_i$.

FIG. 18 illustrates calculation of a gradient $\nabla w_{car}L_2$ for the second image of FIG. 8A.

FIG. 19 illustrates such multiplication of −2 times the score vector $x_2$ to arrive at the gradient $\nabla w_{car}L_2$.

FIG. 20 illustrates taking the gradient with respect to $W_j$ resulting in the gradient $\nabla w_j L_i$.

FIG. 21 illustrates calculation of a gradient $\nabla w_{bicycle}L_2$ for the second image of FIG. 8A.

FIG. 23 illustrates calculation of a gradient $\nabla w_{boat}L_2$ for the second image of FIG. 8A.

FIG. 25 illustrates the combination of the transposes of column vectors to form the gradient $\nabla wL_2$.

FIG. 26 illustrates an exemplary update function for calculating an updated matrix $W_{updated}$.

FIG. 27 illustrates multiplication of the calculated gradient $\nabla wL_2$ by −1 times a step size variable.

FIG. 28 illustrates addition of the resultant matrix to the previously existing matrix $W_{original}$ resulting in the matrix $W_{updated}$.

FIG. 29 illustrates subsequent calculation of new hypothetical updated class scores for the vector $x_2$ containing image data for the second image of FIG. 8A.

FIG. 30 illustrates subsequent calculation of a new hypothetical loss value for the scores from FIG. 29.

Figure 32:
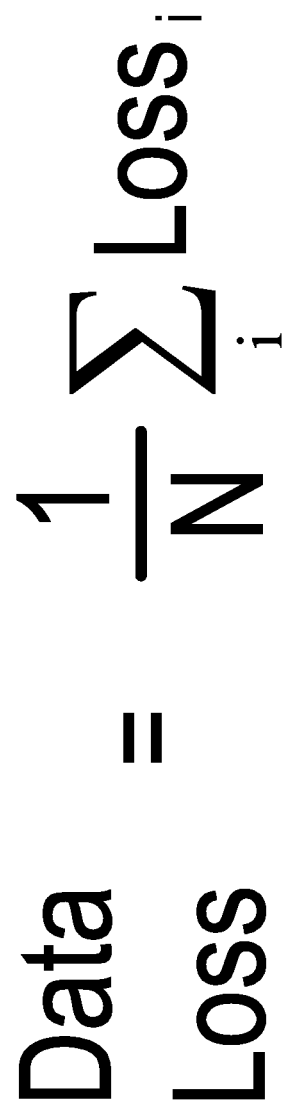

FIG. 32 illustrates an exemplary such formula specifying the total data loss for a batch of N examples, where each example is a matrix $x_i$.

FIG. 33 illustrates calculation of a data loss value for the images of FIG. 1, FIG. 8A and FIG. 8B.

FIG. 34 illustrates specification of a regularization penalty that is set to be the sum of the square of all values in a matrix W containing weight parameters.

FIG. 35 illustrates calculation of such a regularization penalty for the previously utilized matrix W of FIG. 4.

FIG. 36 illustrates calculation of part of this penalty for the bicycle class.

FIG. 37 illustrates the regularization loss.

FIG. 38 illustrates the total loss for a batch.

FIG. 39 illustrates several equivalent articulations of cross-entropy loss for a softmax classifier.

FIG. 40A illustrates specification of a score function s based on two other functions, f(z) and g(z).

FIG. 40B illustrates an alternative scheme for specifying a more complex score function.

FIG. 42 illustrates a score function s configured to utilize a first function f(z) and a second function g(z) to calculate scores based on an input column vector x containing image data for a single image or a matrix X containing image data for a plurality of images.

FIG. 44A illustrates another score function S configured to utilize a first function f(z) and a second function g(z) to calculate scores based on an input column vector x containing image data for a single image or a matrix X containing image data for a plurality of images.

FIG. 45 illustrates an exemplary matrix containing image data for three very simple two-pixel images.

FIG. 47 illustrates an exemplary first weight matrix $W_1$ containing a first set of weight parameters and an exemplary first bias vector $b_1$ containing a first set of bias parameters.

FIG. 48 illustrates calculation of a matrix F based on the function $f(z)=\max(0,z\ W_1+b_1)$ where matrix X is the normalized centered image data from FIG. 46.

FIG. 52 illustrates specification of a score vector $s_i$ based on the same score function of FIG. 44A.

FIG. 57 illustrates a loss function $L_i$ and a formula for calculating a probability $p_{i,k}$.

FIG. 60 illustrates the loss function $L_i$ reformulated as $L_i=-\log(p_{i,yi})$.

FIG. 61 illustrates calculation of the loss $L_1$ for the first image (corresponding to an i value of one) for which data was presented in the matrix of FIG. 45.

FIG. 64 illustrates calculation of the loss $L_1$ for the first image (corresponding to an i value of one) for which data was presented in the matrix of FIG. 45.

FIG. 66 illustrates exemplary pseudocode for an exemplary neural network implementation of the example detailed in FIGS. 52-65.

FIG. 67A illustrates calculation of a matrix F based on the function $f(z)=\max(0, z\, W_1+b_1)$, the matrix X from FIG. 46, and the matrices W1 and b1 from FIG. 47.

FIG. 71 illustrates utilizing matrix correct_P from FIG. 70 to generate a matrix L using the L function defined in FIG. 60.

FIG. 72 specifies a formula for the calculation of total regularization loss.

FIG. 74 illustrates the calculation of a regularization loss for matrix W1.

FIG. 75 illustrates the calculation of a regularization loss for matrix W2.

FIG. 76 illustrates the calculation of total regularization loss.

FIG. 77 illustrates differentiation used to produce a gradient.

FIG. 78 illustrates differentiation with the notation from FIG. 61 used to produce a gradient relative to metal.

FIG. 79 illustrates differentiation with the notation from FIG. 61 used to produce a gradient relative to plastic.

FIG. 80 illustrates differentiation with the notation from FIG. 61 used to produce a gradient relative to wood.

FIG. 81 illustrates additional exemplary pseudocode for an exemplary neural network implementation which implements backpropagation through the defined layers of the neural network to update parameters using pseudocode similar to FIG. 66.

FIG. 83 illustrates matrix dS divided by the number of images in the batch represented by n.

FIG. 86 illustrates the matrix dS backpropagated into a matrix dF which is calculated as the dot product of the matrix dS from FIG. 83, and the matrix $W2^T$, from FIG. 49.

FIG. 88 illustrates a matrix dW1 calculated as the dot product of the matrix $X^T$ and the matrix dF.

FIG. 92 illustrates use of the matrix dW1 to update the matrix W1.

FIG. 94 illustrates use of the matrix dW2 to update the matrix W2.

FIG. 97A illustrates a 3×3 matrix representing data for a greyscale image, and a 2×2 filter.

FIG. 97F-971 illustrate an exemplary convolution operation using a stride of two.

FIG. 97D illustrates a convolutional layer additionally implementing an activation function to introduce non-linearity.

FIGS. 98A-C illustrate use of a three-dimensional filter for input data for an image that includes three channel values for each pixel.

FIGS. 99G-991 illustrate a situation where zero-padding of one is added to the depthwise slices of the three-dimensional matrix produced in FIG. 99F, and a three-dimensional 2×2×3 filter is utilized to produce a 3×3 matrix.

FIG. 99K illustrates a 3×3×3 matrix.

FIG. 99L illustrates the use of two convolutional layers to take matrix X containing data for a 3×3 greyscale image as input and produce a three-dimensional 3×3×3 matrix.

FIG. 99M illustrates the use of fully connected layers.

FIGS. 100A-100F fancifully illustrates operation of a pooling layer to reduce the spatial size of data.

Figure 1A:
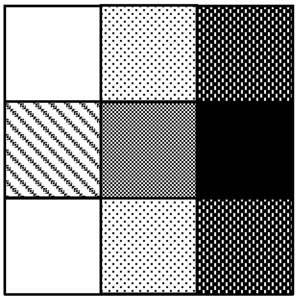
FIG. 1A illustrates a 3×3 greyscale image matrix adjacent a 3×3 matrix containing the corresponding greyscale values.
Figure 1B:
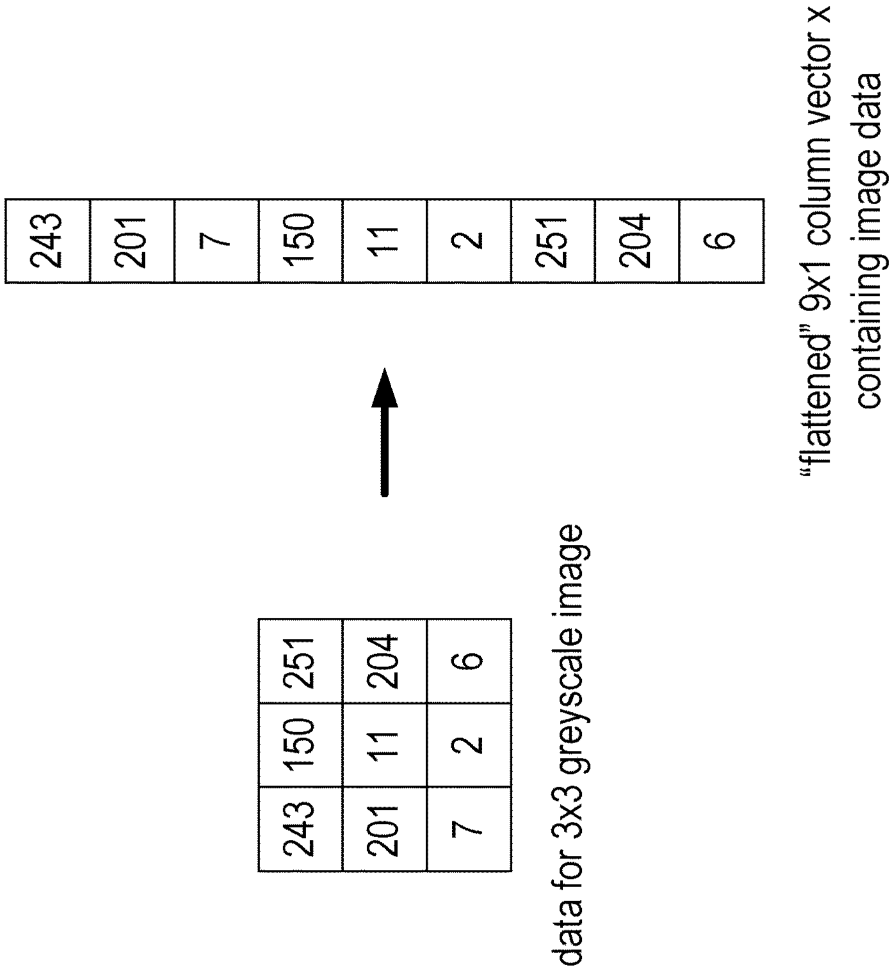
FIG. 1B illustrates a flattened single 9×1 column vector.
Figure 2:
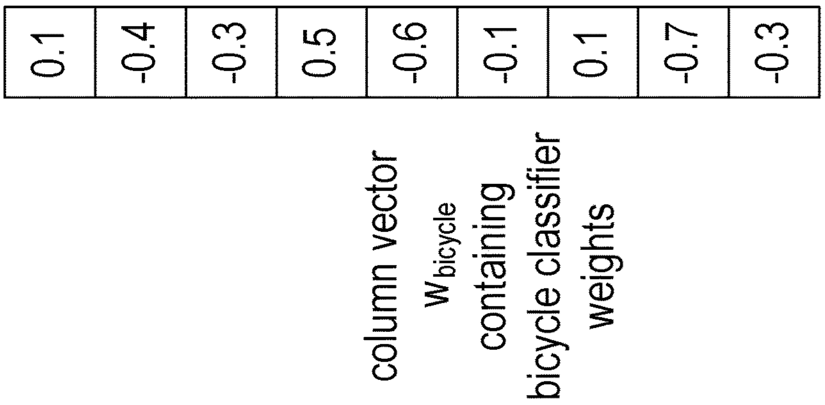
FIG. 2 illustrates a column vector $w_{bicycle}$ containing bicycle classifier weights.
Figure 3:
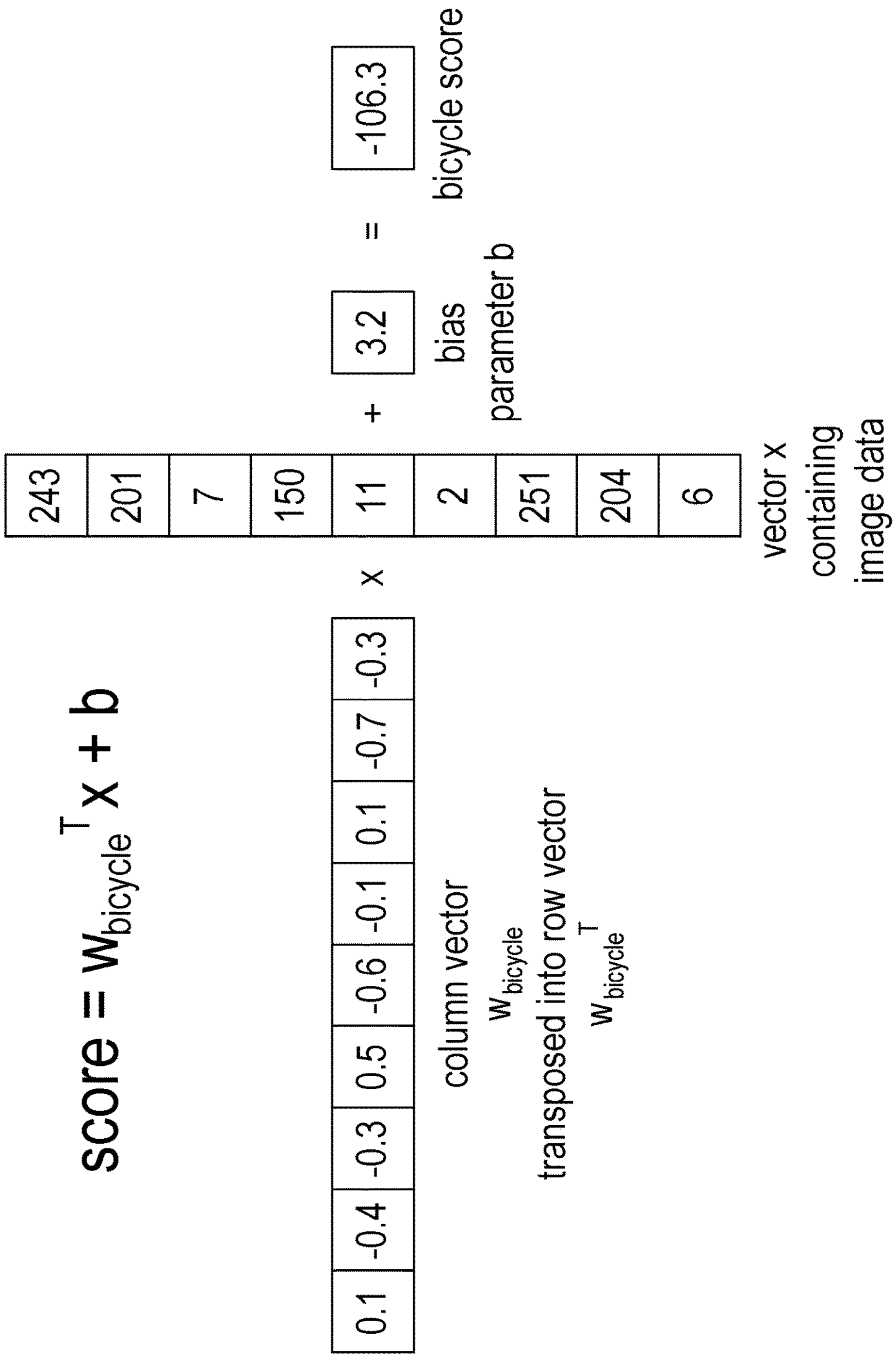
FIG. 3 illustrates a bicycle score produced by multiplying the vector of FIG. 2 by the vector x, and then adding a bias value.
Figure 5:
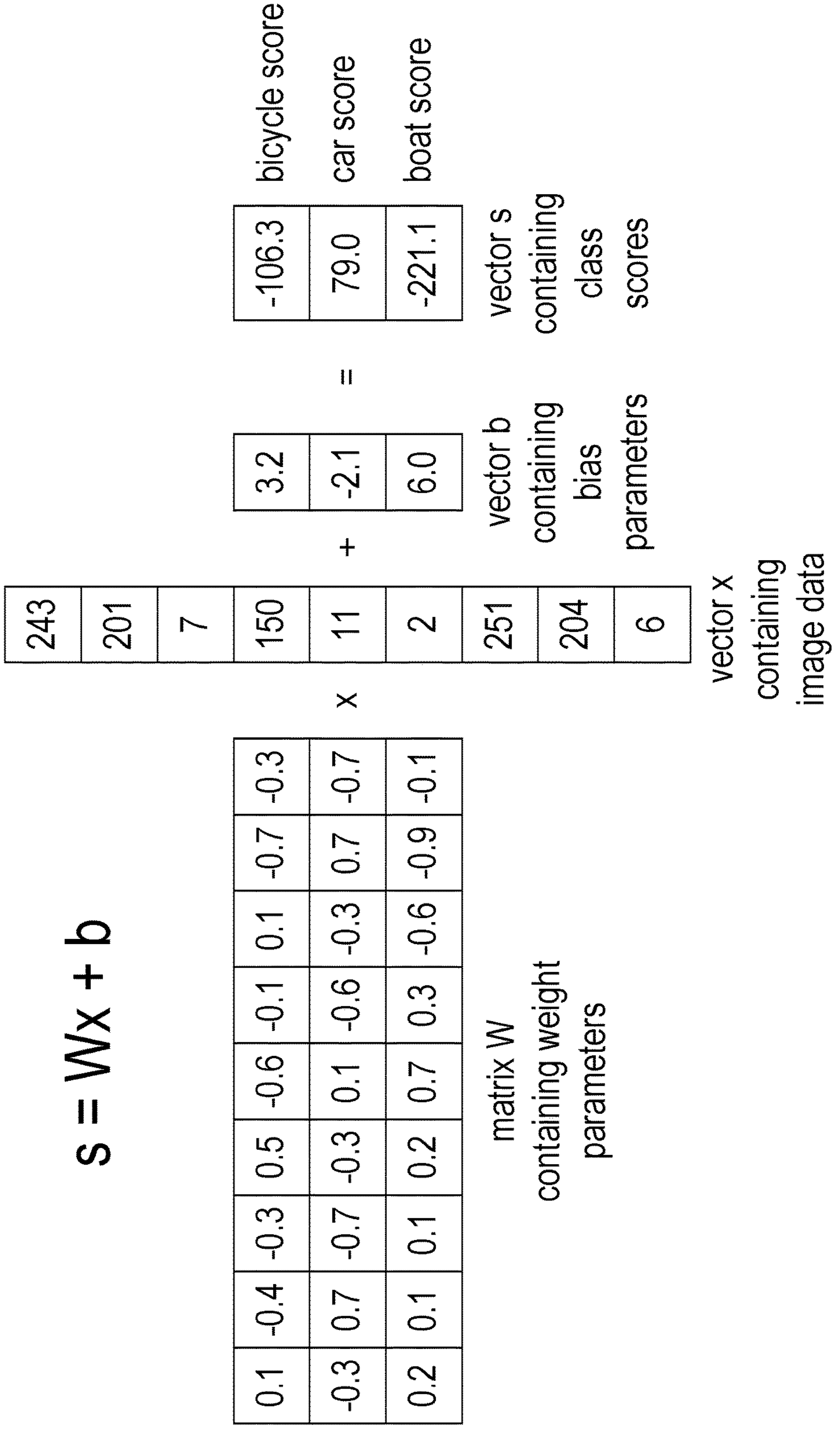
FIG. 5 illustrates the generation of a vector s containing scores for the classes from FIG. 4.
Figure 8A:
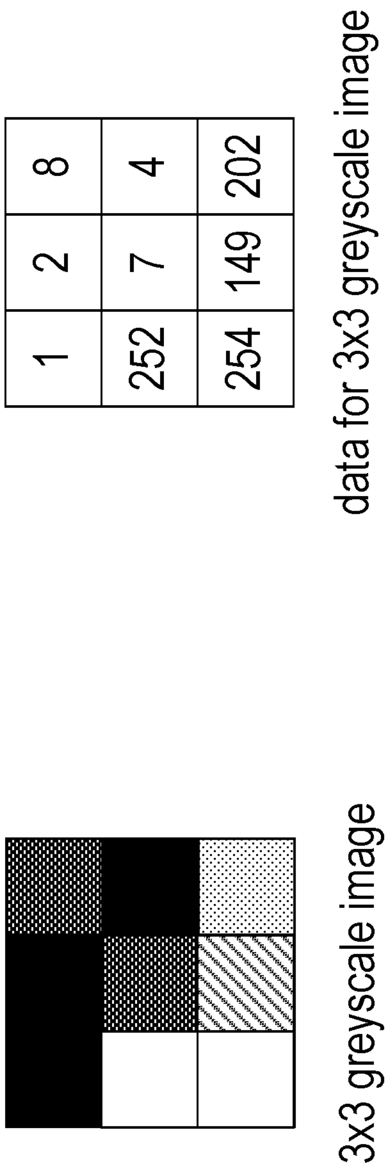
FIG. 8A illustrate another 3×3 greyscale image comprising nine pixels each having a greyscale value.
Figure 8B:
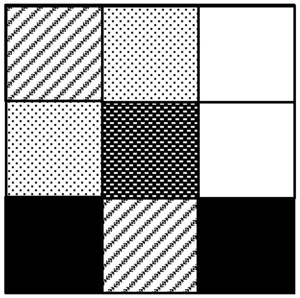
FIG. 8B illustrates another 3×3 greyscale image comprising nine pixels each having a greyscale value.
Figure 9:
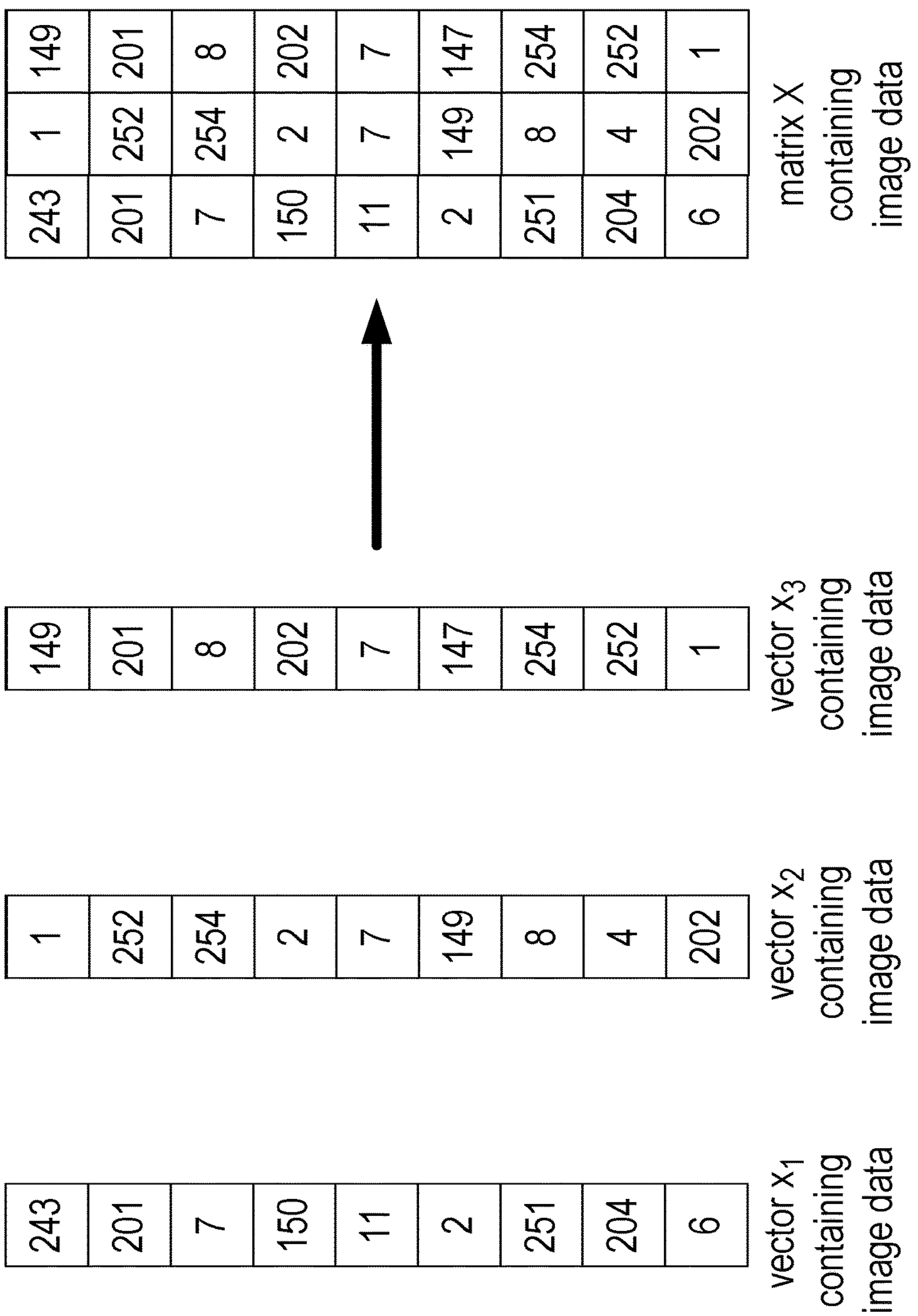
FIG. 9 illustrates the combination of the resulting three flattened single 9×1 column vectors from FIGS. 1A, 8A, and 8B into a matrix X.
Figure 10A:
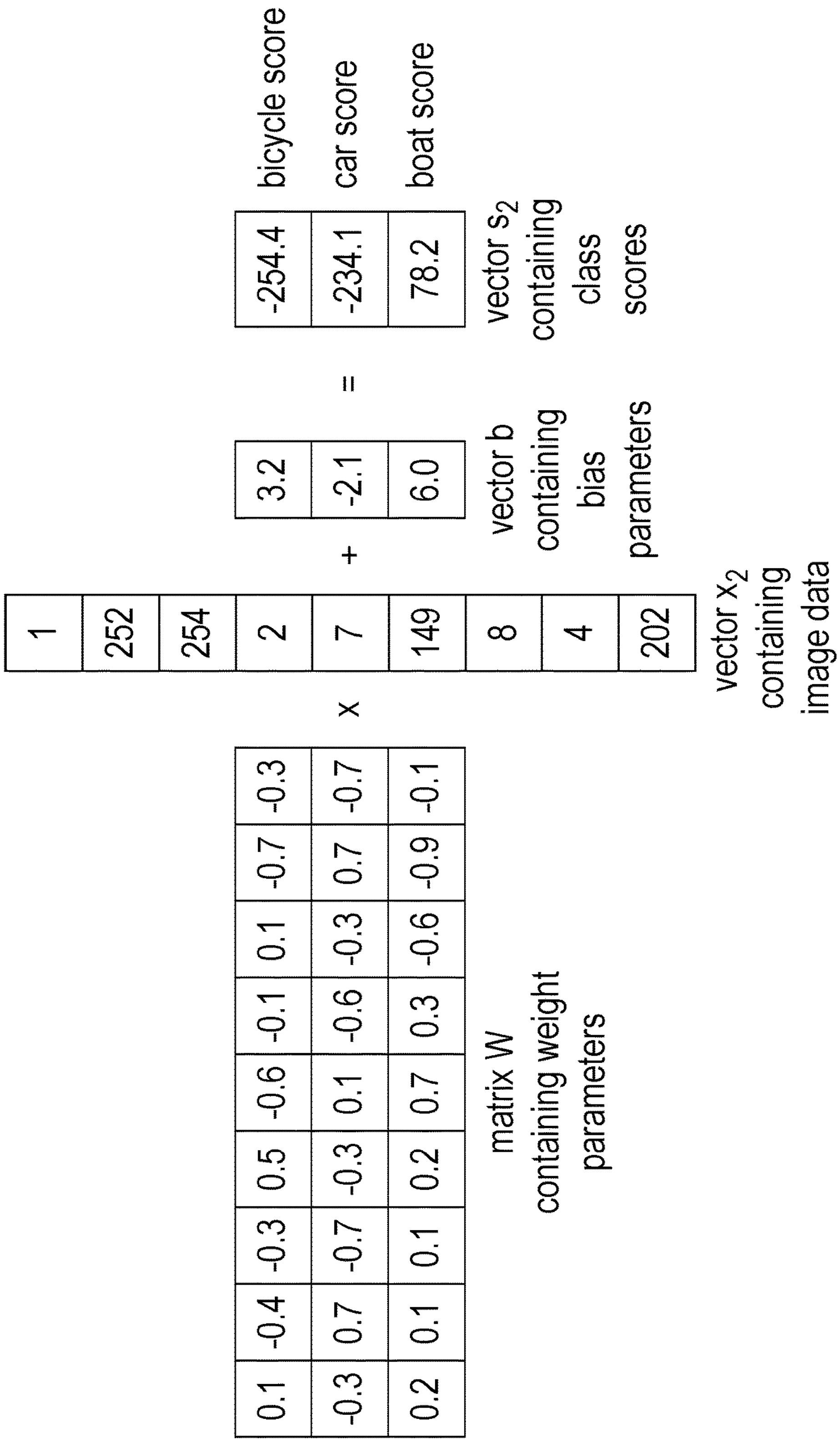
FIG. 10A illustrates use of the matrix W and vector b that were previously used to calculate a score vector for the image of FIG. 1A to similarly calculate a score vector $s_3$ for the image of FIG. 8A.
Figure 11A:
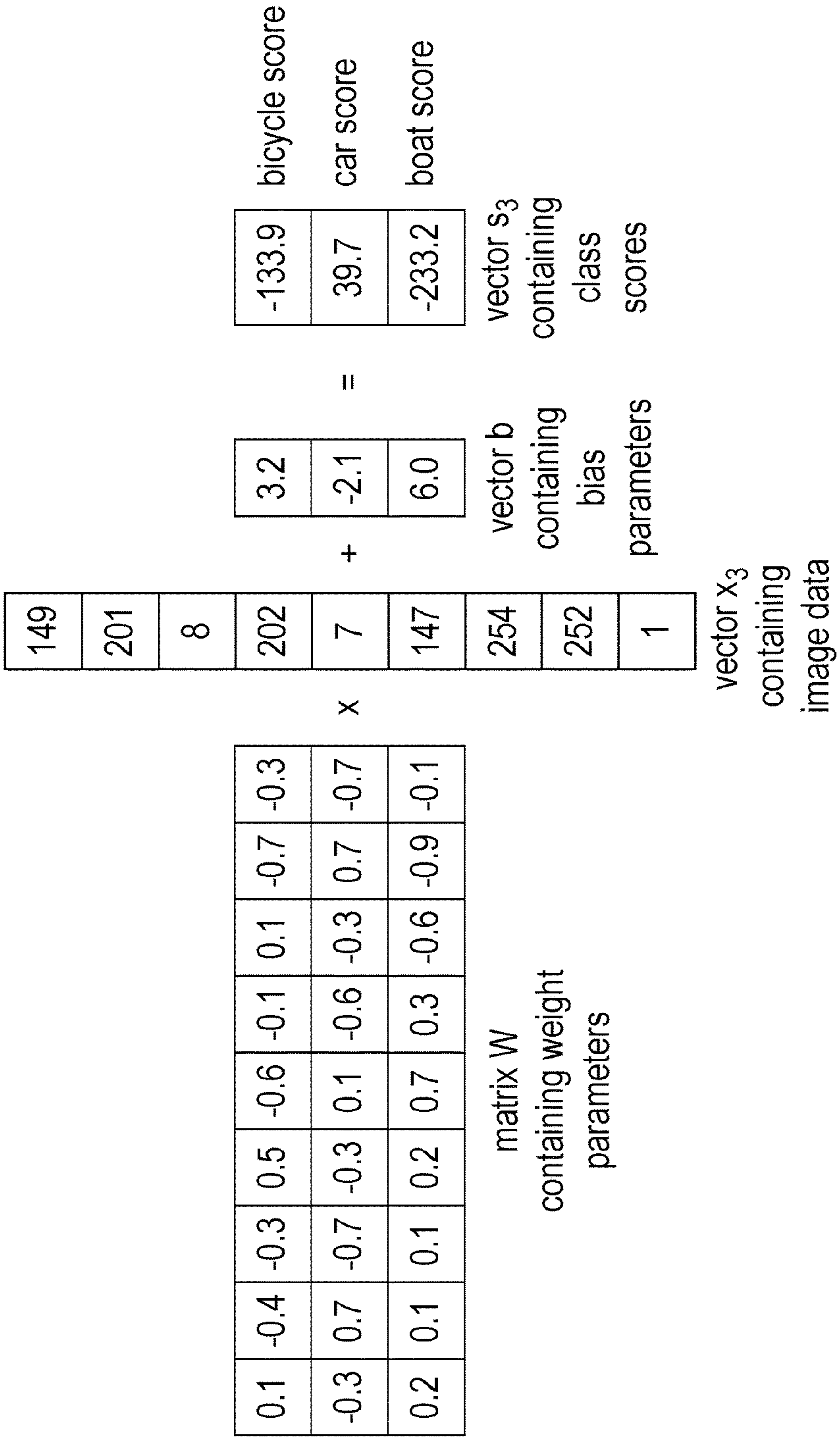
FIG. 11A illustrates use of the matrix W and vector b that were previously used to calculate a score vector for the image of FIG. 1A to similarly calculate a score vector $s_3$ for the image of FIG. 8B.
Figure 12:
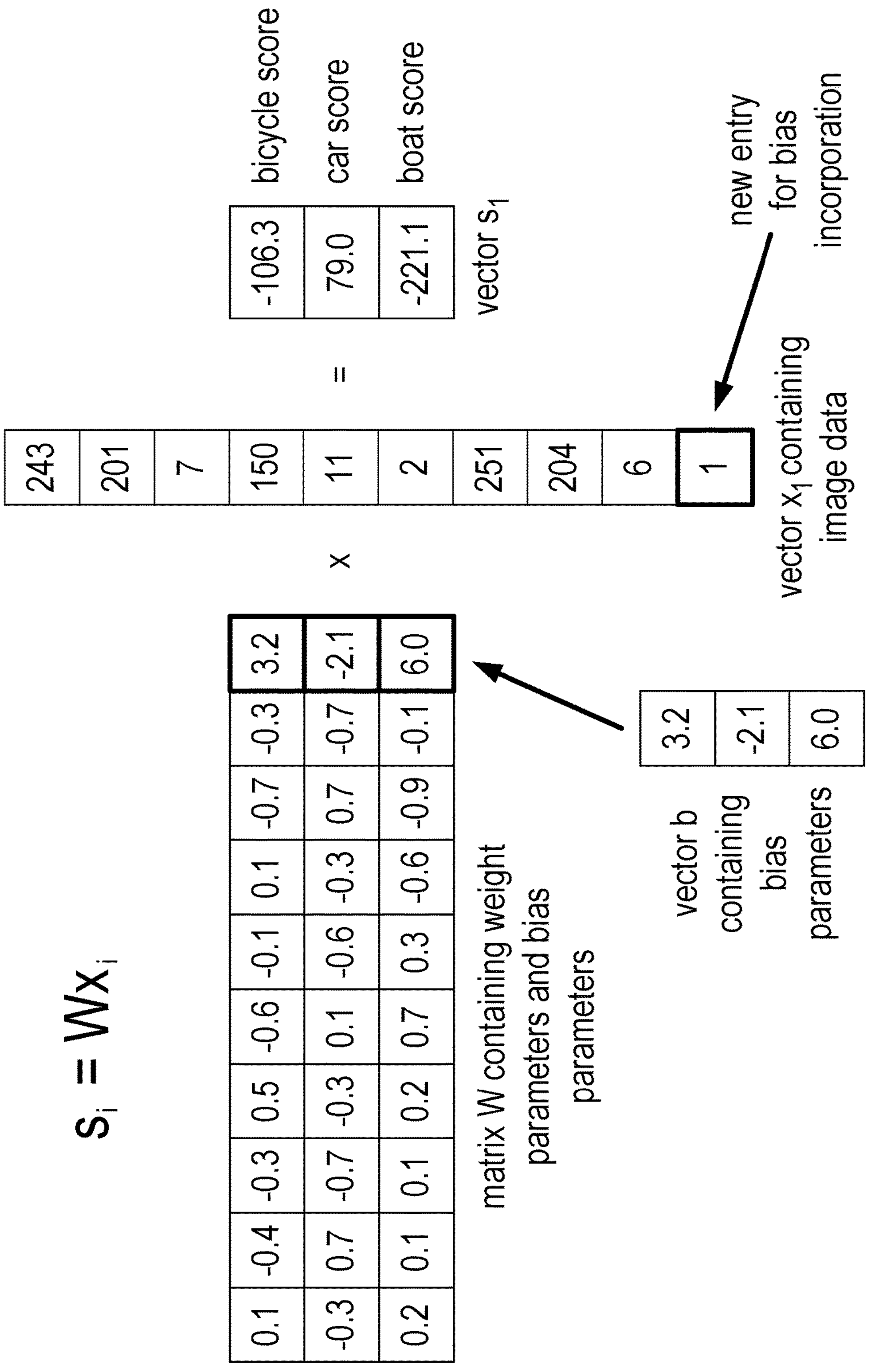
FIG. 12 illustrates the bias parameters incorporated into a vector or matrix containing weight parameters and the calculation of a score vector $s_1$ containing scores for the image of FIG. 1A.
Figure 14:
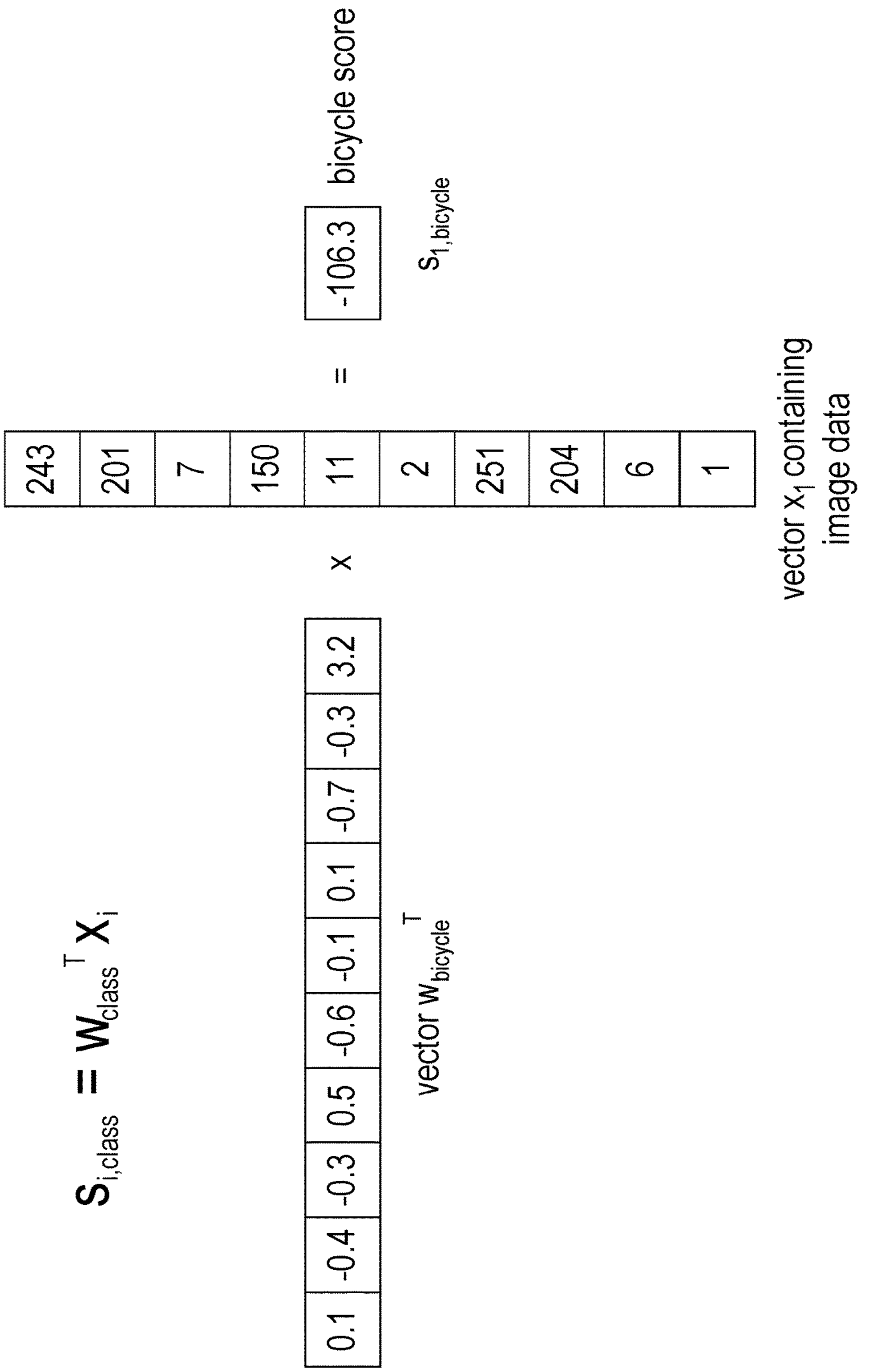
FIG. 14 illustrates calculation of a score value $s_{i,bicycle}$ for the bicycle class for the first image of FIG. 1A.
Figure 22:
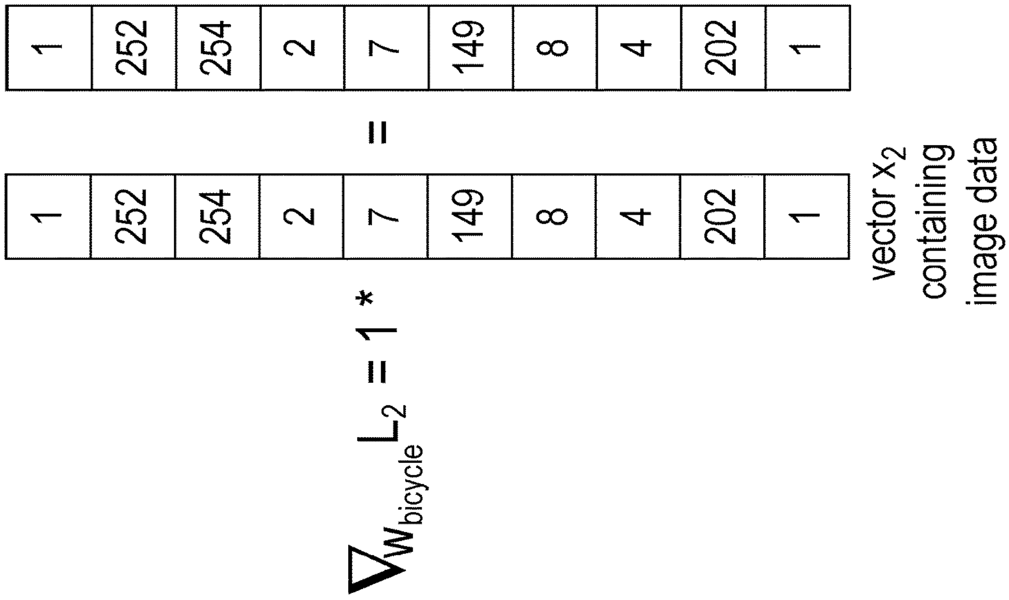
FIG. 22 illustrates the gradient $\nabla w_{bicycle}L_2$ equals the score vector $x_2$ for the second image of FIG. 8A.
Figure 24:
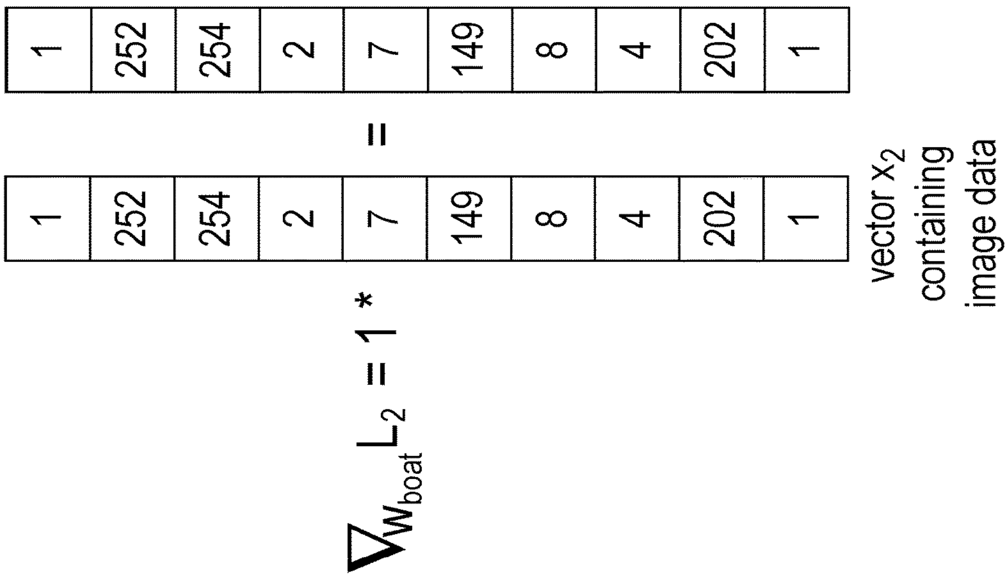
FIG. 24 illustrates the gradient $\nabla w_{boat}L_2$ equals the score vector $x_2$ for the second image of FIG. 8A.
Figure 31:
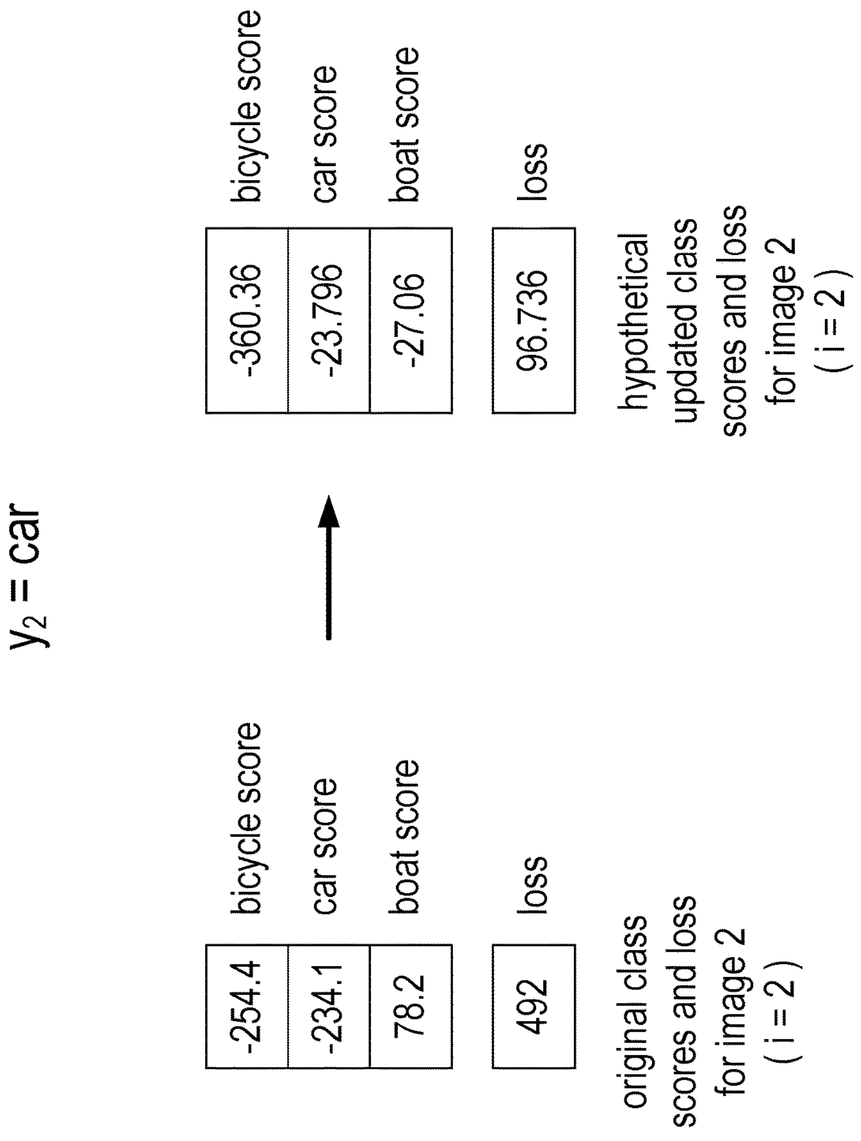
FIG. 31 illustrates comparison of the originally calculated class scores and loss value for the second image of FIG. 8A with these hypothetical updated class scores and loss value of FIGS. 29 and 30.
Figure 41A:
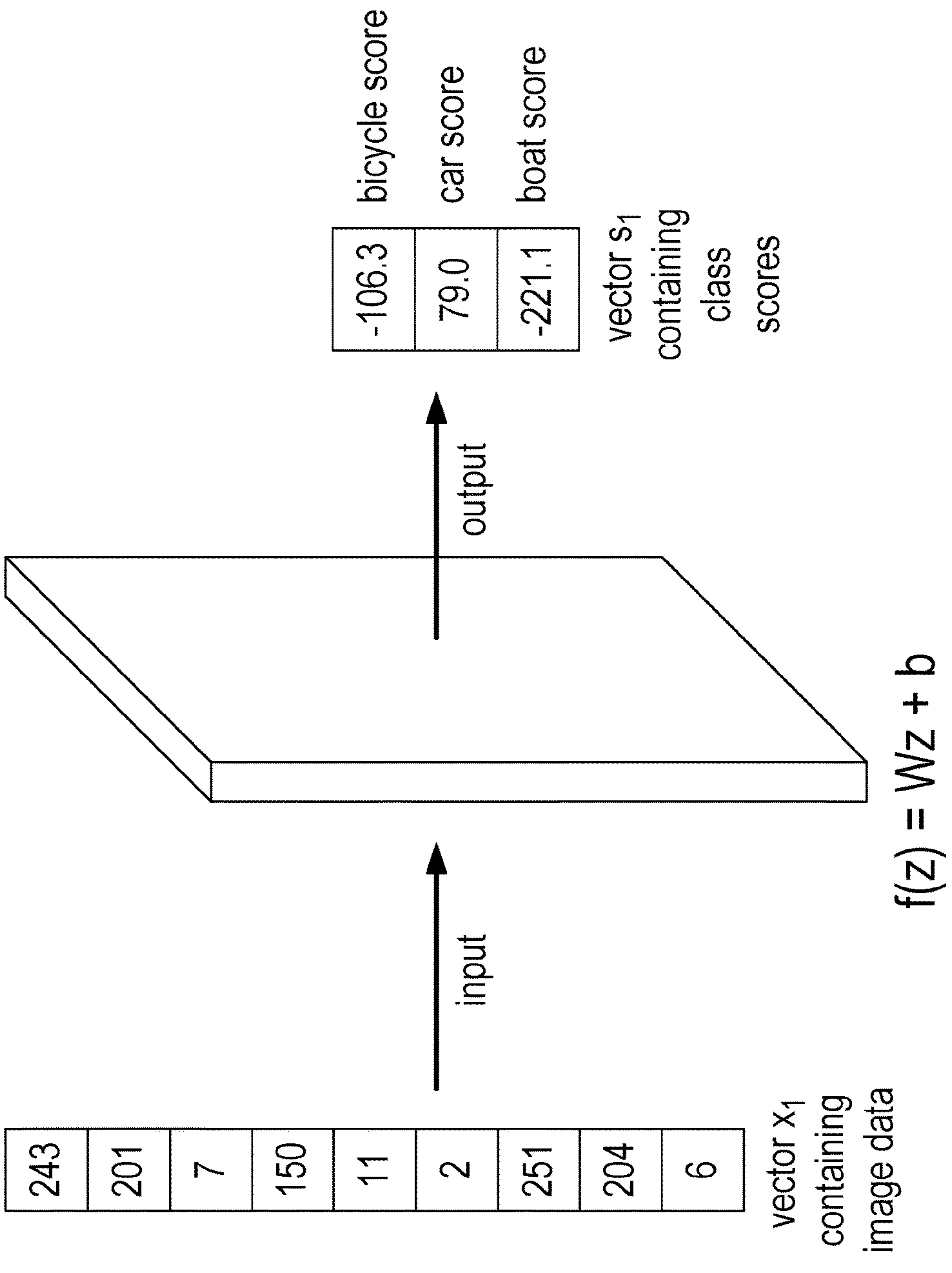
FIG. 41A illustrates characterization of the generation of scores from FIG. 5 including a single layer implementing the function f(z)=Wz+b.
Figure 41B:
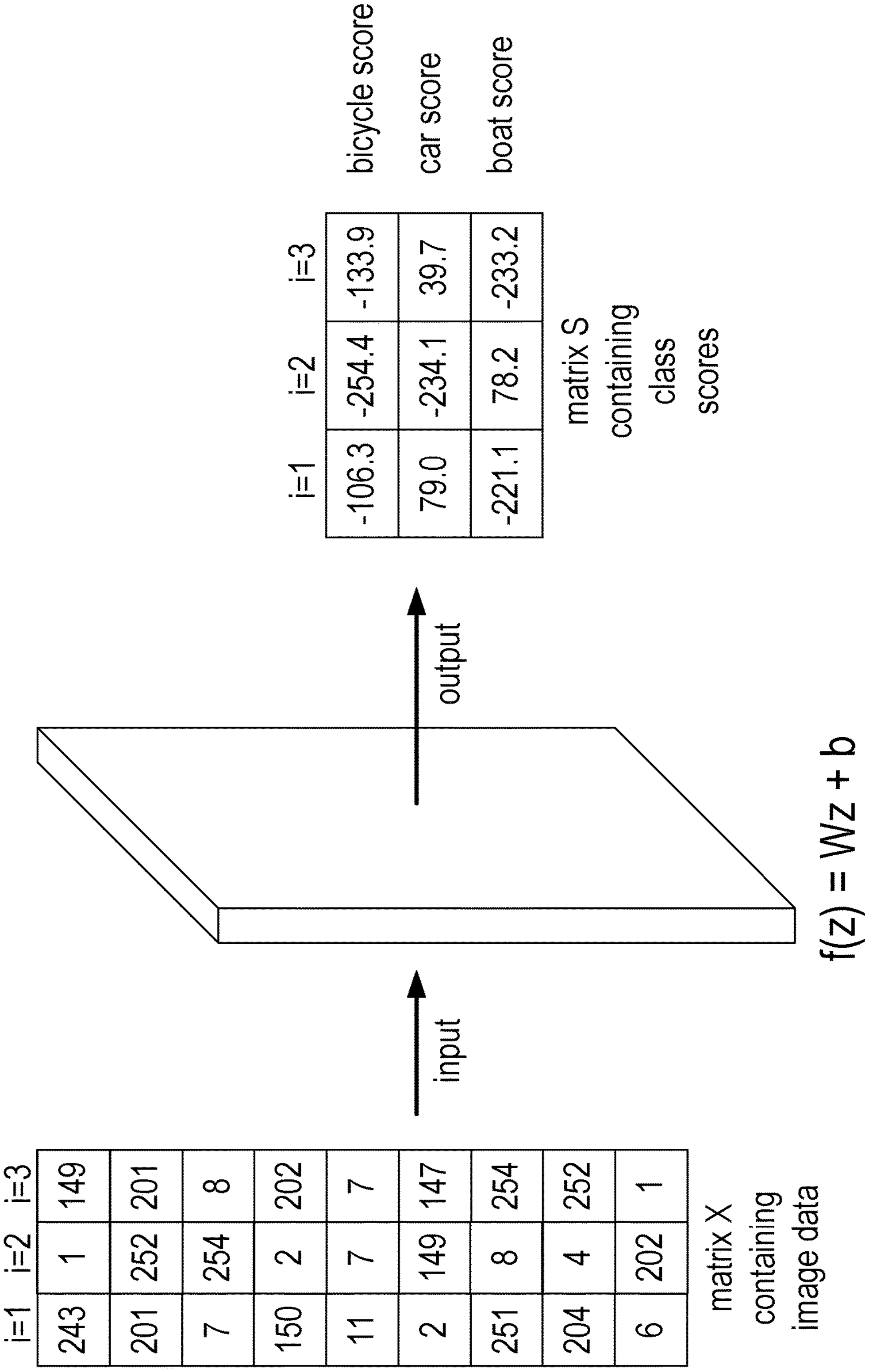
FIG. 41B illustrates a layer configured to take as input a matrix X containing image data for three images (i=1,2,3), and provide as output a matrix S containing class scores for each image.
Figure 43:
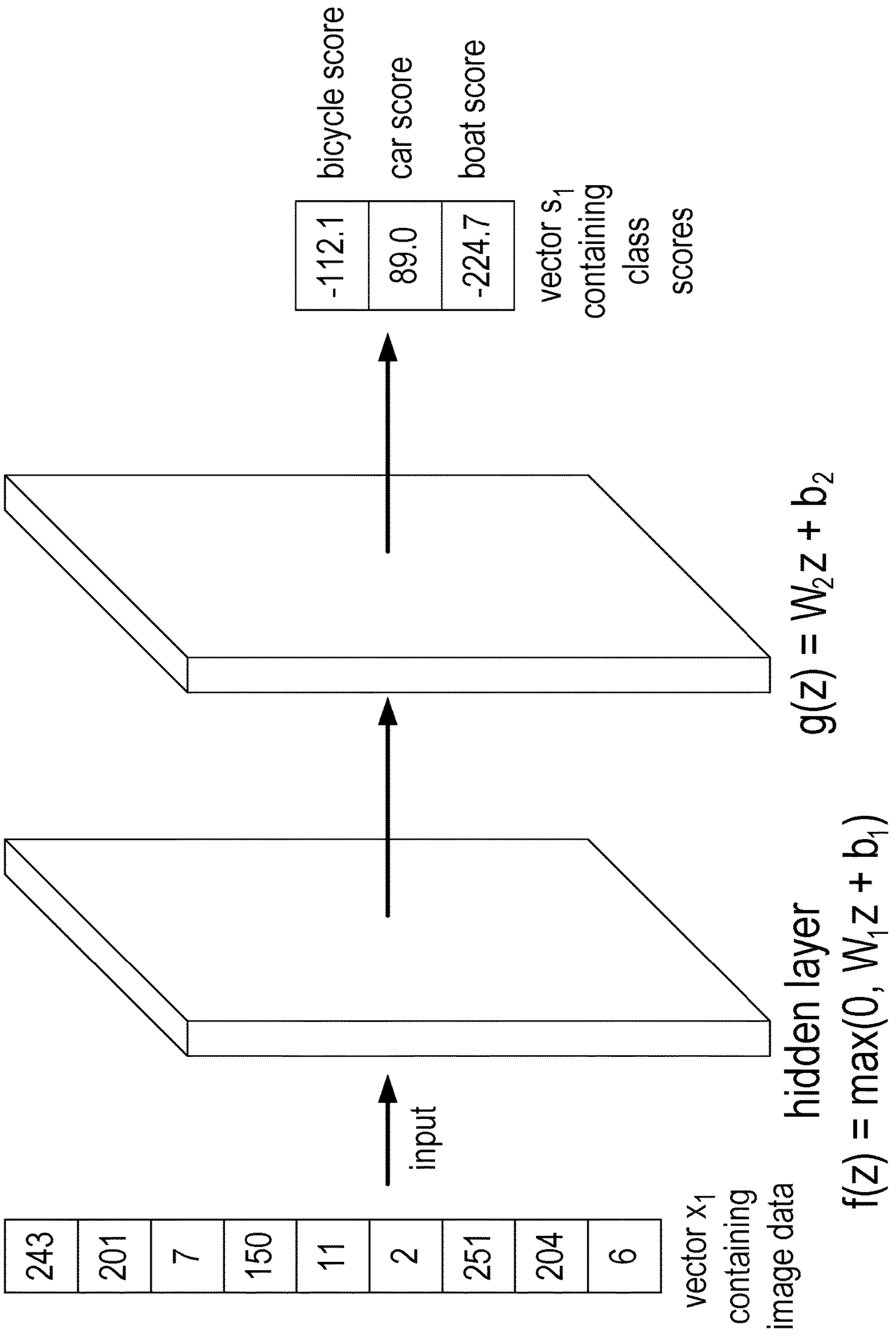
FIG. 43 fancifully illustrates use of such multilayer neural network to take as input a vector $x_i$ containing image data for a single image and produce as output a vector $s_1$ containing class scores.
Figure 44B:
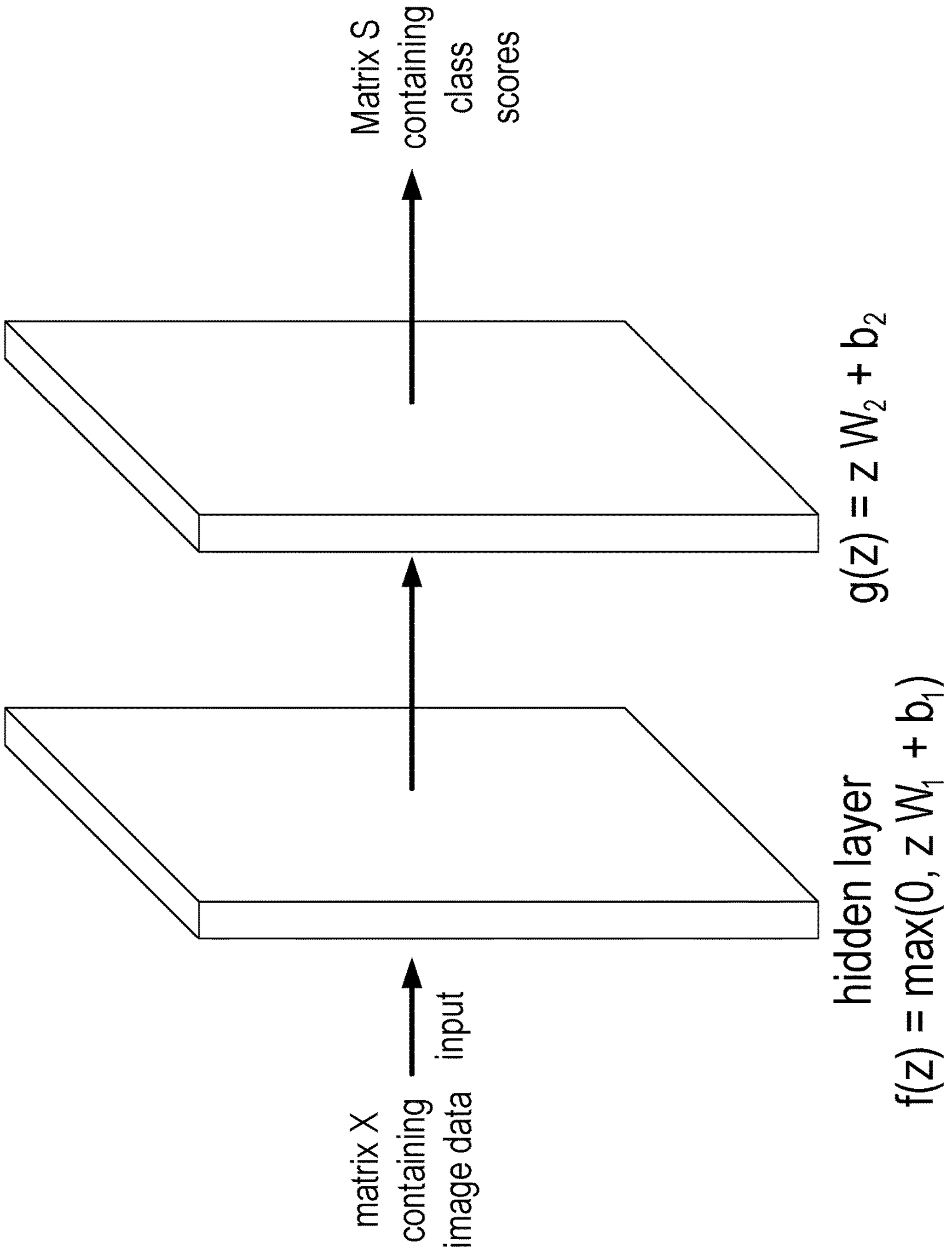
FIG. 44B fancifully illustrates use of such multilayer neural network to take as input a matrix X containing image data for a plurality of images and produce as output a matrix S containing class scores for each of these images.
Figure 46:
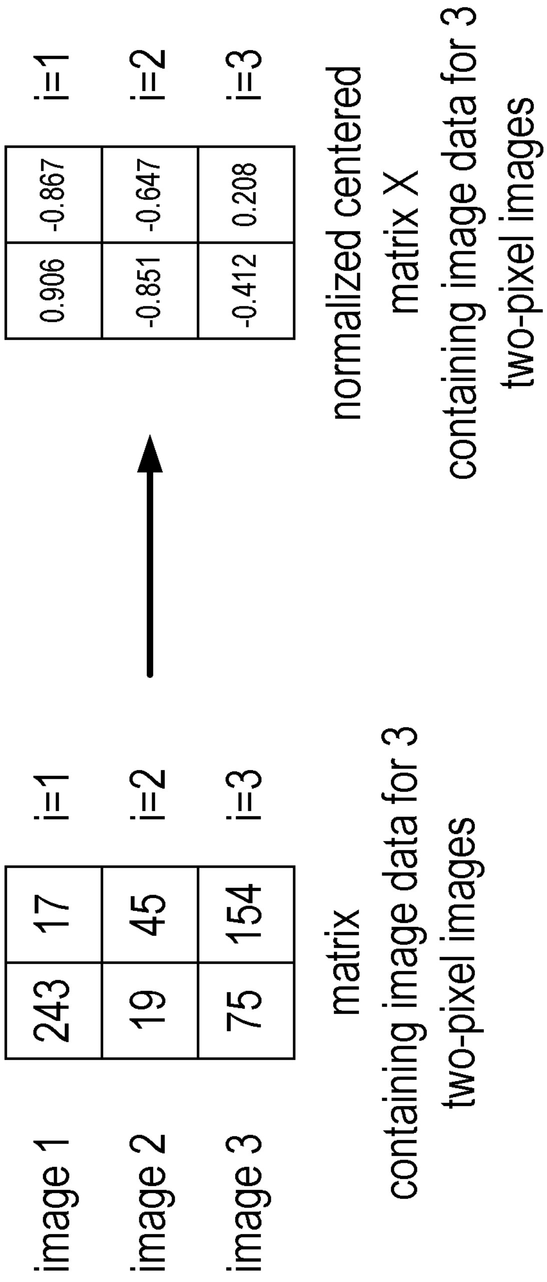
FIG. 46 illustrates transformation of the matrix of FIG. 45 into matrix X containing normalized centered image data for these three two-pixel images.
Figure 49:
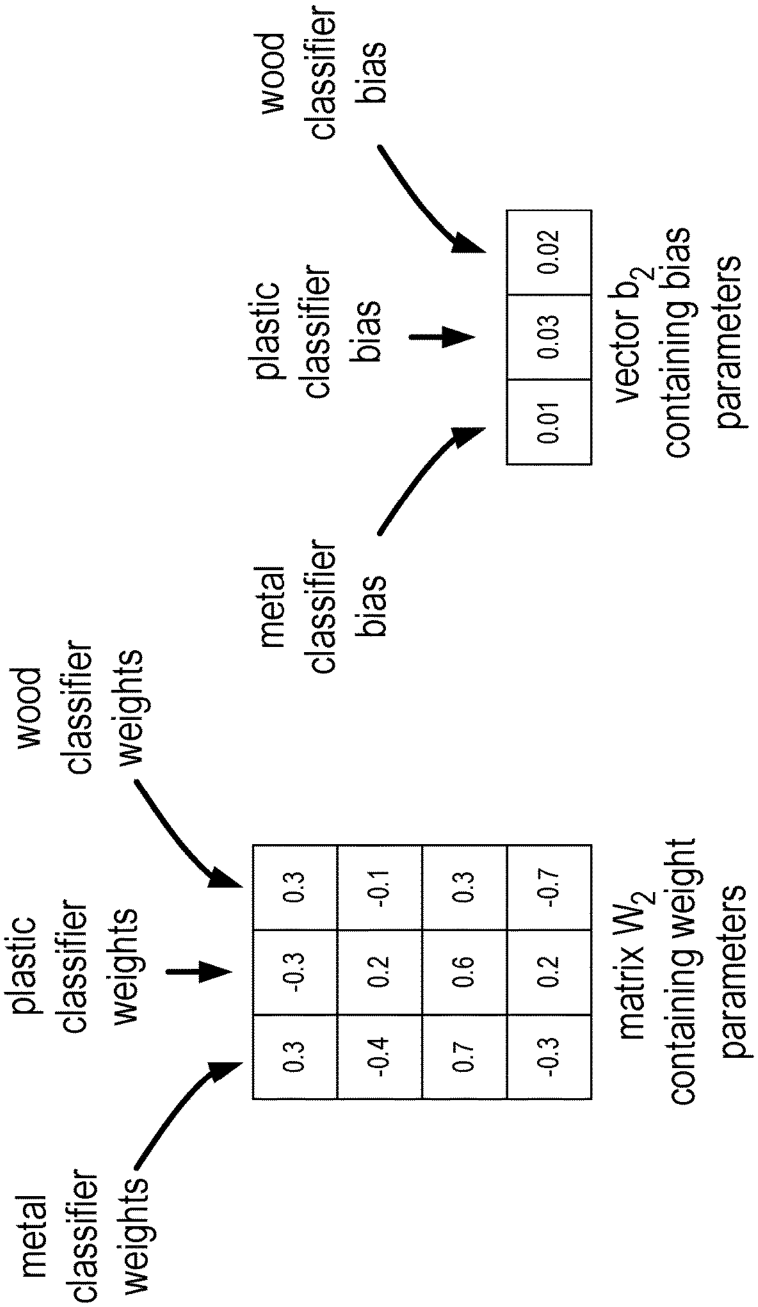
FIG. 49 illustrates an exemplary second weight matrix $W_2$ containing a second set of weight parameters and an exemplary second bias vector $b_2$ containing a second set of bias parameters.
Figure 50:
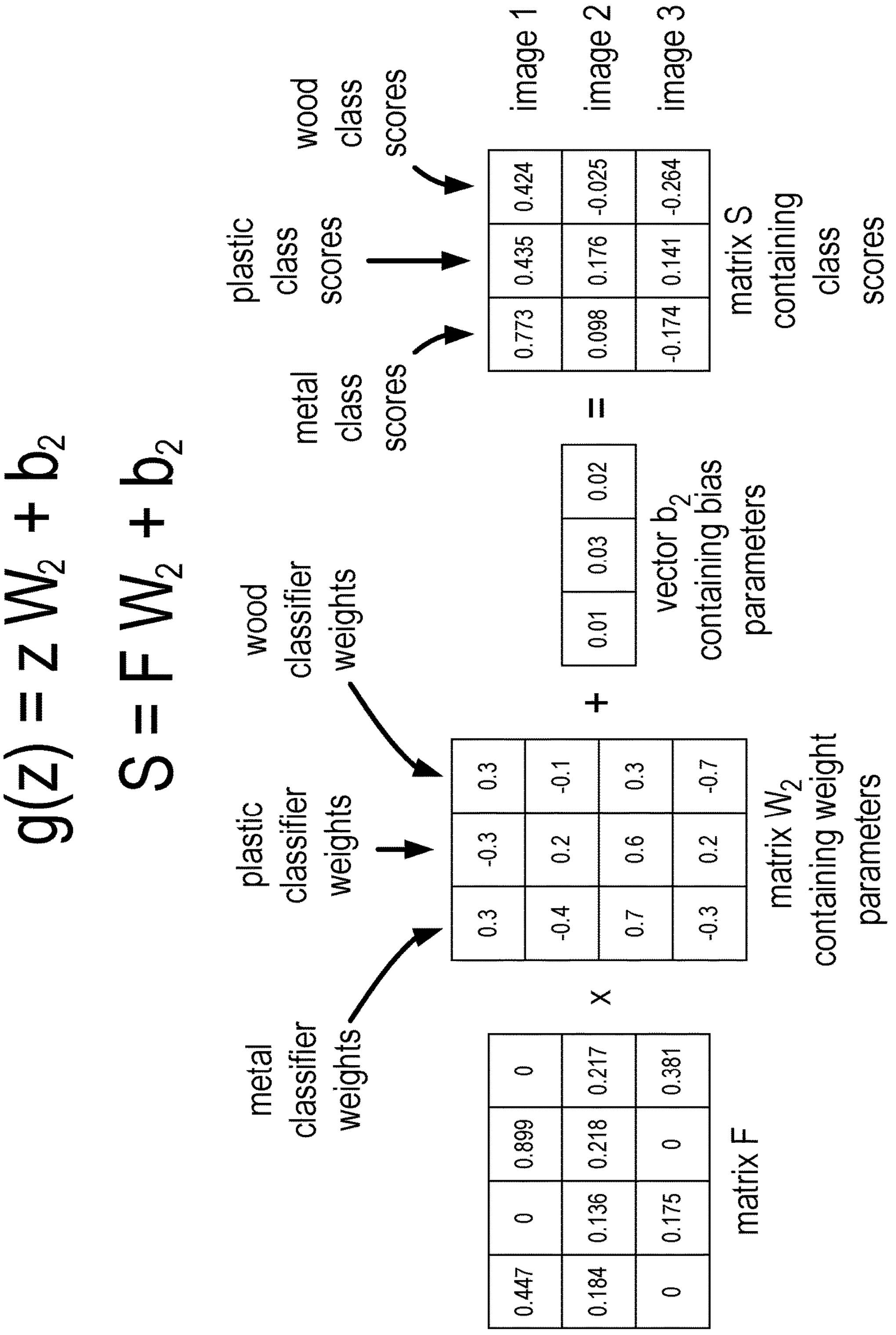
FIG. 50 illustrates calculation of a matrix S containing class scores based on the function $g(z)=z\ W_2+b_2$, the matrix F, the matrix $W_2$ containing weight parameters, and the vector $b_2$ containing bias parameters.
Figure 51:
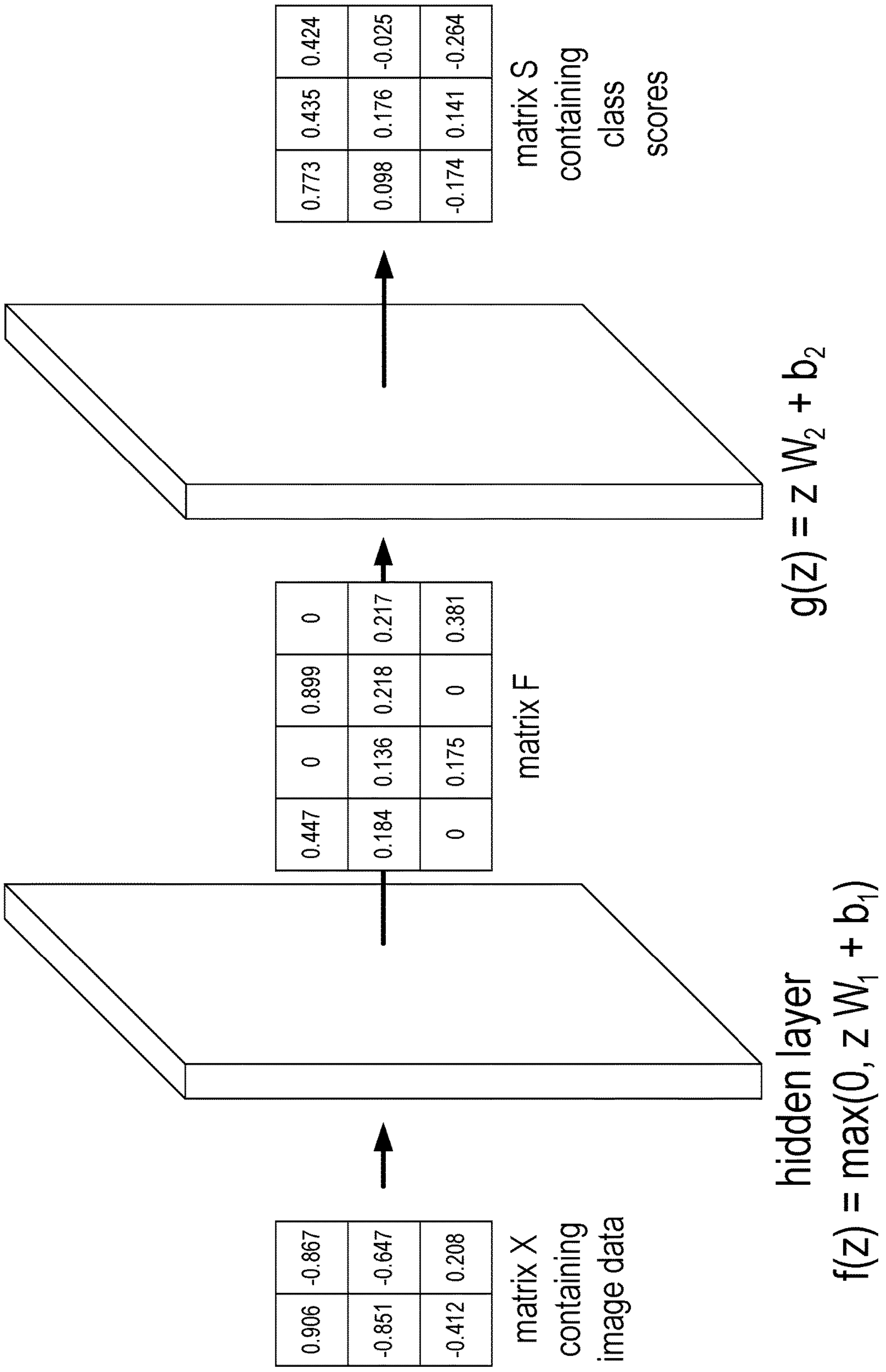
FIG. 51 fancifully illustrates operation of the neural network detailed in FIGS. 45-50.
Figure 53:
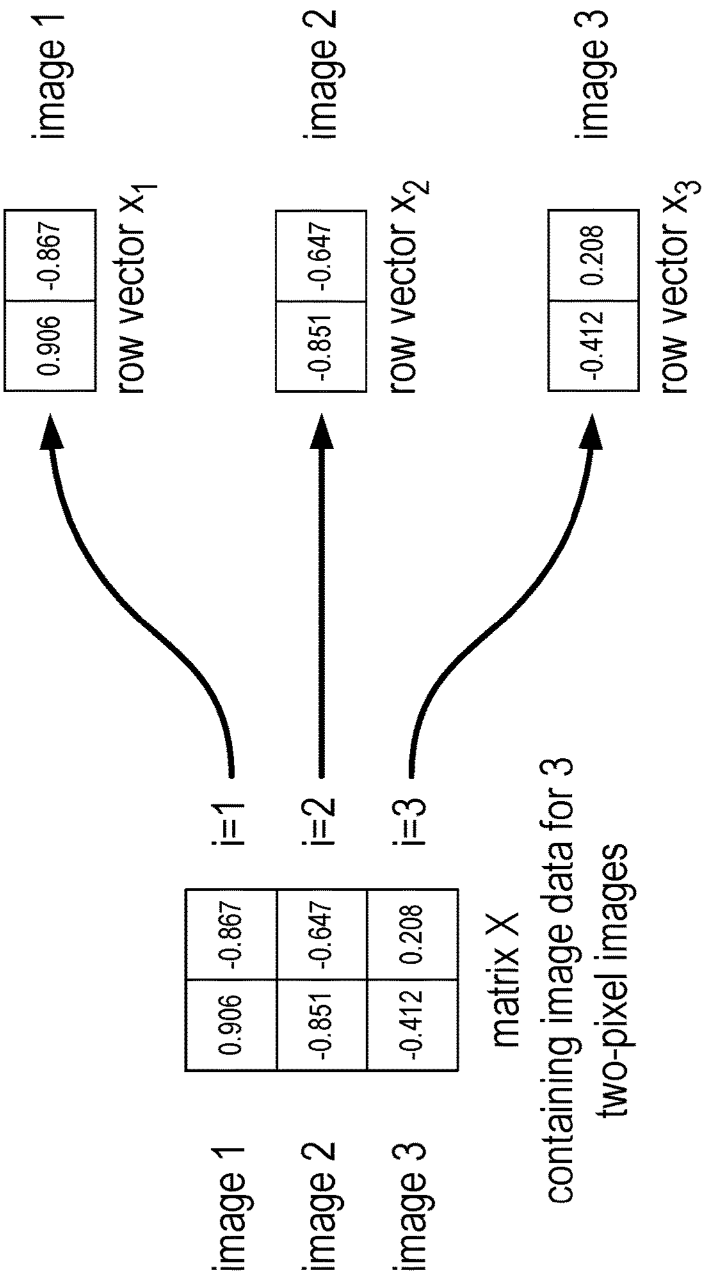
FIG. 53 illustrates decomposition of the matrix X in FIG. 46 into three row vectors.
Figure 54:
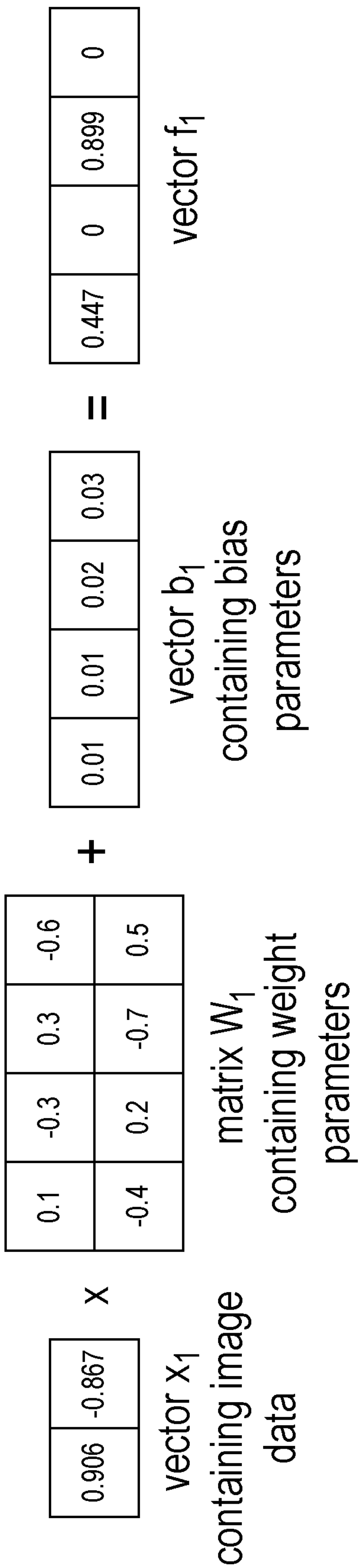
FIG. 54 illustrates calculation of a row vector $f_1$ based on the function $f(z)=\max(0,z\ W_1+b_1)$ using row vector $x_1$ from FIG. 53.
Figure 55:
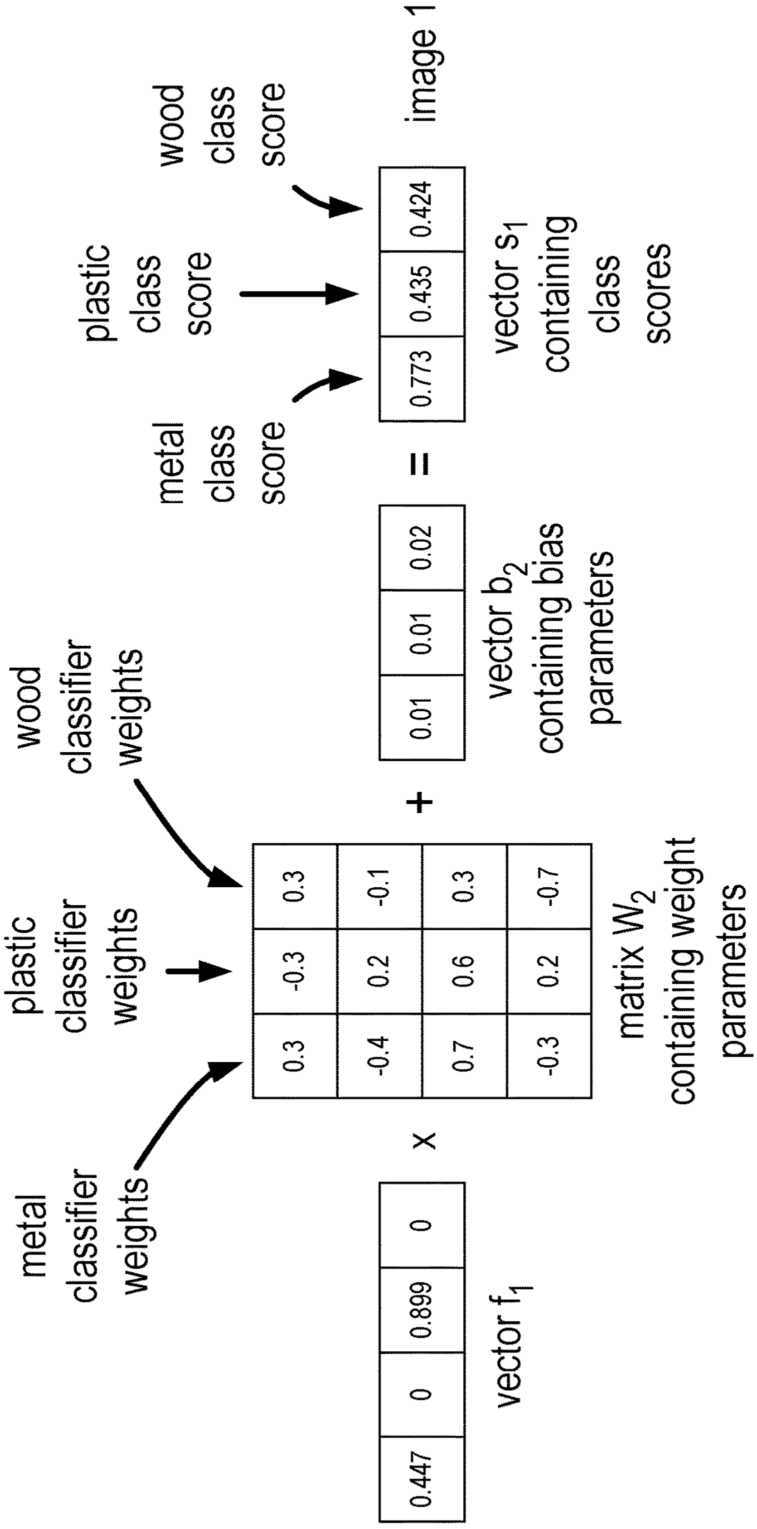
FIG. 55 illustrates calculation of a row vector $s_1$ containing class scores based on the function $g(z)=z\ W_2+b_2$ using the row vector $f_1$ from FIG. 54.
Figure 56:
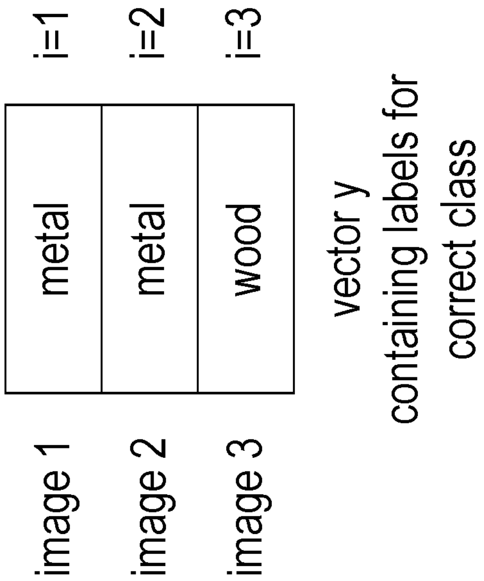
FIG. 56 fancifully illustrates a column vector y containing labels for the correct class for each image for which data is presented in the matrix of FIG. 45.
Figure 58:
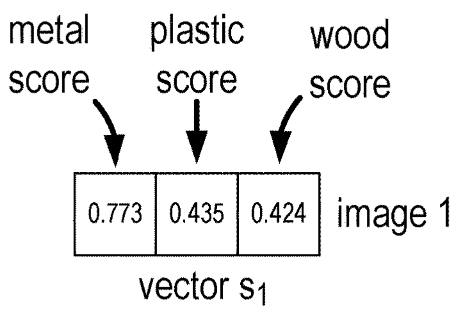
FIG. 58 illustrates calculation of a probability $p_{i,metal}$ that the metal class is the correct class for the first image (corresponding to an i value of one) for which score values are contained in vector $s_1$ calculated in FIG. 55.
Figure 59:
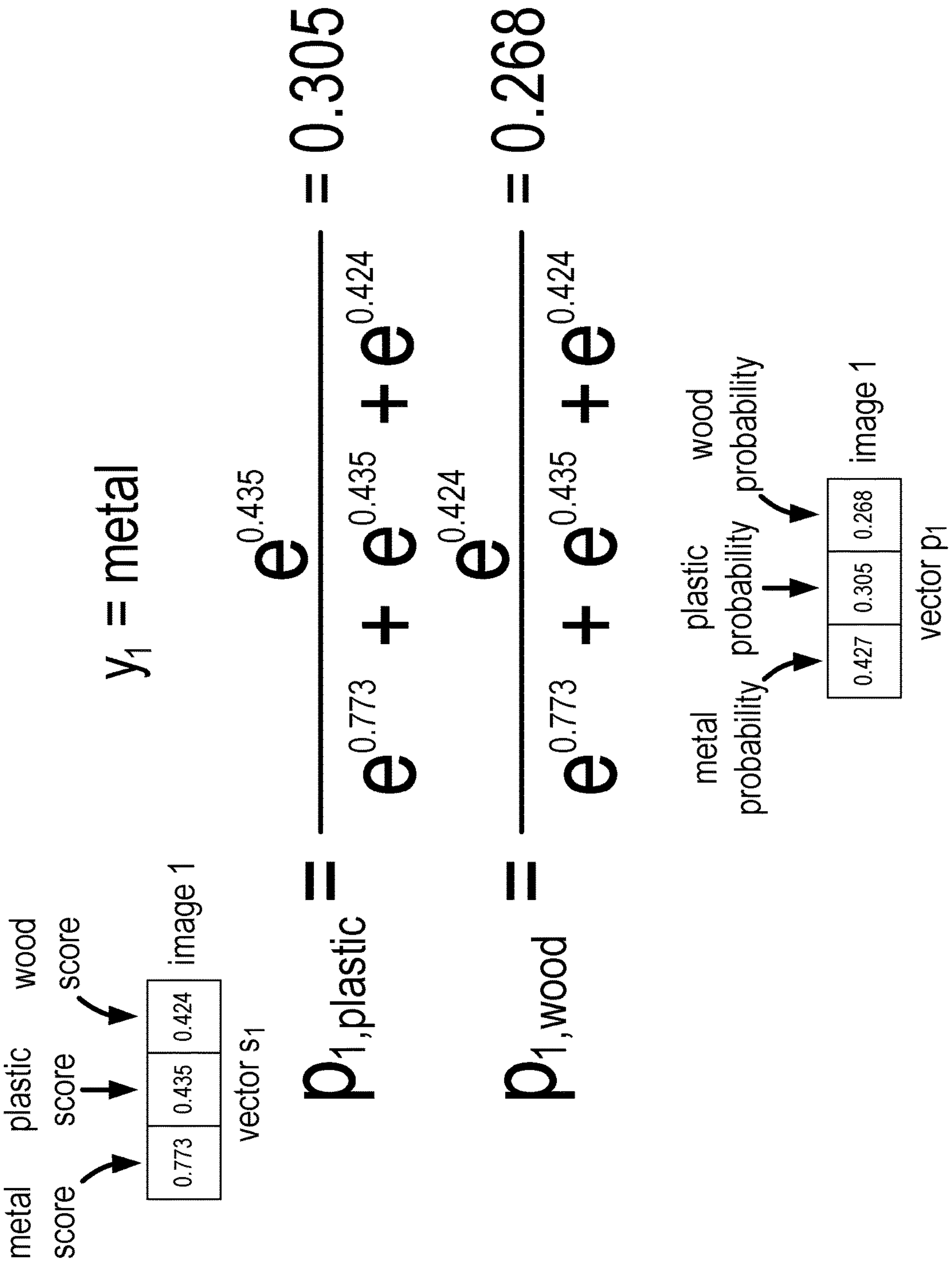
FIG. 59 illustrates similar calculation to FIG. 58 of a probability $p_{i,plastic}$ and a probability $p_{i,wood}$ for which score values are contained in vector $s_1$ calculated in FIG. 55.
Figure 62:
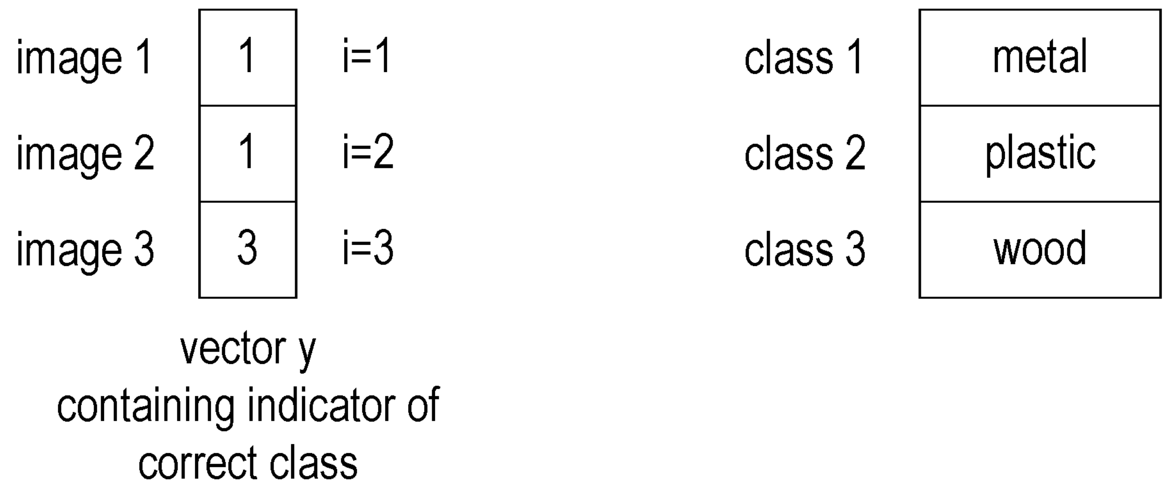
FIG. 62 illustrates a column vector y containing an indicator of the correct class for each image for which data is presented in the matrix of FIG. 45.
Figure 63:
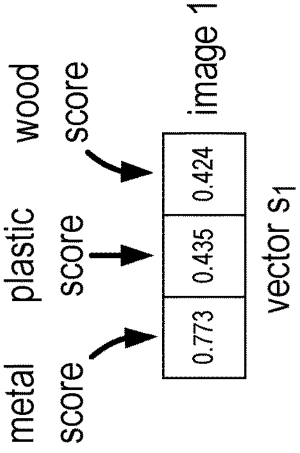
FIG. 63 illustrates calculation of a probability that the metal class is the correct class for the first image (corresponding to an i value of one) for which score values are contained in vector $s_1$.
Figure 65:
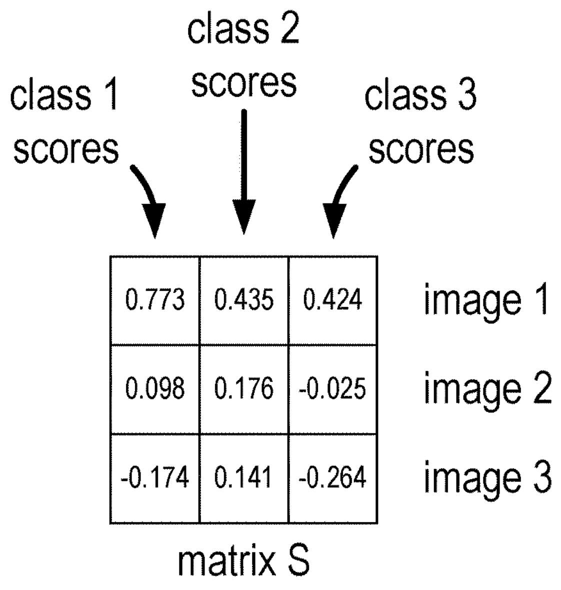
FIG. 65 illustrates, side by side, the matrix S containing class scores for the three images for which data was presented in the matrix of FIG. 45, and the specified formula for calculating a probability $p_{i,k}$.
Figure 67B:
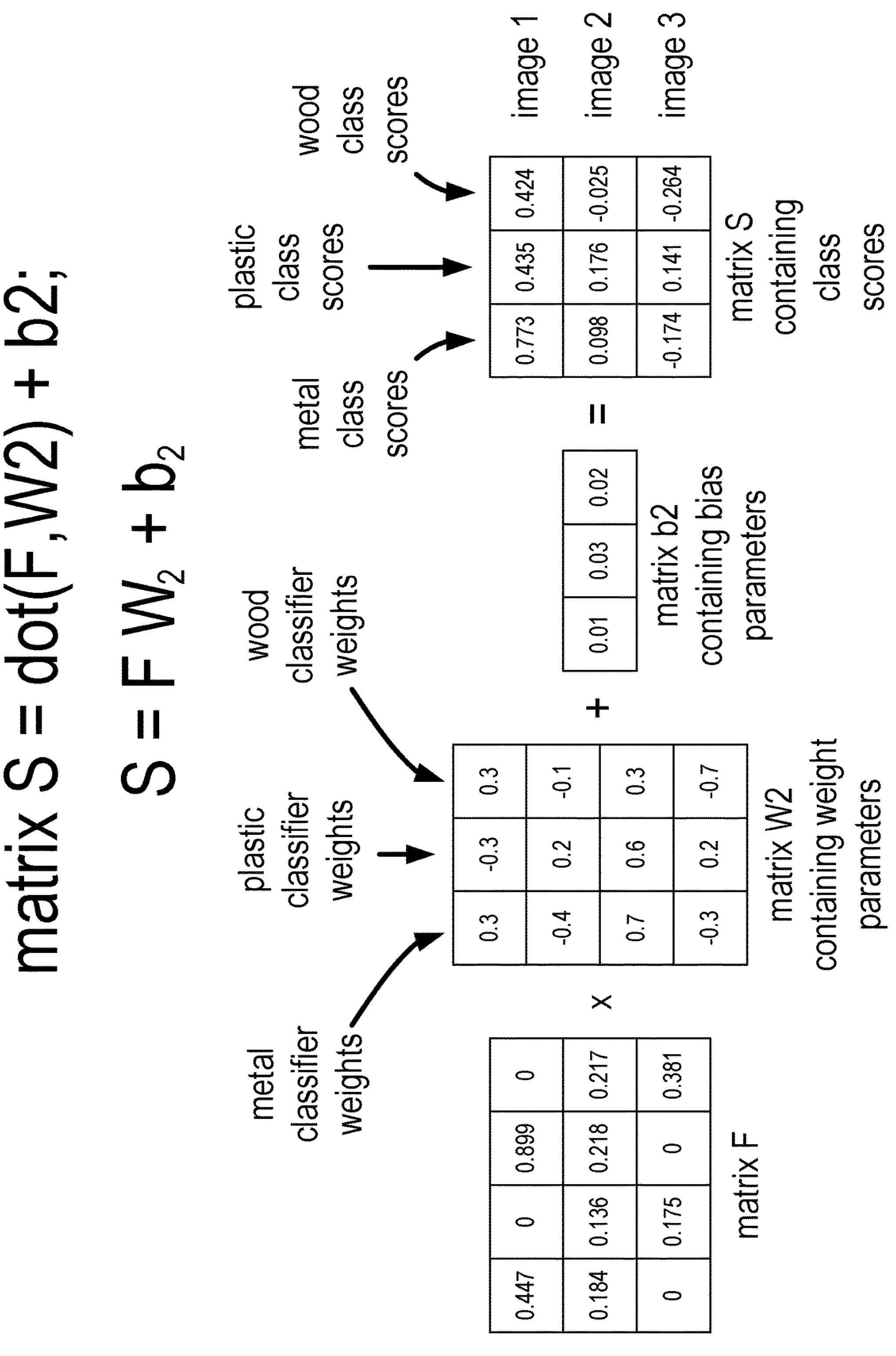
FIG. 67B illustrates calculation of a matrix S containing class scores based on the function $g(z)=z\, W_2+b_2$, the matrix F from FIG. 67A, and the matrices W2 and b2 from FIG. 49.
Figure 68:
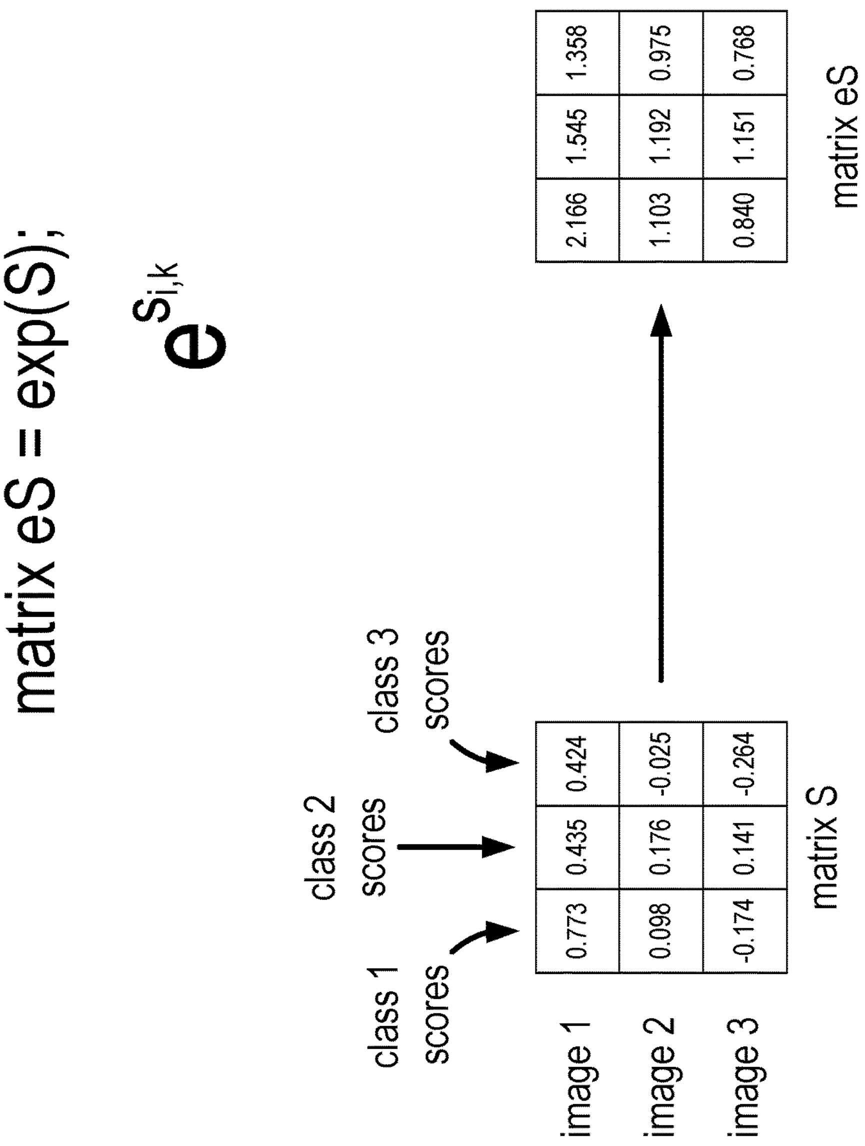
FIG. 68 illustrates generating a matrix eS where each value is determined by raising Euler's number to the value of the corresponding entry in matrix S of FIG. 67B
Figure 69A:
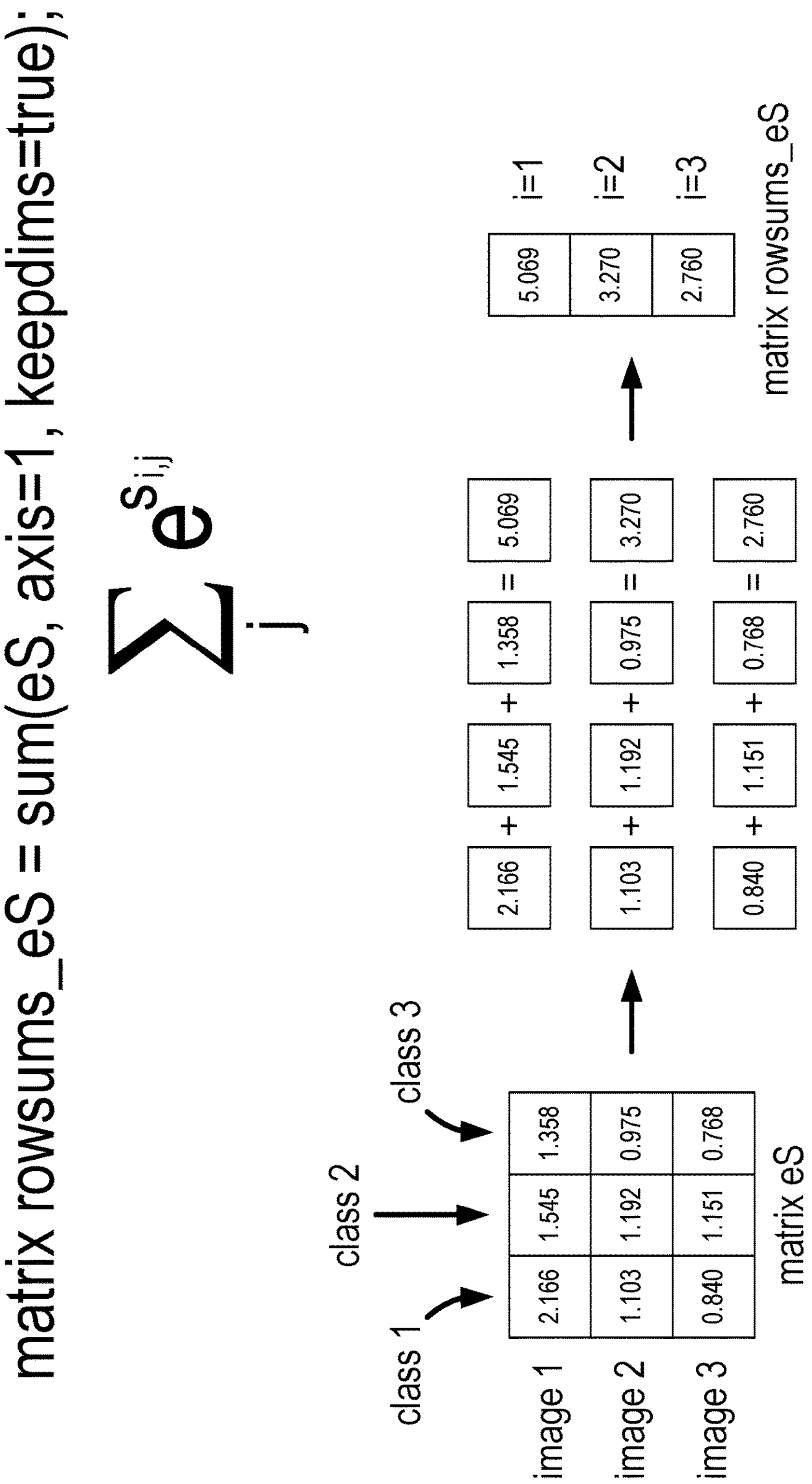
FIG. 69A illustrates calculating rowsums for matrix eS of FIG. 68 which are stored in a matrix rowsums_eS.
Figure 69B:
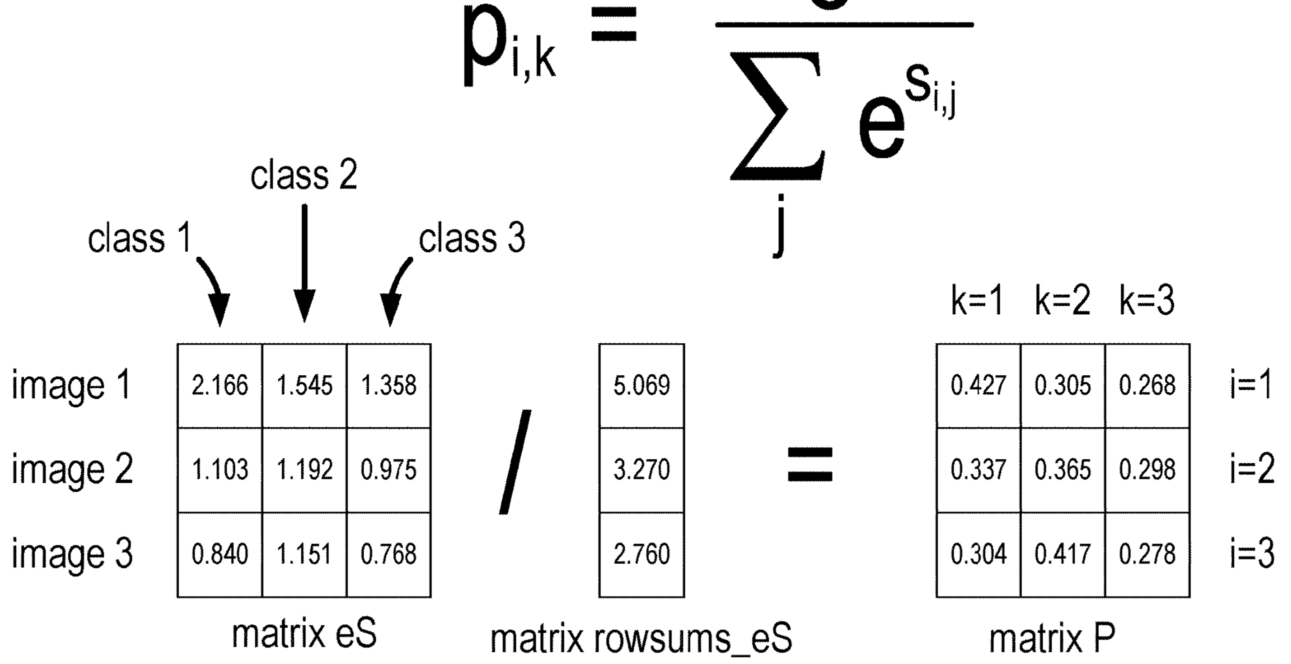
FIG. 69B illustrates generating matrix P where each entry is determined by dividing the corresponding entry in the matrix eS from FIG. 68, by the rowsums for that row stored in the matrix rowsums_eS from FIG. 69A.
Figure 70:
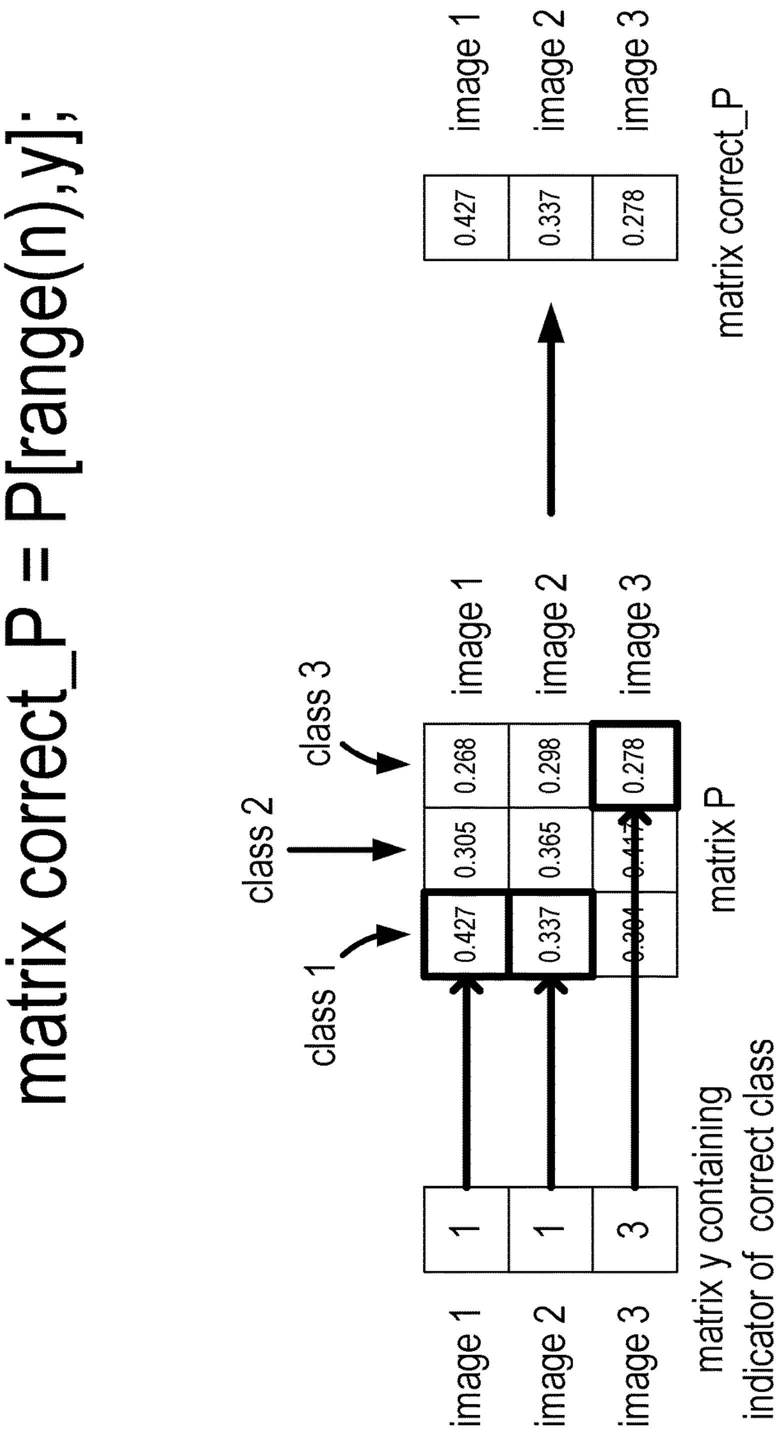
FIG. 70 illustrates generating a matrix correct_P from matrix y of FIG. 62 and matrix P of FIG. 69B.
Figure 73:
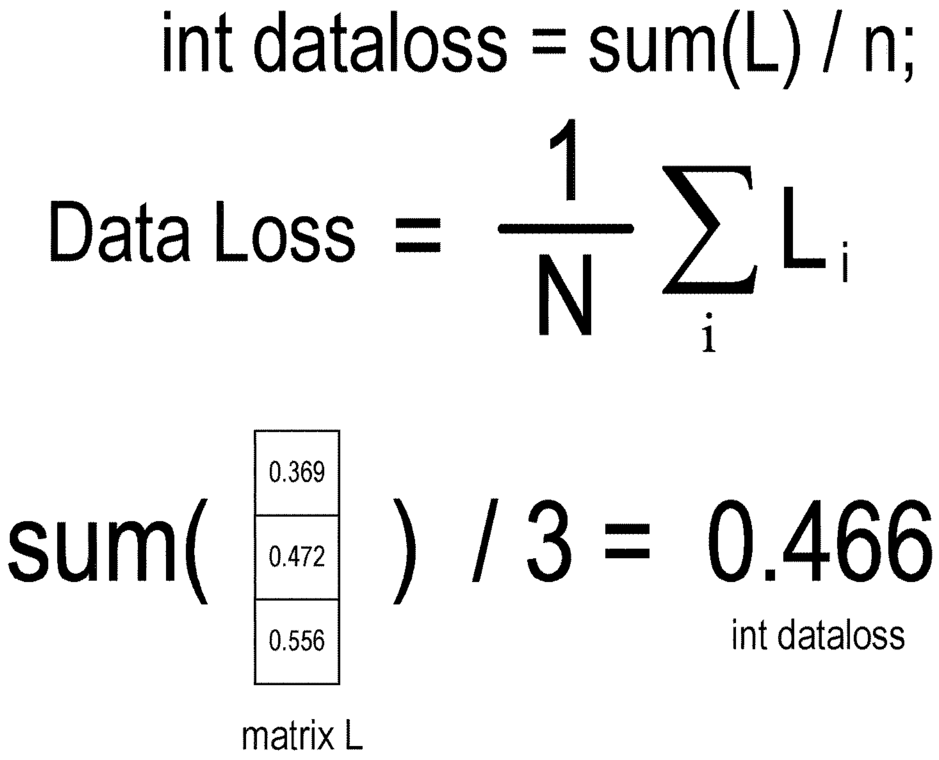
FIG. 73 illustrates calculation of a data loss value using matrix L from FIG. 71.
Figure 82:
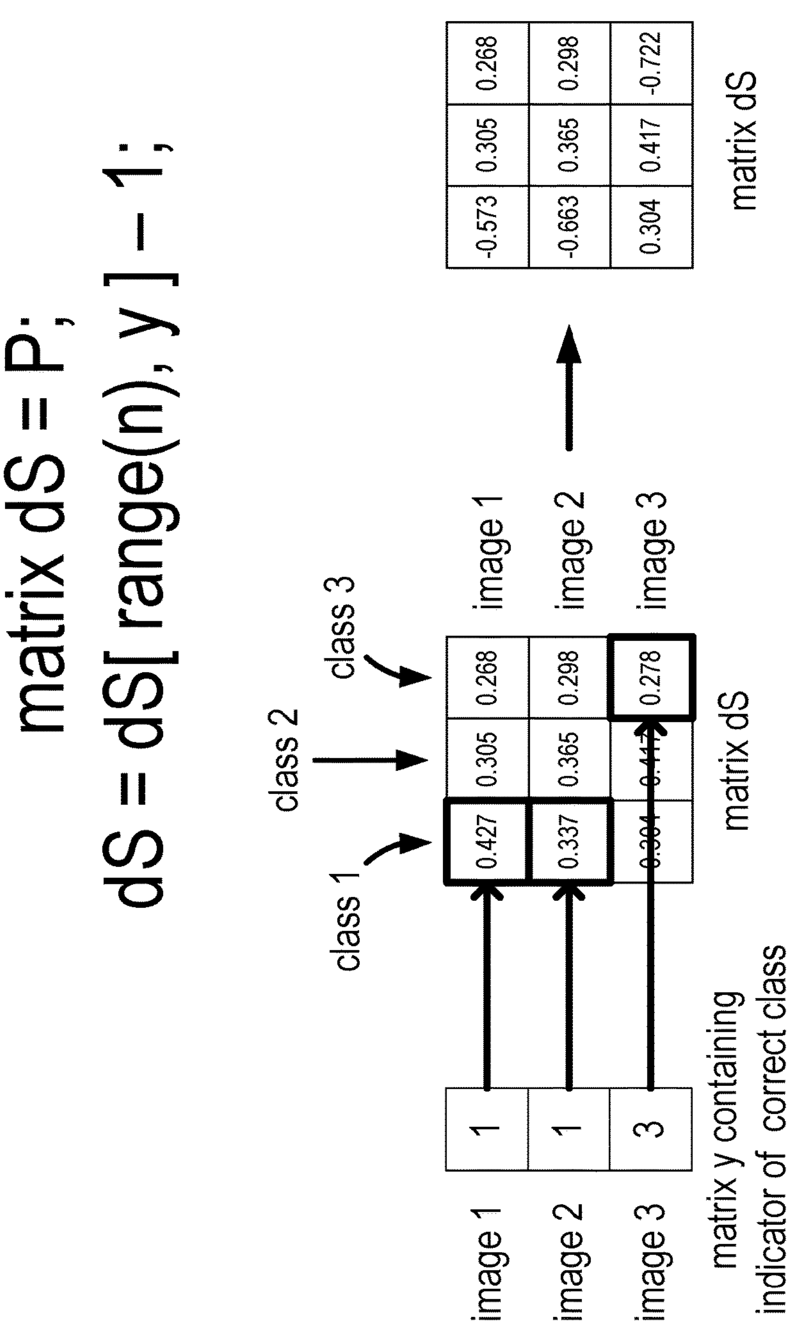
FIG. 82 illustrates analytically calculated gradient formulas $\delta L_i/\delta s_{i,k}=p_{i,k}-1$ $\delta L_i/\delta s_{i,k}=p_{i,k}$ utilized to calculate a gradient on the scores by generating a matrix dS based on the matrix P from FIG. 69B.
Figure 84:
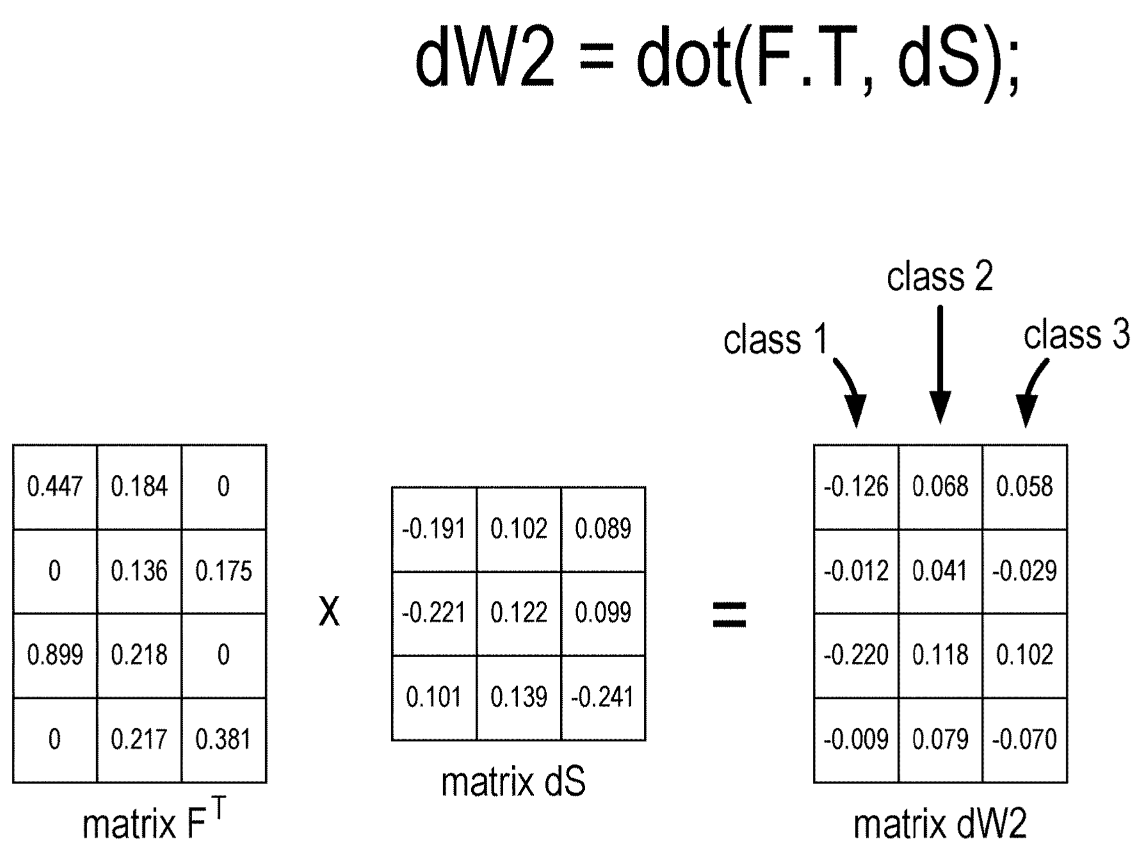
FIG. 84 illustrates matrix dW2 calculated as the dot product of the matrix $F^T$ and the matrix dS from FIG. 83.
Figure 85:
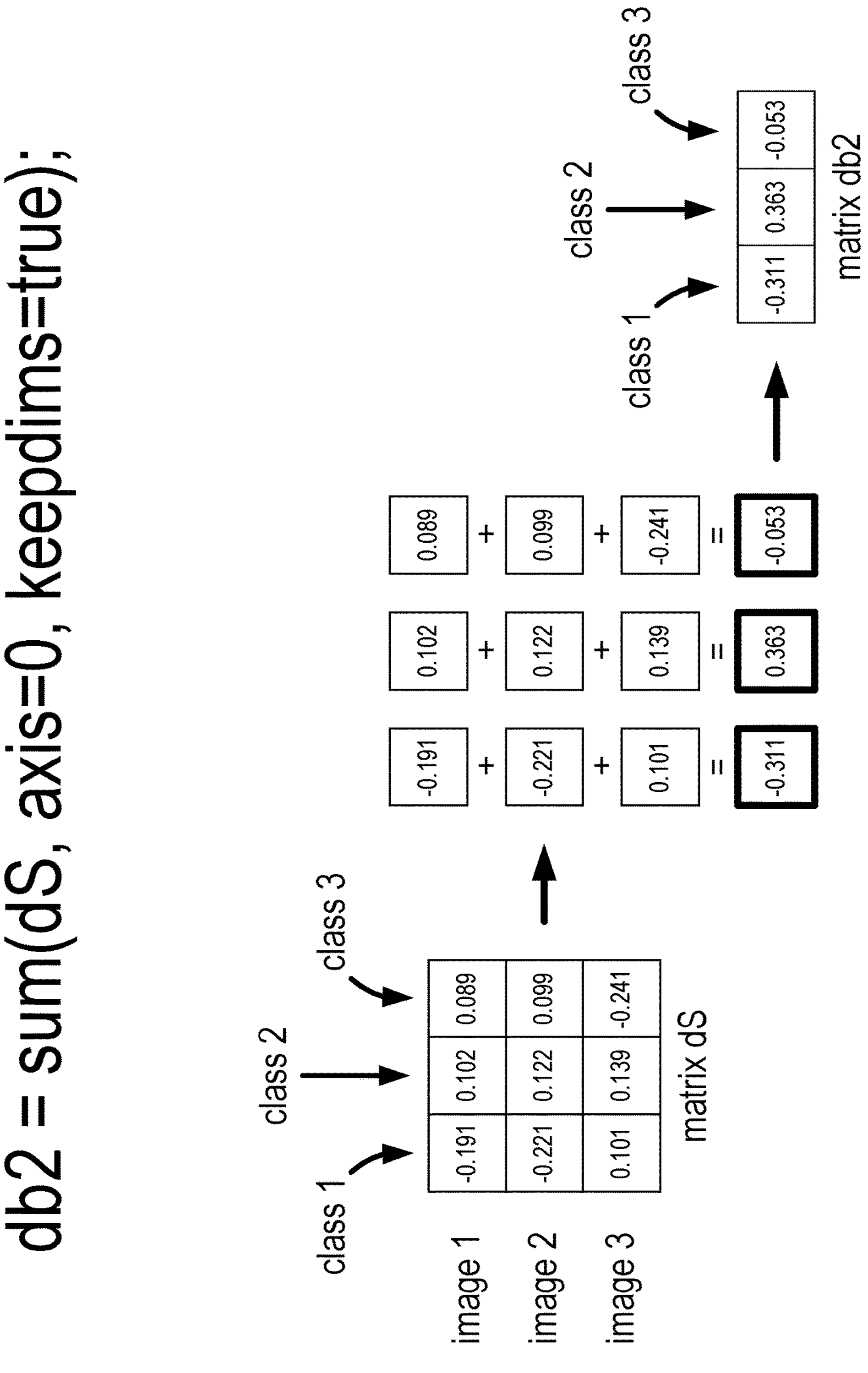
FIG. 85 illustrates the columns of the calculated matrix dS from FIG. 83 summed to produce a matrix db2.
Figure 87:
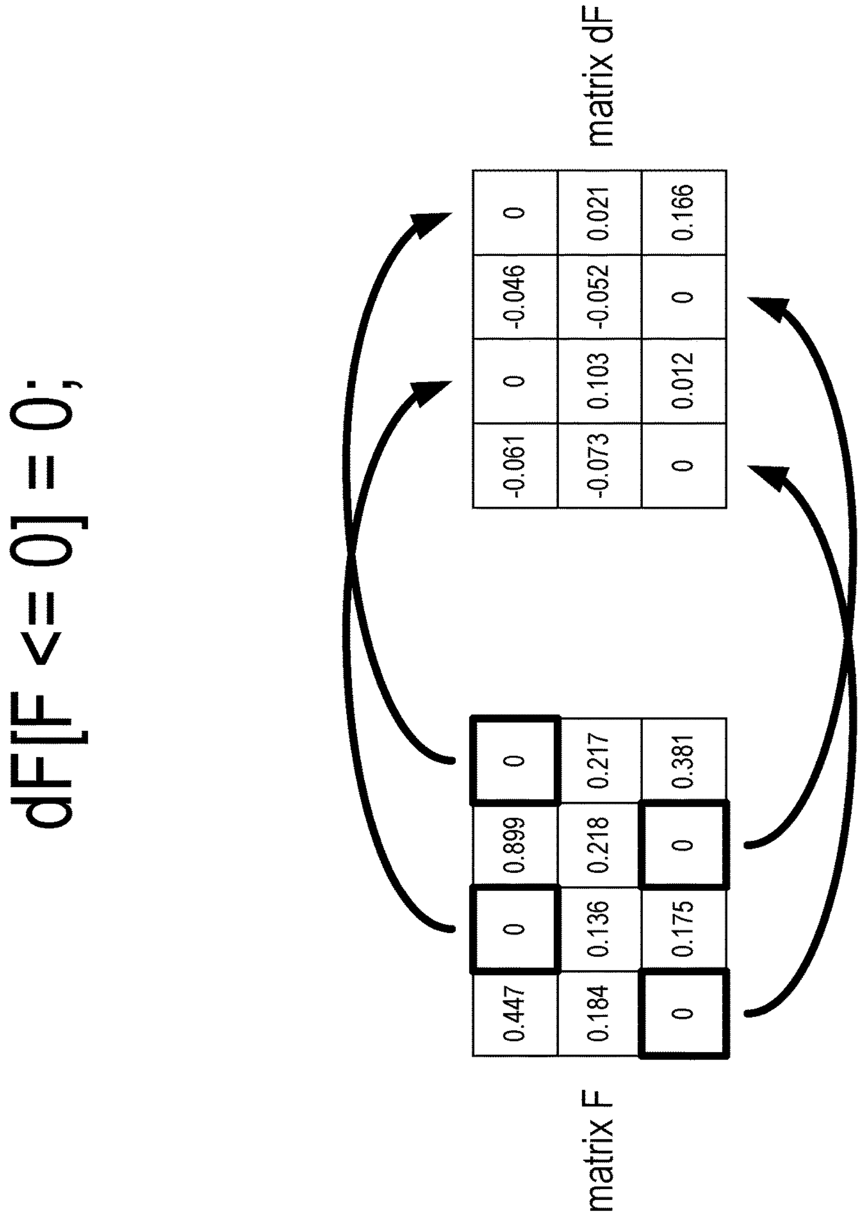
FIG. 87 illustrates the nonlinearity of the activation function backpropagated by replacing, for any entry in matrix F that is less than or equal to zero, the corresponding entry in dF with a zero.
Figure 89:
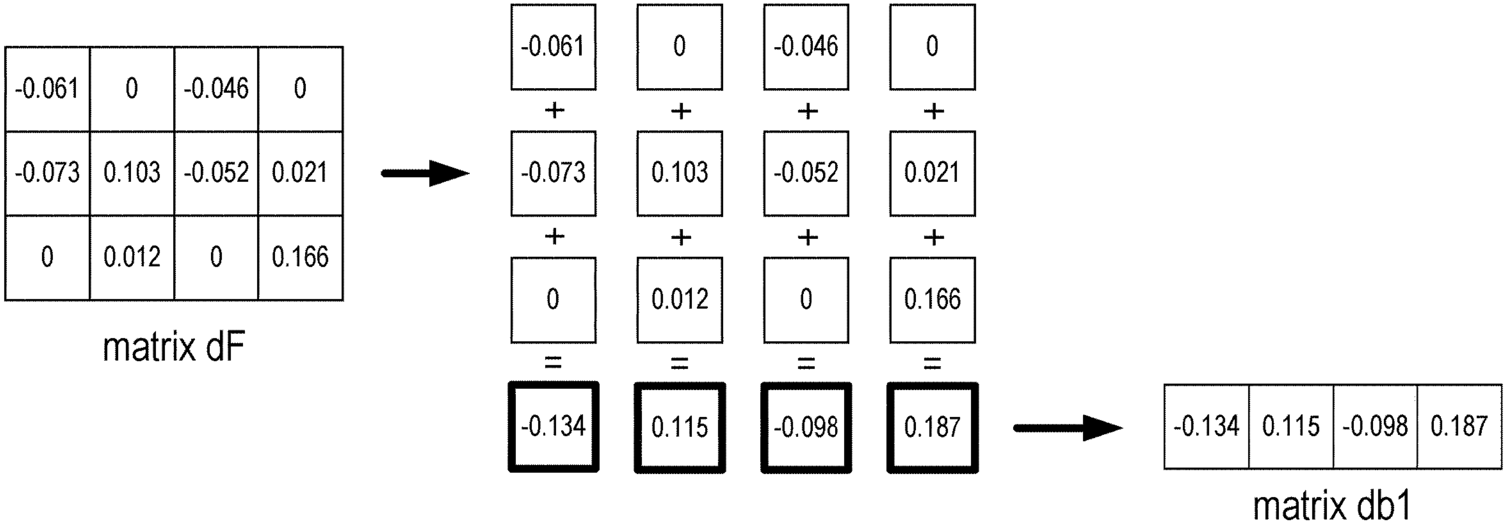
FIG. 89 illustrates columns of the calculated matrix dF summed to produce a matrix db1.
Figure 90:
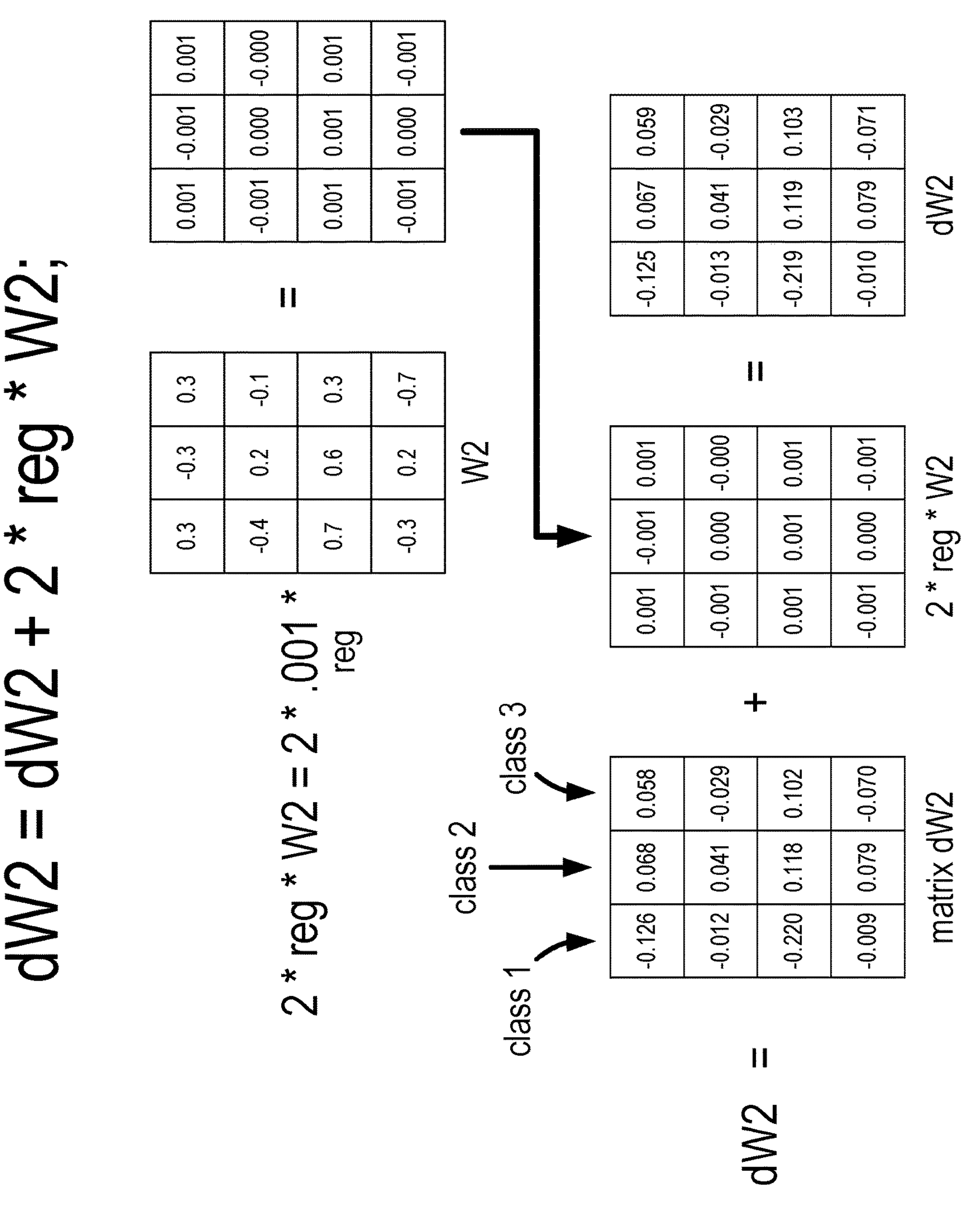
FIG. 90 illustrates addition of the contribution from regularization to the matrix dW2.
Figure 91:
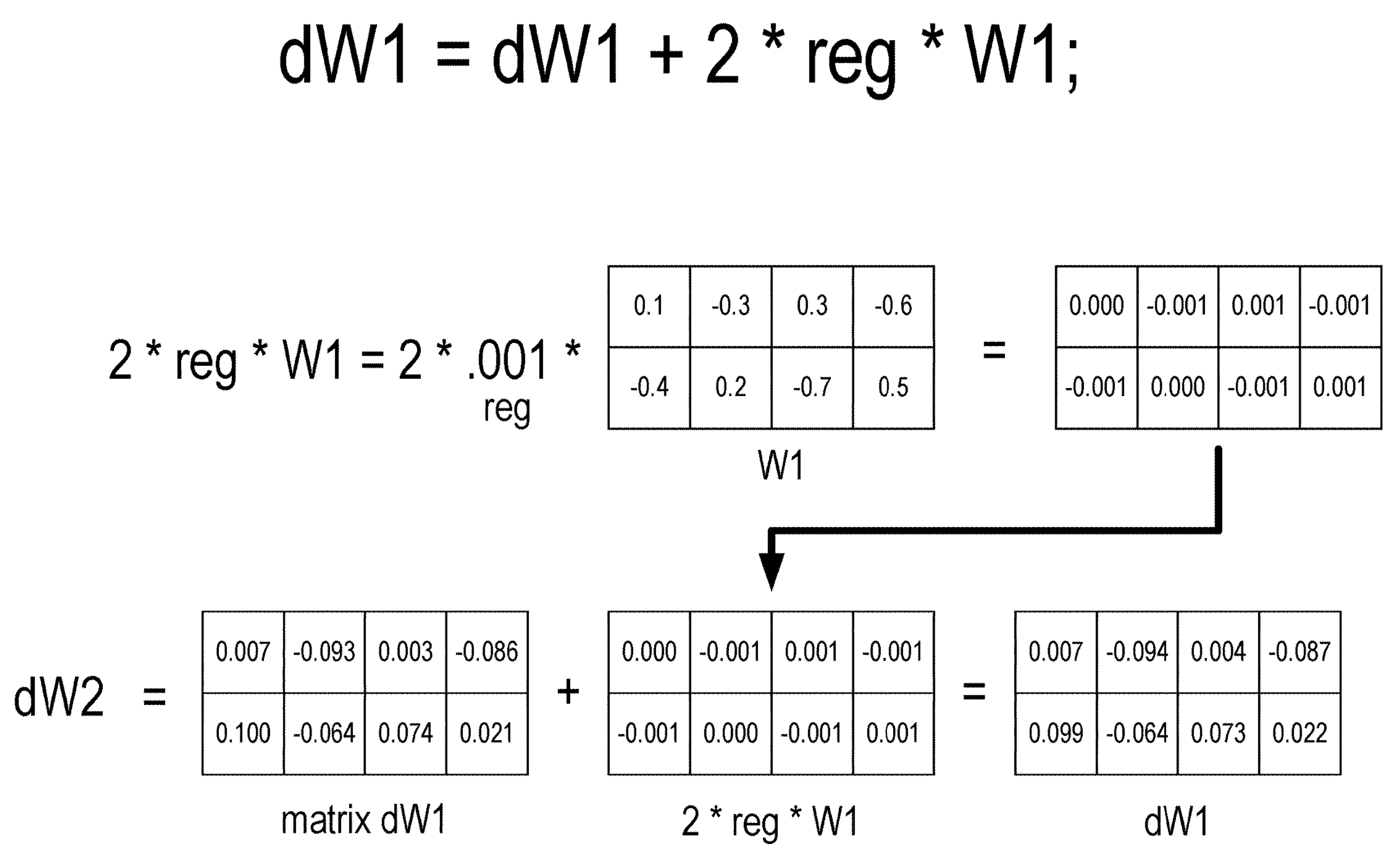
FIG. 91 illustrates addition of the contribution from regularization to the matrix dW.
Figure 93:
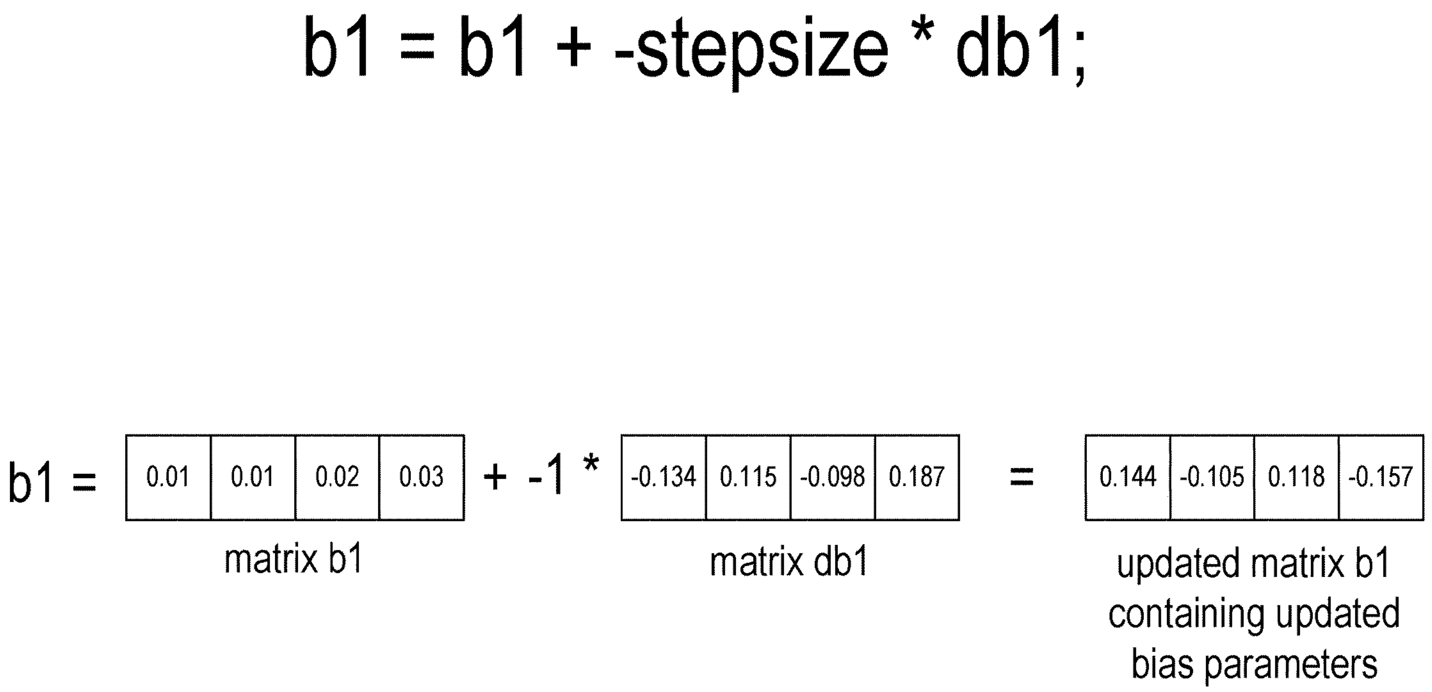
FIG. 93 illustrates use of the matrix db1 to update the matrix b1.
Figure 95:
FIG. 95 illustrates use of the matrix db2 to update the matrix b2.
Figure 96:
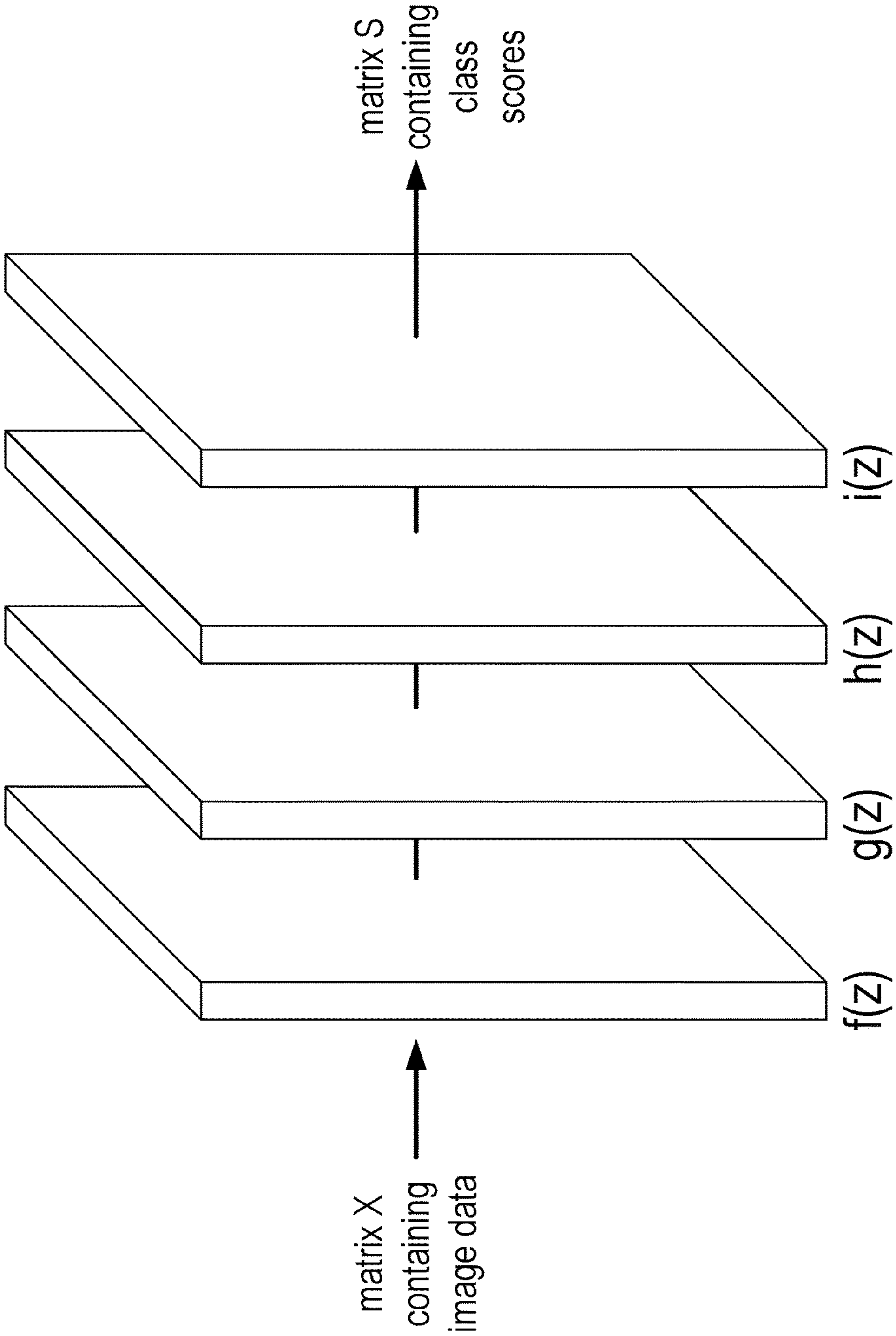
FIG. 96 illustrates an exemplary neural network containing a plurality of layers with each layer utilizing or implementing a function such as f(z), g(z), etc.
Figure 97B:
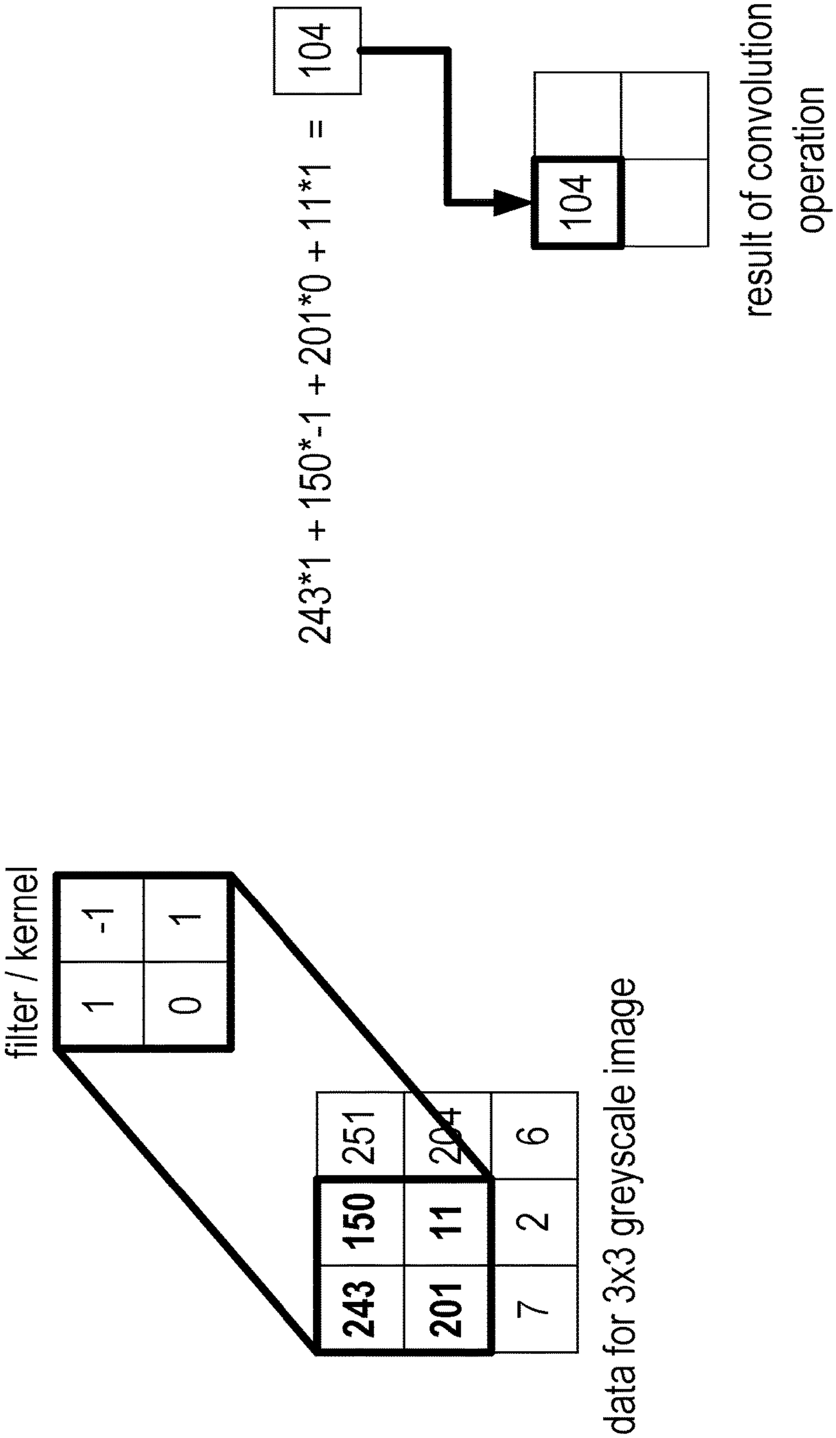
FIGS. 97B-97E illustrate an exemplary convolution operation for the exemplary matrix of FIG. 97A using the exemplary filter OF FIG. 97A.
Figure 97C:
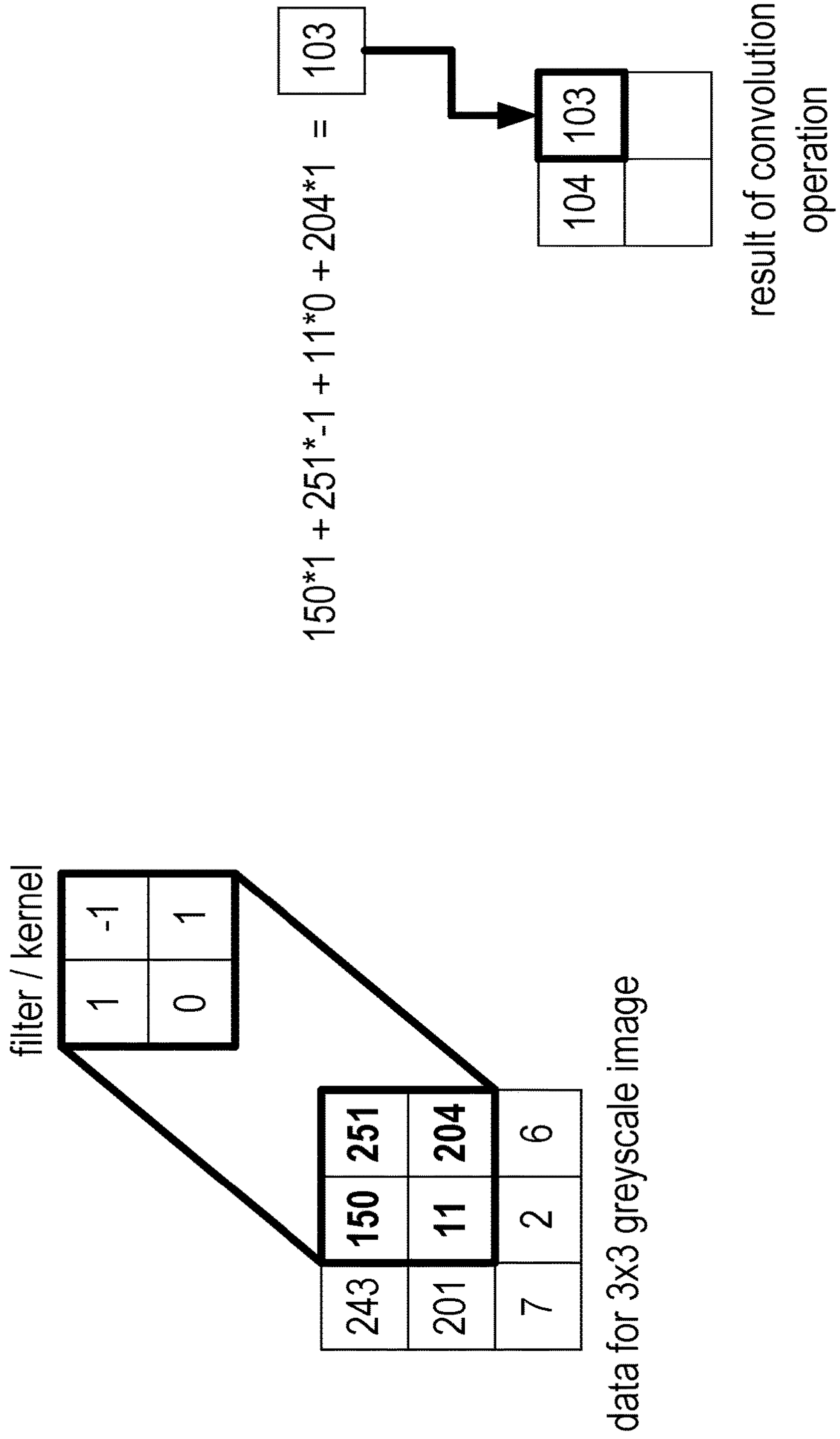
Figure 97D:
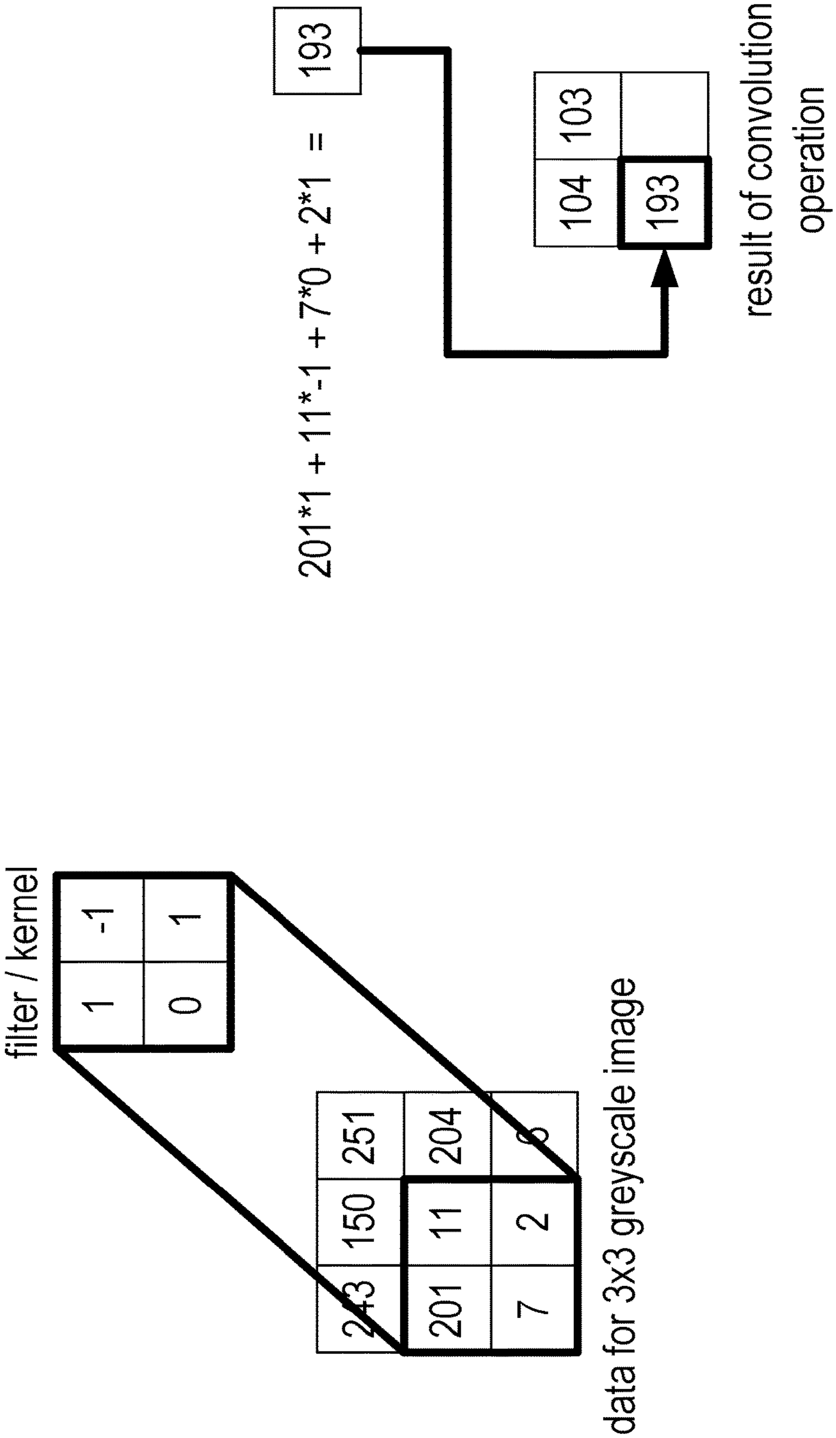
Figure 97E:
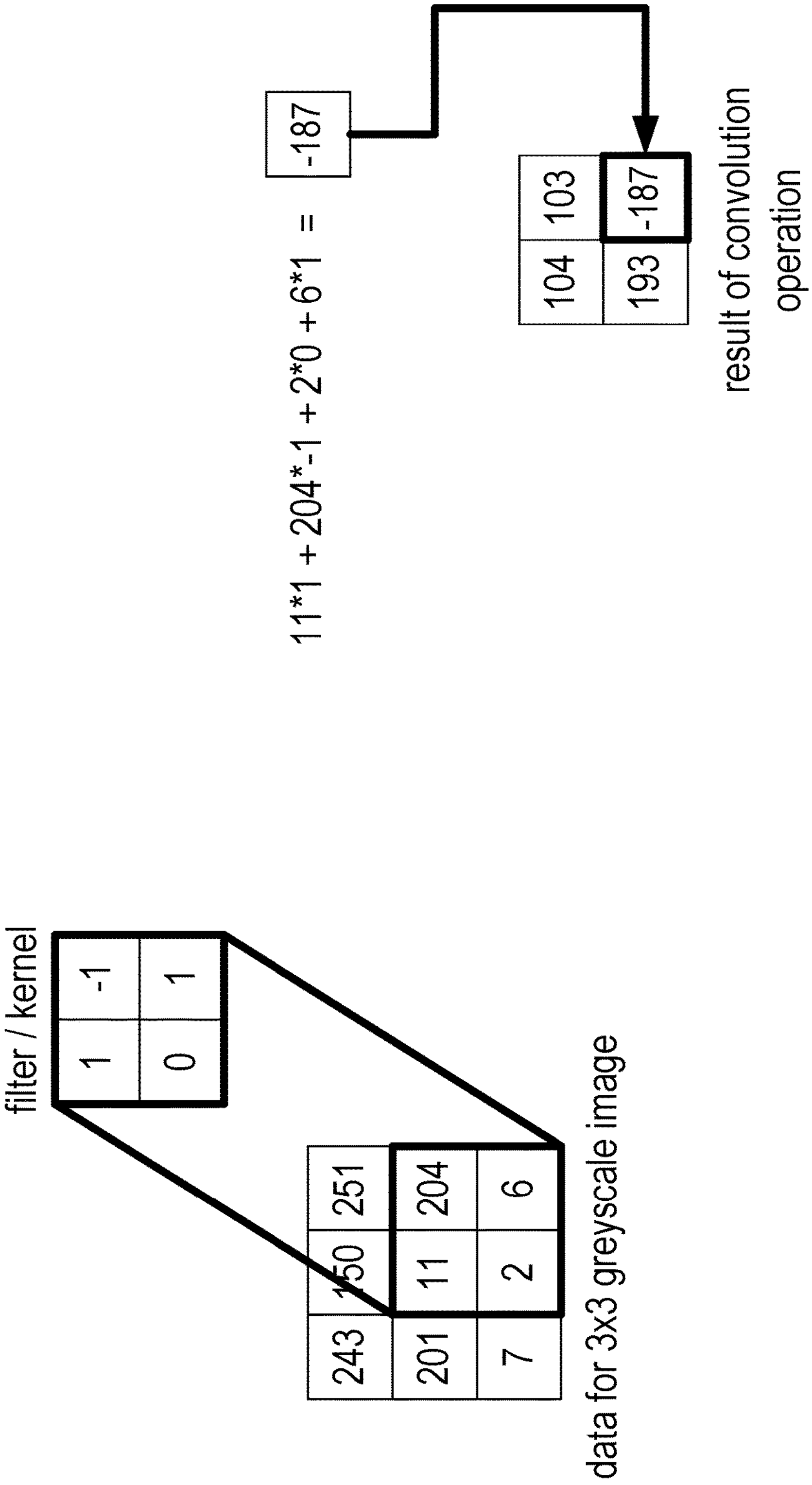
Figure 97F:
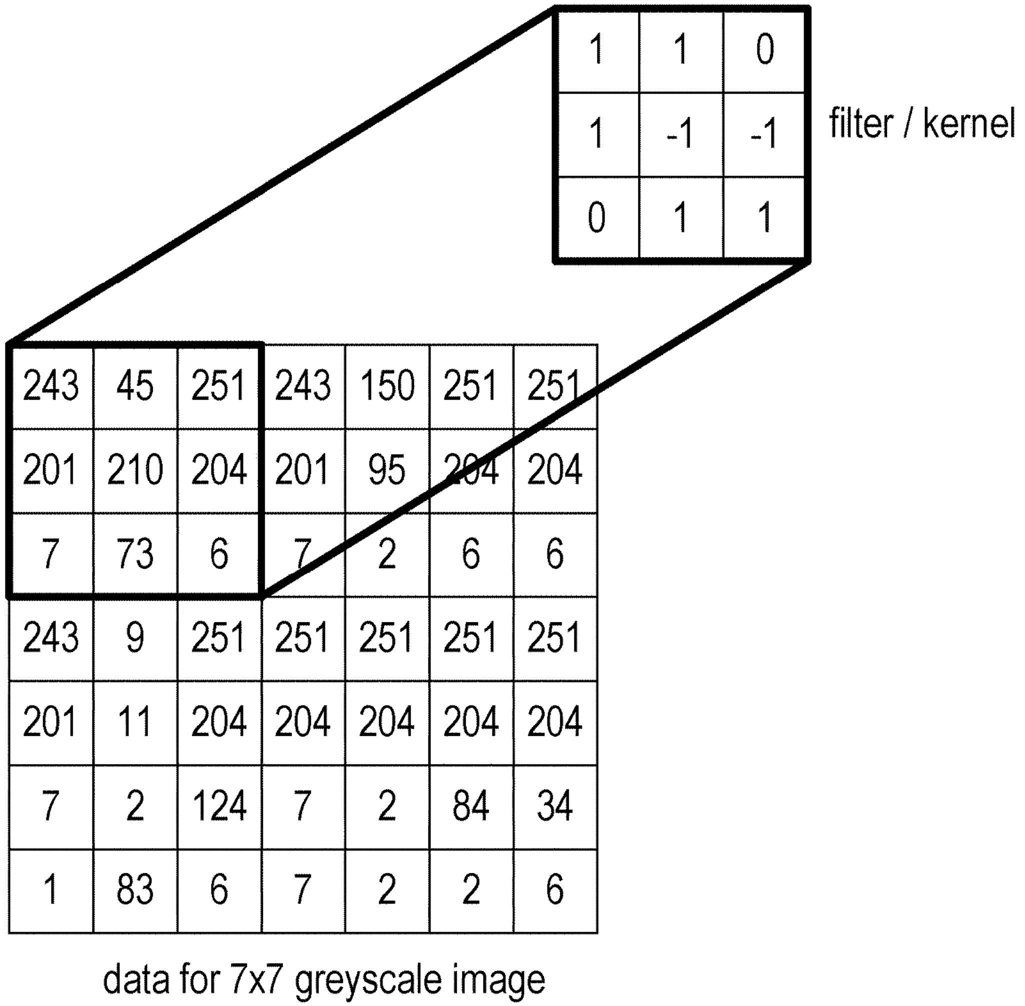
Figure 97G:
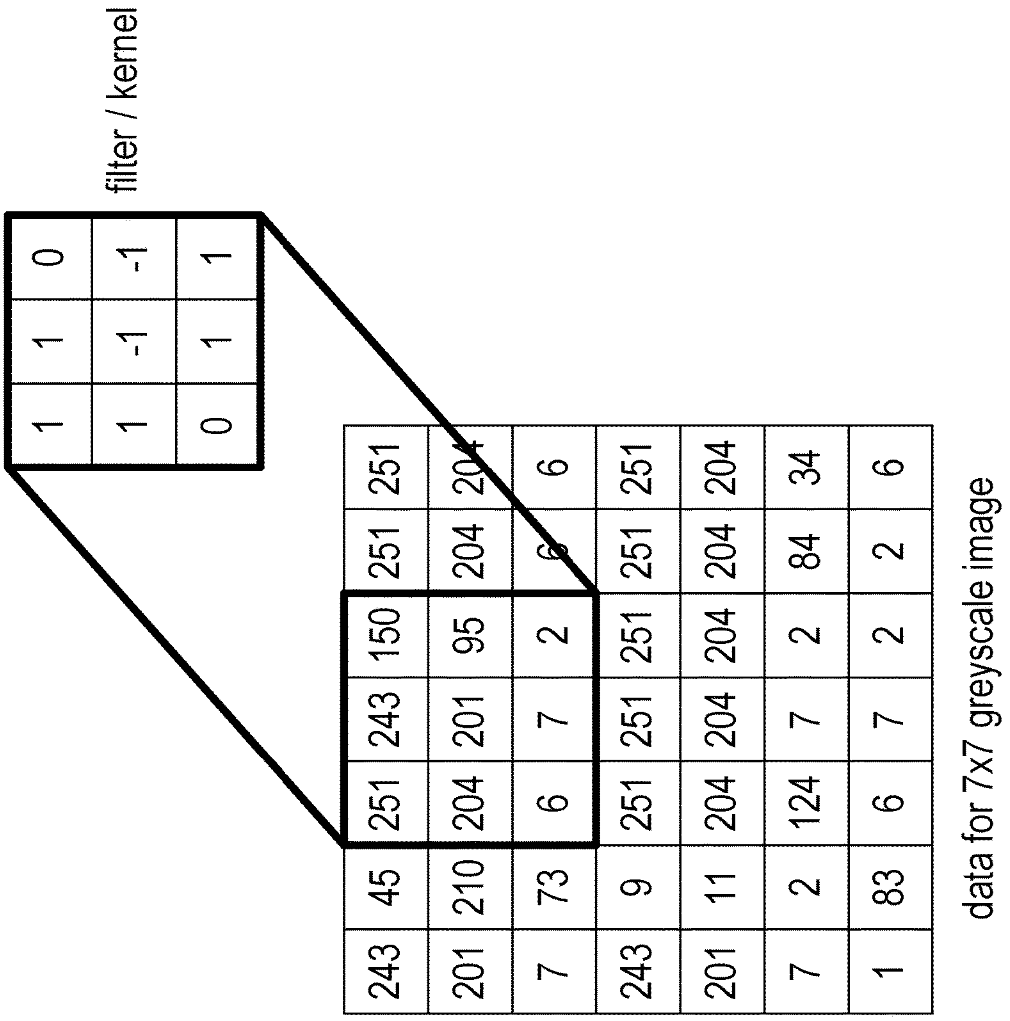
Figure 97H:
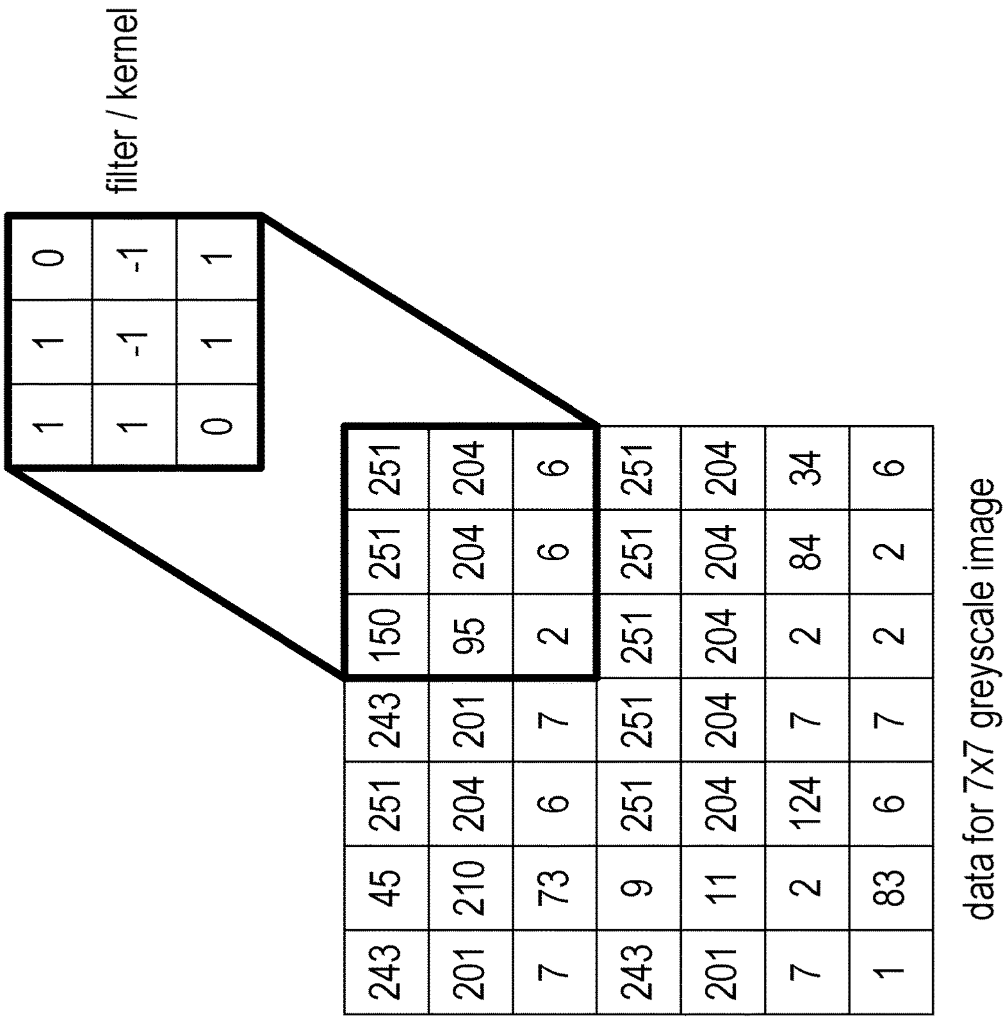
Figure 97I:
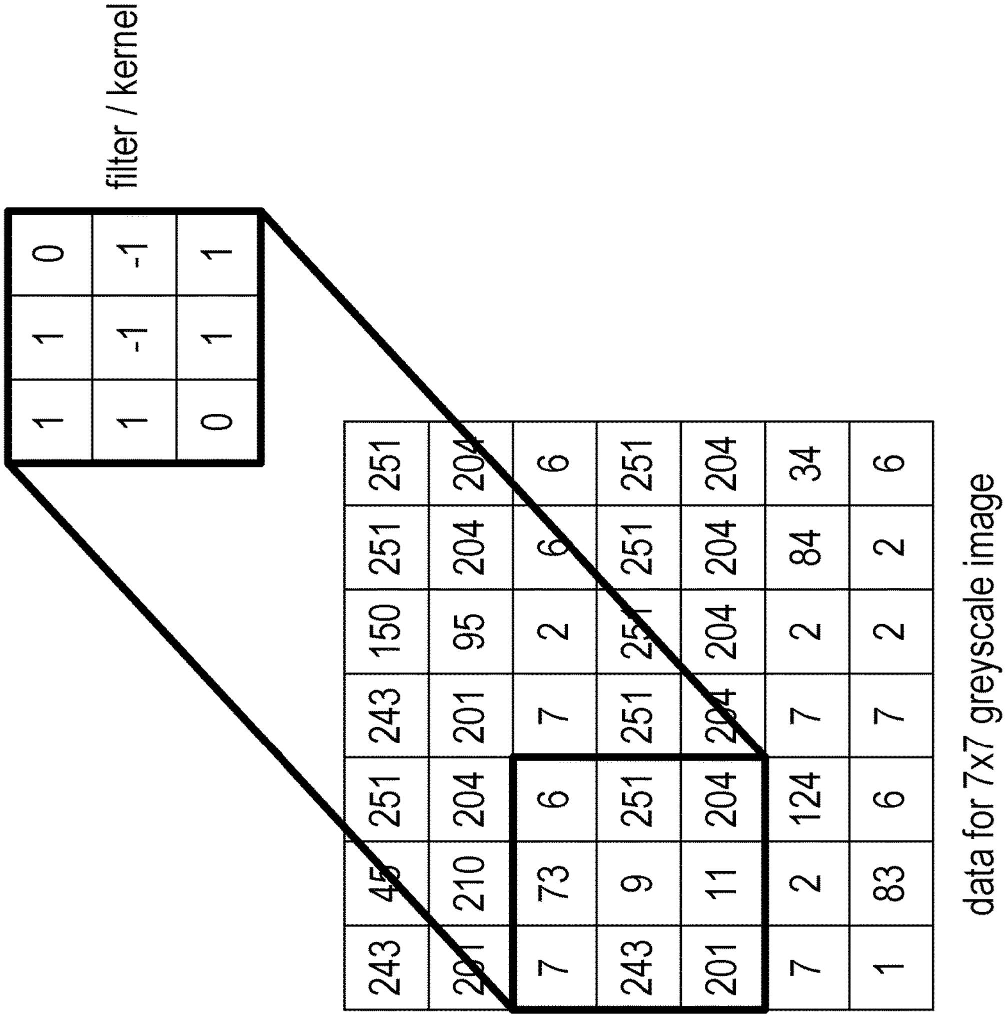
Figure 97J:
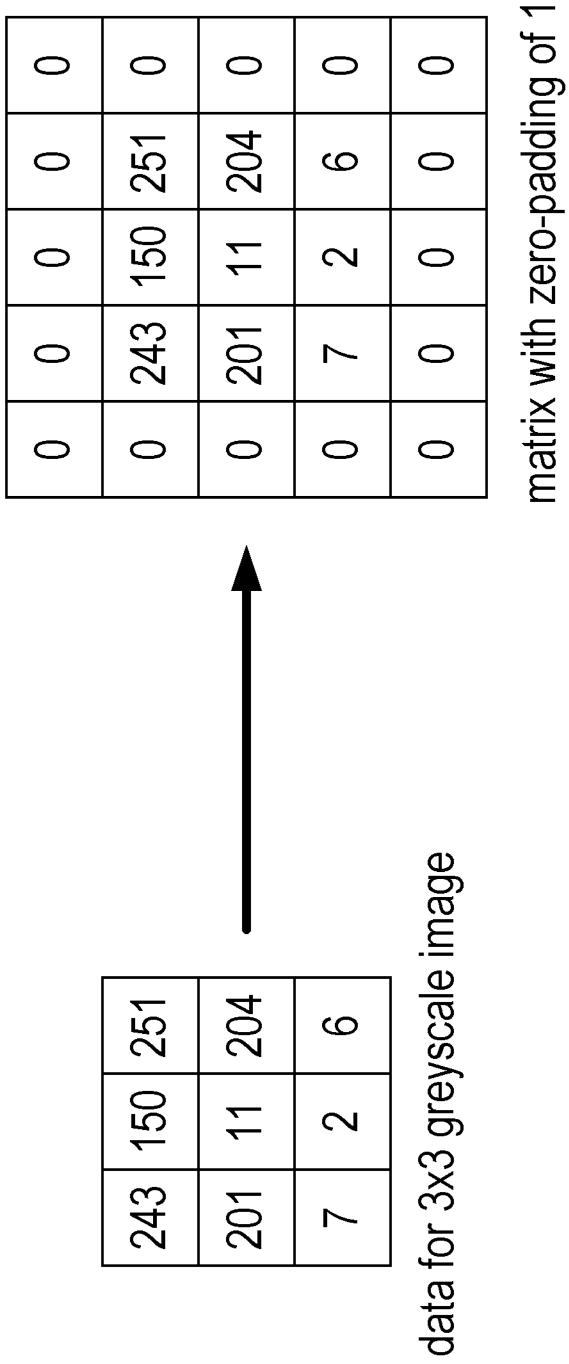
FIG. 97J illustrates the use of zero-padding of one to convert a 3×3 matrix to a 5×5 matrix.
Figure 97K:
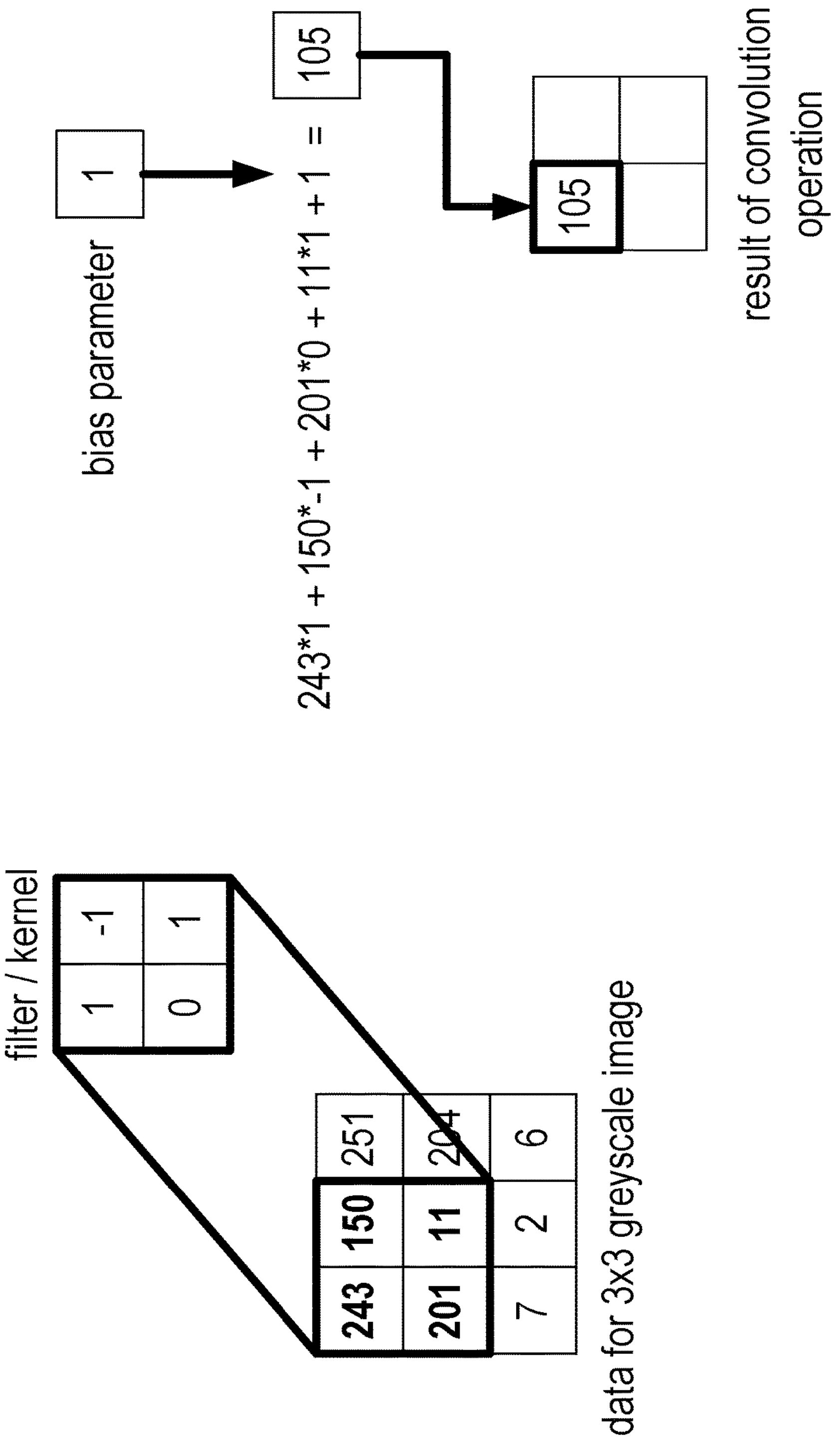
FIGS. 97K-97L illustrate the use of a bias parameter.
Figure 97L:
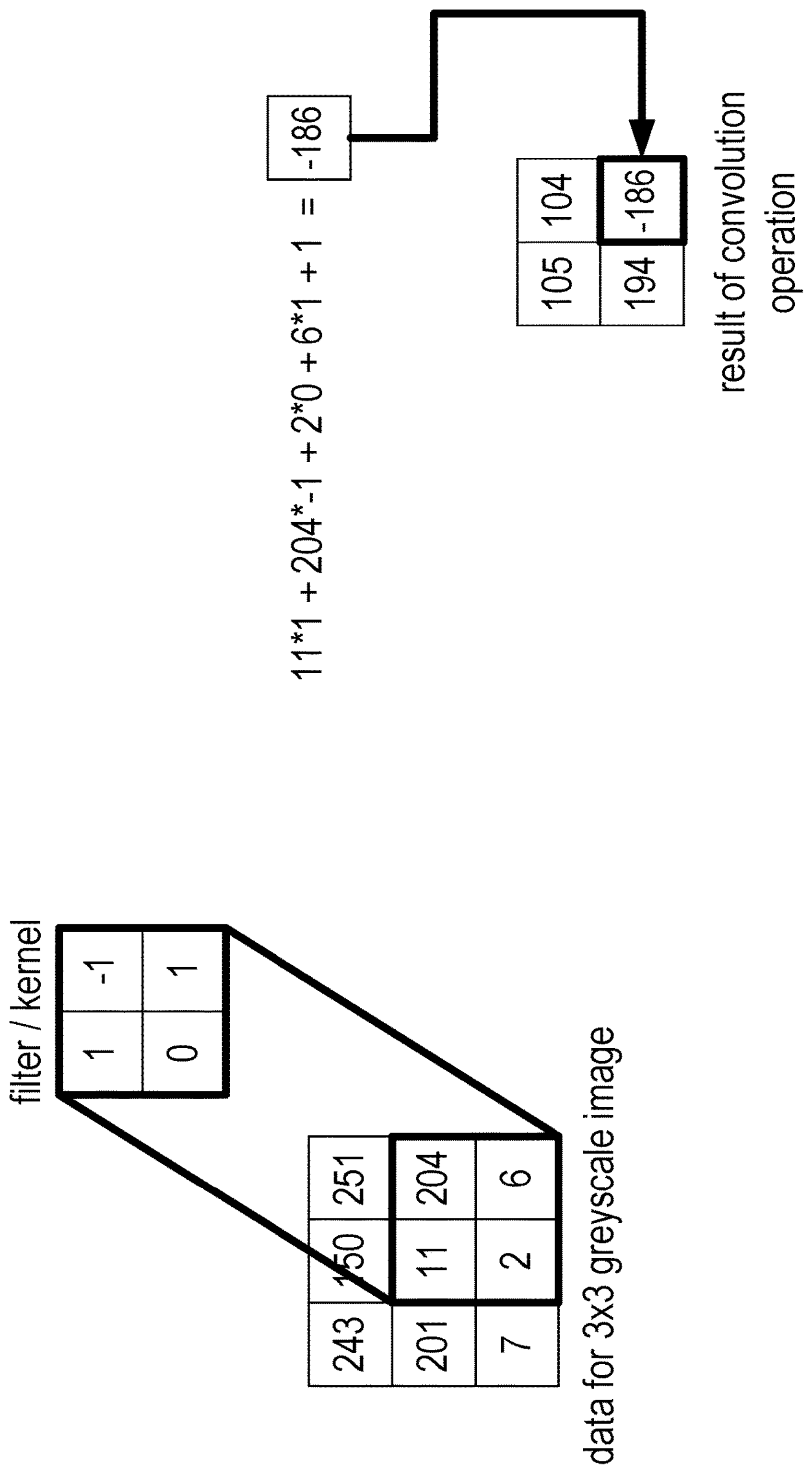
Figure 97M:
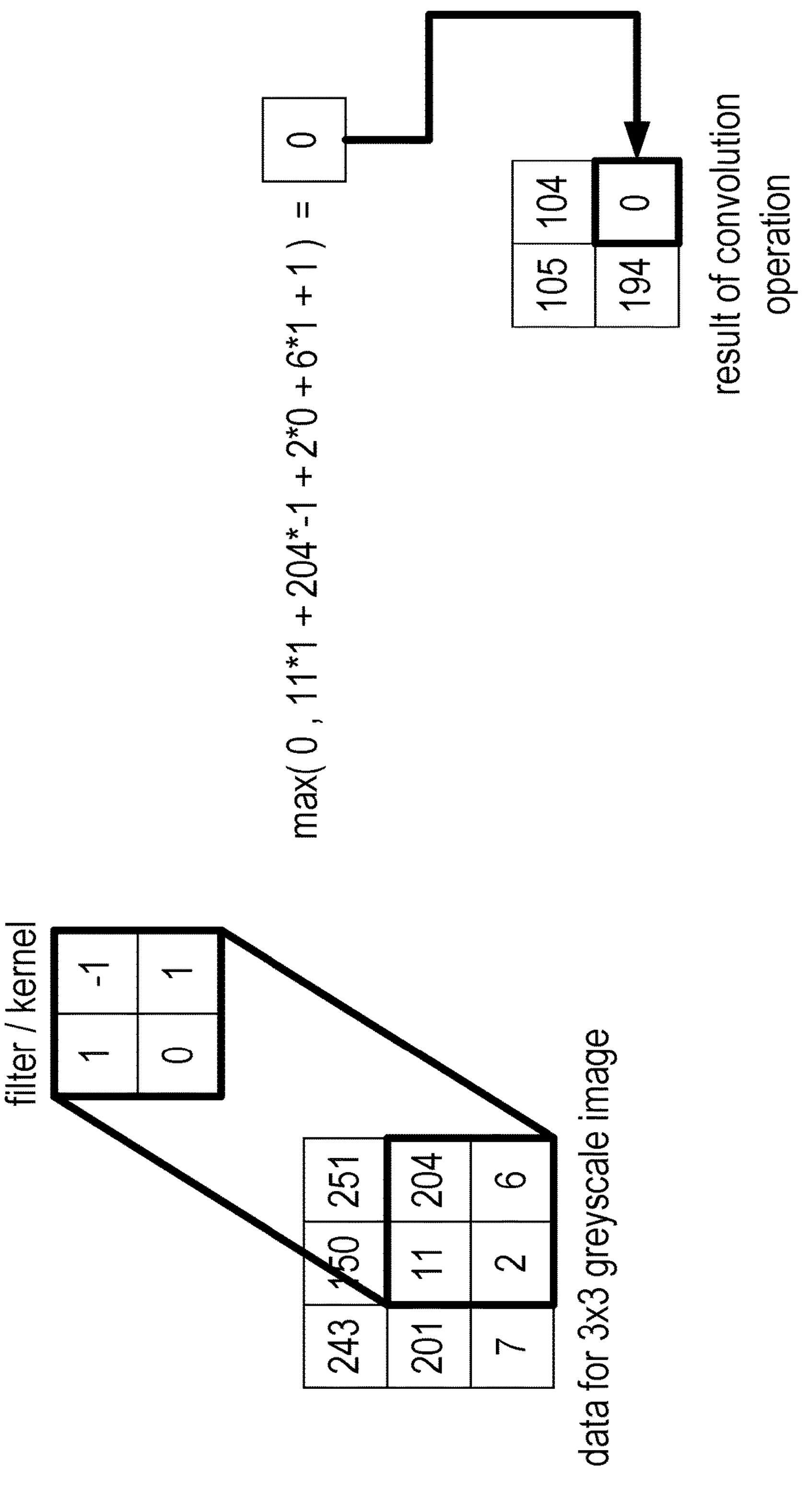
FIG. 97M illustrates implementation of an activation function by a convolutional layer.
Figure 97N:
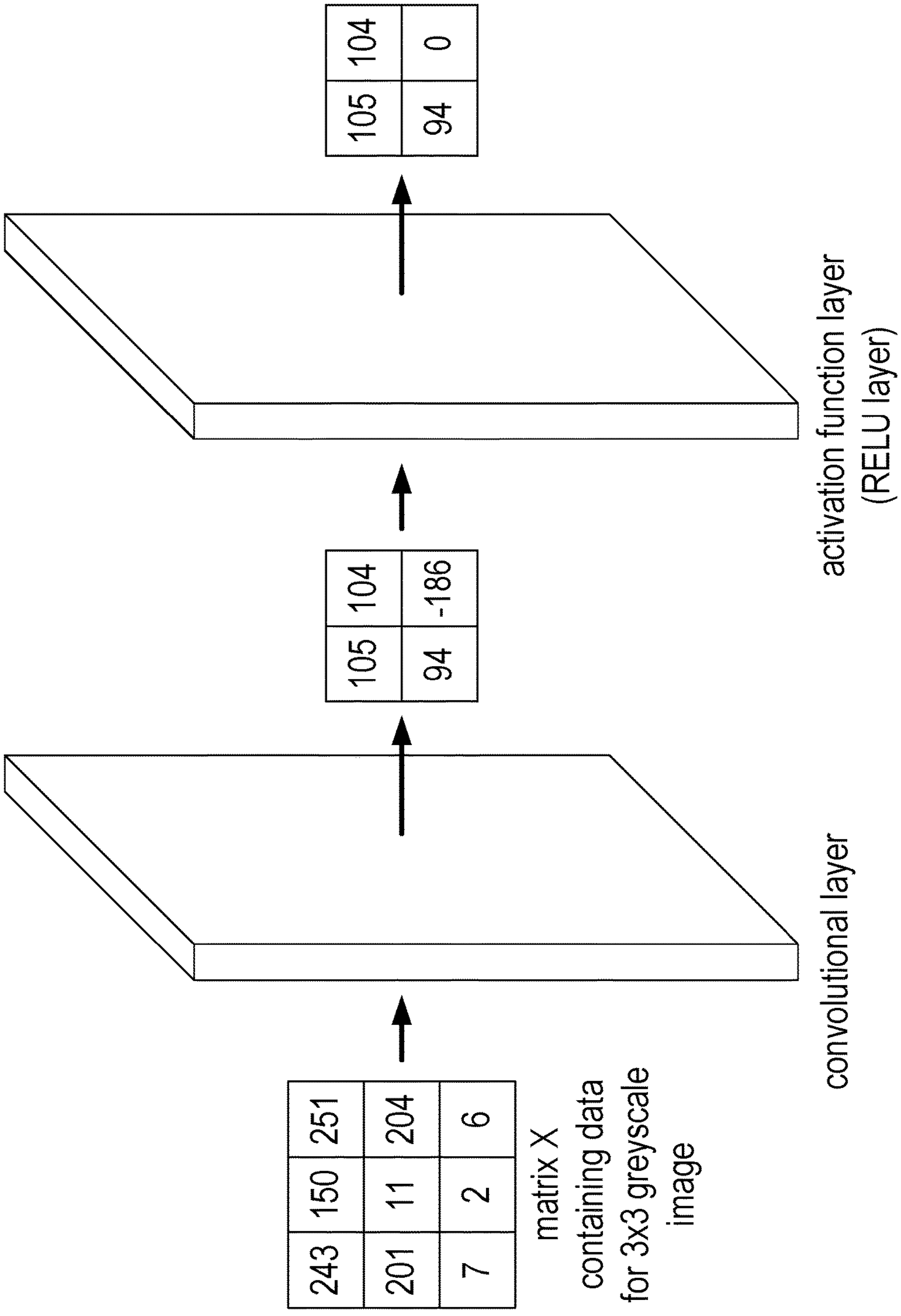
FIG. 97N illustrates use of an activation function layer.
Figure 98B:
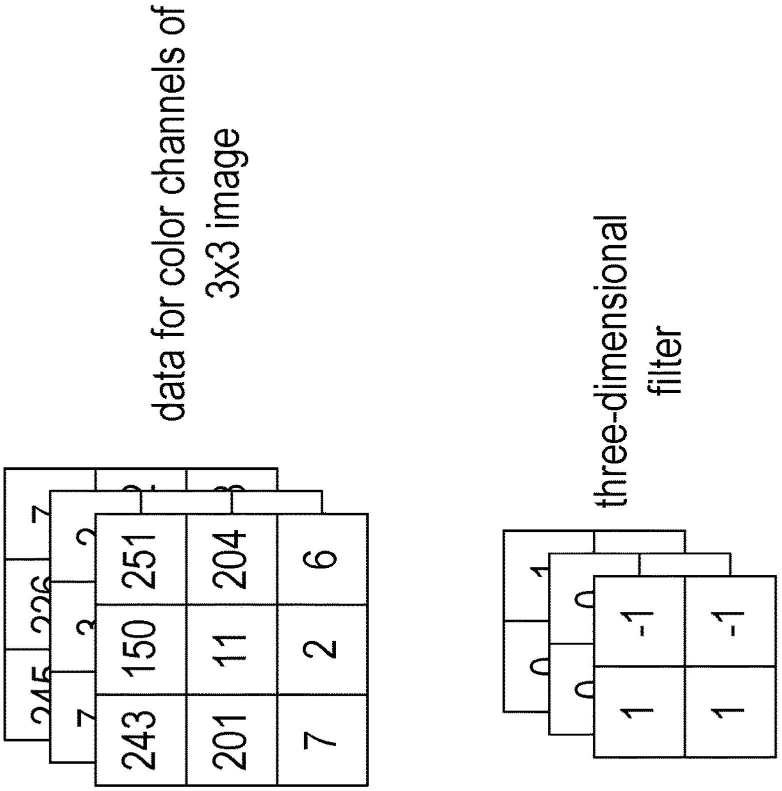
Figure 98C:
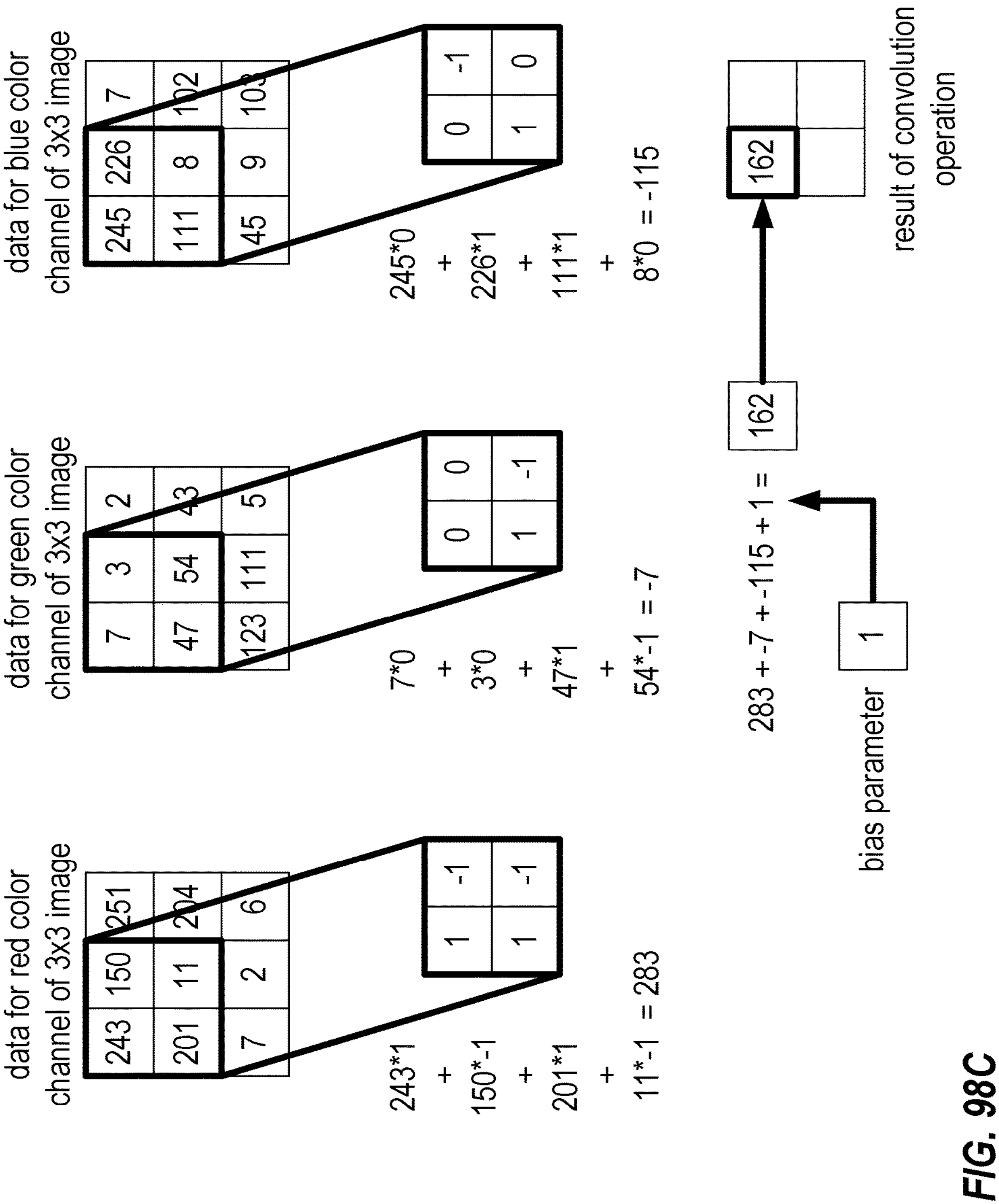
Figure 99A:
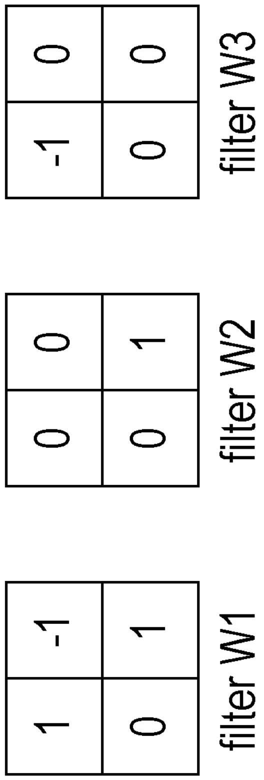
FIG. 99A illustrates three filters.
Figure 99B:
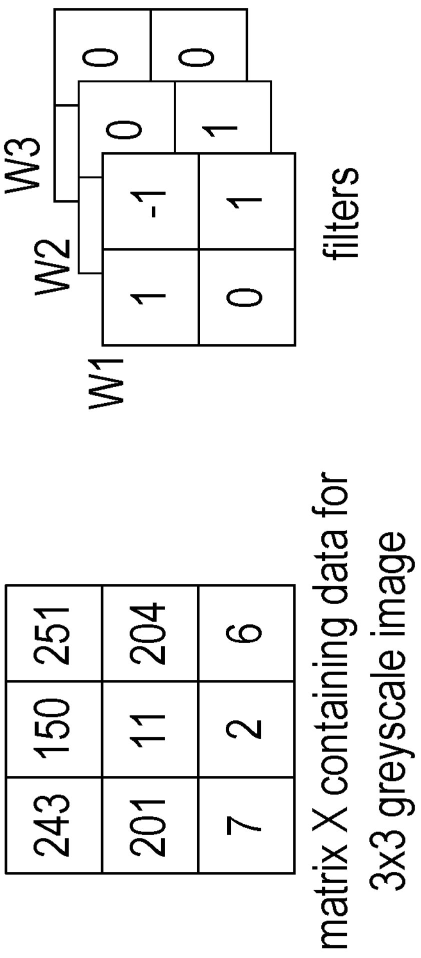
FIG. 99B illustrates a matrix X containing image data.
Figure 99C:
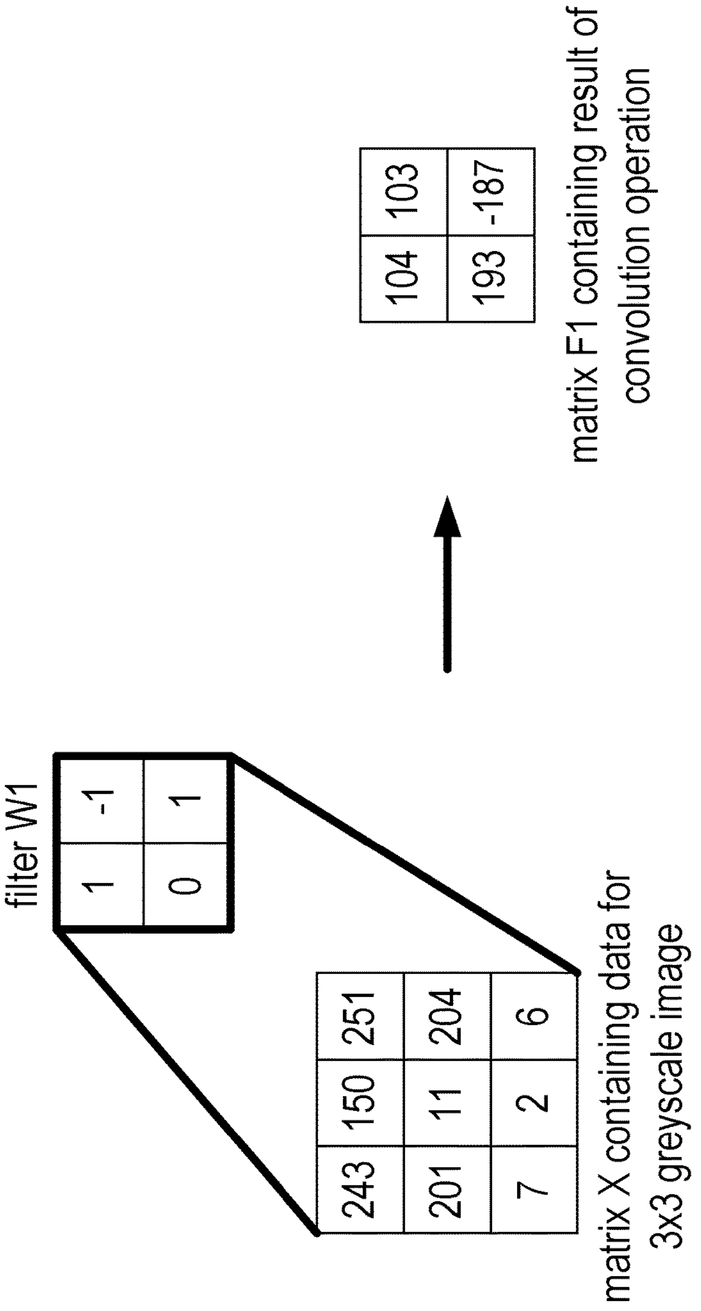
FIGS. 99C-99F illustrate the three-dimensional output resulting from application of the filters of FIG. 99A to the matrix of FIG. 99B.
Figure 99D:
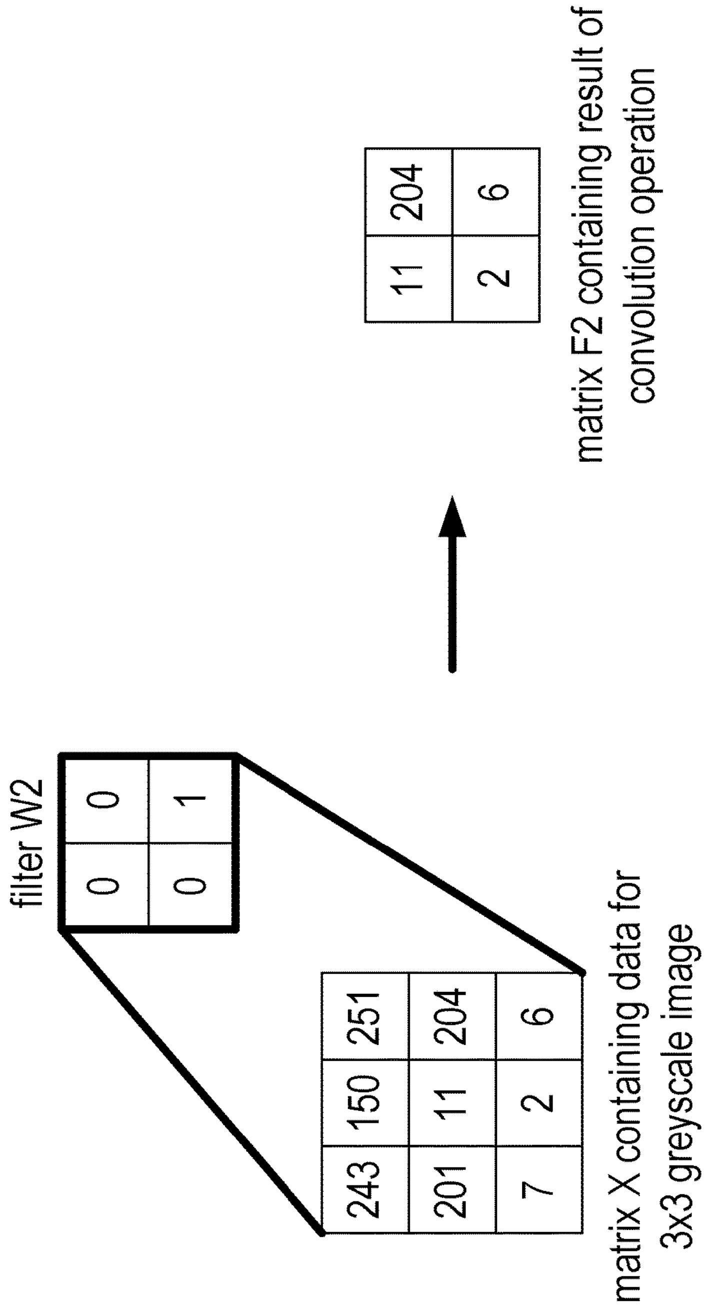
Figure 99E:
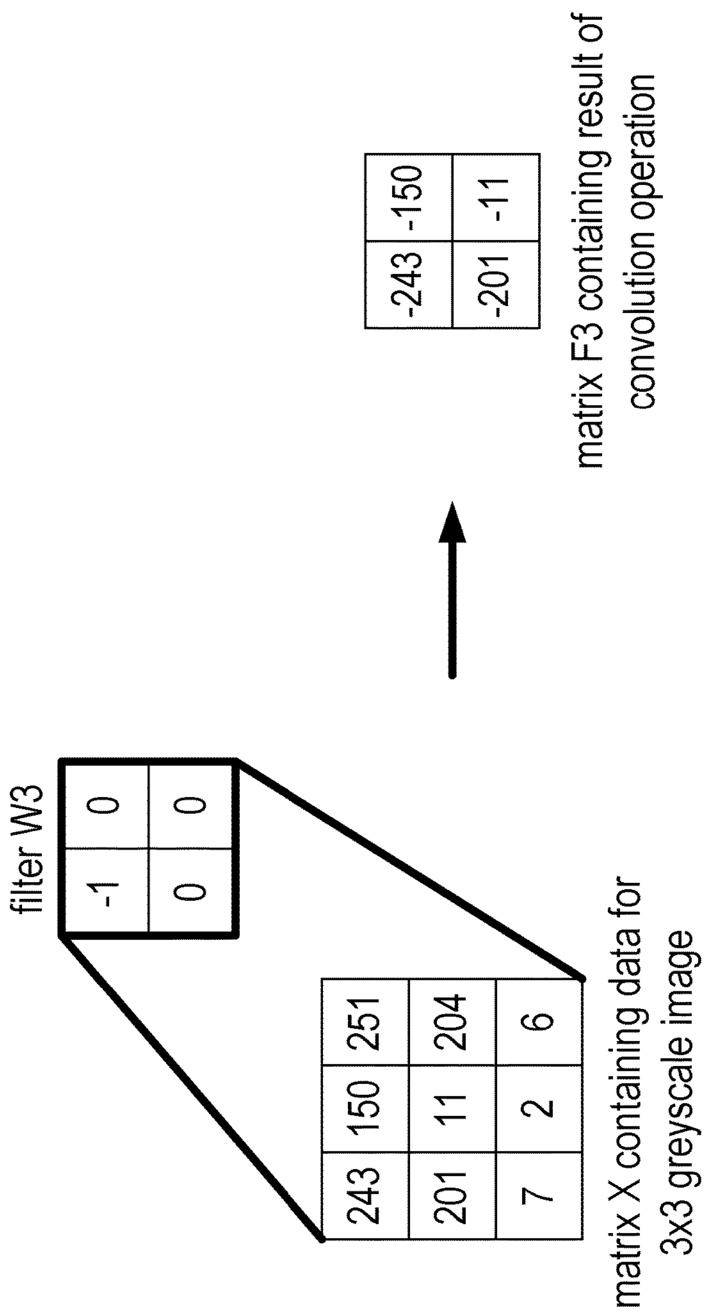
Figure 99F:
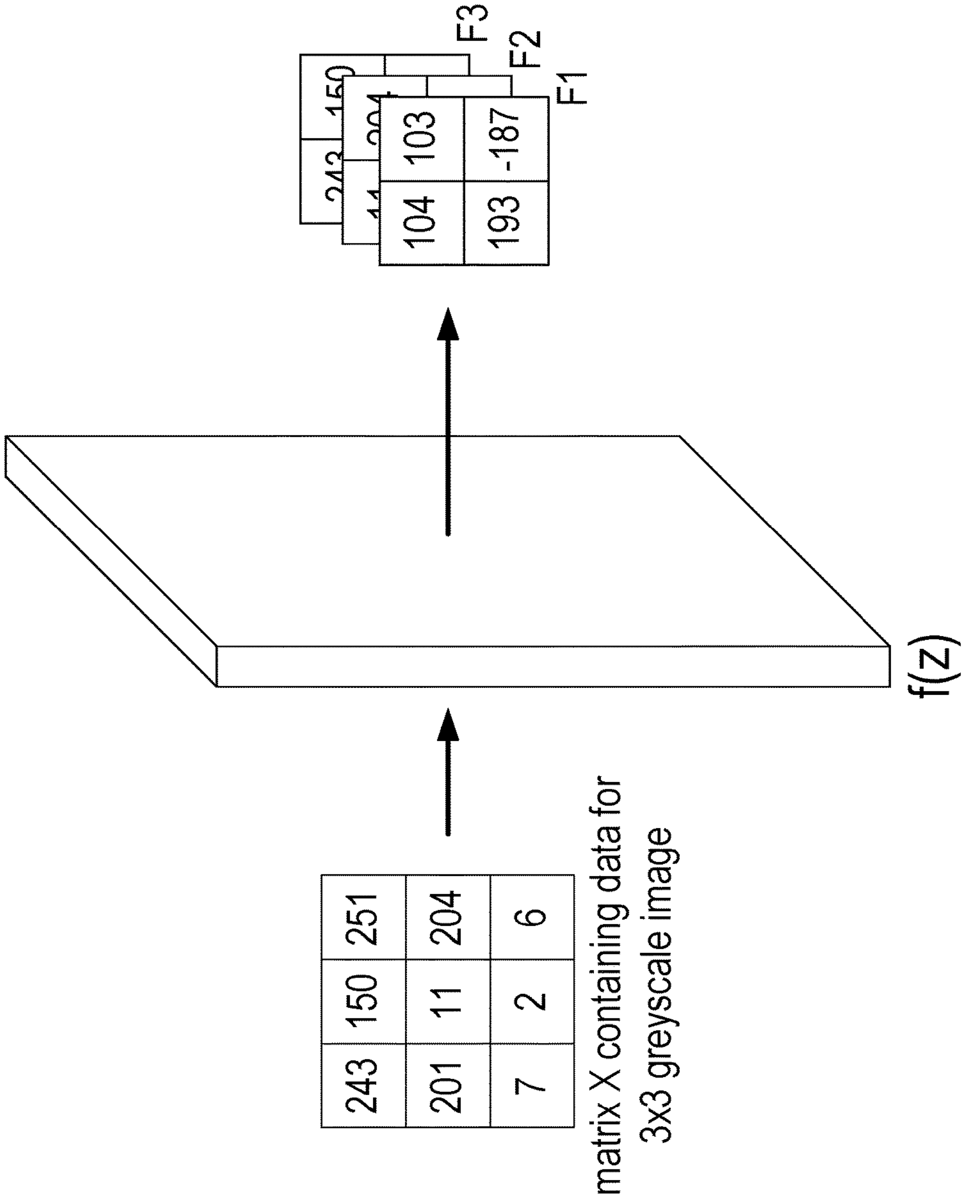
Figure 99H:
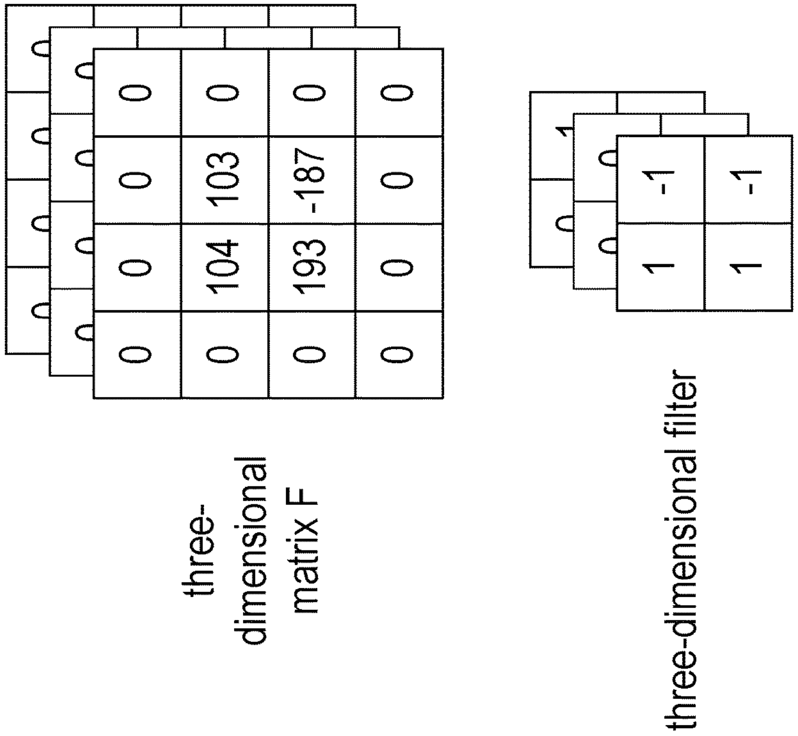
Figure 99I:
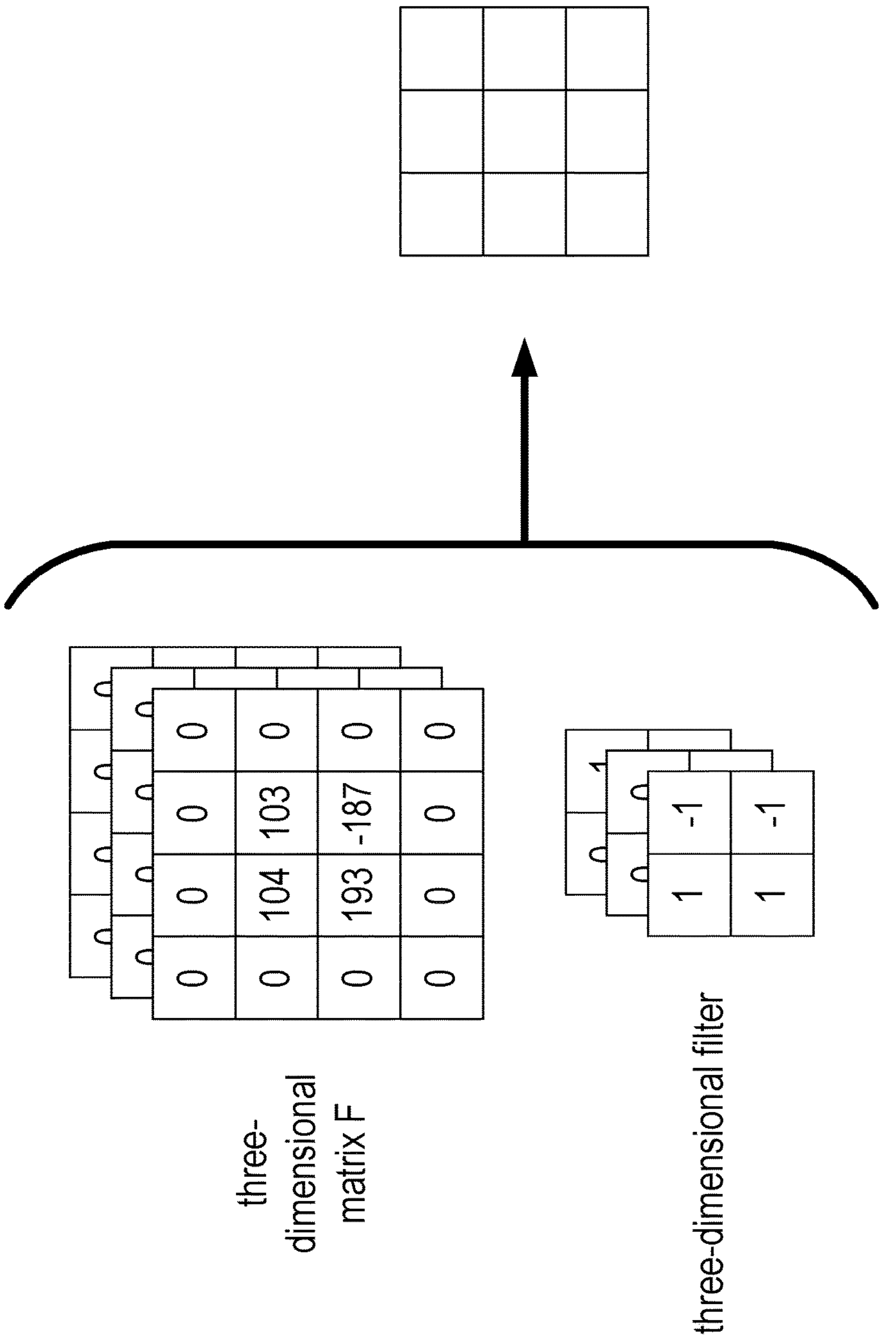
Figure 99J:
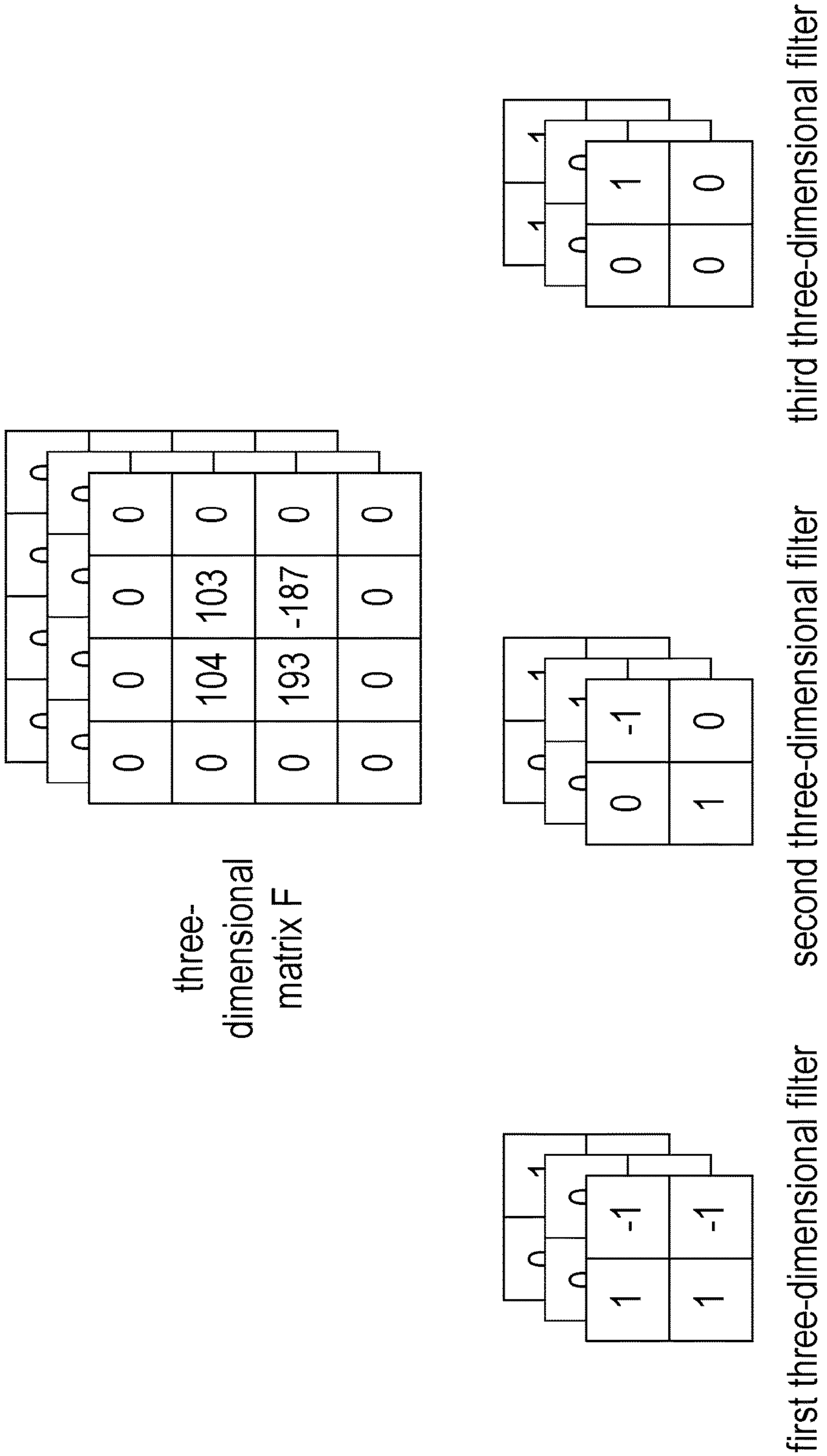
FIG. 99J illustrates additional three-dimensional filters to be applied at a convolutional layer.
Figure 99K:
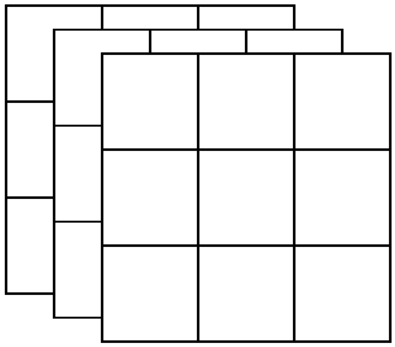
Figure 99L:
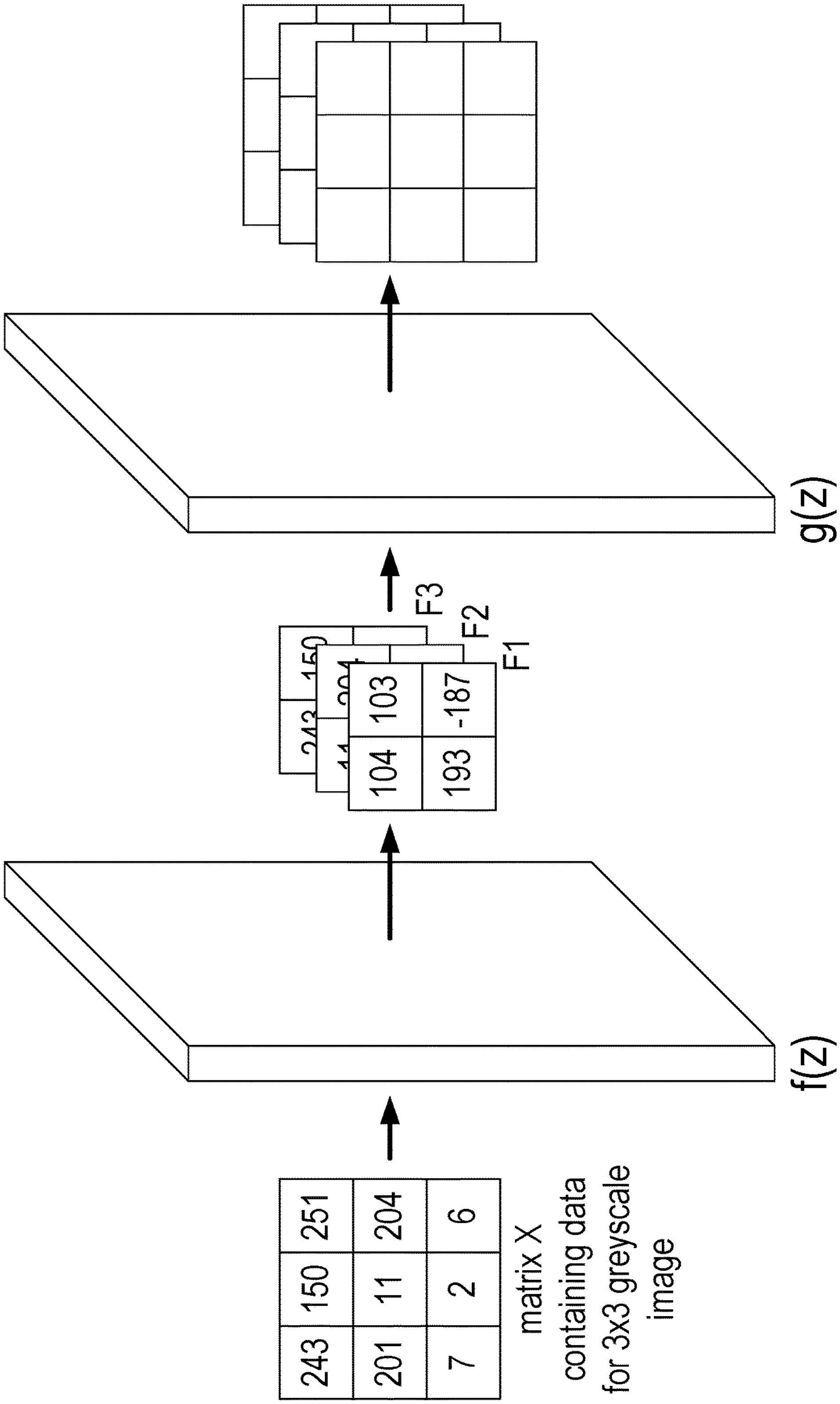
Figure 99M:
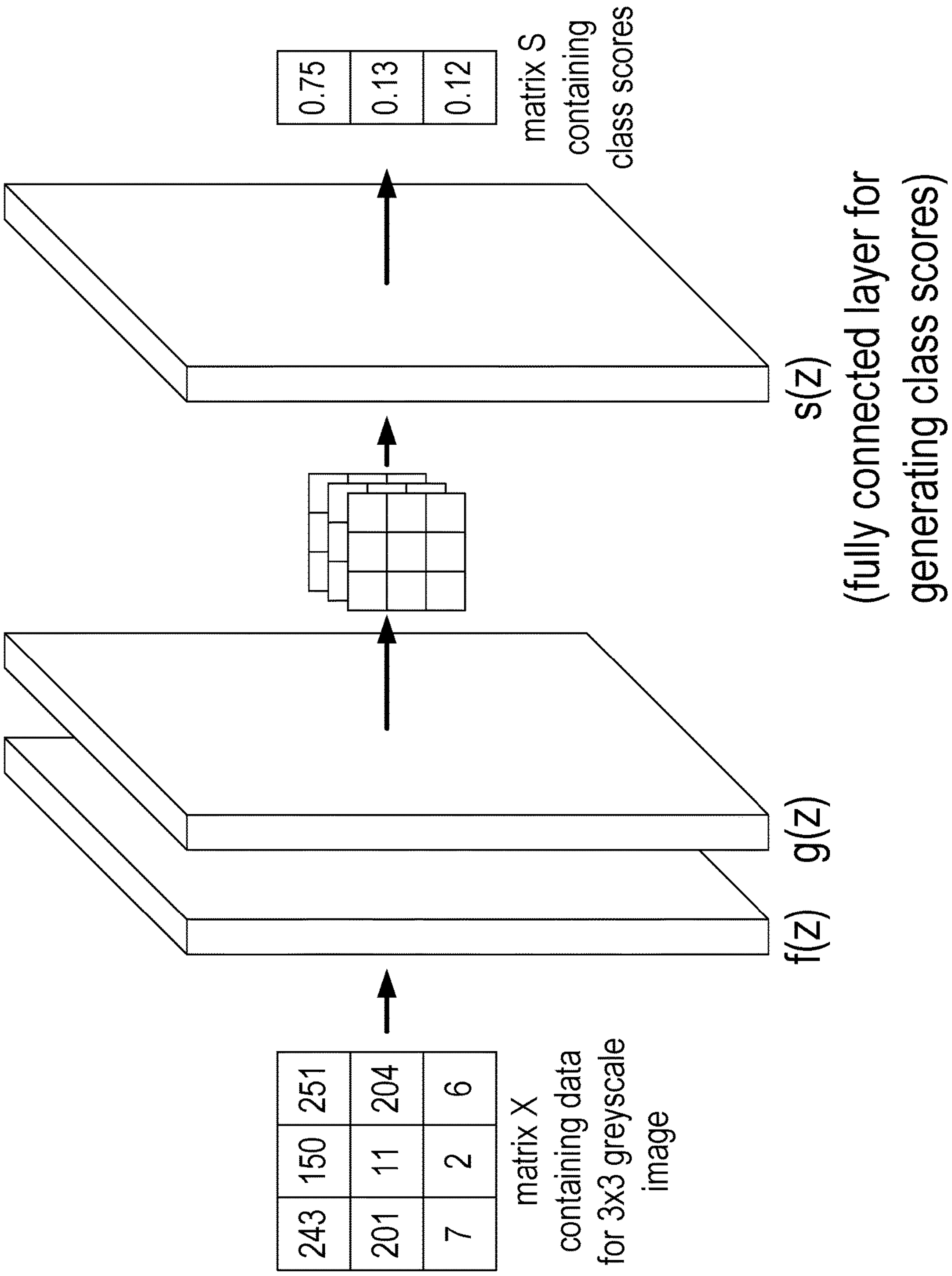
Figure 100B:
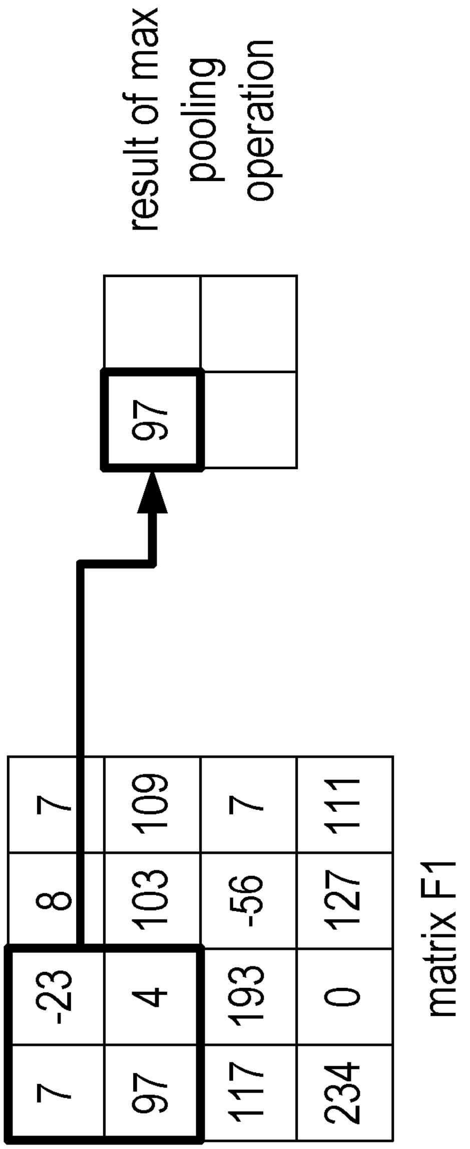
Figure 100C:
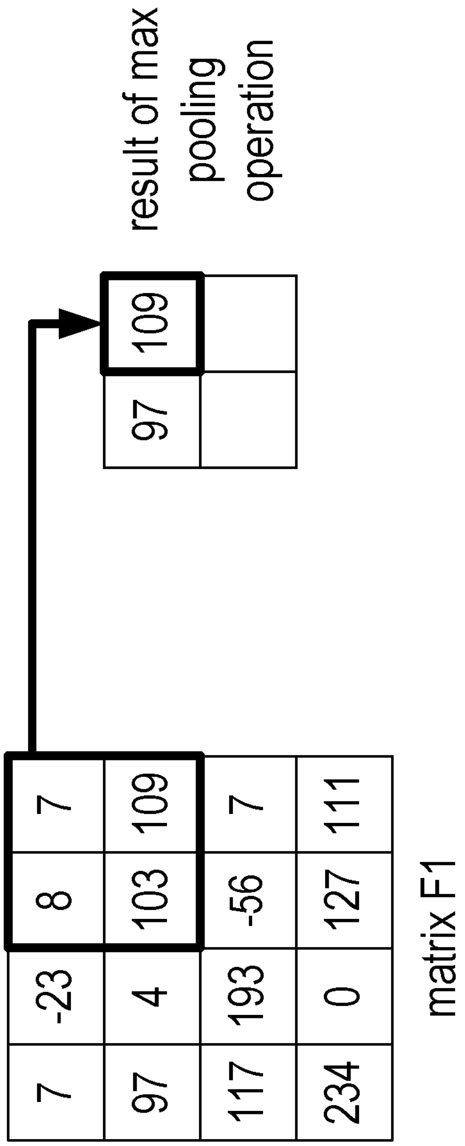
Figure 100D:
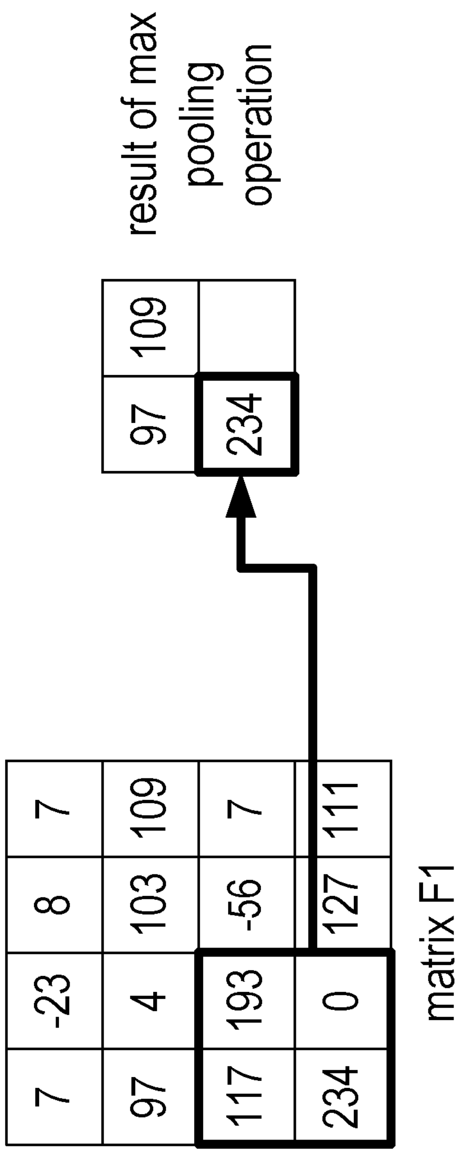
Figure 100E:
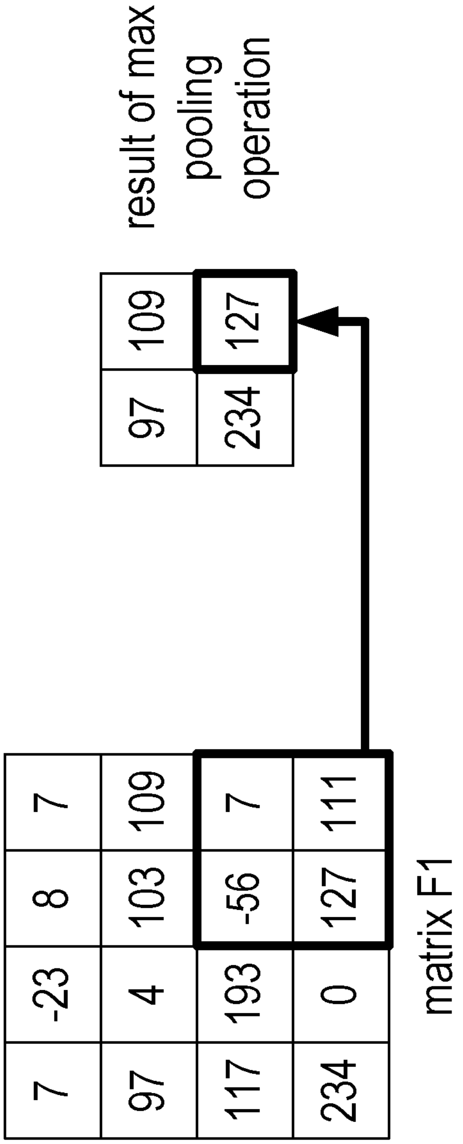
Figure 100F:
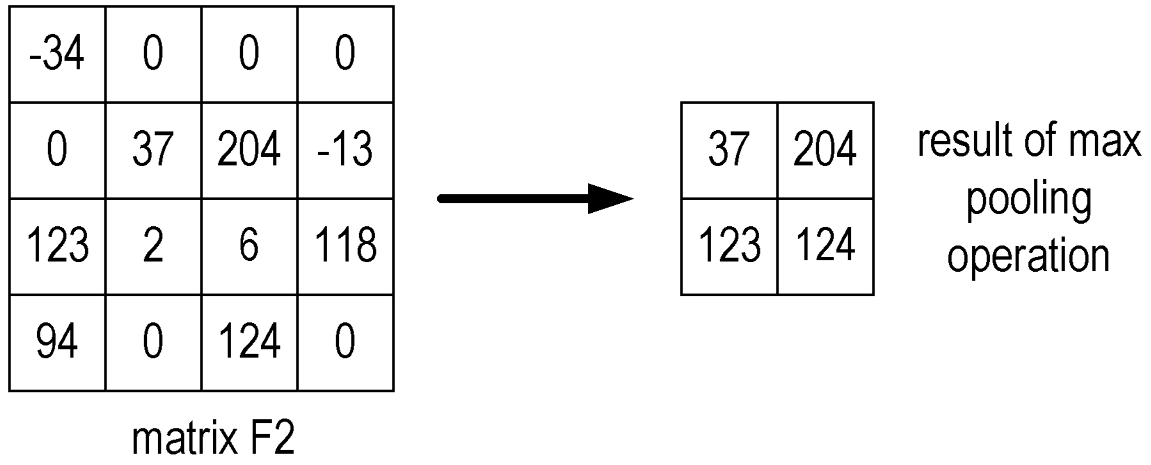
Figure 100G:
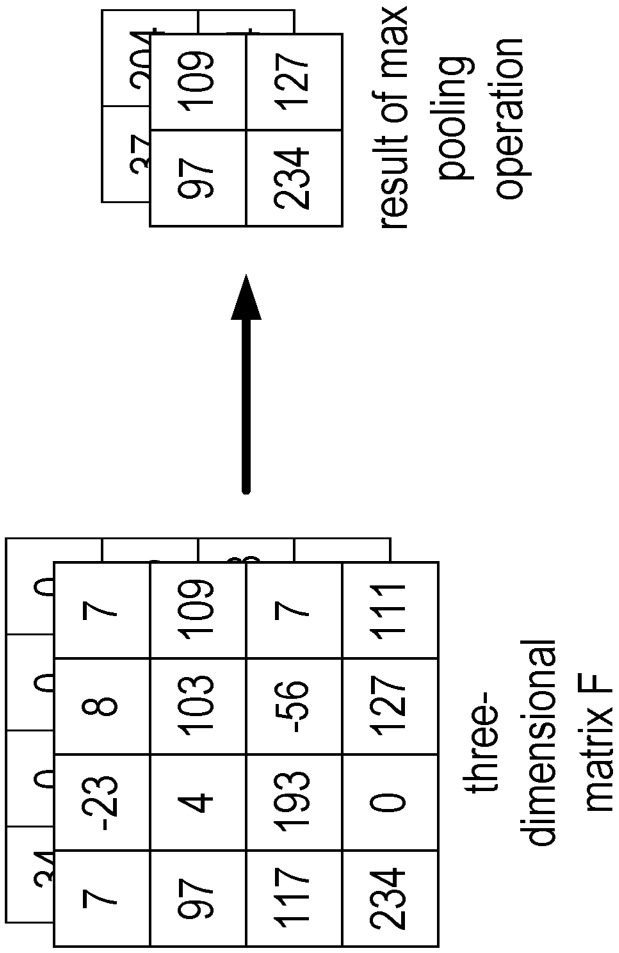

FIG. 100G illustrates a max pooling operation for a three-dimensional matrix.

Figure 100H:
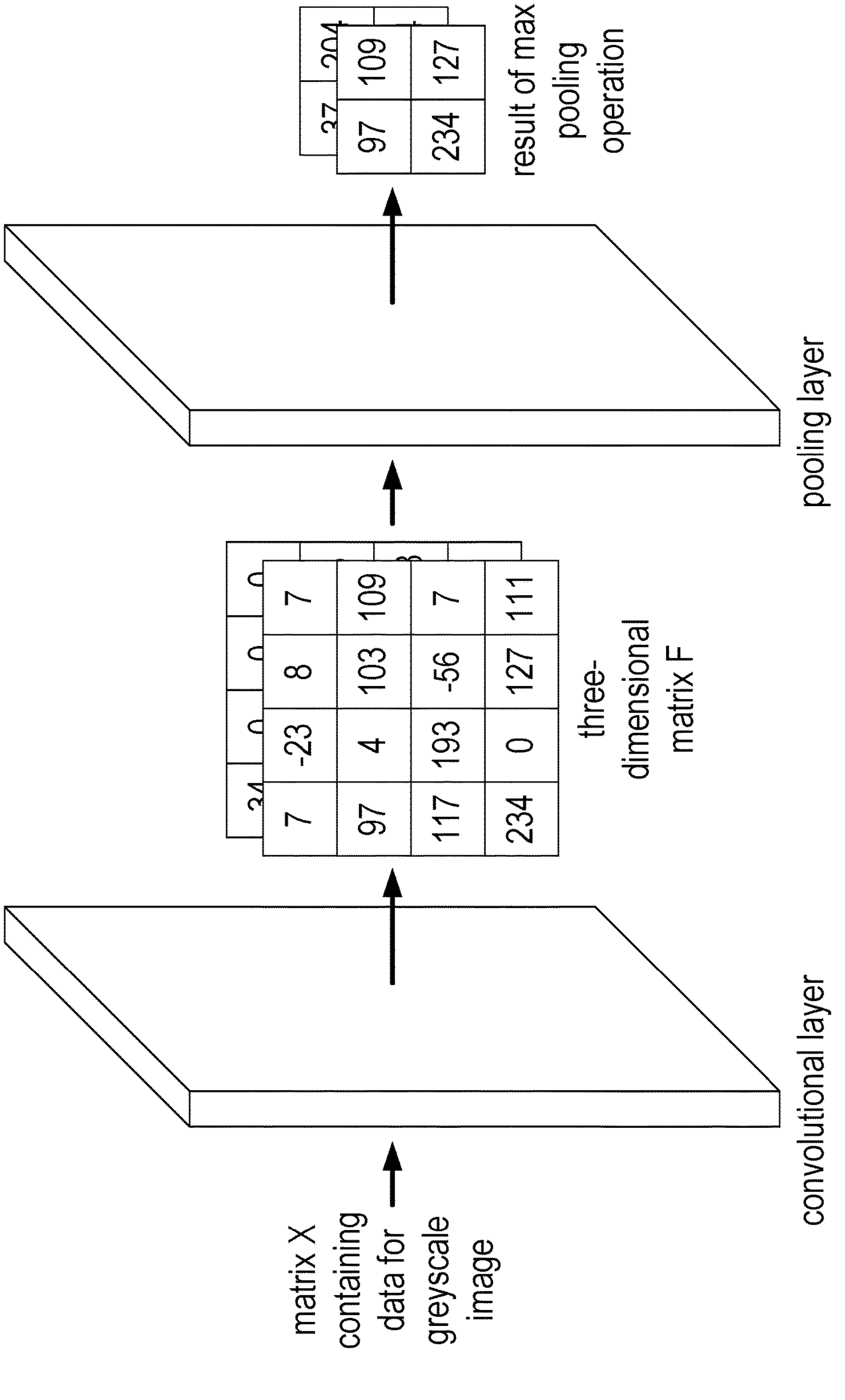
Figure 100I:
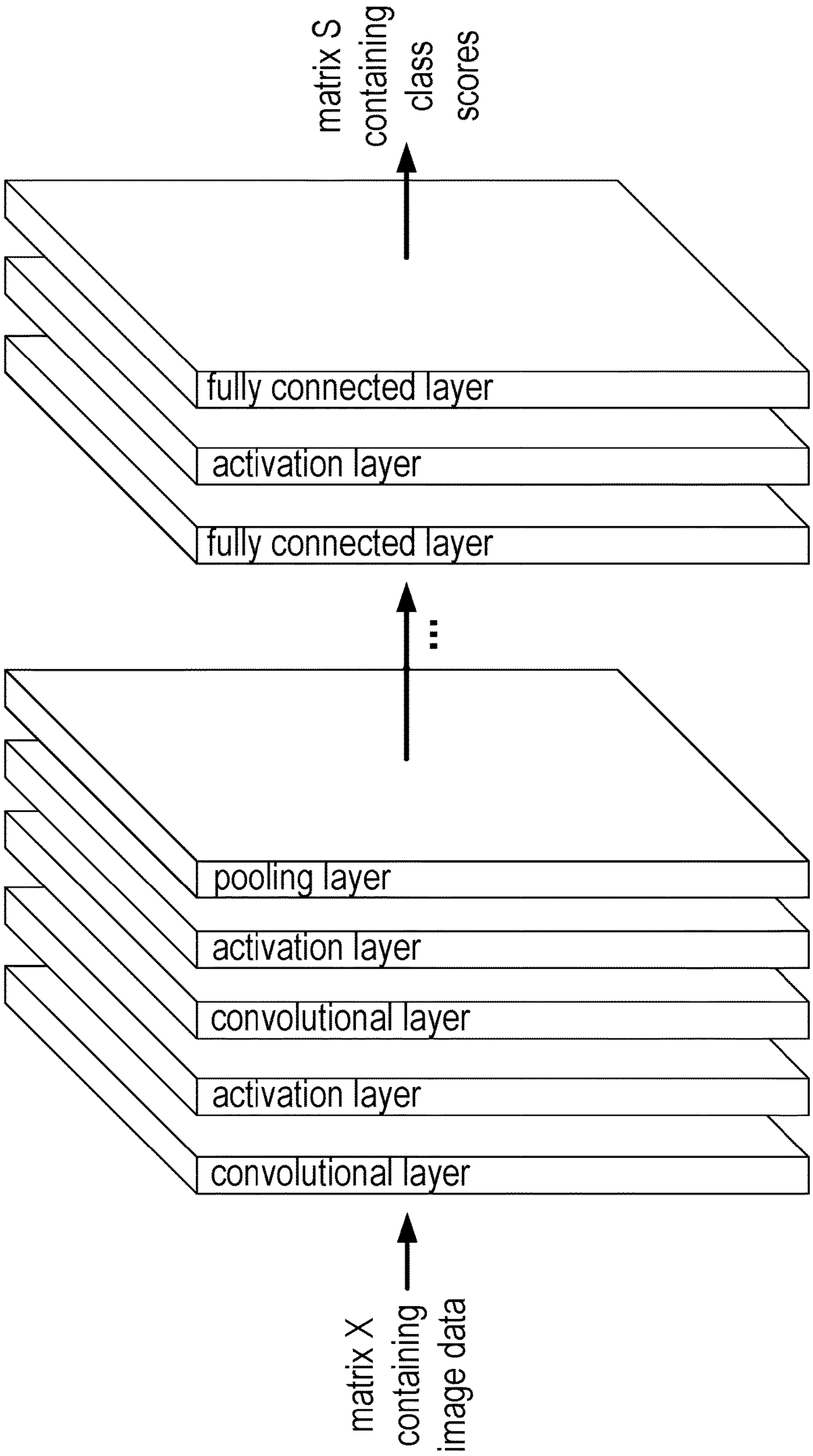

FIGS. 100H-100I illustrate exemplary architectures.

Figure 101:
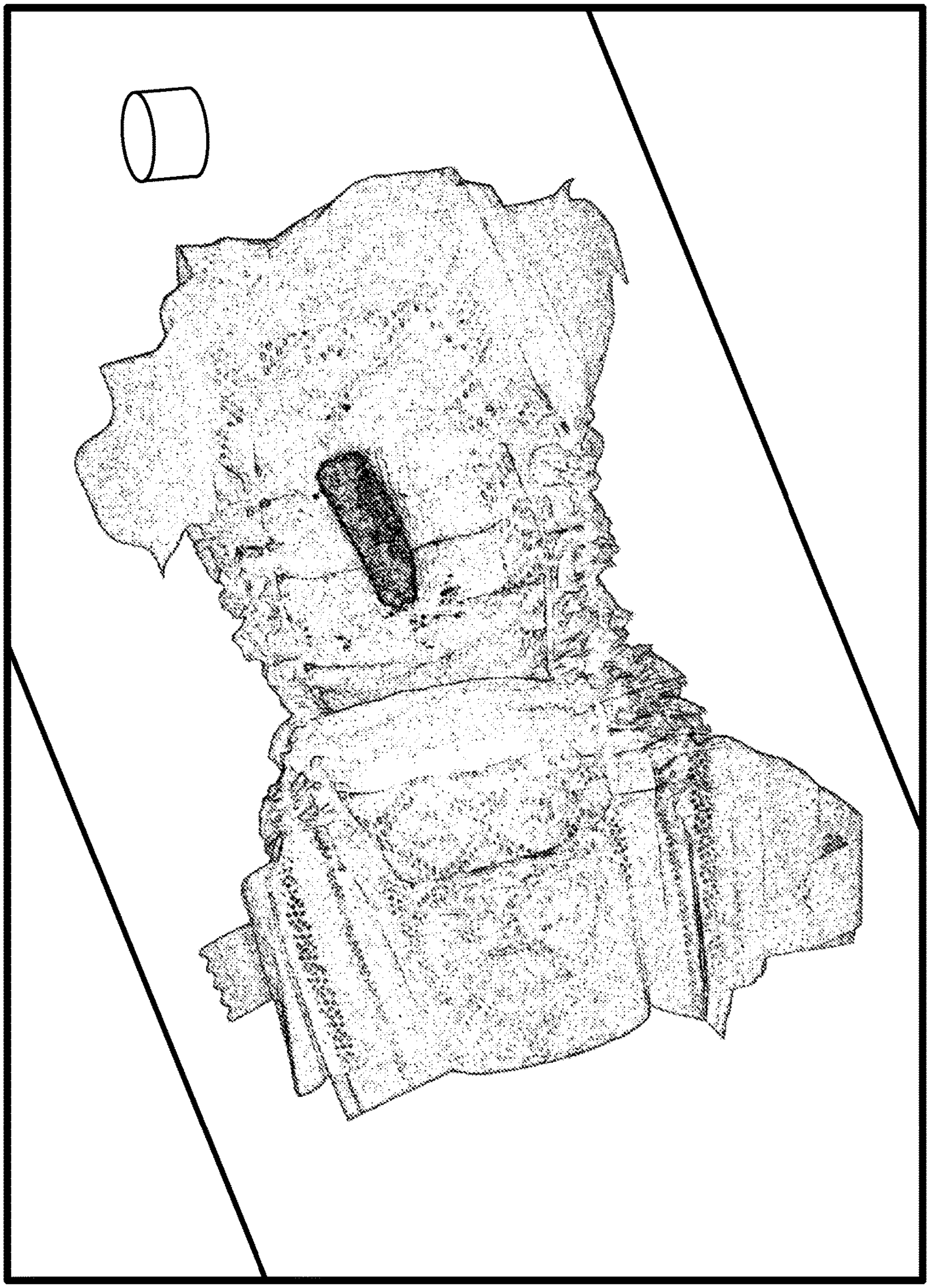

FIG. 101 illustrates an exemplary digital image of a diaper with stool.

Figure 102:
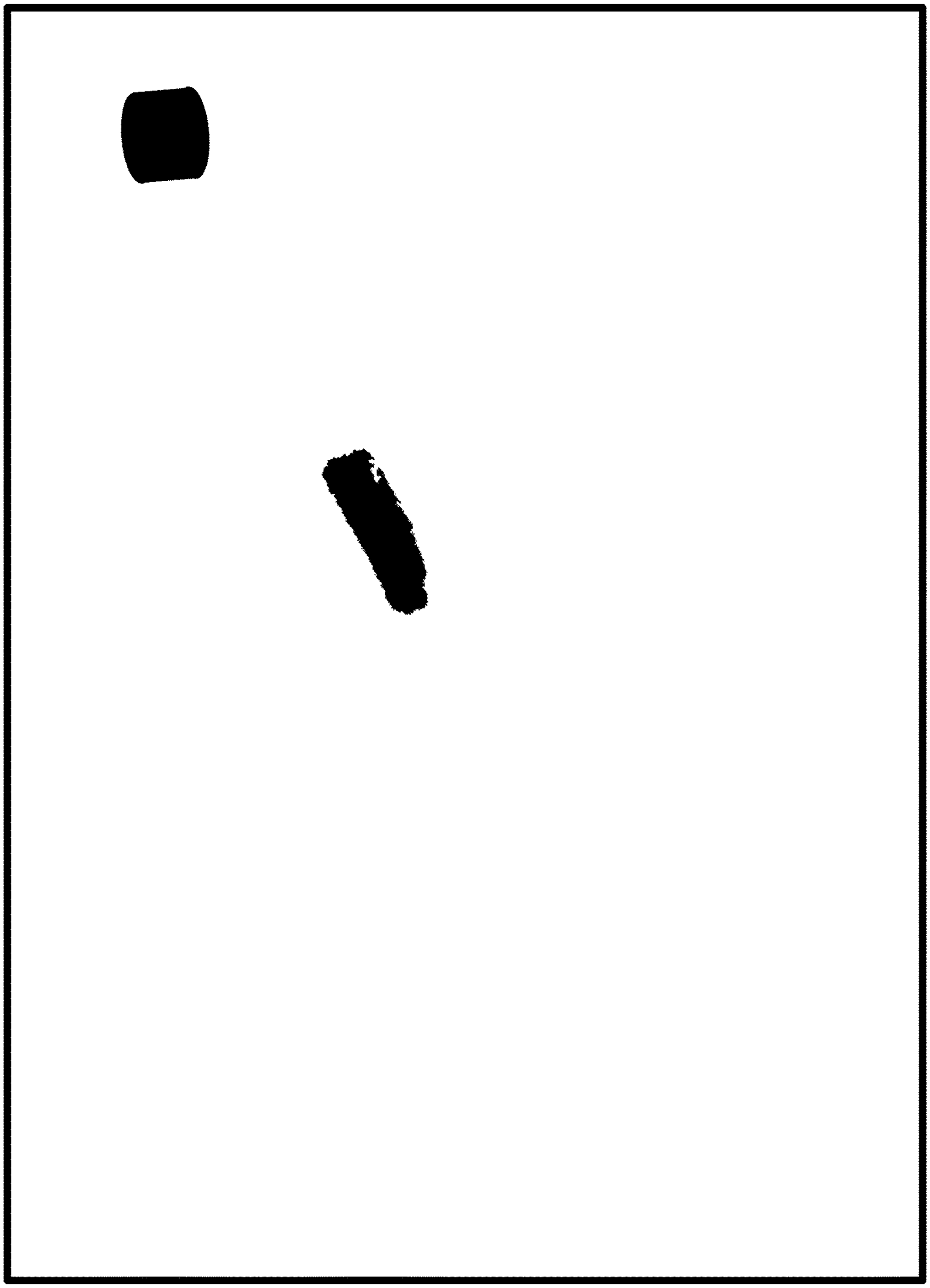

FIG. 102 fancifully illustrates an exemplary such first segmentation mask indicating one or more areas of the image in FIG. 101 determined to correspond to stool.

Figure 103:
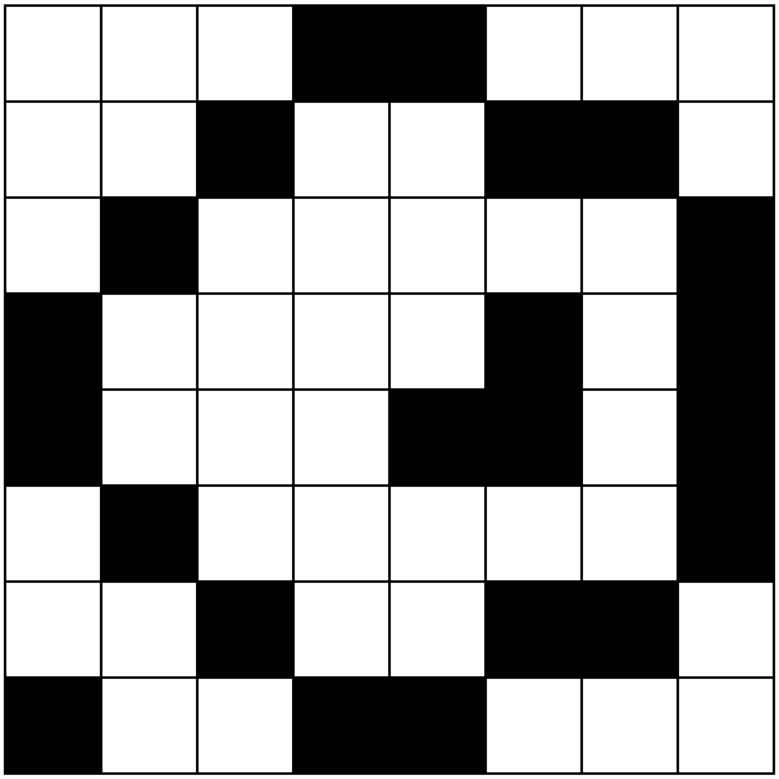

FIG. 103 illustrates a very simple 8×8 image.

FIG. 104 fancifully illustrates an exemplary representation of a first segmentation mask for the image in FIG. 103.

Figure 105:
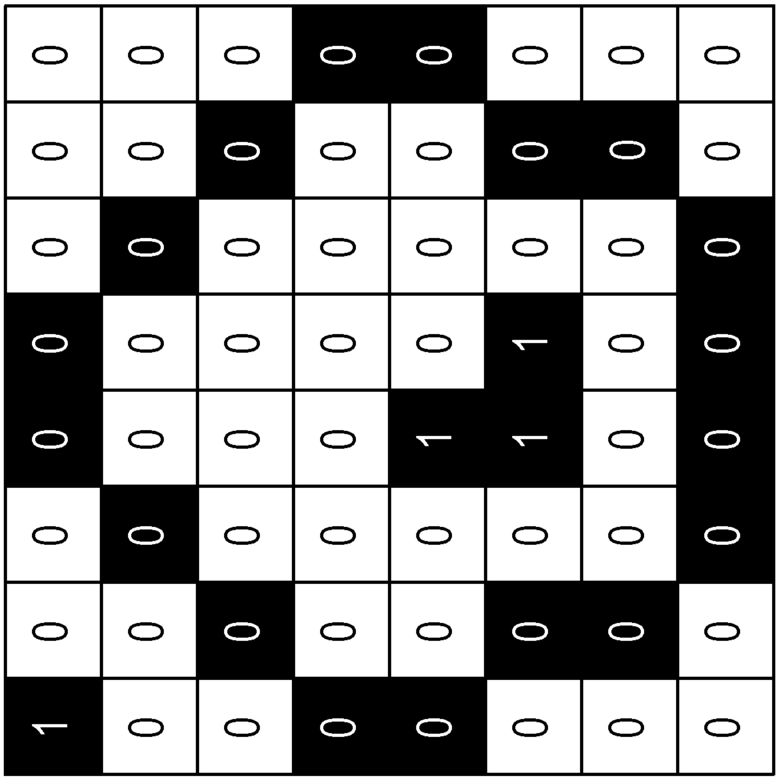

FIG. 105 illustrates the exemplary representation of the first segmentation mask of FIG. 104 overlaid over the corresponding image of FIG. 103.

Figure 106:

FIG. 106 fancifully illustrates an exemplary such second segmentation mask indicating an area of the image in FIG. 101 determined to correspond to a diaper.

FIG. 107 fancifully illustrates an exemplary representation of a second segmentation mask for the image in FIG. 103.

Figure 108:
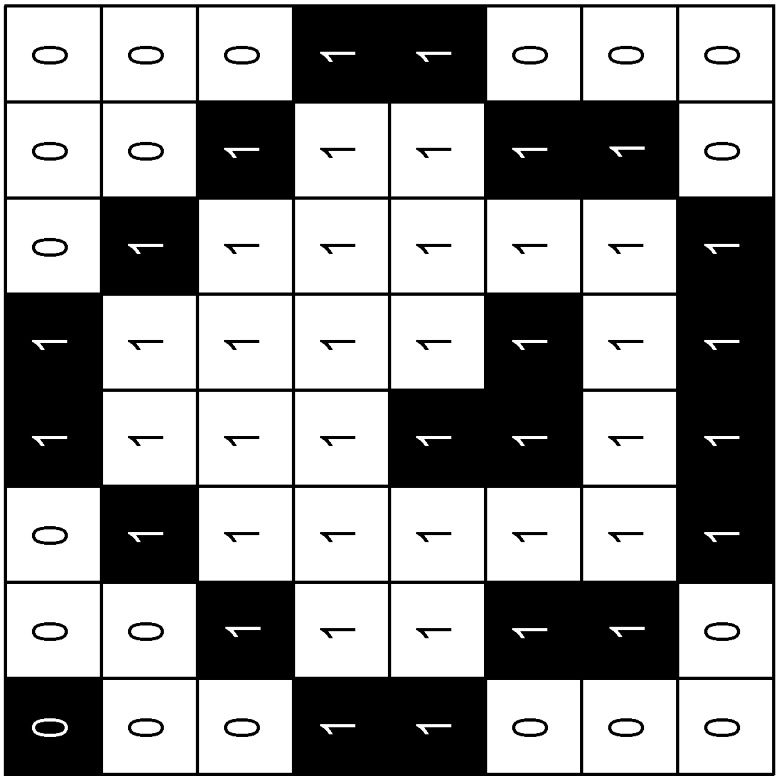

FIG. 108 illustrates the exemplary representation of the second segmentation mask of FIG. 107 overlaid over the corresponding image of FIG. 103.

FIG. 109 fancifully illustrates a third segmentation mask generated by performance of an intersection operation intersecting the first segmentation mask of FIG. 104.

Figure 110:
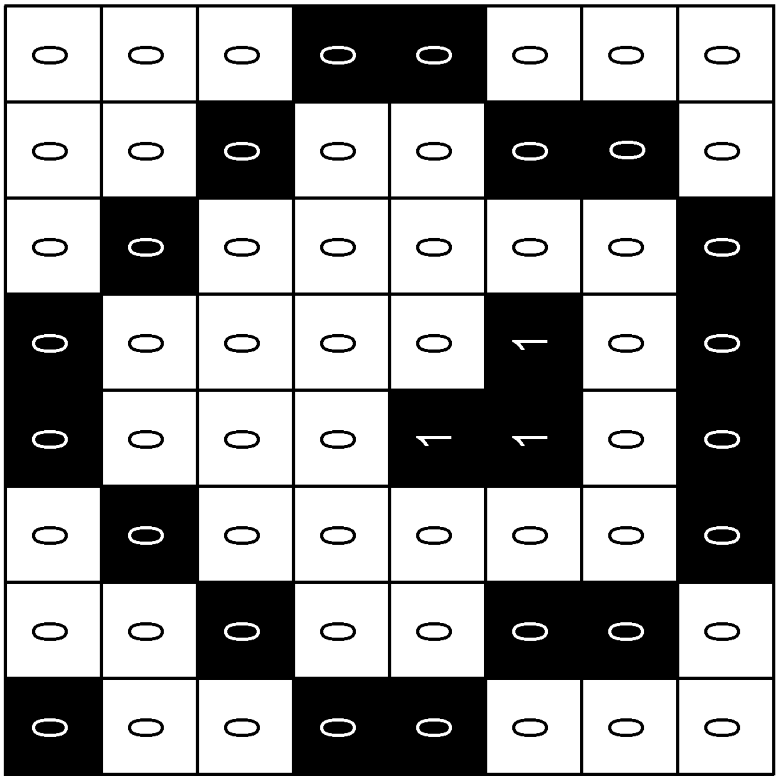

FIG. 110 illustrates the exemplary representation of the third segmentation mask of FIG. 109 overlaid over the image of FIG. 103.

Figure 111:
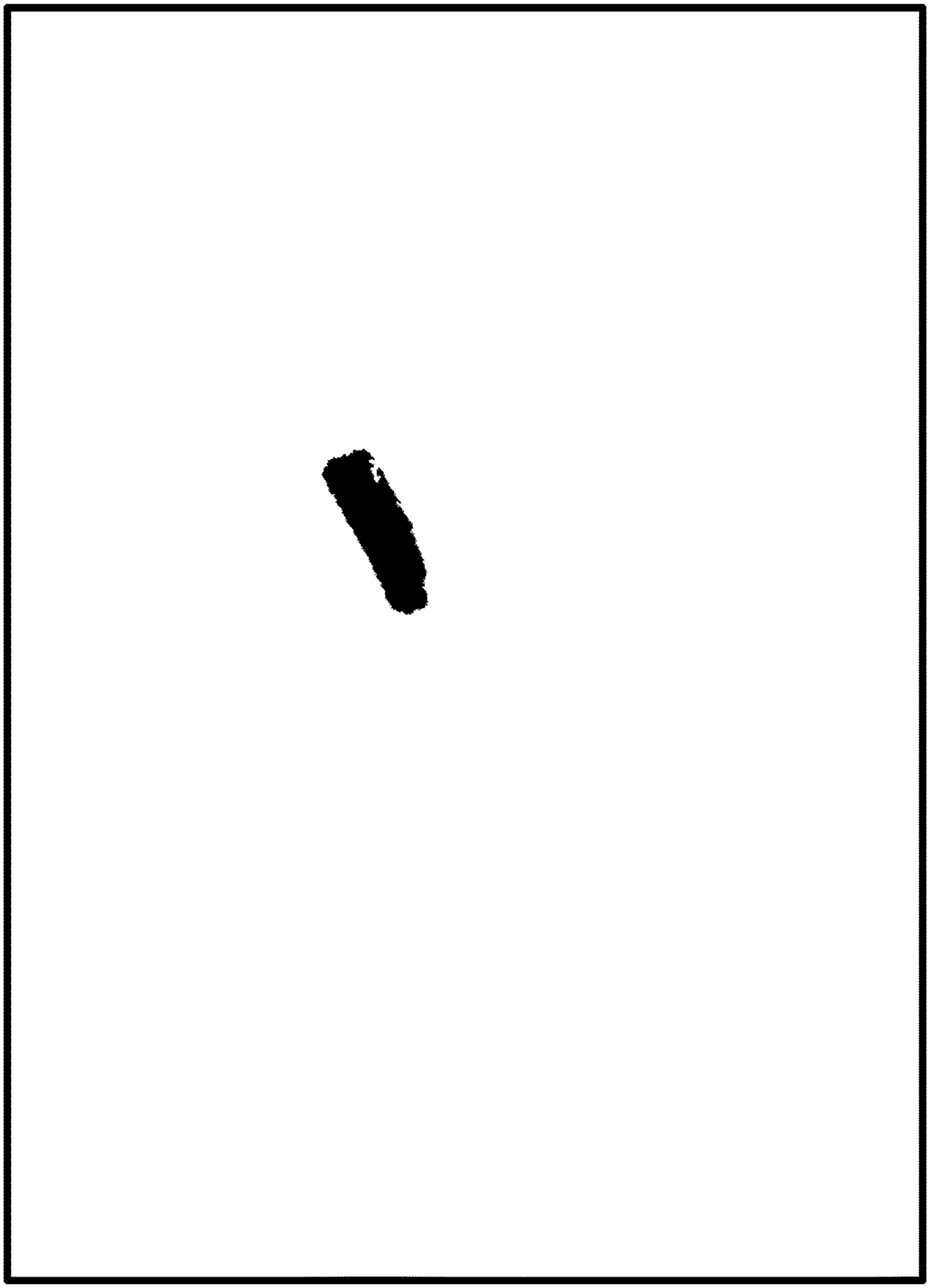

FIG. 111 fancifully illustrates an exemplary third segmentation mask for the image in FIG. 101.

Figure 112:
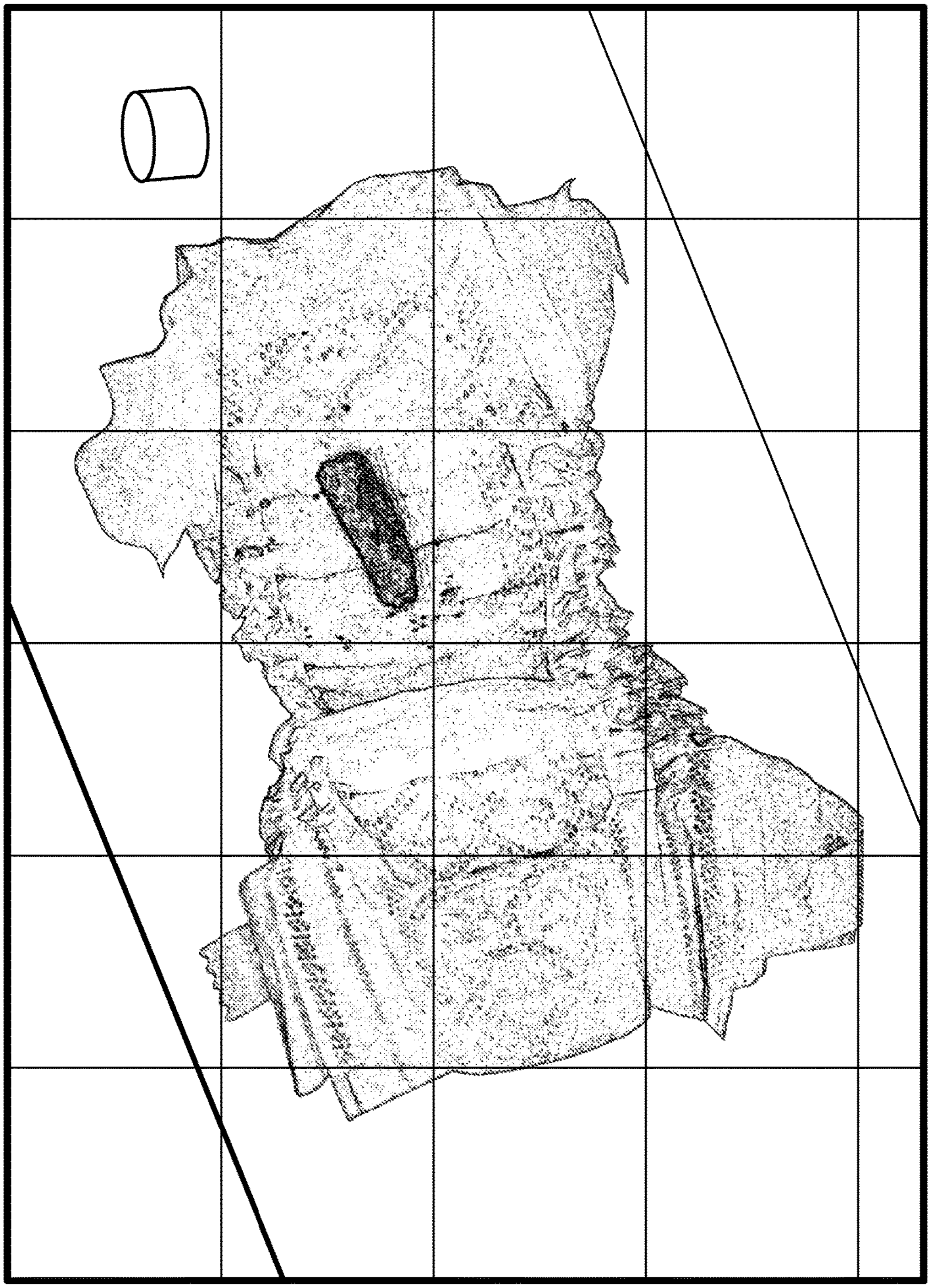

FIG. 112 fancifully illustrates the image of FIG. 101 partitioned into square sections that can be manipulated to transform the image.

Figure 113:
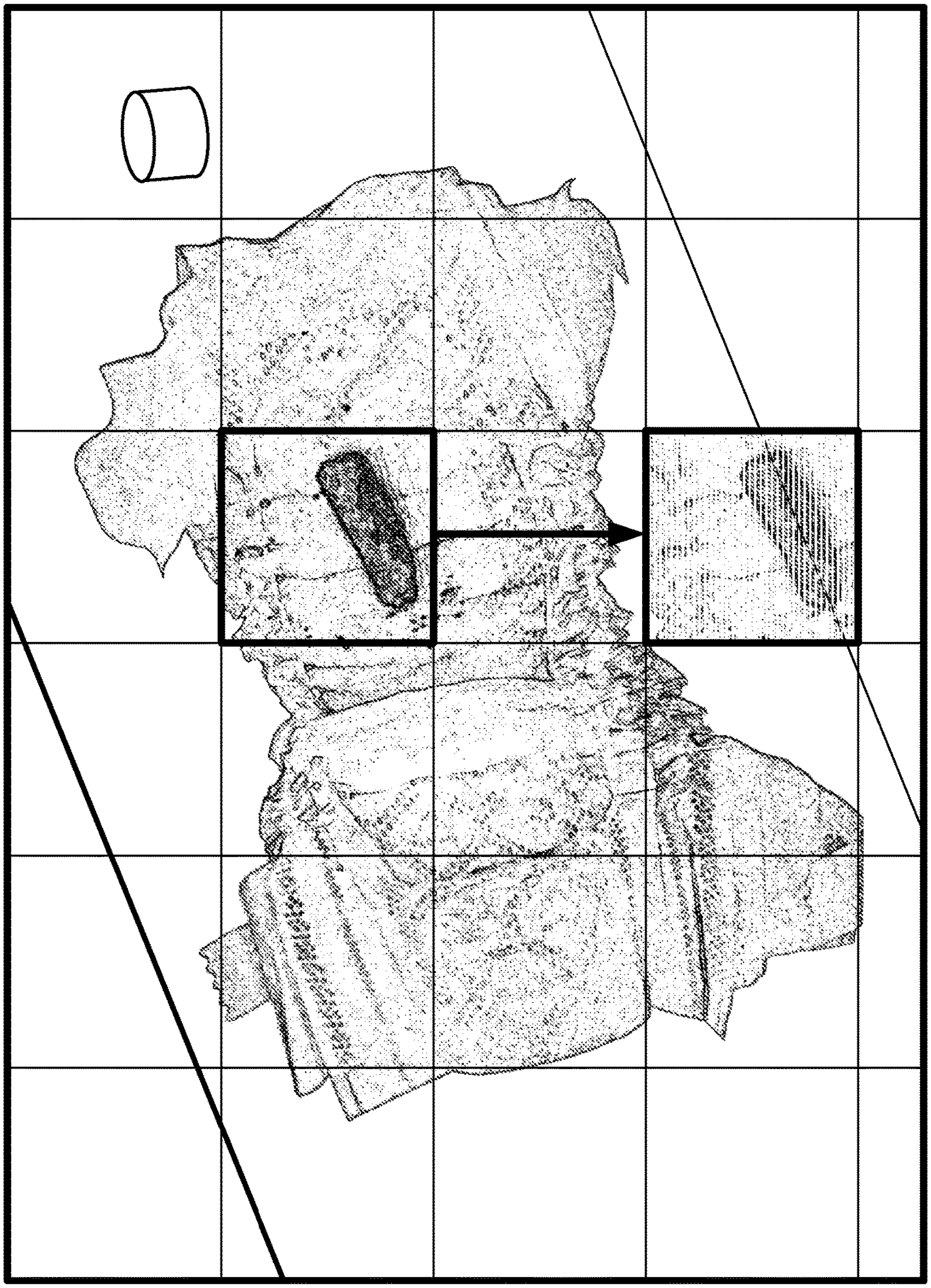

FIG. 113 fancifully illustrates translation of one of these square sections to another square section.

Figure 114:
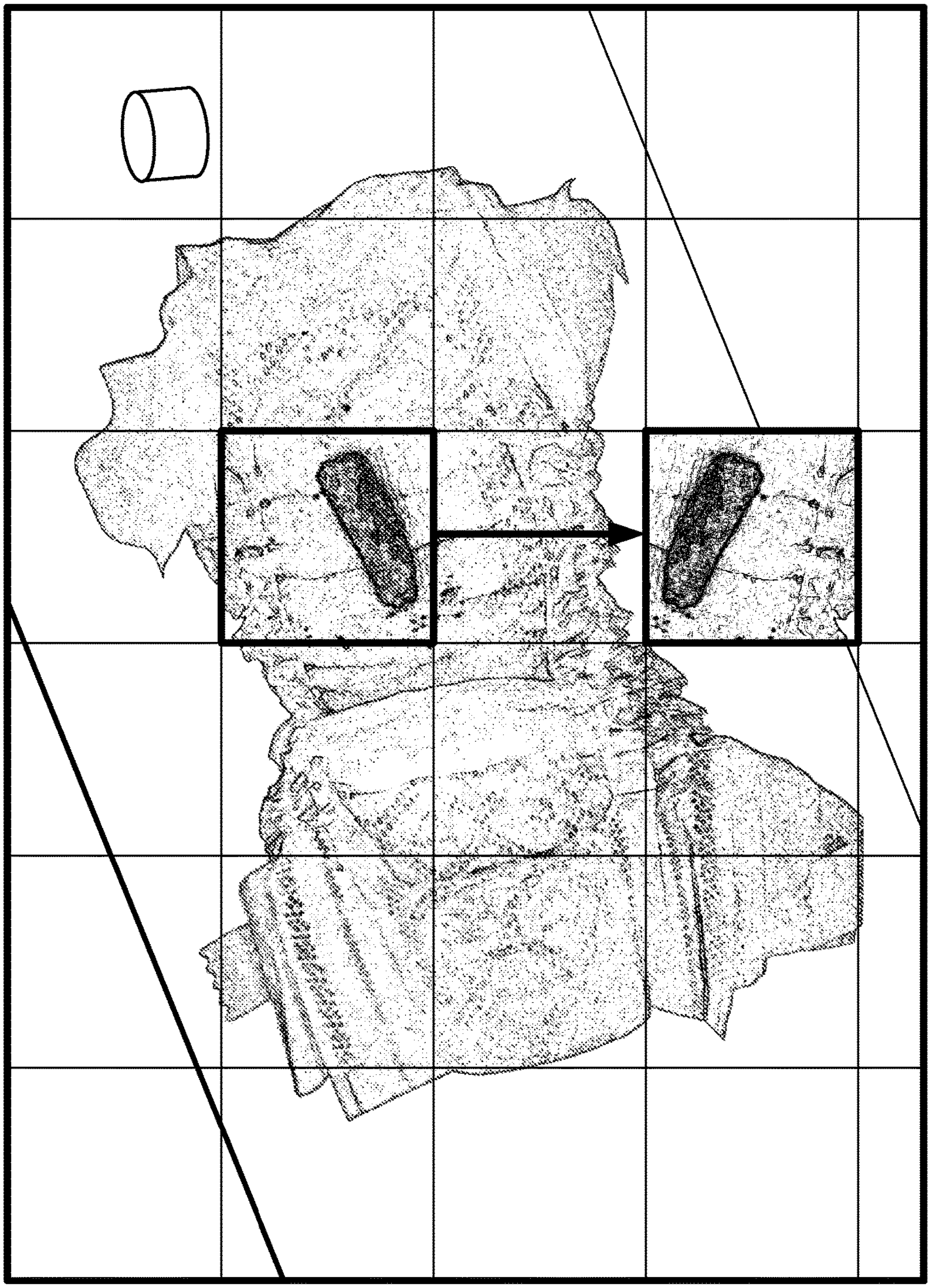

FIG. 114 illustrates a section of FIG. 113 flipped.

Figure 115:
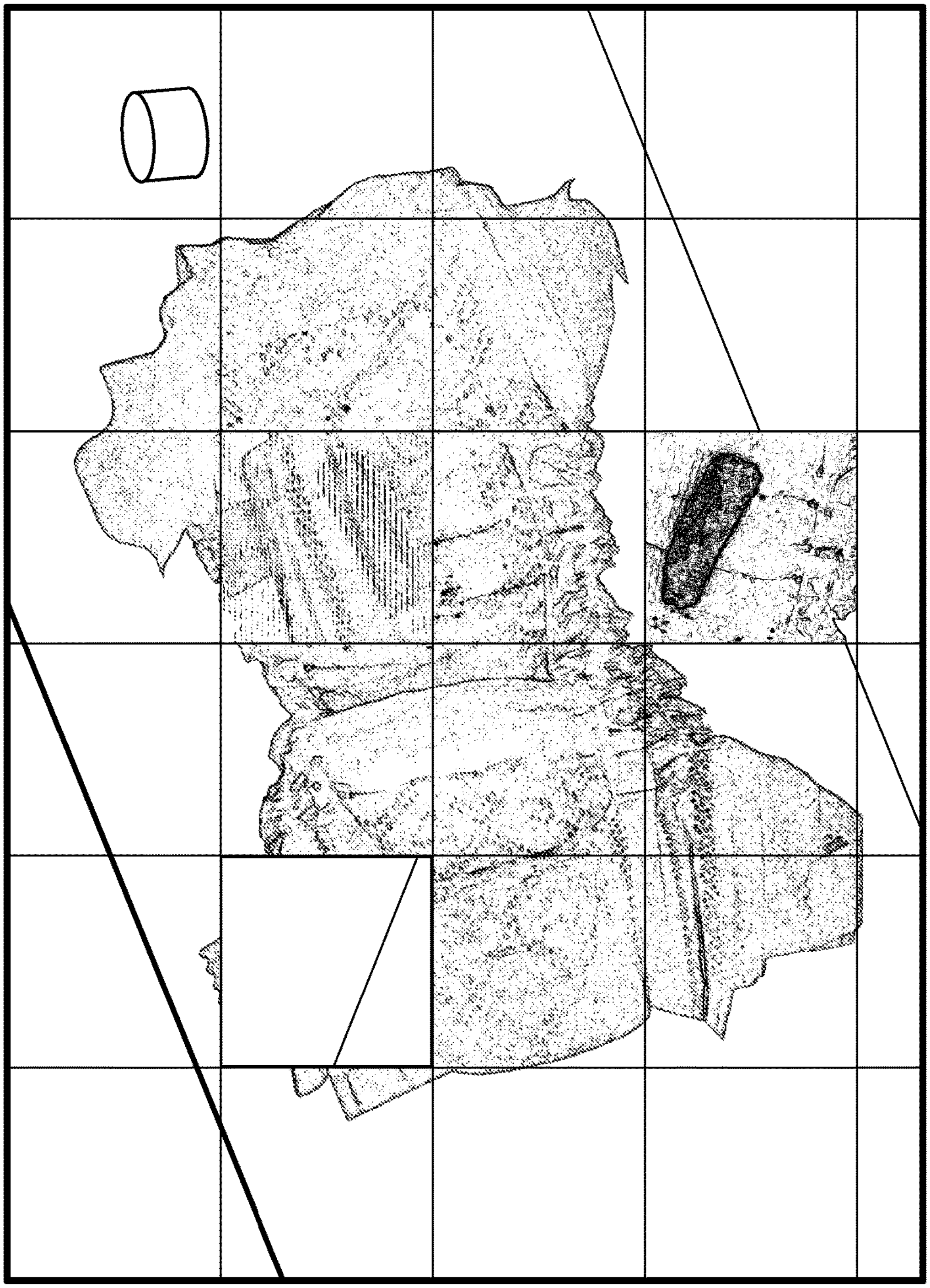

FIG. 115 illustrates sections of FIG. 113 transformed.

Figure 116:
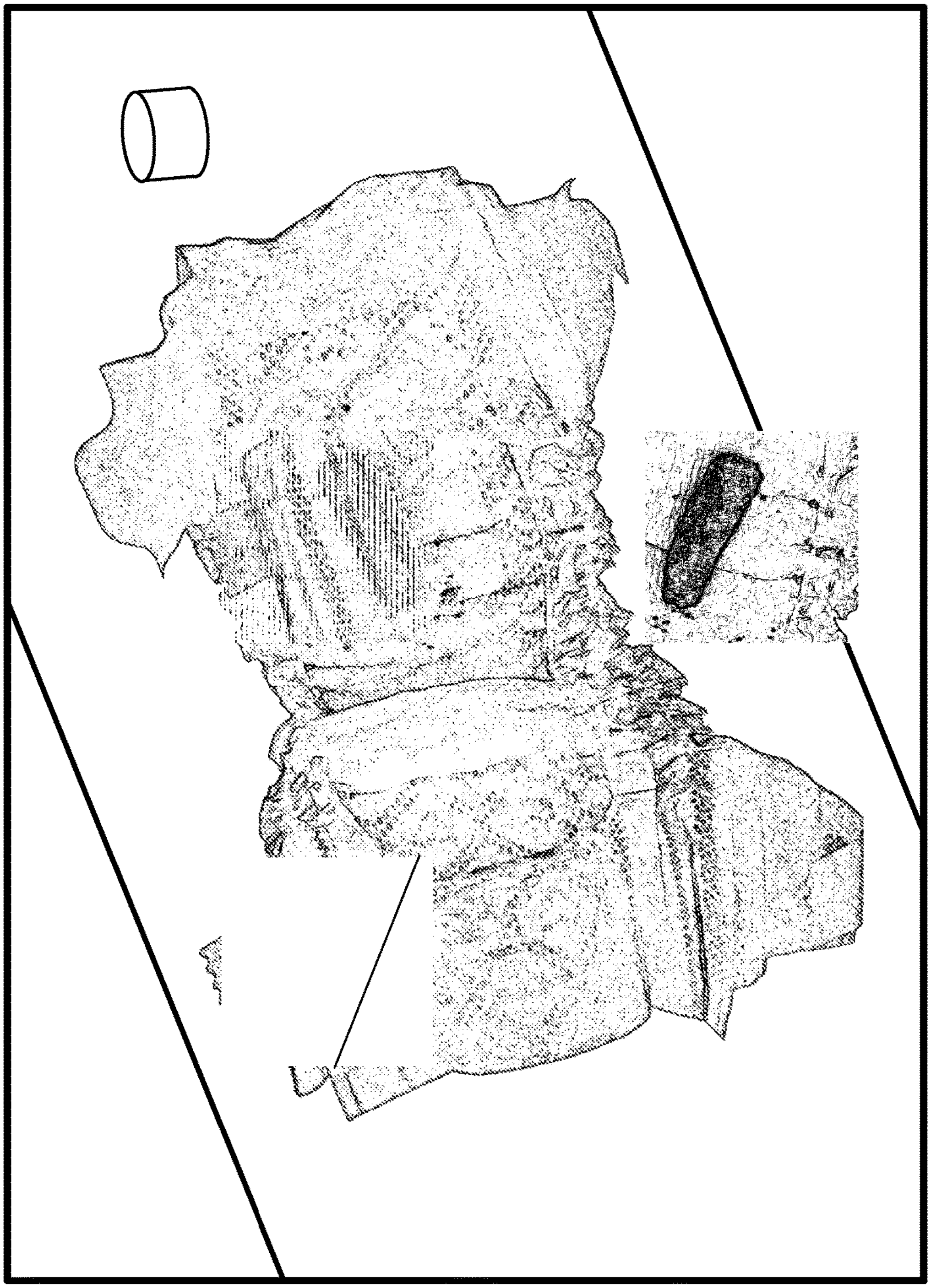

FIG. 116 illustrates the exemplary transformed image that has been transformed from the image of FIG. 101 by applying the transforms if FIGS. 113-115.

Figure 117:
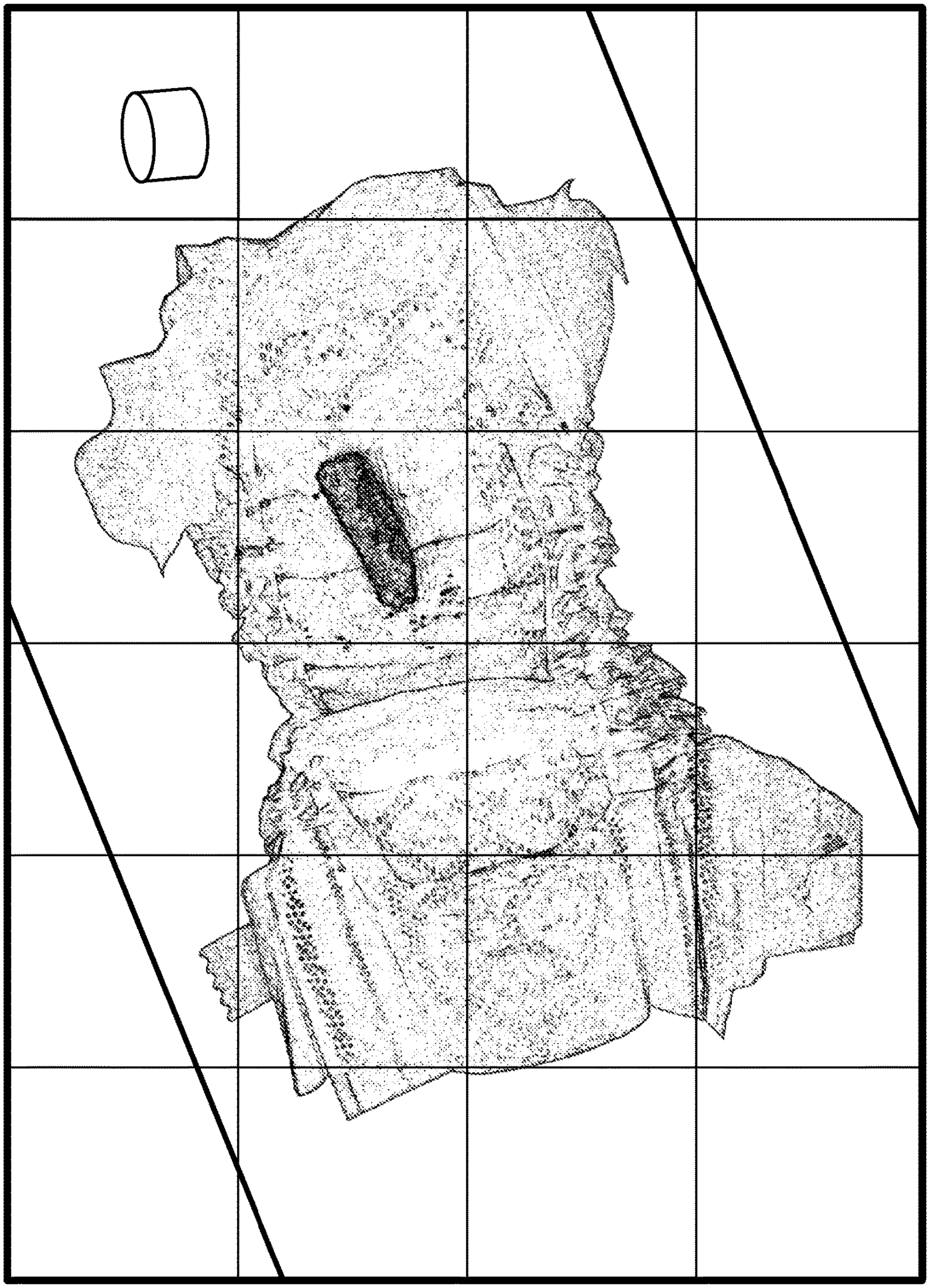

FIG. 117 fancifully illustrates the image of FIG. 101 partitioned into rectangular sections that can be manipulated to transform the image.

Figure 118:
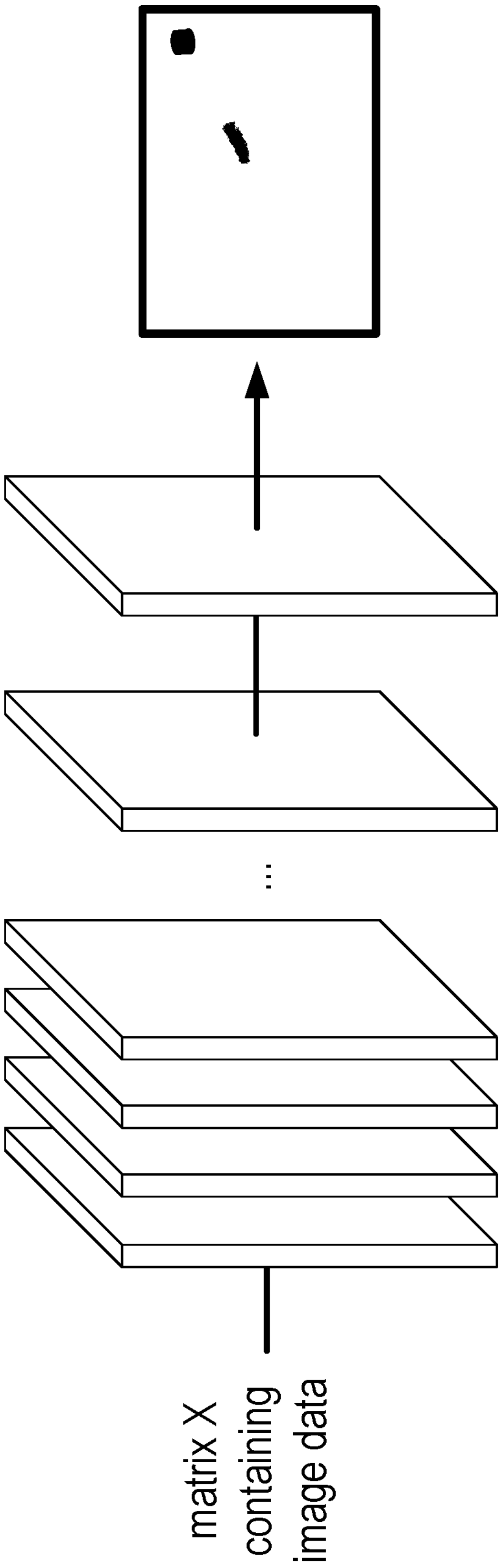

FIG. 118 illustrates methodologies described involving use of a first convolutional neural network to generate a first segmentation mask for stool.

Figure 119:
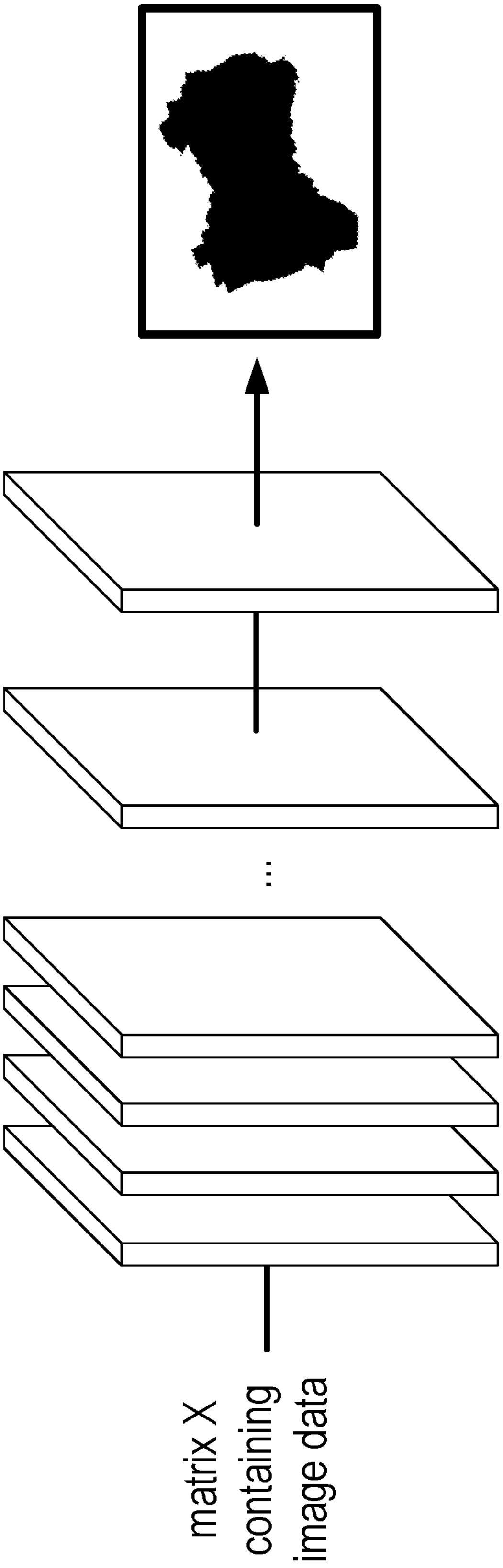

FIG. 119 illustrates methodologies described involving use of a second convolutional neural network to generate a second segmentation mask for a diaper.

Figure 120:
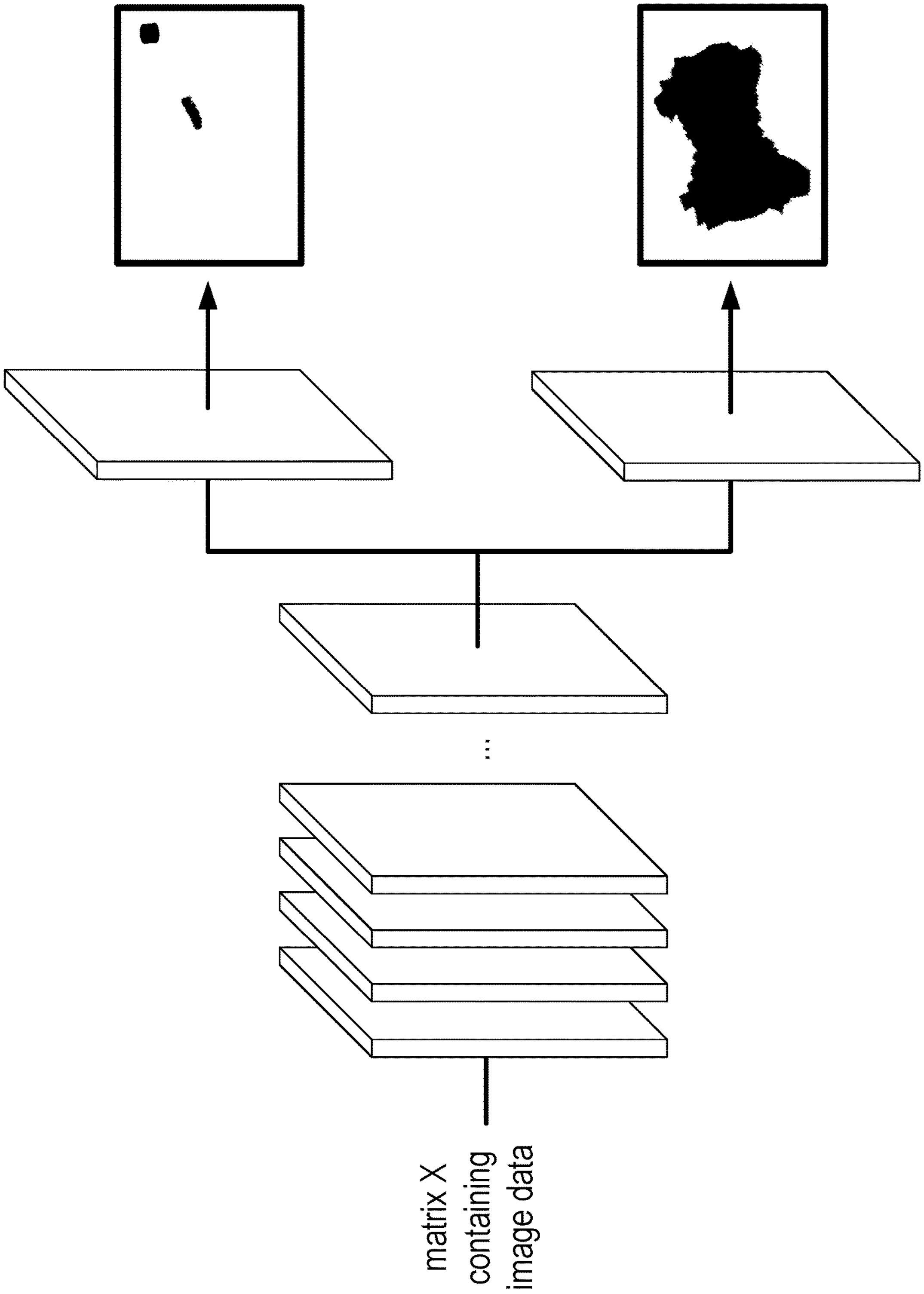

FIG. 120 illustrates a single convolutional neural network configured to generate, based on input image data for an image, both a first segmentation mask for stool, and a second segmentation mask for a diaper.

Figure 121:
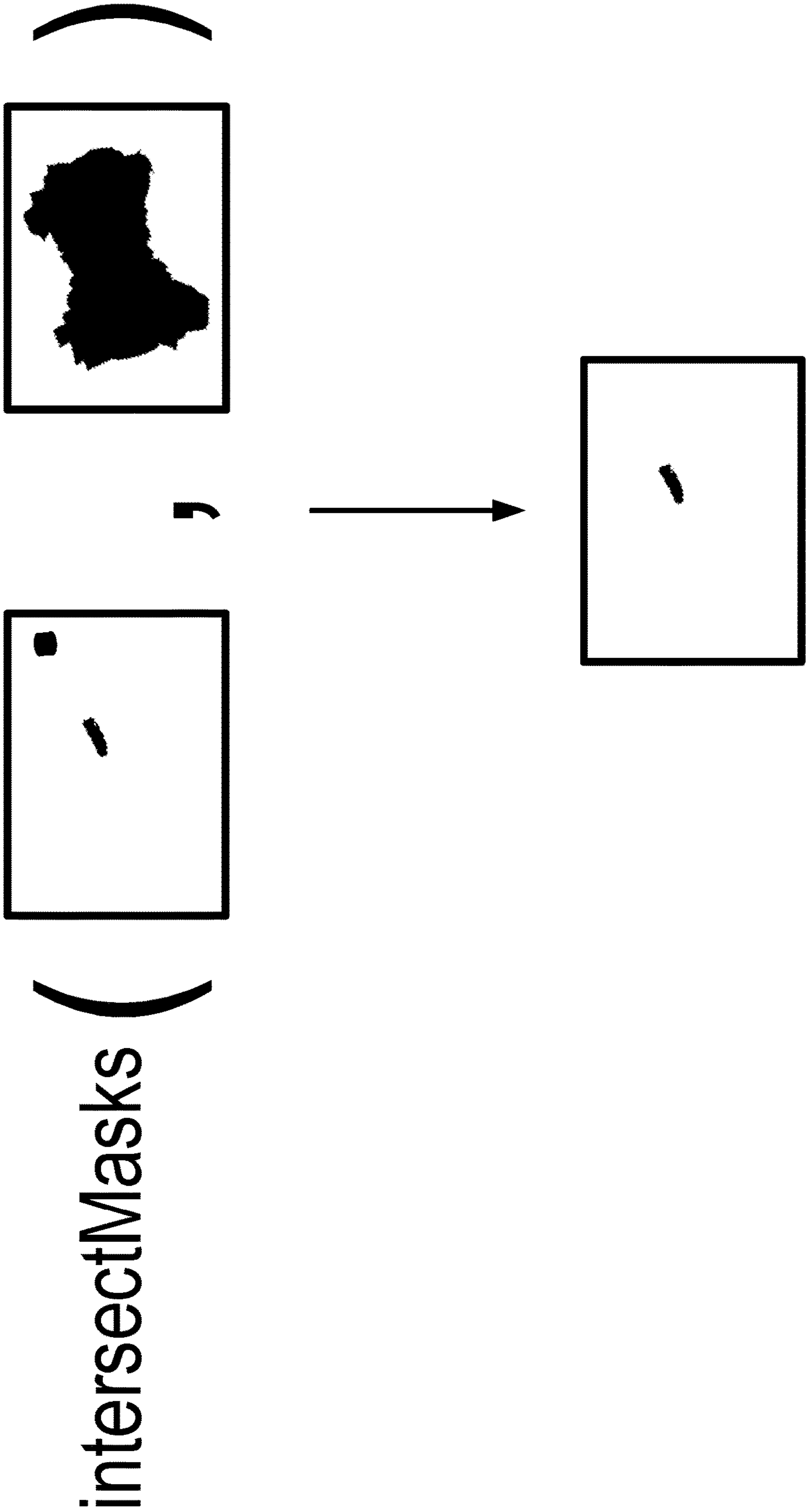

FIG. 121 illustrates generated masks intersected to produce the intersected mask indicating pixels that have been determined to both lie within an area of the image determined to correspond to stool and lie within an area of the image determined to correspond to a diaper.

Figure 122:
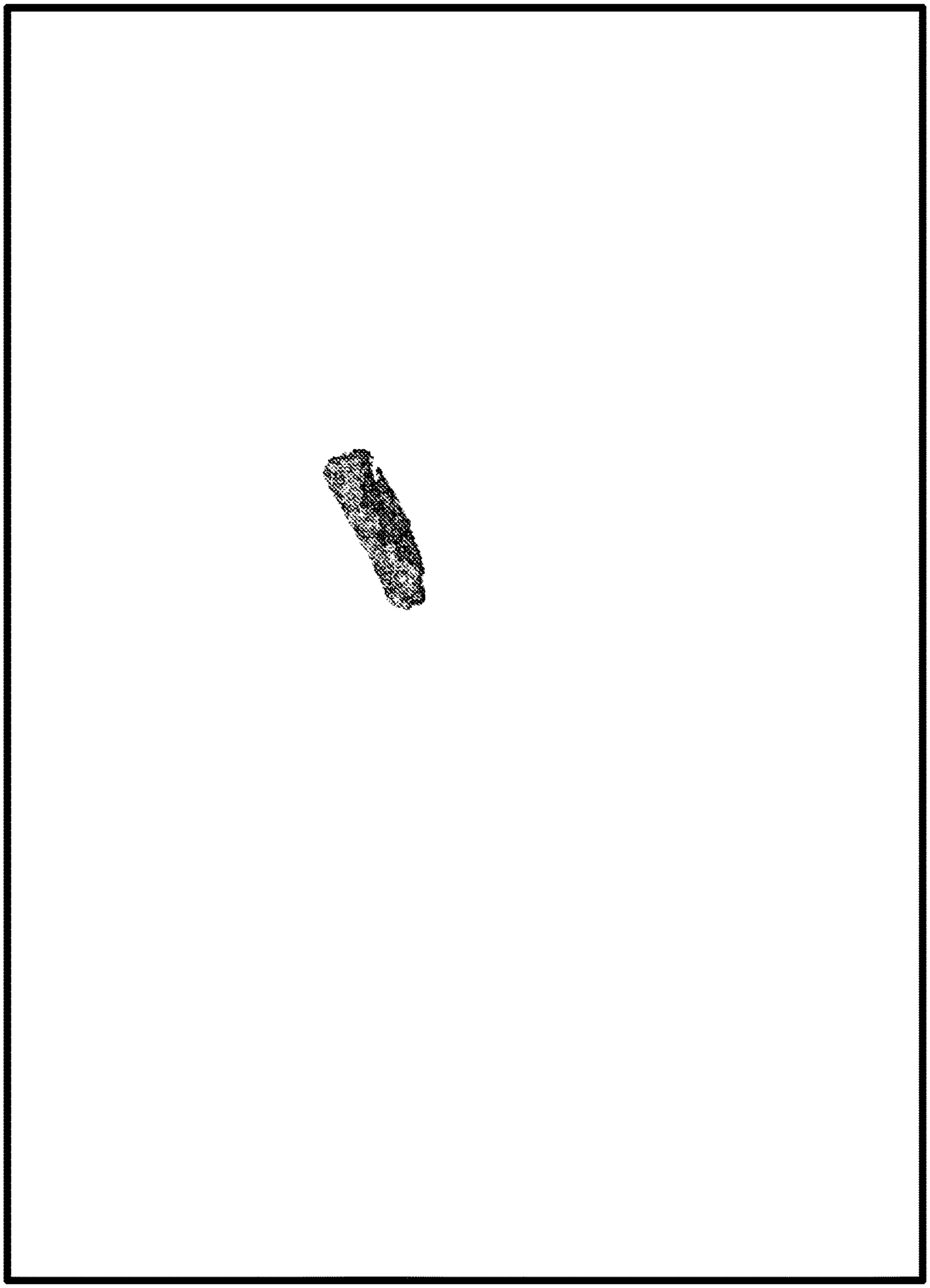

FIG. 122 fancifully illustrates application of such an intersected mask of FIG. 121 to produce a modified image.

Figure 123:

FIG. 123 illustrates an exemplary resized modified image of the stool in FIG. 117.

DETAILED DESCRIPTION

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast, "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

Utilizing an Intersection of Masks for Generation of a Modified Image for Analysis As noted above, although computer image analysis and machine learning have been applied to the problem of human stool recognition and characterization, and even to the specific problem of scoring images of stool in diapers, this has raised the technical problem of how to increase accuracy of such automated machine scoring of images of stool in diapers.

In accordance with one or more preferred implementations, a methodology utilizes multiple segmentation masks for a single image in a manner which has been shown to enable increased accuracy of automated scoring of stool in diapers as compared to use of a single segmentation mask.

An exemplary such methodology for utilizing multiple segmentation masks to enable increased accuracy of automated scoring of images of stool in diapers involves training one or more convolutional neural networks to generate, for a digital image, a first segmentation mask indicating an area of the image determined to correspond to stool, and a second segmentation mask indicating an area of the image determined to correspond to stool. The trained one or more convolutional neural networks are then utilized to generate, for each respective image of one or more particular digital images, a first segmentation mask indicating an area of the respective image determined to correspond to stool and a second segmentation mask indicating an area of the respective image determined to correspond to a diaper. These generated first and second segmentation masks are then utilized together to generate, for each respective image, a respective modified image that masks out non-stool portions of the original respective image. Another convolutional neural network is then utilized to classify, for each of these respective modified images, stool in the image into one of a plurality of discrete classes that correspond to a stool rating scale. This stool rating scale might be, for example, the Bristol scale, or the Brussels Infant and Toddler Stool Scale (BITSS).

For example, FIG. 101 illustrates an exemplary digital image of a diaper with stool.

In accordance with an exemplary methodology, data for this digital image is resized to a size configured for input into a first convolutional neural network (e.g. 224×224 pixels), and then provided as input to a first convolutional neural network that is configured for image segmentation. This first convolutional neural network generates a first segmentation mask indicating one or more areas of the image determined to correspond to stool.

FIG. 102 fancifully illustrates an exemplary such first segmentation mask indicating one or more areas of the image determined to correspond to stool. The generated first segmentation mask indicates for each pixel of the image, whether that pixel lies within an area of the image determined to correspond to stool.

In accordance with one or more preferred implementations, a generated segmentation mask comprises a plurality of ones and zeroes, with a "1" indicating a pixel that lies within an area of the image determined to correspond to stool, and a "0" indicating a pixel that does not lie within an area of the image determined to correspond to stool. A segmentation mask may be represented as a matrix (e.g. a boolean matrix or an int matrix), as a bit string, as an integer, or in some other way.

It will be appreciated that a full segmentation mask for even a moderately sized image will contain more digits than is easily illustrated, e.g. a segmentation mask for a 224×224 image would generally contain 50,176 digits, one for each pixel of the image. Accordingly, it is difficult to illustrate a representation of a full segmentation mask for the first segmentation mask of FIG. 102.

Instead, for illustrative purposes, FIG. 103 illustrates a very simple 8×8 image, FIG. 104 fancifully illustrates an exemplary representation of a first segmentation mask for this image, FIG. 105 illustrates the exemplary representation of the first segmentation mask of FIG. 104 overlaid over the corresponding image of FIG. 103.

Further, in accordance with an exemplary methodology, data for the digital image is provided as input to a second convolutional neural network that is configured for image segmentation. This second convolutional neural network generates a second segmentation mask indicating one or more areas of the image determined to correspond to a diaper. (In accordance with one or more preferred implementations, a single convolutional neural network might instead be configured for both image segmentation of a diaper and image segmentation of stool, and might be used to generate both a first segmentation mask indicating one or more areas of the image determined to correspond to stool and a second segmentation mask indicating one or more areas of the image determined to correspond to a diaper.)

Returning to the example of the image of FIG. 101, FIG. 106 fancifully illustrates an exemplary such second segmentation mask indicating an area of the image determined to correspond to a diaper. The generated second segmentation mask indicates for each pixel of the image, whether that pixel lies within an area of the image determined to correspond to a diaper.

In accordance with an exemplary methodology, the first segmentation mask and the second segmentation mask are intersected together to produce a third segmentation mask that indicates pixels that have been determined to both lie within an area of the image determined to correspond to stool and lie within an area of the image determined to correspond to a diaper. Aspirationally, this third segmentation mask indicates an area of the image that corresponds to stool disposed within or overlaying a diaper.

For illustrative purposes, returning to the example of the simplified image of FIG. 103, FIG. 107 fancifully illustrates an exemplary representation of a second segmentation mask for this image, and FIG. 108 illustrates the exemplary representation of the second segmentation mask of FIG. 107 overlaid over the corresponding image of FIG. 103.

FIG. 109 fancifully illustrates a third segmentation mask generated by performance of an intersection operation intersecting the first segmentation mask of FIG. 104 (which indicates, for each pixel of the image of FIG. 103, whether that pixel lies within an area of the image determined to correspond to stool) with the second segmentation mask of FIG. 107 (which indicates, for each pixel of the image of FIG. 103, whether that pixel lies within an area of the image determined to correspond to a diaper). The generated third segmentation mask indicates, for each pixel of the image of FIG. 103, whether that pixel both lies within an area of the image determined to correspond to a diaper and lies within an area of the image determined to correspond to stool. That is, the third segmentation mask indicates pixels that have been determined to both lie within an area of the image determined to correspond to stool and lie within an area of the image determined to correspond to a diaper. FIG. 110 illustrates the exemplary representation of the third segmentation mask of FIG. 109 overlaid over the image of FIG. 103.

Returning again to the example of the image of FIG. 101, FIG. 111 fancifully illustrates an exemplary third segmentation mask for this image indicating pixels that have been determined to both lie within an area of the image determined to correspond to stool and lie within an area of the image determined to correspond to a diaper.

In accordance with an exemplary methodology, a third segmentation mask for an image indicating pixels that have been determined to both lie within an area of the image determined to correspond to stool and lie within an area of the image determined to correspond to a diaper is utilized to generate a modified image that masks out non-stool portions of the original image. Another convolutional neural network is then utilized to classify, for each of these respective modified images, stool in the image into one of a plurality of discrete classes that correspond to a stool rating scale.

Classification Training

In accordance with one or more preferred implementations, a convolutional neural network is trained to classify images into one of a plurality of discrete classes that correspond to a stool rating scale. In accordance with one or more preferred methodologies, such training involves use of modified images that have been generated using an intersection segmentation mask for an image indicating pixels that have been determined to both lie within an area of the image determined to correspond to stool and lie within an area of the image determined to correspond to a diaper.

In accordance with one or more preferred implementations, a convolutional neural network that is used to classify images into one of a plurality of discrete classes that correspond to a stool rating scale is a ResNet18 convolutional neural network utilizing residual learning. See, e.g., Kaiming He et al., *Deep Residual Learning for Image Recognition,* 2016 IEEE Conference on Computer Vision and Pattern Recognition (2016).

In accordance with one or more preferred implementations, training a convolutional neural network to classify images into one of a plurality of discrete classes comprises use of transfer learning. In accordance with one or more preferred implementations, training a convolutional neural network to classify images into one of a plurality of discrete classes comprises only training one or more last layers of the neural network, e.g. only modifying parameters associated with the last layer during training. In accordance with one or more preferred implementations, training a convolutional neural network to classify images into one of a plurality of discrete classes comprises training all layers of the neural network.

In accordance with an exemplary preferred methodology, training a convolutional neural network to classify images into one of a plurality of discrete classes comprises training the convolutional neural network using a plurality of batches of digital images of a diaper with stool. Each of the digital images represents a modified image that has been generated using an intersection segmentation mask for an original image indicating pixels that have been determined to both lie within an area of the original image determined to correspond to stool and lie within an area of the original image determined to correspond to a diaper.

This exemplary methodology involves, for a respective batch of digital images, calculating, by the convolutional neural network for each respective digital image of the respective batch of digital images, a respective set of class probability values for the respective digital image. Each class probability value is calculated based on one or more parameters associated with one or more layers of the convolutional neural network. The one or more parameters include one or more weight parameters and one or more bias parameters.

The convolutional neural network calculates, based on a loss function, a respective loss value for the respective batch. This involves calculating, for each respective digital image of the respective batch, a respective loss value based on the calculated respective class probability values and a respective label associated with the respective digital image representing an indication of a classification of stool in the digital image on a rating scale by a human rater, and determining the respective loss value for the respective batch (for an iteration) based on the calculated loss values for the digital images of the respective batch (for that iteration).

The convolutional neural network repeatedly updates one or more parameters of the convolutional neural network. This updating involves calculating a gradient of the matrix of calculated class probability values, and, starting from this calculated gradient of the matrix of the calculated class probability values, backpropagating through layers of the convolutional neural network and calculating gradients for parameters associated with these layers, including weight parameters and bias parameters associated with these layers. This backpropagation involves at least some use of skip connections, e.g. as disclosed in Kaiming He et al., *Deep Residual Learning for Image Recognition,* 2016 IEEE Conference on Computer Vision and Pattern Recognition (2016). This updating further involves performing, for each respective parameter of a set of one or more parameters of the first convolutional neural network, a parameter update based on a corresponding calculated gradient for that respective parameter and a step size value.

This process of performing parameter updates for a batch is repeated, for each batch, for a configured plurality of iterations in a process of gradient descent, before moving on to be repeated for a next batch.

In accordance with one or more preferred implementations, this updating only involves modifying parameters associated with the last layer, or last several layers, during training. In accordance with one or more preferred implementations, this updating only involves modifying parameters associated with the last layer, or last several layers, during training. In accordance with one or more preferred implementations, this updating involves modifying parameters associated with all layers.

Stool Segmentation Training

In accordance with one or more preferred implementations, a convolutional neural network is trained to segment images depicting stool by identifying one or more areas of a respective image that correspond to stool, and generating a segmentation mask that indicates for each pixel of the respective image, whether that pixel lies within an area of the respective image determined to correspond to stool.

In accordance with one or more preferred implementations, a convolutional neural network that is used to segment images depicting stool, by identifying one or more areas of a respective image that correspond to stool, is a SegNet convolutional neural network. See, e.g., Vijay Badrinarayanan et al., *SegNet: A Deep Convolutional Encoder Decoder Architecture for Image Segmentation*, IEEE Transactions on Pattern Analysis and Machine Intelligence 39, 12: 2481-2495 (2017).

In accordance with one or more preferred implementations, training a convolutional neural network to segment images depicting stool comprises use of transfer learning. In accordance with one or more preferred implementations, training a convolutional neural network to segment images depicting stool comprises only training one or more last layers of the neural network, e.g. only modifying parameters associated with the last layer during training. In accordance with one or more preferred implementations, training a convolutional neural network to segment images depicting stool comprises training all layers of the neural network.

In accordance with an exemplary preferred methodology, training a convolutional neural network to identify one or more areas of a digital image that correspond to stool comprises training the convolutional neural network using a plurality of batches of digital images of stool, and preferably a plurality of batches of digital images of a diaper with stool.

This exemplary methodology involves, for a batch of digital images, calculating, by the convolutional neural network for each respective digital image of the batch of digital images, a class probability value for each pixel of the respective digital image. Each class probability value is calculated based on one or more parameters associated with one or more layers of the convolutional neural network. The one or more parameters include one or more weight parameters and one or more bias parameters.

The convolutional neural network calculates, based on a loss function, a respective loss value for the respective batch. This calculating involves comparing, for each respective pixel of each respective digital image of the batch, the calculated respective class probability value for the respective pixel to a respective encoded truth mask representing an indication of pixels of the respective digital image that were manually identified by a person as corresponding to stool. The respective loss value for the respective batch is determined based at least in part on summing up loss values determined based on the comparisons of the calculated class probability values for the pixels of the respective digital images with the encoded truth masks.

Thereafter, one or more parameters of the convolutional neural network are updated. This updating involves calculating a gradient of the matrix of calculated class probability values, and, starting from this calculated gradient of the matrix of the calculated class probability values, backpropagating through layers of the convolutional neural network and calculating gradients for parameters associated with these layers, including weight parameters and bias parameters associated with these layers. For each respective parameter of a set of one or more parameters of the convolutional neural network, a parameter update is performed based on a corresponding calculated gradient for that respective parameter and a step size value.

This process of performing parameter updates for a batch is repeated, for each batch, for a configured plurality of iterations in a process of gradient descent, before moving on to be repeated for a next batch.

Diaper Segmentation Training

In accordance with one or more preferred implementations, a convolutional neural network is trained to segment images depicting a diaper by identifying one or more areas of a respective image that correspond to a diaper, and generating a segmentation mask that indicates for each pixel of the respective image, whether that pixel lies within an area of the respective image determined to correspond to a diaper.

In accordance with one or more preferred implementations, a convolutional neural network that is used to segment images depicting a diaper, by identifying one or more areas of a respective image that correspond to a diaper, is a SegNet convolutional neural network. See, e.g., Vijay Badrinarayanan et al., *SegNet: A Deep Convolutional Encoder Decoder Architecture for Image Segmentation*, IEEE Transactions on Pattern Analysis and Machine Intelligence 39, 12: 2481-2495 (2017).

In accordance with one or more preferred implementations, training a convolutional neural network to segment images depicting a diaper comprises use of transfer learning. In accordance with one or more preferred implementations, training a convolutional neural network to segment images depicting a diaper comprises only training one or more last layers of the neural network, e.g. only modifying parameters associated with the last layer during training. In accordance with one or more preferred implementations, training a convolutional neural network to segment images depicting a diaper comprises training all layers of the neural network.

In accordance with an exemplary preferred methodology, training a convolutional neural network to identify one or more areas of a digital image that correspond to a diaper comprises training the convolutional neural network using a plurality of batches of digital images of a diaper, and in at least some implementations a plurality of batches of digital images of a diaper with stool.

This exemplary methodology involves, for a batch of digital images, calculating, by the convolutional neural network for each respective digital image of the batch of digital images, a class probability value for each pixel of the respective digital image. Each class probability value is calculated based on one or more parameters associated with one or more layers of the convolutional neural network. The one or more parameters include one or more weight parameters and one or more bias parameters.

The convolutional neural network calculates, based on a loss function, a respective loss value for the respective batch. This calculating involves comparing, for each respective pixel of each respective digital image of the batch, the calculated respective class probability value for the respective pixel to a respective encoded truth mask representing an indication of pixels of the respective digital image that were manually identified by a person as corresponding to a diaper. The respective loss value for the respective batch is determined based at least in part on summing up loss values determined based on the comparisons of the calculated class probability values for the pixels of the respective digital images with the encoded truth masks.

Thereafter, one or more parameters of the convolutional neural network are updated. This updating involves calculating a gradient of a matrix of calculated class probability values, and, starting from this calculated gradient of the matrix of the calculated class probability values, backpropagating through layers of the convolutional neural network and calculating gradients for parameters associated with these layers, including weight parameters and bias parameters associated with these layers. For each respective parameter of a set of one or more parameters of the convolutional neural network, a parameter update is performed based on a corresponding calculated gradient for that respective parameter and a step size value.

This process of performing parameter updates for a batch is repeated, for each batch, for a configured plurality of iterations in a process of gradient descent, before moving on to be repeated for a next batch.

Use of Augmented Images to Facilitate Training

In accordance with one or more preferred implementations, training data for a convolutional neural network is supplemented with augmented data in the form of transformed images that are generated by applying one or more transforms, and preferably one or more random transforms, to a digital image, e.g. a digital image of a diaper with stool.

These transforms may include one or more skew transformations, one or more rotation transformations, one or more flip transformations, one or more occlusion transformations, one or more erasures, one or more crop transformations, and one or more zoom transformations.

For illustrative purposes, FIG. 112 fancifully illustrates the image of FIG. 101 partitioned into square sections that can be manipulated to transform the image. For example, FIG. 113 fancifully illustrates translation of one of these square sections to another square section. This section could then further be flipped, as illustrated in FIG. 114. Other square portions could similarly be translated in a manner such that all original portions of the image are still present, but some have been moved, flipped, or otherwise transformed, as illustrated in FIG. 115. FIG. 116 illustrates the exemplary transformed image that has been transformed from the image of FIG. 101 by applying these transforms. In accordance with one or more preferred implementations, rather than performing transforms based on square portions, other sized portions or other sizing or transform methodologies may be utilized. For example, FIG. 117 fancifully illustrates the image of FIG. 101 partitioned into rectangular sections that can be manipulated to transform the image.

In accordance with one or more preferred implementations, transformed images are utilized in training a convolutional neural network to classify images into one of a plurality of discrete classes that correspond to a stool rating scale. In accordance with one or more preferred implementations, transformed images are utilized in training a convolutional neural network to segment images depicting stool by identifying one or more areas of a respective image that correspond to stool. In accordance with one or more preferred implementations, transformed images are utilized in training a convolutional neural network to segment images depicting a diaper by identifying one or more areas of a respective image that correspond to a diaper.

Neural Network Architectures for Implementing Mask Generation

Thus far, methodologies have been described involving use of a first convolutional neural network to generate a first segmentation mask for stool, as fancifully illustrated in FIG. 118, and use of a second convolutional neural network to generate a second segmentation mask for a diaper, as fancifully illustrated in FIG. 119.

In accordance with one or more preferred implementations, a single convolutional neural network is configured to generate, based on input image data for an image, both a first segmentation mask for stool, and a second segmentation mask for a diaper. In accordance with one or more preferred implementations, such a convolutional neural network creates efficiencies by leveraging the same image processing for the first n layers of a neural network, before eventually providing the output from one layer as input to both a first layer configured to generate (possibly with the assistance of other subsequent layers) a first segmentation mask for stool, and a second layer configured to generate (possibly with the assistance of other subsequent layers) a second segmentation mask for a diaper, as fancifully illustrated in FIG. 120.

In either event, these generated masks can be intersected to produce the intersected mask indicating pixels that have been determined to both lie within an area of the image determined to correspond to stool and lie within an area of the image determined to correspond to a diaper, as fancifully illustrated in FIG. 121. FIG. 122 fancifully illustrates application of such an intersected mask to produce a modified image. In accordance with one or more preferred implementations, such a modified image may be resized, including by cropping and resizing. FIG. 123 illustrates an exemplary resized modified image.

In situations in which a single neural network is utilized to generate, based on input image data for an image, both a first segmentation mask for stool, and a second segmentation mask for a diaper, this neural network may also perform such intersection and may even apply the mask to the image to generate a modified image. The network may provide as output one or more of: the first segmentation mask for stool, the second segmentation mask for a diaper, the intersected segmentation mask, a modified image, and a resized modified image.

In accordance with one or more preferred implementations, a single convolutional neural network may even be trained to, based on input image data for an image, perform segmentation identifying pixel of the image as "not_stool", "not_diaper", or "not_stool_and_not_diaper". The remaining portions of the image would be "stool_and_diaper".

Similarly, in accordance with one or more preferred implementations, a single convolutional neural network may be trained to, based on input image data for an image, perform segmentation identifying pixels of the image as "stool" or "diaper_but_not_stool". The remaining portions of the image would be characterized as "not_stool_and_not_diaper".

In accordance with one or more preferred implementations, a single convolutional neural network may be trained to, based on input image data for an image, perform segmentation identifying pixel of the image as "not_stool_and_not_diaper" (e.g. with an assigned value of "0"), "diaper" (e.g. with an assigned value of "1") (which preferably would be associated with an area of the image determined to correspond to a diaper but not stool), and "stool" (e.g. with an assigned value of "2").

In accordance with one or more preferred implementations, such a convolutional neural network may be trained with annotated images annotated in accordance with such classifications.

Exemplary User Interfaces

In accordance with one or more preferred implementations, one or more servers are configured to provide a website that is accessible to a user via a web browser. This website comprises an interface that allows a user to upload one or more digital images (e.g. images of a diaper with stool).

In accordance with one or more preferred implementations, such a website is further configured to effect automatic determination, for each such uploaded image, of a rating for the image in accordance with one or more methodologies disclosed herein. In accordance with one or more preferred implementations, such a website is configured to provide to a user, for each such uploaded image, an indication of an automatically determined rating (e.g. on the Bristol scale or the Brussels Infant and Toddler Stool Scale (BITSS)).

An exemplary interface of an exemplary such website allows a user to upload one or more digital images, and then effects automatic determination, for each such uploaded image, of a rating for the image by communicating a request to a classification service, which may be hosted on the same server or cloud or a different server or cloud. The classification service, or another service executing prior to the classification service, may resize the image to a standardized size.

From either the original uploaded image or a resized image, the classification service generates, using one or more neural networks, a first segmentation mask for stool, and a second segmentation mask for a diaper. The classification service further generates an intersection mask, and applies this intersection mask to the utilized image. The classification service then calculates one or more class scores for the modified utilized image, and determines a rating (e.g. on the Bristol scale) based on the calculated class scores. The classification service returns, to a service or process associated with the website, at least data indicative of the determined rating, and possibly other data as well, such as data representing the modified utilized image.

In accordance with one or more preferred implementations, images provided by a user are stored and utilized in future training. In accordance with one or more preferred implementations, images provided by a user are stored, subsequently annotated and/or classified (e.g. annotated to indicate areas corresponding to stool or a diaper or classified by a clinician), and the images (and a mask or classification) used as training images in future training. In accordance with one or more preferred implementations, personal/protected health information (PHI) is removed from images prior to being annotated and/or classified.

In accordance with one or more preferred implementations, a website provides a front end to a web application. In accordance with one or more preferred implementations, such a web application is a Flask web application. In accordance with one or more preferred implementations, such a web application comprises a restful application programming interface.

In accordance with one or more preferred implementations, a phone or tablet app, such as an Android or iOS app, provides the same capabilities as described with respect to a web interface.

***

Based on the foregoing description, it will be readily understood by those persons skilled in the art that the invention has broad utility and application. Many embodiments and adaptations of the invention other than those specifically described herein, as well as many variations, modifications, and equivalent arrangements, will be apparent from or reasonably suggested by the invention and the foregoing descriptions thereof, without departing from the substance or scope of the invention. Accordingly, while the invention has been described herein in detail in relation to one or more preferred embodiments, it is to be understood that this disclosure is only illustrative and exemplary of the invention and is made merely for the purpose of providing a full and enabling disclosure of the invention. The foregoing disclosure is not intended to be construed to limit the invention or otherwise exclude any such other embodiments, adaptations, variations, modifications or equivalent arrangements, the invention being limited only by the claims appended hereto and the equivalents thereof.

What is claimed is:

1. A method involving use of multiple convolutional neural networks and multiple segmentation masks to programmatically generate a rating for one or more test images, the method comprising:

(a) training, using a first plurality of digital images of stool, a first convolutional neural network to identify one or more areas of a digital image that correspond to stool, such training comprising, for each respective batch of digital images of the first plurality of digital images, for each of a plurality of iterations, (i) calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, (ii) calculating, by the first convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to stool, and (B) determining the respective loss value for the respective batch based on summing up loss values determined based on the comparisons of the calculated class probability values for the pixels of the respective digital images with the encoded truth masks, (iii) updating one or more parameters of the first convolutional neural network, such updating comprising (A) calculating a gradient of a matrix of the calculated class probability values, (B) starting from this calculated gradient of the matrix of the calculated class probability values, backpropagating through layers of the first convolutional neural network and calculating gradients for parameters associated with these layers, including weight parameters and bias parameters associated with these layers, (C) performing, for each respective parameter of a set of one or more parameters of the first convolutional neural network, a parameter update based on a corresponding calculated gradient for that respective parameter and a step size value;

(b) training, using a second plurality of digital images of diapers, a second convolutional neural network to identify an area of a digital image that corresponds to a diaper, such training comprising, for each respective batch of digital images of the second plurality of digital images, for each of a plurality of iterations, (i) calculating, by the second convolutional neural network for each respective digital image of the respective batch of digital images, a class probability value for each pixel of the respective digital image, each class probability value being calculated based on one or more parameters associated with one or more layers of the second convolutional neural network, the one or more parameters including one or more weight parameters and one or more bias parameters, (ii) calculating, by the second convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and (B) determining the respective loss value for the respective batch based on summing up loss values determined based on the comparisons of the calculated class probability values for the pixels of the respective digital images with the encoded truth masks, (iii) updating one or more parameters of the second convolutional neural network, such updating comprising (A) calculating a gradient of a matrix of the calculated class probability values, (B) starting from this calculated gradient of the matrix of the calculated class probability values, backpropagating through layers of the second convolutional neural network and calculating gradients for parameters associated with these layers, including weight parameters and bias parameters associated with these layers, (C) performing, for each respective parameter of a set of one or more parameters of the second convolutional neural network, a parameter update based on a corresponding calculated gradient for that respective parameter and a step size value;

(c) training, using a third plurality of digital images of diapers with stool, a third convolutional neural network to classify stool depicted in an image, such training comprising (i) generating, for each respective digital image of the third plurality of digital images, a respective first mask by providing the respective digital image to the first convolutional neural network as input and receiving as output the generated respective first mask representing an identification of one or more areas of the respective digital image that correspond to stool, (ii) generating, for each respective digital image of the third plurality of digital images, a respective second mask by providing the respective digital image to the second convolutional neural network as input and receiving as output the generated respective second mask representing an identification of an area of the respective digital image that corresponds to a diaper, (iii) generating, for each respective digital image of the third plurality of digital images, a respective third mask representing an intersection of the respective first mask for the respective digital image and the respective second mask for the respective digital image, (iv) generating a fourth plurality of digital images from the third plurality of digital images by, for each respective digital image of the third plurality of digital images, applying the generated respective third mask to the respective digital image, (v) for each respective batch of digital images of the fourth plurality of digital images, for each of a plurality of iterations, (A) calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, (B) calculating, by the third convolutional neural network based on a loss function, a respective loss value for the respective batch, such calculating comprising (I) calculating, for each respective digital image of the respective batch, a respective loss value based on the calculated respective class probability values and a respective label associated with the respective digital image representing an indication of a classification of stool in the digital image on a rating scale by a human rater, and (II) determining the respective loss value for the respective batch based on the calculated loss values for the digital images of the respective batch, (C) updating one or more parameters of the third convolutional neural network based on use of gradient descent, such updating comprising (I) calculating a gradient of a matrix of the calculated class probability values, (II) starting from this calculated gradient of the matrix of the calculated class probability values, backpropagating through layers of the third convolutional neural network and calculating gradients for parameters associated with these layers, including weight parameters and bias parameters associated with these layers, this backpropagation involving at least some use of skip connections, (III) performing, for each respective parameter of a set of one or more parameters of the third convolutional neural network, a parameter update based on a corresponding calculated gradient for that respective parameter and a step size value;

(d) providing, to a user via a web browser of the user, an interface configured to allow for upload of one or more digital images;

(e) receiving, at a server based on user input corresponding to interaction with the interface to upload digital images, a first set of digital images;

(f) utilizing the trained third convolutional neural network to evaluate the first set of digital images and generate a rating classification for each digital image of the first set of digital images, comprising (i) generating, for each respective digital image of the first set of digital images, a respective first mask by providing the respective digital image to the first convolutional neural network as input and receiving as output the generated respective first mask representing an identification of one or more areas of the respective digital image that corresponds to stool, (ii) generating, for each respective digital image of the first set of digital images, a respective second mask by providing the respective digital image to the second convolutional neural network as input and receiving as output the generated respective second mask representing an identification of an area of the respective digital image that corresponds to a diaper, (iii) generating, for each respective digital image of the first set of digital images, a respective third mask representing an intersection of the respective first mask for the respective digital image and the respective second mask for the respective digital image, (iv) generating a second set of digital images from the first set of digital images by, for each respective digital image of the first set of digital images, applying the generated respective third mask to the respective digital image, (v) calculating, by the third convolutional neural network for each respective digital image of the second set of digital images, a respective set of class probability values for the respective digital image, each class probability value being calculated based on one or more parameters associated with one or more layers of the third convolutional neural network, the one or more parameters including one or more weight parameters and one or more bias parameters, (vi) determining, for each respective digital image of the second set of digital images, based on the calculated respective set of class probability values for that respective digital image, a class to assign the respective digital image to, and associating the corresponding digital image of the first set of digital images with a rating corresponding to that class.

2. The method of claim 1, wherein the method further comprises further training the third convolutional neural network to classify stool depicted in an image, such further training comprising (i) generating a fifth plurality of digital images from the fourth plurality of digital images by, for each respective digital image of the third plurality of digital images, applying one or more random transformations to generate one or more augmented images forming part of the fifth plurality of digital images, and (ii) for each respective batch of digital images of the fifth plurality of digital images, for each of a plurality of iterations, (A) calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, (B) calculating, by the third convolutional neural network based on a loss function, a respective loss value for the respective batch, such calculating comprising (I) calculating, for each respective digital image of the respective batch, a respective loss value based on the calculated respective class probability values and a respective label associated with the respective digital image representing an indication of a classification of stool in the digital image on a rating scale by a human rater, and (II) determining the respective loss value for the respective batch based on the calculated loss values for the digital images of the respective batch, and (C) updating one or more parameters of the third convolutional neural network, such updating comprising (I) calculating a gradient of a matrix of the calculated class probability values, (II) starting from this calculated gradient of the matrix of the calculated class probability values, backpropagating through layers of the third convolutional neural network and calculating gradients for parameters associated with these layers, including weight parameters and bias parameters associated with these layers, this backpropagation involving at least some use of skip connections, and (III) performing, for each respective parameter of a set of one or more parameters of the third convolutional neural network, a parameter update based on a corresponding calculated gradient for that respective parameter and a step size value.

3. The method of claim 2, wherein the random transformations include one or more skew transformations.

4. The method of claim 2, wherein the random transformations include one or more rotation transformations.

5. The method of claim 2, wherein the random transformations include one or more flip transformations.

6. The method of claim 2, wherein the random transformations include one or more occlusion transformations.

7. The method of claim 2, wherein the random transformations include one or more brightness or contrast transformations.

8. The method of claim 2, wherein the random transformations include one or more crop transformations.

9. The method of claim 2, wherein the random transformations include one or more zoom transformations.

10. The method of claim 1, wherein each batch comprises a single image.

11. The method of claim 1, wherein each batch is a mini-batch.

12. The method of claim 1, wherein each batch comprises a plurality of images.

13. The method of claim 1, wherein calculating, by the first convolutional neural network based on a loss function, a loss value for a batch comprises calculating a cross-entropy loss value.

14. The method of claim 1, wherein calculating, by the first convolutional neural network based on a loss function, a loss value for a batch comprises calculating a hinge loss.

15. The method of claim 1, wherein calculating, by the first convolutional neural network based on a loss function, a loss value for a batch comprises calculating a multiclass support vector machine loss.

16. The method of claim 1, wherein the first convolutional neural network utilizes a softmax classifier.

17. The method of claim 1, wherein the third convolutional neural network comprises one or more skip connections.

18. A method involving use of multiple convolutional neural networks and multiple segmentation masks to programmatically generate a rating for a plurality of test images, the method comprising:

(a) training, using a first plurality of digital images of stool, a first convolutional neural network to identify one or more areas of a digital image that correspond to stool, such training comprising, for each respective batch of digital images of the first plurality of digital images, for each of a plurality of iterations, (i) calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, (ii) calculating, by the first convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and (B) determining the respective loss value for the respective batch based on summing up loss values determined based on the comparisons of the calculated class probability values for the pixels of the respective digital images with the encoded truth masks, (iii) updating one or more parameters of the first convolutional neural network, such updating comprising (A) calculating a gradient of a matrix of the calculated class probability values, (B) starting from this calculated gradient of the matrix of the calculated class probability values, backpropagating through layers of the first convolutional neural network and calculating gradients for parameters associated with these layers, including weight parameters and bias parameters associated with these layers, (C) performing, for each respective parameter of a set of one or more parameters of the first convolutional neural network, a parameter update based on a corresponding calculated gradient for that respective parameter and a step size value;

(b) training, using a second plurality of digital images of diapers, a second convolutional neural network to identify an area of a digital image that corresponds to a diaper, such training comprising, for each respective batch of digital images of the second plurality of digital images, for each of a plurality of iterations, (i) calculating, by the second convolutional neural network for each respective digital image of the respective batch of digital images, a class probability value for each pixel of the respective digital image, each class probability value being calculated based on one or more parameters associated with one or more layers of the second convolutional neural network, the one or more parameters including one or more weight parameters and one or more bias parameters, (ii) calculating, by the second convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and (B) determining the respective loss value for the respective batch based on summing up loss values determined based on the comparisons of the calculated class probability values for the pixels of the respective digital images with the encoded truth masks, (iii) updating one or more parameters of the second convolutional neural network, such updating comprising (A) calculating a gradient of a matrix of the calculated class probability values, (B) starting from this calculated gradient of the matrix of the calculated class probability values, backpropagating through layers of the second convolutional neural network and calculating gradients for parameters associated with these layers, including weight parameters and bias parameters associated with these layers, (C) performing, for each respective parameter of a set of one or more parameters of the second convolutional neural network, a parameter update based on a corresponding calculated gradient for that respective parameter and a step size value;

(c) training, using a third plurality of digital images of diapers with stool, a third convolutional neural network to classify stool depicted in an image, such training comprising (i) generating, for each respective digital image of the third plurality of digital images, a respective first mask by providing the respective digital image to the first convolutional neural network as input and receiving as output the generated respective first mask representing an identification of one or more areas of the respective digital image that correspond to stool, (ii) generating, for each respective digital image of the third plurality of digital images, a respective second mask by providing the respective digital image to the second convolutional neural network as input and receiving as output the generated respective second mask representing an identification of an area of the respective digital image that corresponds to a diaper, (iii) generating, for each respective digital image of the third plurality of digital images, a respective third mask representing an intersection of the respective first mask for the respective digital image and the respective second mask for the respective digital image, (iv) generating a fourth plurality of digital images from the third plurality of digital images by, for each respective digital image of the third plurality of digital images, applying the generated respective third mask to the respective digital image, (v) for each respective batch of digital images of the fourth plurality of digital images, for each of a plurality of iterations, (A) calculating, by the third convolutional neural network for each respective digital image of the respective batch of digital images, a respective set of class probability values for the respective digital image, each class probability value being calculated based on one or more parameters associated with one or more layers of the third convolutional neural network, the one or more parameters including one or more weight parameters and one or more bias parameters, (B) calculating, by the third convolutional neural network based on a loss function, a respective loss value for the respective batch, such calculating comprising (I) calculating, for each respective digital image of the respective batch, a respective loss value based on the calculated respective class probability values and a respective label associated with the respective digital image representing an indication of a classification of stool in the digital image on a rating scale by a human rater, and (II) determining the respective loss value for the respective batch based on the calculated loss values for the digital images of the respective batch, (C) updating one or more parameters of the third convolutional neural network, such updating comprising (I) calculating a gradient of a matrix of the calculated class probability values, (II) starting from this calculated gradient of the matrix of the calculated class probability values, backpropagating through layers of the third convolutional neural network and calculating gradients for parameters associated with these layers, including weight parameters and bias parameters associated with these layers, this backpropagation involving at least some use of skip connections, (III) performing, for each respective parameter of a set of one or more parameters of the third convolutional neural network, a parameter update based on a corresponding calculated gradient for that respective parameter and a step size value;

(d) utilizing the trained third convolutional neural network to evaluate a fifth plurality of digital images of diapers with stool and generate a rating classification for each digital image of the fifth plurality of digital images, comprising (i) generating, for each respective digital image of the fifth plurality of digital images, a respective first mask by providing the respective digital image to the first convolutional neural network as input and receiving as output the generated respective first mask representing an identification of one or more areas of the respective digital image that correspond to stool, (ii) generating, for each respective digital image of the fifth plurality of digital images, a respective second mask by providing the respective digital image to the second convolutional neural network as input and receiving as output the generated respective second mask representing an identification of an area of the respective digital image that corresponds to a diaper, (iii) generating, for each respective digital image of the fifth plurality of digital images, a respective third mask representing an intersection of the respective first mask for the respective digital image and the respective second mask for the respective digital image, (iv) generating a sixth plurality of digital images from the fifth plurality of digital images by, for each respective digital image of the fifth plurality of digital images, applying the generated respective third mask to the respective digital image, (v) calculating, by the third convolutional neural network for each respective digital image of the sixth plurality of digital images, a respective set of class probability values for the respective digital image, each class probability value being calculated based on one or more parameters associated with one or more layers of the third convolutional neural network, the one or more parameters including one or more weight parameters and one or more bias parameters, (vi) determining, for each respective digital image of the sixth plurality of digital images, based on the calculated respective set of class probability values for that respective digital image, a class to assign the respective digital image to, and associating the corresponding digital image of the fifth set of digital images with a rating corresponding to that class.

19. A method involving use of multiple convolutional neural networks and multiple segmentation masks to programmatically generate a rating for one or more test images, the method comprising:

(a) training, using a first plurality of digital images of stool, a first downstream layer of a first convolutional neural network to identify one or more areas of a digital image that correspond to stool, such training comprising, for each respective batch of digital images of the first plurality of digital images, for each of a plurality of iterations, (i) calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, (ii) calculating, by the first convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to stool, and (B) determining the respective loss value for the respective batch based on summing up loss values determined based on the comparisons of the calculated class probability values for the pixels of the respective digital images with the encoded truth masks, (iii) updating one or more parameters of the first downstream layer of the first convolutional neural network, such updating comprising (A) calculating a gradient of a matrix of the calculated class probability values, (B) starting from this calculated gradient of the matrix of the calculated class probability values, backpropagating into the first downstream layer of the first convolutional neural network and calculating gradients for parameters associated with this layer, including weight parameters and bias parameters associated with this layer, (C) performing, for each respective parameter of a set of one or more parameters of the first downstream layer of the neural network, a parameter update based on a corresponding calculated gradient for that respective parameter and a step size value;

(b) training, using a second plurality of digital images of diapers, a second downstream layer of the first convolutional neural network to identify an area of a digital image that corresponds to a diaper, such training comprising, for each respective batch of digital images of the second plurality of digital images, for each of a plurality of iterations, (i) calculating, by the first convolutional neural network for each respective digital image of the respective batch of digital images, a class probability value for each pixel of the respective digital image, each class probability value being calculated based on one or more parameters associated with one or more layers of the first convolutional neural network, the one or more parameters including one or more weight parameters and one or more bias parameters, (ii) calculating, by the first convolutional neural network based on a loss function, a respective loss value for the respective batch, such calculating comprising (A) comparing, for each respective pixel of each respective digital image of the respective batch, the calculated respective class probability value for the respective pixel to a respective encoded truth mask representing an indication of pixels of the respective digital image that were manually identified by a person as corresponding to a diaper, and (B) determining the respective loss value for the respective batch based on summing up loss values determined based on the comparisons of the calculated class probability values for the pixels of the respective digital images with the encoded truth masks, (iii) updating one or more parameters of the second downstream layer of the first convolutional neural network, such updating comprising (A) calculating a gradient of a matrix of the calculated class probability values, (B) starting from this calculated gradient of the matrix of the calculated class probability values, backpropagating into the second downstream layer of the first convolutional neural network and calculating gradients for parameters associated with this layer, including weight parameters and bias parameters associated with this layer, (C) performing, for each respective parameter of a set of one or more parameters of the second downstream layer of the first convolutional neural network, a parameter update based on a corresponding calculated gradient for that respective parameter and a step size value;

(c) training, using a third plurality of digital images of diapers with stool, a second convolutional neural network to classify stool depicted in an image, such training comprising (i) generating, for each respective digital image of the third plurality of digital images, a respective first mask by providing the respective digital image to the first convolutional neural network as input and receiving as output the generated respective first mask representing an identification of one or more areas of the respective digital image that correspond to stool, (ii) generating, for each respective digital image of the third plurality of digital images, a respective second mask by providing the respective digital image to the first convolutional neural network as input and receiving as output the generated respective second mask representing an identification of an area of the respective digital image that corresponds to a diaper, (iii) generating, for each respective digital image of the third plurality of digital images, a respective third mask representing an intersection of the respective first mask for the respective digital image and the respective second mask for the respective digital image, (iv) generating a fourth plurality of digital images from the third plurality of digital images by, for each respective digital image of the third plurality of digital images, applying the generated respective third mask to the respective digital image, (v) for each respective batch of digital images of the fourth plurality of digital images, for each of a plurality of iterations, (A) calculating, by the second convolutional neural network for each respective digital image of the respective batch of digital images, a respective set of class probability values for the respective digital image, each class probability value being calculated based on one or more parameters associated with one or more layers of the second convolutional neural network, the one or more parameters including one or more weight parameters and one or more bias parameters, (B) calculating, by the second convolutional neural network based on a loss function, a respective loss value for the respective batch, such calculating comprising (I) calculating, for each respective digital image of the respective batch, a respective loss value based on the calculated respective class probability values and a respective label associated with the respective digital image representing an indication of a classification of stool in the digital image on a rating scale by a human rater, and (II) determining the respective loss value for the respective batch based on the calculated loss values for the digital images of the respective batch, (C) updating one or more parameters of the second convolutional neural network based on use of gradient descent, such updating comprising (I) calculating a gradient of a matrix of the calculated class probability values, (II) starting from this calculated gradient of the matrix of the calculated class probability values, backpropagating through layers of the second convolutional neural network and calculating gradients for parameters associated with these layers, including weight parameters and bias parameters associated with these layers, this backpropagation involving at least some use of skip connections, (III) performing, for each respective parameter of a set of one or more parameters of the second convolutional neural network, a parameter update based on a corresponding calculated gradient for that respective parameter and a step size value;

(d) providing, to a user via a web browser of the user, an interface configured to allow for upload of one or more digital images;

(e) receiving, at a server based on user input corresponding to interaction with the interface to upload digital images, a first set of digital images;

(f) utilizing the trained second convolutional neural network to evaluate the first set of digital images and generate a rating classification for each digital image of the first set of digital images, comprising (i) generating, for each respective digital image of the first set of digital images, a respective first mask by providing the respective digital image to the first convolutional neural network as input and receiving as output the generated respective first mask representing an identification of one or more areas of the respective digital image that corresponds to stool, (ii) generating, for each respective digital image of the first set of digital images, a respective second mask by providing the respective digital image to the first convolutional neural network as input and receiving as output the generated respective second mask representing an identification of an area of the respective digital image that corresponds to a diaper, (iii) generating, for each respective digital image of the first set of digital images, a respective third mask representing an intersection of the respective first mask for the respective digital image and the respective second mask for the respective digital image, (iv) generating a second set of digital images from the first set of digital images by, for each respective digital image of the first set of digital images, applying the generated respective third mask to the respective digital image, (v) calculating, by the second convolutional neural network for each respective digital image of the second set of digital images, a respective set of class probability values for the respective digital image, each class probability value being calculated based on one or more parameters associated with one or more layers of the second convolutional neural network, the one or more parameters including one or more weight parameters and one or more bias parameters, (vi) determining, for each respective digital image of the second set of digital images, based on the calculated respective set of class probability values for that respective digital image, a class to assign the respective digital image to, and associating the corresponding digital image of the first set of digital images with a rating corresponding to that class.

20. The method of claim 19, wherein the method further comprises further training the second convolutional neural network to classify stool depicted in an image, such further training comprising (i) generating a seventh plurality of digital images from the fourth plurality of digital images by, for each respective digital image of the third plurality of digital images, applying one or more random transformations to generate one or more augmented images forming part of the seventh plurality of digital images, and (ii) for each respective batch of digital images of the seventh plurality of digital images, for each of a plurality of iterations, (A) calculating, by the second convolutional neural network for each respective digital image of the respective batch of digital images, a respective set of class probability values for the respective digital image, each class probability value being calculated based on one or more parameters associated with one or more layers of the second convolutional neural network, the one or more parameters including one or more weight parameters and one or more bias parameters, (B) calculating, by the second convolutional neural network based on a loss function, a respective loss value for the respective batch, such calculating comprising (I) calculating, for each respective digital image of the respective batch, a respective loss value based on the calculated respective class probability values and a respective label associated with the respective digital image representing an indication of a classification of stool in the digital image on a rating scale by a human rater, and (II) determining the respective loss value for the respective batch based on the calculated loss values for the digital images of the respective batch, and (C) updating one or more parameters of the second convolutional neural network, such updating comprising (I) calculating a gradient of a matrix of the calculated class probability values, (II) starting from this calculated gradient of the matrix of the calculated class probability values, backpropagating through layers of the second convolutional neural network and calculating gradients for parameters associated with these layers, including weight parameters and bias parameters associated with these layers, this backpropagation involving at least some use of skip connections, and (III) performing, for each respective parameter of a set of one or more parameters of the second convolutional neural network, a parameter update based on a corresponding calculated gradient for that respective parameter and a step size value.

* * * * *